United States Patent [19]

Broniwitz et al.

[11] 3,952,304

[45] Apr. 20, 1976

[54] TRACKING SYSTEM UTILIZING KALMAN FILTER CONCEPTS

[75] Inventors: Laurence E. Broniwitz, Los Angeles; John B. Pearson, III, Santa Monica; Mark I. Landau, Los Angeles, all of Calif.

[73] Assignee: Hughes Aircraft Company, Culver City, Calif.

[22] Filed: Nov. 23, 1973

[21] Appl. No.: 418,693

[52] U.S. Cl. .............................. 343/16 M
[51] Int. Cl.² ............................ G01S 9/22
[58] Field of Search ............. 343/5 DP, 9, 16 M

[56] References Cited
UNITED STATES PATENTS

| | | | |
|---|---|---|---|
| 3,646,554 | 2/1972 | Fierston et al. | 343/5 DP |
| 3,688,313 | 8/1972 | Kern | 343/9 X |
| 3,797,017 | 3/1974 | Taylor | 343/16 M X |

Primary Examiner—T. H. Tubbesing
Attorney, Agent, or Firm—Walter J. Adam; W. H. MacAllister

[57] ABSTRACT

A monopulse radar tracking system is disclosed employing four tracking channels, one for each of range, velocity, azimuth and elevation. The two angle channels are referenced directly to antenna coordinates. Each channel is mechanized by a stored program in a digital computer, and the mechanization employs Kalman filtering with gain factors continually optimized for measured signal-to-noise ratios. Angular rate commands for the antennas are obtained by passing pointing error estimates from the angle channels through a compensator for antenna motion and adding line-of-sight rate estimates from the angle filter channels. Cross-coupling between channels is provided, and each channel is aided by outputs from an inertial navigation platform. Preaveraging of discriminants received between computational cycles is provided.

5 Claims, 47 Drawing Figures

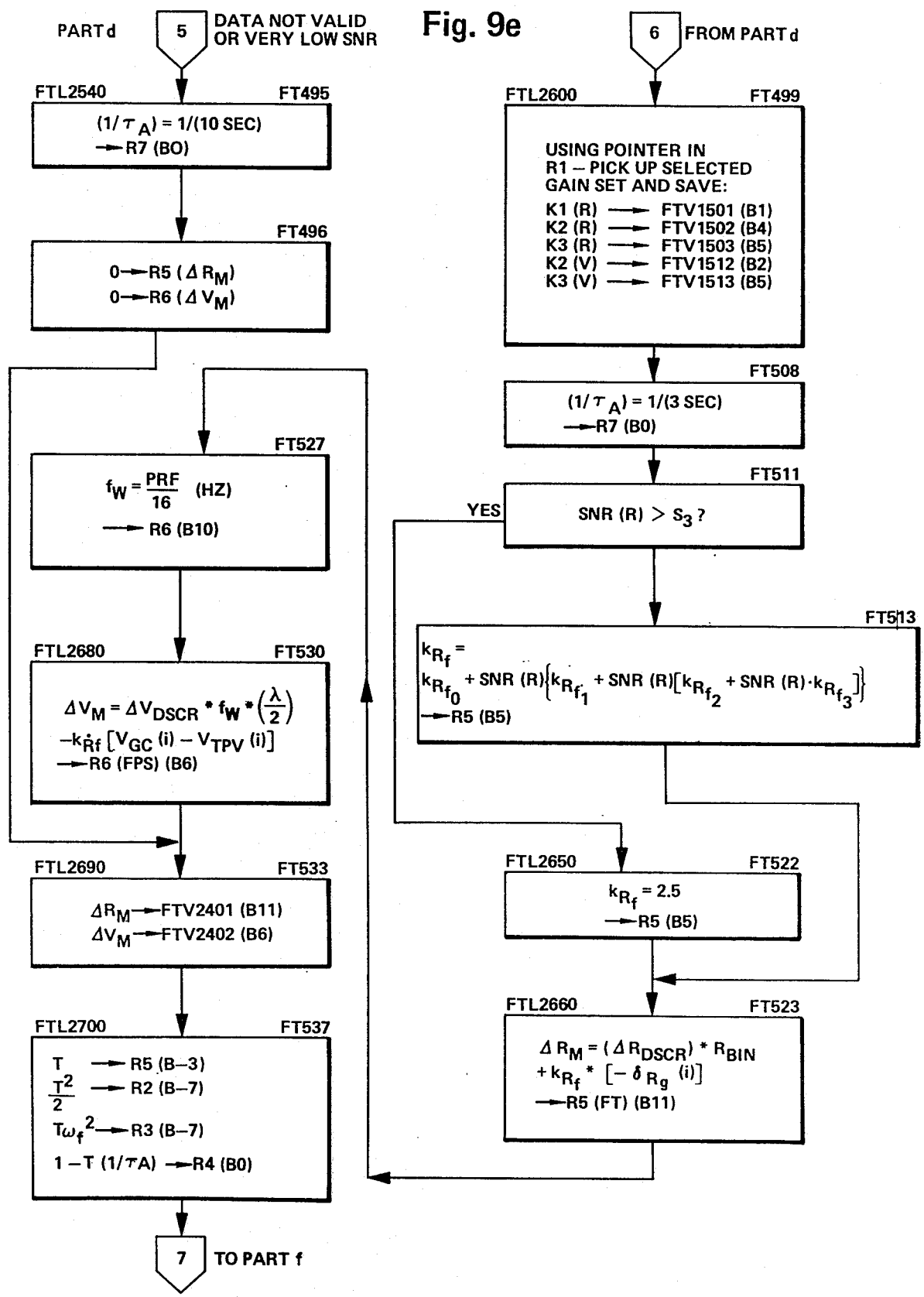

Fig. 25

HALF-WORD INSTRUCTION FORMATS        FORMAT TYPE

| $R^c$ | OP | $R^a$ | RR |

| OPE | OP | $R^a$ | RO |

| OPE | OP | OPE | CO |

| OPE | OP | I | AGE |

0 1 2 3 4 5 6 7 8 9 10 11

FULL-WORD INSTRUCTION FORMATS

| * | $R^x$ | OP | $R^a$ | m | RM |

| * | $R^x$ | OP | m | LA |

| OPE | OP | m | BC |

| k | OP | $R^a$ | m | MM |

| * | $R^x$ | OP | I | m | LA |

| OPE | OP | $R^a$ | y | IY |

| ▨ | $R^x$ | OP | $R^a$ | ▨ | OPE | K | SH |

| ▨ | OP | ▨ | y | BIT |

| ▨ | OP | $R^a$ | y | LCW |

0 1 2 3 4 5 6 7 8 9 10 11 12 13 14 15 16 17 18 19 20 21 22 23

NOTES:
OP — 6-BIT FIELD CONTAINING THE BASIC INSTRUCTION OPERATION CODE
OPE — 3-BIT FIELD CONTAINING AN OPERATION EXTENDER CODE
$R^a$ — 3-BIT FIELD DESIGNATING THE DESTINATION REGISTER ($0 \leq a \leq 7$)
$R^c$ — 3-BIT FIELD DESIGNATING THE SOURCE REGISTER ($0 \leq a \leq 7$)
$R^x$ — 2-BIT FIELD DESIGNATING THE INDEX REGISTER ($1 \leq x \leq 3$) (x = 0 SPECIFIES NO INDEXING)
\* — BIT DESIGNATING THE INDIRECT ADDRESS FLAG
m — 12-BIT (RM) OR 15-BIT (LA AND BC) FIELD CONTAINING THE INSTRUCTION'S IMMEDIATE ADDRESS
y — 12-BIT FIELD CONTAINING AN IMMEDIATE OPERAND
I — 3-BIT FIELD CONTAINING AN IMMEDIATE OPERAND
K — 6-BIT FIELD CONTAINING AN IMMEDIATE COUNT VALUE
k — 3-BIT FIELD CONTAINING AN IMMEDIATE COUNT VALUE

TRACKING SYSTEM UTILIZING KALMAN FILTER CONCEPTS

ORIGIN OF THE INVENTION

The invention herein described was made in the course of or under a Contract or Subcontract thereunder with the Air Force.

BACKGROUND OF THE INVENTION

This invention relates to systems for tracking targets with electromagnetic energy sensors, and more particularly to radar angle, range and velocity tracking systems.

Although reference will be made hereinafter to only active radar tracking systems, it is to be understood that the techniques of the present invention are also applicable to other electromagnetic systems, such as laser tracking systems, and to passive tracking systems as well. For example, to measure satellite orbits using a completely passive tracking system, either optical or UHF sensors measure angles and continually drive sensor positioning servomotors to maintain the sensor axis on the satellite. However, for determination of orbits without round-trip time-delay (range) measurements, long observation periods are required to determine the orbit. Consequently, active systems are preferred in satellite tracking as in most other applications but there will be those special applications where range information is not required or can be determined by some other means.

The concept of pulse trasmission has been basic to most tracking radar systems because range can be easily measured by the time delay of each pulse round trip. Information as to the speed of the target is determined by measuring the doppler frequency shift between transmitted and reflected waves of each pulse, and information as to the angular coordinates of the target is determined by relating received energy properties to the sensitivity and directivity patterns of the sensor (antenna).

In a typical radar tracking system, a target reflects pulses to an antenna which derives signals that provide the desired information. A trnsmitter and receiver is operated in accordance with a predetermined mode in regard to frequency and PRF, both of which are often selected automatically or by an operator for a particular target to avoid velocity and range blind zones. The receiver provides video signals to a radar signal processor which produces signals that are measurements of range, range rate (radial velocity) and angular coordinates (elevation and azimuth deflection) of the target. These measurement signals are then applied to standard antenna controllers for positioning the antenna and to range and velocity controllers. A typical radar tracking is thus a multiple closed-loop feedback system. Two loops for tracking in azimuth and elevation, and two loops for tracking in range and velocity. Standard servomechanism design procedures are both applicable and practical to each of these loops, but optimal results are not always achieved by such procedures.

The prior art tracking loops have ranged from classical single control loops, employing low-pass filtering to remove noise from measurement signals, to more advanced control loops employing filters for estimating quantities from measured differences between estimates and actual measurements, such as $\Delta R_m = \hat{R} - R_m$. The timing of a range gate, $R_G$, represents the estimate, $\hat{R}$, and the time of arrival of a round-trip radar pulse represents the measured range $R_m$. The difference then is $\Delta R_m$. The range servo-loop continually updates the range estimate $\hat{R}$ to drive $\Delta R_m$ toward zero. Analogous servomechanism procedures drive the radial velocity difference, $\Delta V_m$, toward zero and the azimuth and elevation angle differences, $\Delta \eta_m$ and $\Delta \epsilon_m$, toward zero.

A typical tracking system in a tactical aircraft performs two principal functions. First, it positions the antenna and the range and velocity gates of the radar signal processor, so as to keep the target accurately centered within the "field of view" of those elements. Second, it generates estimates of the target's position and motion for use in fire-control and aircraft-steering computations. These functions must be accurately performed over an extremely broad range of operating conditions, ranging from highly dynamic dog-fight encounters at short-range to very low signal-to-noise ratios at long range.

Several factors must be dealt with in the design of the tracking system in order to obtain the required accuracies and performance capabilities. First, there is the problem of measurement errors due to factors such as noise, target scintillation, and radome refraction. Maneuvers of the target and deception techniques (countermeasures) employed by targets to prevent tracking are the second class of problems which must be dealt with.

Due to the large variations in the characteristics and magnitudes of these error sources over the wide spectrum of operating conditions, variable parameter filters are necessary to meet tracking accuracy requirements of high performance aircraft. For example, narrow bandwidth filtering is required for tracking targets at long range with low signal-to-noise ratios. But rapid response is necessary for tracking highly maneuverable targets at short range. These factors, plus the requirement for generating high accuracy estimates of target line-of-signt (LOS) rates, and the desirability of employing one unified set of general filter equations to handle any radar mode — high PRF, medium PRF, low PRF, and so forth — have led to the use of a new approach in the design of the tracking filter using Kalman filtering.

An object of this invention is to use the Kalman filter concept to provide a practical and readily-mechanizable approach to the optimal estimation of dynamically-varying quantities from noisy measurements (optimal in the sense of minimizing mean-square estimation errors) for a wide class of tracking problems.

The manner in which discriminants are processed for use in performing angle, range, and velocity tracking must depent upon the characteristics and quality of the discriminants. For example, at high signal-to-noise ratios, greater weighting can be applied to the discriminants than at low signal-to-noise ratios. And since signal characteristics can fluctuate rapidly over extremely wide ranges, some method of adapting the tracking-loops to these changes must be used in order to prevent severe degradations in tracking performance.

A further object of this invention is to provide means for automatically adapting tracking loops to rapid changes in signal characteristics so that optimal tracking can be maintained despite large variations and fluctuations in these characteristics.

SUMMARY OF THE INVENTION

In accordance with the present invention, an airborne system is provided with electromagnetic energy sensors for tracking moving targets in some or all of range, radial velocity, elevation, and azimuth. Energy received from the system sensors is processed to develop signals representing actual discriminants of range, $\Delta R_m$, radial velocity, $\Delta V_m$, elevation, $\Delta \epsilon_m$, and azimuth, $\Delta \eta_m$. These measurements are used to generate predictions of the next measurements from current estimates of system states, where the states are vectors $\overline{X}_R(i), \overline{X}_V(i), \overline{X}_e(i)$ and $\overline{X}_d(i)$, using for each state an equation of the general form $$\hat{X}_{i+1} = \overline{\Phi}_i \hat{X}_i + L_i + K_i (Y_i - \overline{H}_i \hat{X}_i) \qquad 1$$

where $\hat{X}$ is a state vector, $\overline{\Phi}$ is a transition matrix, $L$ is a vector of dynamical aiding terms to compensate for rotational rates and inertial acceleration of the antenna, $K$ is a gain factor, $Y$ is the output of a measurement structure for the dynamical system and $H$ is a system scaling factor which accounts for the gain in the measurement structure. The four channels implemented in accordance with this general equation are cross-coupled by using outputs of one or more channels as parameters in the remaining channels. For the range channel $$\hat{X}_R = \begin{bmatrix} R_{TPR} \\ V_{TPR} \\ a_{TPR} \end{bmatrix}$$

thus generating estimates of predicted target range, $R_{TPR}$, radial velocity, $V_{TPR}$, and radial acceleration, $a_{TPR}$. For the velocity (doppler) channel $$\hat{X}_V = \begin{bmatrix} V_{TPV} \\ a_{TPV} \end{bmatrix}$$

thus generating estimates of predicted doppler velocity $V_{TPV}$ and acceleration $a_{TPV}$. For the antenna angle channels $$\hat{X}_e = \begin{bmatrix} \epsilon_{Pe} \\ \omega_{LSPe} \\ a_{Td} \\ S_e \end{bmatrix} \qquad \hat{X}_d = \begin{bmatrix} \epsilon_{Pd} \\ \omega_{LSPd} \\ a_{Te} \\ S_d \end{bmatrix}$$

thus generating estimates of pointing errors, $\epsilon_{e,d}$, target line-of-signt rates, $\omega_{LSPe,d}$, target accelerations normal to the line of sight, $a_{Td,e}$, and target angular scintillation, $S_{e,d}$, all referenced directly to antenna coordinates. The pointing error estimates, $\epsilon_{Pe}$ and $\epsilon_{Pd}$, and the target line-of-sight rates $\omega_{LSPe}$ and $\omega_{LSPd}$ are used to product antenna elevation and azimuth commands $\omega_{Ce}$ and $\omega_{Cd}$. The range estimate $R_{TPR}$ and the velocity estimate $V_{TPV}$ are used to produce a range gate command, $R_{GC}$, and a velocity gate command, $V_{GC}$, both to be used by a radar controller in generating range gating signals, $R_G$, and velocity gating signals, $V_G$, transmitted to the signal processor. In the case of a passive system, both the range and velocity filter channels would be necessarily inoperative, and therefore could be omitted.

In operation of the tracking system, measurements of SNR are made coincidentally with the discriminant measurements. The discriminant noise variance and the discriminant slope are then determined from the measured SNR, and these quantities are utilized in the calculations of the filter gains. Thus, the filter is provided with data on discriminant variance and slope for each sample of the discriminant used by the filter, thereby providing the filter with the means to adapt to the characteristics of each measurement sample. However, it is not essential that each filter of the system be provided with such adaptive means.

BRIEF DESCRIPTION OF THE DRAWINGS

FIGS. 9a–9f illustrate a detailed flow diagram for the routine of FIGS. 8a–8d.

FIG. 25 illustrates instruction formats for the RDP of FIG. 22.

DESCRIPTION OF PREFERRED EMBODIMENT

Figure 1:
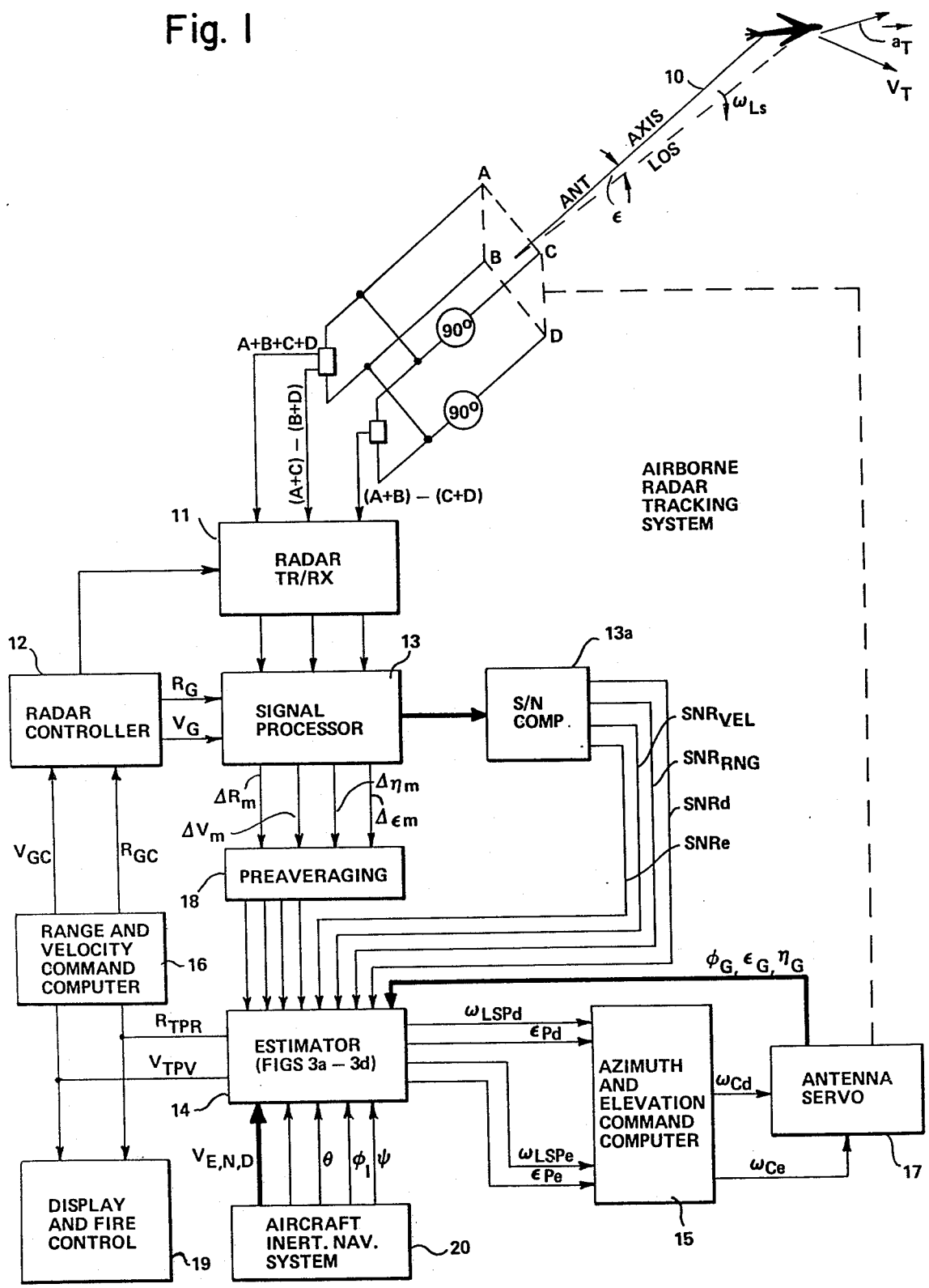
FIG. 1 is a block diagram illustrating an airborne radar monopulse tracking system embodying the present invention.

Before proceeding with a detailed description of a preferred embodiment, a typical environment for the present invention will be described with reference to FIG. 1, and the general concept and organization of the invention will be described with reference to FIGS. 2 and 3a through 3d. But first a general discussion of the concept, organization, and use of the invention will be given.

In accordance with the broadest aspects of the invention, means are provided for iteratively computing a prediction $\hat{X}t_{(i+1)}$ of the next measurement sample $Yt_{(i+1)}$ from the difference (residual) between a current estimate $\hat{X}t_{(i)}$ and measurement $Yt_{(i)}$ of a tracking system state. The residual is multiplied by a gain factor $Kt_{(i)}$ and the product is improved by available external aiding signals $Lt_{(i)}$, such as for compensation of antenna motion and/or aircraft motion as they affect tracking. Means for extrapolating the next estimate $\hat{X}t_{(i+1)}$ from the current estimate $\hat{X}t_{(i)}$ and the measurement residual is provided as a minor loop in the residual loop. The two loops constitute a tracking filter.

In the foregoing, $t_{(i+1)}$ denotes the time of the updated measurement and $t_{(i)}$ denotes the time of the previous measurement. For convenience, the letter $t$ will be omitted hereinafter and only the subscripts $i$ and $i+1$ will be used to denote the times.

The extrapolation loop is a dynamic model, $\Phi_i$, of the system state aided by the available external aiding signals, $L_i$. The general filter structure is then defined by equation (1) set forth hereinbefore in the summary of the invention. In operation, the estimates are generated by adding measurement corrections $K_i[V_i - \overline{H}_i \hat{X}_i]$ to extrapolated values $\Phi_i \hat{X}_i$ of past estimates improved by an aiding term $L_i$. Thus, in the absence or rejection of a measurement, extrapolation is automatically performed until the next measurement is obtained, thereby tracking through blind regions. Correlation between the measurement residuals and the errors in estimated states is important to the present invention. Such correlation can arise in one of two possible ways — direct measurement correlation or indirect dynamical correlation.

Direct measurement correlation exists between a given measurement and a given state if the measurement is itself a measure of the particular state. For example, the azimuth and elevation measurement residuals of the radar are direct measurements of the angular pointing errors, and are, therefore, directly correlated with the computational estimates of angular pointing error. Dynamical correlation arises from dynamical coupling between quantities which are directly measured and quantities which are estimated. As an example, extrapolation of the angular position of the target is performed by integrating the estimate of the target's line-of-sight (LOS) rate. Thus, any errors in the estimated LOS rate will produce errors in the extrapolated angular position, thereby resulting in a correlation between the angular position error and the LOS rate error.

Means is provided for an estimated state to be updated by any measurement which is correlated — either directly or dynamically — with that state. Thus, in the preceding example, since the angle measurement residuals are directly correlated with angular position error, and since angular position error is dynamically correlated with LOS rate error, the angle measurement residuals are correlated with LOS rate errors and can therefore be used to reduce LOS rate errors. In that manner, a single measurement quantity may be employed to generate estimates of several system states. Each estimated state is updated by the measurement residual weighted by a particular gain factor associated with that state. To obtain the greatest accuracy, the value of each gain factor is continually made proportional to the statistical correlation between the measurement residual and the uncertainty in the particular estimate, and inversely proportional to the variance of the measurement error. This is the form of the optimal gain for a continuous-time computational means; a slight modification is necessary in the case of discrete-time computational means. The real-time calculations of the gain factors are performed as follows: The statistical (ensemble) cross-correlations between the measurement residual and the estimation uncertainties, or errors, are computed by appropriate means in terms of the measurement model and the covariance matrix of the estimation errors, which is recomputed by appropriate means in a recursive manner once each computational cycle. The covariance matrix takes into account cross-correlation between the system states due to dynamical interactions between the states.

The tracking system is divided into the following channels:
1. Azimuth angle channel
2. Elevation angle channel
3. Range channel
4. Velocity channel These four channels are cross-coupled to obtain the benefits of cross-channel aiding. The azimuth and elevation angle channels have Kalman filter configurations and are identical in form, each estimating the following set of four state variables: (1) pointing error, (2) line-of-sight rate, (3) target acceleration normal to the line-of-sight, and (4) angular scintillation. Each of these states is referenced directly to antenna coordinates. Both of the angle channels use the same set of gain factors, which are computed and updated once each computational cycle. Measured values of signal-to-noise ratios are used in the calculation of the filter gain factors, thereby enabling the computational means to adapt to changing signal characteristics.

The range and velocity channels also have Kalman filter configurations, but employ semi-fixed instead of time-varying gains. Both of these channels employ three sets of gains, which are selected as a function of measured signal-to-noise ratio. Range signal-to-noise ratio ($SNR_{RNG}$) is used to select the appropriate set of gains for the range channels, and velocity signal-to-noise ratio ($SNR_{VEL}$) is used to select the appropriate set of gains for the velocity channels. In different PRF modes, the range channel processes the measurement residuals to form estimates of target range, range rate and radial acceleration. In a high PRF mode, where no range residuals are measured and where it is unnecessary to control range rate positions, the range channel consists of a single state, the target range state, and velocity aiding is provided by the velocity channel.

In high and medium PRF modes, the velocity channel processes velocity measurement residuals to form estimates of range rate and radial acceleration. The velocity channel is not employed in low PRF mode. The angular rate commands for the antenna are obtained by passing the pointing error estimate through a compensator and adding the line-of-sight rate estimate to the compensator output. The use of the accurate line-of-sight rate estimates in the antenna commands results in a substantial reduction of both dynamical and steady-state antenna pointing errors. The fact that the estimates are generated in antenna coordinates permits the antenna commands to be generated simply and directly from the estimates without any coordinate transformation.

Although each of the four channels could function independently of one another, better performance is obtained by cross coupling. The form of the channel filters permits this cross coupling to be implemented very easily. Thus, range and range rate estimates from the range and velocity channels, respectively, are used in the angle channels, and the line-of-sight rate estimates of the angle channels can be used in the range and velocity channels. In addition, roll cross coupling is provided between the two angle channels.

Each of the four tracking loops is aided by inertial navigator outputs to compensate for aircraft accelerations. However, the loops can also function in the absence of inertial navigator aiding. A unique form of aiding, utilizing gyro outputs in addition to gyro torque commands, is employed to compensate for antenna motion.

The system also employs special timing techniques which permit sufficient time to process the radar data while avoiding dynamical problems which might otherwise result from the delays between the time of measurement and the time of generating the commands required for closed-loop tracking. These techniques include pre-averaging of the radar measurements together with one-step extrapolation of the estimates in the angle channels, and two-step extrapolation in the range and velocity channels.

At the initiation of tracking, and until the tracking channels can acquire sufficient data with which to accurately track the motion of the target, the tracking loops are iterated at a fast rate in order to avoid losing the target. Thereafter, a slow rate of iteration may be employed. However, fast iteration cannot be performed if channel gain factors are to be computed due to time required for the computations. Therefore, in an initial tracking phase of predetermined duration (~ 1.5 sec.) after initial lock-on, constant preprogrammed gain factors are used to permit the tracking loops to iterate at fast rates. Thereafter, the gain factors used are computed to provide adaptive tracking loops.

FIG. 1 illustrates an exemplary amplitude-comparison monopulse airborne radar tracking system embodying the present invention. Four antenna horns A, B, C and D are located symmetrically around the antenna axis 10, and are fed in phase by a conventional transmitter-receiver 11 to produce a narrow beam along the axis. Transmitted pulses are timed by a conventional controller 12. Between transmitted pulses, received energy is coupled to three channels of a receiver portion of the radar receiver-transmitter. An in-phase or sum channel (A+B+C+D) permits reception of full-amplitude echo signals for use in display, ranging, radial velocity tracking and as a reference signal for angle tracking. An azimuth error channel, (A+C)−(B+D), and an elevation error channel, (A+B)−(C+D) permit angle tracking. The coupling duplexers (not shown) are conventional.

The radar controller transmits range and velocity gates $R_G$ and $V_G$ to a signal processor 13. There the received sum channel is sampled to produce range and velocity discriminants $\Delta R_m$ and $\Delta V_m$, while at the same time the difference channels are sampled to produce azimuth and elevation discriminants, $\Delta \eta_m$ and $\Delta \epsilon_m$. For ranging, two samples are taken, one on each side of the predicted peak of a return pulse, to develop the range discriminant. For velocity tracking, two samples are also taken, one on each side of the predicted doppler shift to develop the velocity discriminant. The signal processor also provides measurements of signal and noise to a signal-to-noise ratio computer 13a which computes for range, velocity, elevation and azimuth the respective ratios $SNR_{RNG}$, $SNR_{VEL}$, $SNR_e$ and $SNR_a$ as required for use by an estimator 14.

The outputs of the signal processor 13 and SNR computer 13a are in digital form, and are used in an estimator 14 for developing an estimate of target range $R_{TPR}$, an estimate of radial velocity (range rate of target) $V_{TPV}$, azimuth and elevation line-of-signt rate estimates $\omega_{LSPa}$ and $\omega_{LSPe}$, and azimuth and elevation tracking error estimates $\epsilon_{P_a}$ and $\epsilon_{P_e}$. These angle estimates are used in an azimuth and elevation command computer 15 to produce control signals for an antenna servo 17, thus closing a servo loop through the dynamical system.

The range and velocity estimates are used in a range and velocity command computer 16 to produce control signals for the radar controller 12 which produces range and velocity gates $R_G$ and $V_G$, to close range and velocity tracking loops.

Timing for the sections 13, 13a, 14, 15 and 16, which collectively constitute a digital radar data processor, is provided by a clock pulse system that is based on a very stable high frequency clock pulse source in a conventional manner. The estimator 14 operates on a fixed cycle of a period selected for the mode of radar operation, namely high, medium or low PRF. In each mode, the cycle period is greater than the sampling period in the signal processor. In order to utilize the information contained in the intervening samples, a preaveraging system 18 implemented as part of the radar data processor, accumulates the intervening samples and divides by the number of samples taken to provide average discriminant inputs to the estimator. Assuming the discriminant values are in binary form, averaging may consist of simply adding $2^N$ samples, where N is a whole integer, and dividing by $2^N$ by effectively shifting down N places at the end of every $2^N$ samples. The accumulator is reset after every $2^N$ samples.

State vectors of the for Kalman filter channels in the estimator may be used for purposes other than tracking, such as in a display and fire control system 19. Each of the four tracking loops is aided by outputs from an aircraft inertial navigation system 20 which produces signals representing pitch angle $\theta$, aircraft roll angle $\phi_I$, aircraft heading angle $\psi$ and north, east, and vertical components of interceptor velocity, $V_N$, $V_E$ and $V_D$. The antenna servo 17 also provides input signals representing antenna roll gimbal angle $\phi_G$, antenna elevation gimbal angle $\epsilon_G$ and antenna azimuth gimbal angle $\eta_G$. These signals are all either in digital form or immediately converted to digital form, preferably the former.

Although each of the four tracking filters could function completely and independently, better performance is obtained by cross coupling the filters in particular ways. The form of the filters permits cross coupling to be easily implemented. Range ($R_{TPR}$) and range-rate ($V_{TPR}$) estimates from the range and velocity filters, respectively, are used in the angle filters, and the line-of-sight rate estimates $\omega_{LSPd}$ and $\omega_{LSPe}$ are used in the range of velocity filters. In addition roll cross coupling is provided between the two angle-tracking filters.

A general block diagram applicable to each of the four tracking filters in the system will now be described with reference to FIG. 2. A block 21 represents the dynamical system of a tracking channel, such as for elevation tracking. The differential equation in the block indicates the form of the discrete tracking systems. Pursuing the example of the elevation channel, the dynamical system can be more accurately defined by the following continuous state equations $$\dot{\epsilon}_r = \omega_{LSr} - \omega_{Ar} + \omega_{Ar} \epsilon_d \tag{2}$$

$$\dot{\omega}_{LSr} = -\left(\frac{2\dot{R}}{R}\right)\omega_{LSr} + \frac{1}{R}a_{T_d} - \frac{1}{R}a_{t_d} \tag{3}$$

$$\dot{a}_{T_d} = -\frac{1}{\tau_T}a_T = w_{T_d} \tag{4}$$

$$\dot{S}_r = -\frac{1}{\tau_s}S_r + w_s \tag{5}$$

Where:

$\epsilon_e$ is the pointing error in elevation.

$\omega_{LSe}$ is the angular rate in elevation of the line-of-sight to the target.

$\omega_{Ae}$ is the angular rate of the antenna axis in elevation.

$\omega_{Ar}$ is the angular (roll) rate about the antenna axis.

$\epsilon_d$ is the pointing error in azimuth.

R is the slant range to the target.

$a_{T_d}$ is the acceleration of the target in azimuth.

$a_{I_d}$ is the acceleration of the interceptor (radar platform) in azimuth.

$\omega_{LSd}$ is the angular rate in azimuth of the line-of-sight to the target.

$\tau_T$ is the correlation time of target acceleration model.

$w_T$ is white noise driving target acceleration model.

$S_e$ is scintillation of the target in elevation.

$\tau_s$ is the correlation time of the angular scintillation process.

$w_s$ is the white noise driving angular scintillation model.

Figure 2:
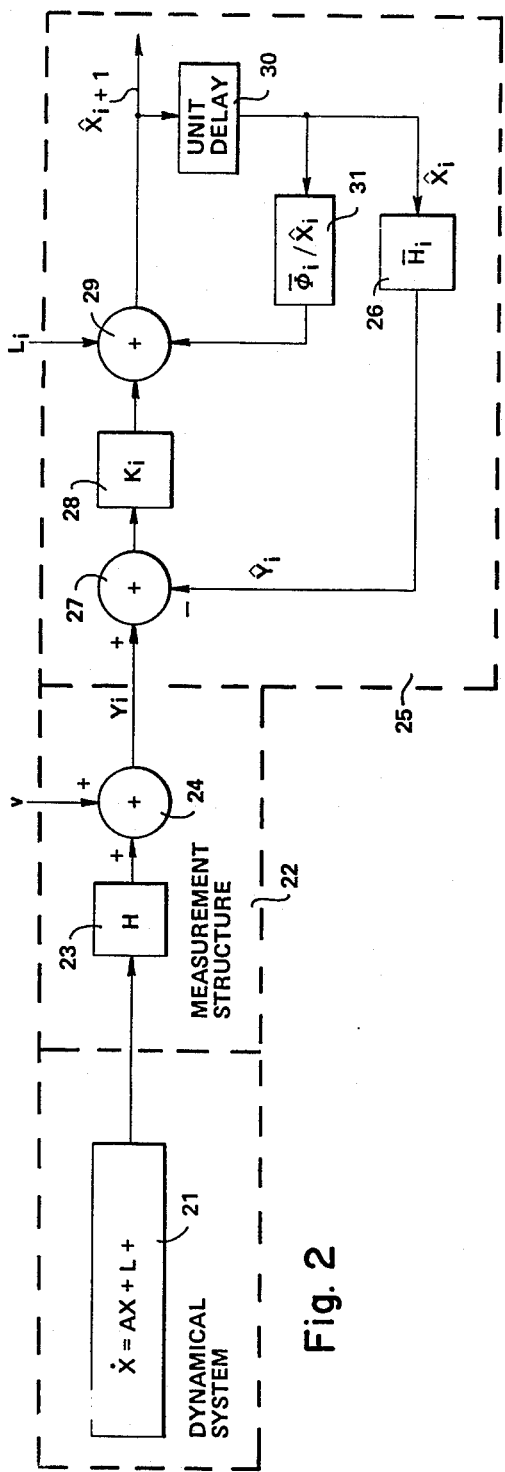
FIG. 2 is a general block diagram of the general form of the filters for each of the four filter channels in an estimator for the elevation, azimuth, range and velocity tracking system of FIG. 1.

These continuous state equations (2)–(5) may be more conveniently set forth in matrix form by the following substitutions in the dynamical system equation (block 21 in FIG. 2).

$$X = \begin{bmatrix} \epsilon_r \\ \omega_{LSe} \\ a_{T_d} \\ S_e \end{bmatrix} \quad (6)$$

$$A = \begin{bmatrix} 0 & 1 & 0 & 0 \\ 0 & \frac{-2\dot{R}}{R} & \frac{1}{R} & 0 \\ 0 & 0 & -\frac{1}{\tau_T} & 0 \\ 0 & 0 & 0 & -\frac{1}{\tau_s} \end{bmatrix} \quad (7)$$

$$L = \begin{bmatrix} -\omega_{Ae} + \omega_{Ar} \epsilon_d \\ -\frac{a_{Id}}{R} + \omega_{Ar} \omega_{LSd} \\ 0 \\ 0 \end{bmatrix} \quad (8)$$

$$w = \begin{bmatrix} 0 \\ 0 \\ w_T \\ w_s \end{bmatrix} \quad (9)$$

The value of $X$ from the differential equation in block 21 is the input to measurement structure represented by a dotted line block 22 in FIG. 2, where $H$ is a measurement system parameter by which the input signal $X$ is multiplied. The multiplier is represented by a block 23. Noise in the measurement system is added to the signal HX to provide a model of measurements $$Y_i = HX + v \qquad 10$$

where $v$ is the noise added, as represented by the circle 24 in the measurement structure. The subscript $i$ indicates the value of the measurement during a particular cycle of the filter shown within a dotted line block 25 in FIG. 2. The filter produces an estimate of the measurement $\hat{X}_i$, from which a predicted measurement $\hat{Y}_i$ is produced by multiplication of the estimate $\hat{X}_i$ by $\overline{H}_i$ in block 26, where $\overline{H}$ is the system measurement parameter. The subscript i indicates the value of $\overline{H}$ at time $i$, thus implying that $\overline{H}$ is not a constant. A bar over a symbol indicates a matrix quantity or value used in the filter as the filter's version of the parameter represented by the symbol.

The predicted measurement is subtracted from the actual measurement in a subtractor represented by a circle 27 to form a measurement residual. That residual is multiplied by a filter gain $K_i$ in block 28. Aiding signals $L_i$ are added to the product through an adder 29 to compensate for antenna motion as sensed at antenna gimbals and aircraft motion as sensed by the inertial navigation system (INS). The output of the adder 29 is fed back through a unit delay operator 30. The feedback signal $\hat{X}_i$ is then used in an extrapolator 31 to form the product $\Phi_i \hat{X}_i$ which is added to the next measurement residual while forming the next estimate $\hat{X}_{i+1}$. In that manner the predicted measurement can be continually extrapolated. The extrapolator loop equation is;

$$\hat{X}_{i+1} = \overline{\Phi}_i \hat{X}_i + L_i \qquad 11$$

where $\hat{X}$, $\overline{\Phi}$ and L are vectors. Observing that $Y_i = H_i X_i$ from the measurement structure, the filter state equation is:

$$\hat{X}_{i+1} = \overline{\Phi}_i \hat{X}_i + L_i + K_i (Y_i - \overline{H}_i \hat{X}_i) \qquad 12$$

where the filter gain is given by the equations $$K_i = \overline{\Phi}_i M_i \overline{H}_i^T (\overline{H}_i M_i \overline{H}_i^T + R_i)^{-1} \qquad 13$$

$$M_{i+1} = (\overline{\Phi}_i - K_i \overline{H}_i) M_i \Phi_i^T + \overline{Q}_i \qquad 14$$

and $Q_i$ is the covariance matrix of the noise driving the systems dynamical model and $R_i$ is the covariance matrix of the measurement noise. The superscript $T$ denotes the transpose of the associated matrix, and is not an exponent.

For the elevation and azimuth channels, $\Phi_i$ is given by the equation $$\Phi_{a_i} = I + A_{a_i} T + A_{a_i}^2 T^2/2 \qquad 15$$

where $I$ is the identifying matrix, $T$ is the filter cycle period and $$A_{a_i} = \begin{bmatrix} 0 & 1 & 0 & 0 \\ 0 & -\frac{2v_{ei}}{\dot{R}_i} & \frac{i}{\dot{R}_i} & 0 \\ 0 & 0 & \frac{-1}{\tau_T} & 0 \\ 0 & 0 & 0 & -\frac{1}{\tau_s} \end{bmatrix} \qquad (16)$$

The elevation and azimuth filter parameters are given the equations $$H_{a_i} = [k_{a_i}\ 0\ 0\ k_{a_i}] \qquad 17$$

$$R_{a_i} = \sigma_{a_i}^2 \qquad 18$$

$$Q_{a_i} = \begin{bmatrix} Q_x & 0 & 0 & 0 \\ 0 & 0 & 0 & 0 \\ 0 & 0 & \frac{2T\sigma_T^2}{\tau_T} & 0 \\ 0 & 0 & 0 & \frac{2T\sigma_s^2}{\tau_s} \end{bmatrix} \qquad (19)$$

$$L_{r_i} = \begin{bmatrix} \alpha \\ \beta \\ 0 \\ 0 \end{bmatrix} \qquad (20)$$

where $$\alpha = \int_{t_i}^{t_{i+1}} \frac{\omega dt}{A_r} + \frac{T}{2} \frac{\Delta V_{di}}{\hat{R}_i} + \theta_{ri} \hat{\omega}_{LSdi} + \theta_{ri} \hat{\epsilon}_{di} \quad (21)$$

$$\beta = (1 - T \hat{r}_{ri}/\hat{R}_i) \frac{\Delta V_{di}}{\hat{R}_i} + \theta_{ri} \hat{\omega}_{LSdi} \quad (22)$$

and $\Delta V_{di}$ is compensation for the acceleration $a_{ld}$ of the interceptor along the azimuth axis; $\theta_r$ is compensation for roll cross-coupling due to antenna roll motion and $$\int \frac{\omega dt}{A_r}$$

is compensation for antenna motion about the elevation axis.

In equations (17) and (18), $k_{a_i}$ is the angle discriminant slope and $\sigma_a^2$ is the angle discriminant noise variance determined from signal-to-noise ratio (SNR). An SNR is determined for both the range ($SNR_{RNG}$) and radial velocity ($SNR_{VEL}$) measurements of discriminants, as well as elevation ($SNR_e$) and azimuth ($SNR_d$) measurements of discriminants, and ideally each SNR would be used in the respctive filters. However, as will be noted more fully hereinafter, the SNR is very nearly the same in both elevation and azimuth so that an average SNR can be used with sufficient accuracy in both angle filters. Another possibility is to compute the angle discriminant slope separately for the two angle filters from $SNR_e$ and $SNR_d$ and to use an average of those values in computing the gain factor $K_{a_i}$ to be used in both angle channels. The average SNR of the angle filters is used to determine the discriminant noise variance to be used in both channels. This alternative is the one adopted for the specific exemplary embodiment to be described because of the desire to minimize computing time without significantly degrading performance. Thus, separate measurements of $SNR_e$ and $SNR_d$ are made by the signal processor 13 (FIG. 1) during each filter channel period while the discriminant measurements are being made. The angle discriminant noise variance, $\sigma_{a_i}^2$, and the angle discriminant slope, $k_{a_i}$, are then computed as the average values for the elevation and azimuth channels. In the specific exemplary embodiment to be described, they are computed according to the following equations:

$$k_{a_i} = \tfrac{1}{2}(k_{r_i} + k_{d_i}) \quad 23$$

where $k_e$ and $k_d$ are predetermined functions of $SNR_e$ and $SNR_d$, respectively.

$$\sigma_a^2 = C_o \text{ for } SNR_a < 1 \quad 24a$$

$$\sigma_a^2 = C_o/SNR_a \text{ for } SNR_a \geq 1 \quad 24b$$

where $C_o$ is a predetermined constant and $SNR_a = \tfrac{1}{2}(SNR_e + SNR_d)$.

For the range and velocity filter channels, sets of predetermined constant gain factors, $K_r$ and $K_v$, are selected based on $SNR_{RNG}$ and $SNR_{VEL}$ to reduce computation time in the specific exemplary embodiment to be described. However, for the present, it is assumed that each of the range and filter channels are fully implemented in a manner analogous to the implementation of each of the angle filter channels.

The value $\Delta V_{di}$ in Equations (21) and (22) is computed from INS velocities with transformation of those velocities to the antenna coordinate system. Assuming the transformation, $\Delta V_{di}$ is computed from the equation $$\Delta V_{di} = V_{di} - V_d (118\ 1) \quad 25$$

and the value $\theta_r$ is computed from the equation $$\theta_r = T \left\{ \frac{\omega_{RG}}{\cos \epsilon_G \cos \eta_G} + \omega_{A_r} \tan \epsilon_G + (\dot{\eta}_G - \omega_{A_d}) \frac{\tan \epsilon_G}{\cos \eta_G} \right\}$$

$$= T \{\omega_{A_r}\} \quad (26)$$

where all symbols are as defined hereinbefore except
$\dot{\eta}_G$ = time derivative of azimuth gyro angle $\eta_G$.
$\omega_{A_d}$ = antenna inertial rate about azimuth, $d$, axis.
$\epsilon_G$ = elevation gyro angle.
$\omega_{RG}$ = angular rate of the aircraft roll gimbal.

The quantity in the curly brackets is a measurable expression for $\omega_{A_r}$, and $\theta_r$ is mechanized by measuring each of these quantities separately and combining as shown. Note that if a rate gyro were mounted on the $r$ axis of the antenna, its output would directly measure $\omega_{A_r}$.

From the foregoing, it is evident that the full elevation channel equation is $$\hat{X}_{ei+1} = \Phi_{ai} \hat{X}_{ei} + L_{ei} + K_{ai} \Delta e \quad 27a$$

where the residual $\Delta e = Y_{ei} - H_{ai} \hat{X}_{ei} - k_{a_i} r_{e_i}$, and $$\hat{X}_{ei} = \begin{bmatrix} \hat{\epsilon}_{ri} \\ \hat{\omega}_{LSei} \\ \hat{a}_{Tdi} \\ \hat{S}_{ei} \end{bmatrix}.$$

The computed radome compensations $r_{ei}$ and $r_{di}$ are determined as a function of gimbal angle. The full azimuth (deflection) channel equation is $$\hat{X}_{di+1} = \Phi_{ai} \hat{X}_d(i) + L_{di} + k_{ai} \Delta d \quad 27b$$

where the residual $\Delta d = Y_{di} - H_{ai} \hat{X}_{di} - k_{ai} r_{di}$, and $$\hat{X}_{di} = \begin{bmatrix} \hat{\epsilon}_{di} \\ \hat{\omega}_{LSdi} \\ \hat{a}_{Tri} \\ \hat{S}_{di} \end{bmatrix}$$

In both angle channels, the filter input, $Y_i$, is the average of discriminants over the $i$th measurement interval. The measurement residual is then the difference between the input $Y_i$ and the predicted measurement $\hat{Y}_i = \hat{X}_i \bar{H}_i$. Roll cross-coupling between channels is provided between the two angle filters.

In the range filter, the continuous system Equation (1) evolves into the following discrete equivalent $$\hat{X}_{ri+1} = \Phi_{ri} \hat{X}_{ri} + L_{ri} + K_{ri} [V_{ri} - \bar{H}_{ri}(\hat{X}_{ri} - X_{Gi})] \quad 28$$

where:
$Y_{ri} = \Delta R_{mi}$ $X_{Gi} = R_{Gi}$ $$\hat{X}_{ri} = \begin{bmatrix} \hat{R}_i \\ \hat{V}_{ri} \\ \hat{a}_{Tri} \end{bmatrix}$$

$$\Phi_{ri} = I + A_{ri}T + A_{ri}^2 \frac{T^2}{2}$$

$$L_{ri} = \begin{bmatrix} T \\ 2\Delta V_{ri} \\ \Delta V_{ri} \\ 0 \end{bmatrix}$$

where $\Delta V_{ri}$ is the change in interceptor (own ship) velocity along the radar boresight axis, and $$A_{ri} = \begin{bmatrix} 0 & 1 & 0 \\ \hat{\omega}_{LSi}^2 & 0 & 1 \\ 0 & 0 & -\frac{1}{\tau_T} \end{bmatrix}$$

where in practice $\hat{\omega}_{LSi}^2$ may be substituted by a constant set to approximate the square of the lie-of-sight rate.

By replacing $X_{ri}$ with $V_{ri}$, $\hat{Y}_{ri}$ with $\Delta V_{mi}$, and $X_{Gi}$ with $V_{Gi}$, the continuous system equation for the velocity filter evolves, where $$X_{ri} = \begin{bmatrix} \hat{V}_{ri} \\ \hat{a}_{Tri} \end{bmatrix} \tag{29}$$

The discriminant $\Delta V_{mi}$ is the average for the ith cycle of radial velocity determined by measuring doppler shift. The parameters used in $\Phi_{ri}$, $L_{ri}$ and $N_{ri}$ are analogous to the parameters of the range filter. The parameter $H_{ri} = [k_{ri}\ 0\ 0\ k_{ri}]$ contains the discriminant slope for range. The corresponding parameter $H_{vi} = [k_{vi}\ 0\ 0\ k_{vi}]$ for the velocity filter contains the discriminant slope for velocity. The parameters $k_{ri}$ and $k_{vi}$ have the same form as the parameter $k_{ai}$ for the angle filters, as noted hereinbefore, and are stored in read only memories 48 and 49 for retreival as functions of $SNR_{RNG}$ and $SNR_{VEL}$, respectively.

Referring to the general Equation (1), the last term is the measurement residual $Y_i - \overline{H}_i \hat{X}_i$. The measurement residual is seen to be the actual measurement $Y_i$ minus the computed estimate or predicted measurement $\overline{H} \hat{X}_i$. In the case of the angle filters, the measured discriminant $Y_i$ is the deviation of the antenna axis from the line-of-sight, i.e., the pointing error $\epsilon$ in elevation or azimuth. Consequently, the estimate computed as a filter output for control of the antenna is, after scaling, in a form to be subtracted directly from the measured value $Y_i$, i.e., $\overline{H}_i \hat{X}_i$ is an estimate of the measured value $Y_i$. Therefore, the direct difference is the desired measurement residual. This residual is analogous to an error signal in a conventional servo control loop.

In the range and velocity filters, the measured discriminator outputs $\Delta R_m$ and $\Delta V_m$ are the difference between the respective slant range and radial velocity of the target and the anticipated range $R_G$ and velocity $V_G$ set by the radar controller from the estimates in range and velocity from the filters. It is therefore necessary to add $R_G - \hat{R}$ and $V_G - \hat{V}$ to the range and velocity discriminator outputs to form the measurement residuals. Consequently, in the range and velocity filters, the measurement residuals are given by the differences $\Delta R_{mi} - \overline{X}_{ri}(\hat{X}_{ri} - X_{rGi})$ and $\Delta V_{mi} - \overline{H}_{ri}(\hat{X}_{ri} - X_{rGi})$.

FIGS. 3a through 3d illustrate separately four filter channels 41, 42, 43 and 44 for the estimator 14 of FIG. 1 for elevation, azimuth, range and velocity, each with its separate controller, where the discriminants are $$\Delta \eta_{mi} = Y_{di}$$

$$\Delta \epsilon_{mi} = Y_{ei}$$

$$\Delta R_{mi} = Y_{ri}$$

$$\Delta V_{mi} = Y_{ri}$$

The equations for the elevation and azimuth angle state vectors in an exemplary embodiment are $$\begin{bmatrix} \epsilon_{Pei+1} \\ \omega_{LSPei+1} \\ a_{Tdi+1} \\ S_{ei+1} \end{bmatrix} = \Phi_{ai} \begin{bmatrix} \epsilon_{Pei} \\ \omega_{LSPei} \\ a_{Tdi} \\ S_{ei} \end{bmatrix} + L_{ei} + K_{ai} \left\{ \Delta \epsilon_m \cdot C_{10} - H_{ei} \cdot \begin{bmatrix} \epsilon_{Pei} \\ \omega_{LSPei} \\ a_{Tdi} \\ S_{ei} \end{bmatrix} - k_{ei}\delta_{Rei} \right\} \tag{30a}$$

$$\begin{bmatrix} \epsilon_{Pdi+1} \\ \omega_{LSPdi+1} \\ a_{Tei+1} \\ S_{di+1} \end{bmatrix} = \Phi_{ai} \begin{bmatrix} \epsilon_{Pdi} \\ \omega_{LSPdi} \\ a_{Tei} \\ S_{di} \end{bmatrix} + L_{di} + K_{ai} \left\{ \Delta \eta_m \cdot C_{10} - H_{di} \cdot \begin{bmatrix} \epsilon_{Pdi} \\ \omega_{LSPdi} \\ a_{Tei} \\ S_{di} \end{bmatrix} - k_{di}\delta_{Rdi} \right\} \tag{30b}$$

where all terms except $\delta_{Re}$ and $\delta_{Rd}$ are as defined hereinbefore. The constant $C_{10}$ is a constant which appropriately scales the radar discriminant measurement. The terms $\delta_{Re}$ and $\delta_{Rd}$ are radome error corrections which can, for example, be computed or determined empirically for antenna gimbal angles and stored in a read-only memory 45 (FIG. 3a) for use in the elevation and azimuth angle filters to correct for refraction of electromagnetic energy by the radome for any position of the antenna during the ith iteration. These equations are used at all times for initial and final tracking at high, medium or low PRFs. However, for initial tracking some simplification may be achieved by omitting radome compensation.

The Kalman gain factor $K_{ai}$ is computed by iterating the following two equations, first the equation for $M_{ai}$ and then the equation for $K_{ai}$.

$$M_{ai} = [\overline{\Phi}_{ai-1} - K_{ai-1}\overline{H}_{ai-1}]M_{ai-1}\Phi_{ai-1}^T + \overline{Q}_{ai} \tag{31}$$

$$K_{ai} = \overline{\Phi}_{ai}M_{ai}\overline{H}_{ai}^T \cdot [\overline{H}_{ai}M_{ai}\overline{H}_{ai}^T + \overline{R}_{ai}]^{-1} \tag{32}$$

where all terms are as defined hereinbefore. The value $H_a$ is a matrix containing the angle discriminant slope $k_a$, and $R_a$ is equal to the angle discriminant noise variance $\sigma_a^2$. The variables $k_a$ and $\sigma_a^2$ could be predetermined empirically as a function of $SNR_\sigma = \frac{1}{2}(SNR_e + SNR_d)$, and stored in a read-only memory for use in computing $M_{ai}$ and $K_{ai}$. Computation of these equations is carried out by a block 46 (FIG. 3b) for both the elevation and the azimuth channels. This assumes the discriminant slopes $k_e$ for elevation and $k_d$ for azimuth are nearly the same to permit using an average $k_a = \frac{1}{2}(k_e + k_d)$. In some systems, that may not be sufficiently true, in which case separate computations may be required for unique Kalman gain factors in each of the two angle filters.

As noted hereinbefore, there is cross-coupling between the angle filters in the aiding vectors $L_e$ and $L_d$ as reflected in Equation (8) for $L_e$. The aiding vector $L_d$ is the exact symmetric version of the aiding vector $L_e$. One need only substitute subscripts in Equation (8) to provide the equation for $L_d$.

The system driving noise covariance matrix $Q_a$ set forth in Equation (19) can be simplified to the following form $$Q_a = \begin{bmatrix} Q_s & 0 & 0 & 0 \\ 0 & 0 & 0 & 0 \\ 0 & 0 & T\alpha_4 & 0 \\ 0 & 0 & 0 & T\sigma_{si}^2/\tau_s \end{bmatrix} \quad (33)$$

where $Q_s$ and $\alpha_4$ are single valued constants determined analytically or empirically, $T$ is the filter iteration period, and the angular scintillation parameters $\tau_s$ and $\tau_s^2$ are updated when the $Q_a$ matrix is to be updated according to the following equations $$\tau_s = \min\{\alpha_1, \alpha_3 R_{TPR} / |V_{TPV}|^{1/2}\} \quad 34a$$

$$\tau_s^2 = \alpha_2 / R_{TPR}^2 \quad 35b$$

where $\alpha_1$, $\alpha_2$ and $\alpha_3$ are single valued constants determined analytically or empirically. This matrix appears only in the angle filters and is the same for both azimuth and elevation. Its function is to reduce tracking error caused by angular scintillation, i.e., to estimate angular scintillation, of the target.

Figure 3A:
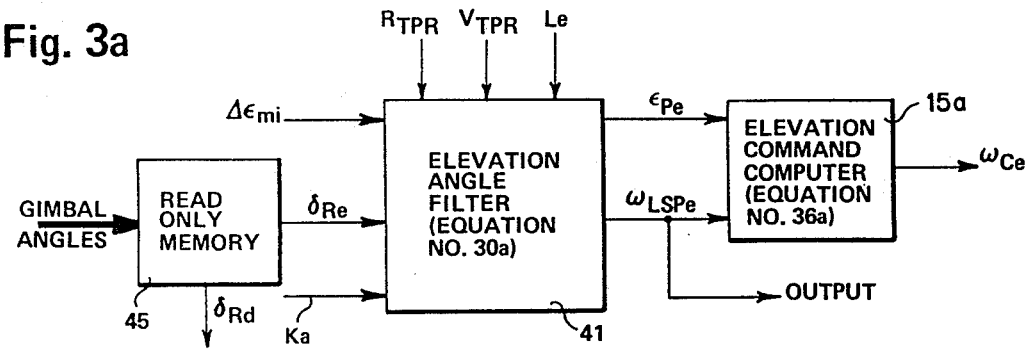
FIGS. 3a through 3d are block diagrams of the four filter channels for tracking in elevation, azimuth, range and velocity, wherein each filter represented by a block is of the form illustrated in FIG. 2.

The angle filter outputs to the azimuth and elevation command computers 15a,b are $\omega_{LSP\,e,d}$ and $\epsilon_{P\,e,d}$ as shown in FIGS. 3a,b. Note that for convenience, the subscripts $i+1$ have been omitted, it being understood that the outputs are for the time $T_{i+1}$. The computers 15a,b calculate the antenna commands $\omega_{c_e}$ and $\omega_{c_d}$ as follows:

$$\omega_{c_e(i+1)} = \omega_{LSP\,e(i+1)} + K_2 \cdot [l_{e(i+1)} + a_2 \epsilon_{P\,e(i+1)}] \quad 36a$$

$$\omega_{c_d(i+1)} = \omega_{LSP\,d(i+1)} + K_2 \cdot [l_{d(i+1)} + a_2 \epsilon_{P\,d(i+1)}] \quad 36b$$

where $K_2$ and $a_2$ are single valued constants. Parameters $l_e$ and $l_d$ are intermediate antenna command variables computed in accordance with the following equations:

$$l_{e(i+1)} = b_2 l_{e(i)} + c_2 \epsilon_{P\,e(i)} \quad 37a$$

$$l_{d(i+1)} = b_2 l_{d(i)} + c_2 \epsilon_{P\,d(i)} \quad 37b$$

where $b_2$ and $c_2$ are single-valued constants. The $l$-parameters provide filtering (sloping) of the tracking errors $\epsilon_{P\,e,d}$. The computations provide for different selection of $b_2$ and $c_2$ during initial track and final track.

Figure 3B:
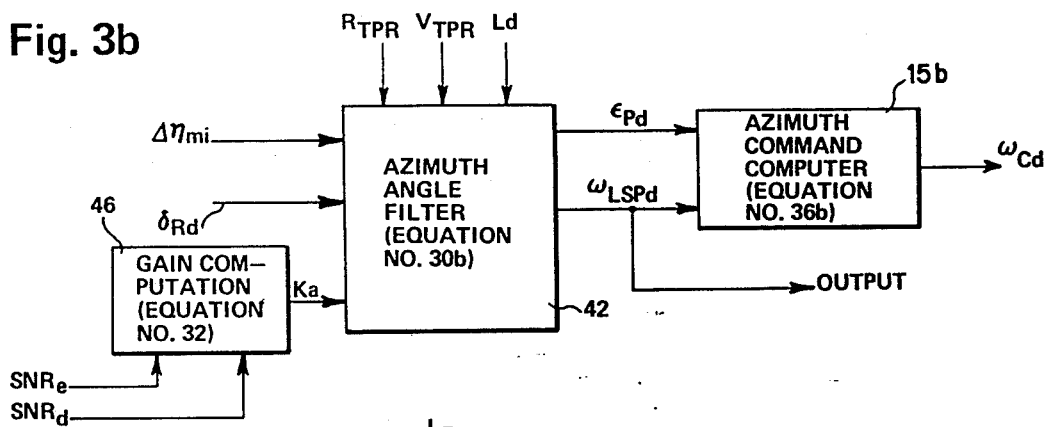

The computations of these Equations 36a and 36b consist of adding compensated elevation and azimuth LOS rate estimates to respective elevation and azimuth tracking errors to maintain angle tracking. The addition is represented in FIGS. 3a and 3b by an encircled summation symbol, $\Sigma$. The second term added to the tracking errors, the compensated LOS rate estimates, is formed by the indicated computation represented in FIGS. 3a and 3b by blocks becoming the legends COMP$_e$ and COMP$_d$. As will be noted in an exemplary implementation (to be described hereinafter) of the present invention in the form of a digital radar data processor programmed to carry out the functions of at least sections 14, 15 and 16 of FIG. 1, the computation of Equations 37a and 37b is included in this angle tracking filter routine, rather than as part of an antenna control routine. That is done merely as a matter of convenience, to avoid having to store $\epsilon_{P_e i}$ and $\epsilon_{P_d i}$ in a buffer during cycle $i+1$.

Figure 3C:
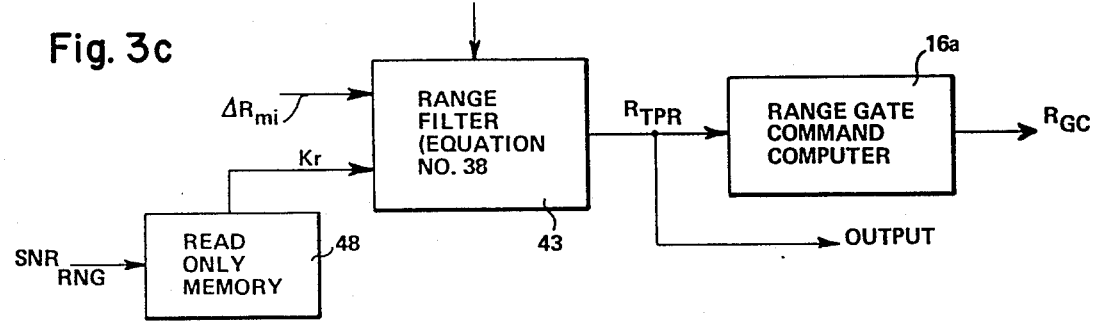
Figure 3D:
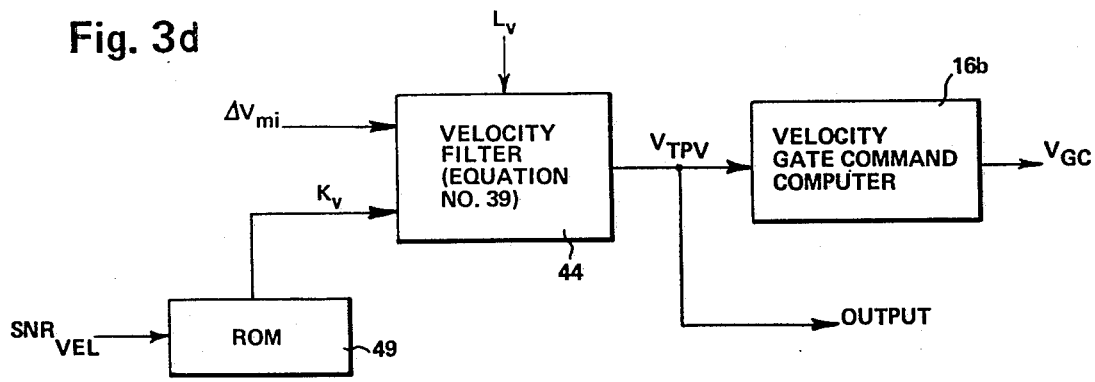

The equations for the range and velocity state vectors for blocks 43 and 44 of FIGS. 3c and 3d are $$\begin{bmatrix} R_{TPR(i+1)} \\ V_{TPR(i+1)} \\ a_{TPR(i+1)} \end{bmatrix} = \Phi_{R_a} \begin{bmatrix} R_{TPRi} \\ V_{TPRi} \\ a_{TPRi} \end{bmatrix} - c_a \begin{bmatrix} \frac{1}{2} T^2 A_{Ir} \\ T A_{Ir} \\ 0 \end{bmatrix}$$

$$+ \begin{bmatrix} K_1^a \\ K_2^a \\ K_3^a \end{bmatrix} \cdot [-\Delta R_m \, R_{BIN}] \quad (38)$$

where $R_{BIN}$ is a scaling factor for converting $\Delta R_m$ into feet.

$$\begin{bmatrix} V_{TPV(i+1)} \\ a_{TPV(i+1)} \end{bmatrix} = \Phi_{R_d} \begin{bmatrix} V_{TPVi} \\ a_{TPVi} \end{bmatrix} - \begin{bmatrix} TA_{Ir} \\ 0 \end{bmatrix} C_u$$

$$+ \begin{bmatrix} K_2^d \\ K_3^d \end{bmatrix} \Delta V_m f_{ir} \frac{\lambda}{2} \quad (39)$$

where $f_{ir}$ is the filter band width for a radar frequency $f = \frac{1}{2}$ used to convert $\Delta V_m$ into feet per second. The superscripts and subscripts a in the range filter, and the superscripts and subscripts d in the velocity filter, indicate an initial track phase of a fixed time $T_j$ following acquisition of a target. In final track, which follows a fixed period of initial track, the superscripts and subscripts $a$ and $d$ are substituted by $b$ and $e$, respectively. $C_u$ is a constant equal to 0 for initial track and to 1 for final track. The range and velocity gate command computations of the computer 16 are represented by blocks 16a and 16b in FIGS. 3c and 3d. In an exemplary embodiment, these computations (which will be described hereinafter) are carried out by a radar data processor, programmed as noted hereinbefore.

Referring first to just the range filter, computation of the transition matrix $\Phi_{R_a}$ is as follows:

$$\Phi_R = I_3 + TA_{R_a} + \frac{1}{2} T^2 A_{R_a}^2 \quad 40$$

where $I_3$ is a 3 × 3 identity matrix and $A_{R_a}$ is the system dynamical matrix given by $$A_R = \begin{bmatrix} 0 & 1 & 0 \\ C_1 & 0 & 1 \\ 0 & 0 & C_2 \end{bmatrix} \quad (41)$$

$C_1$ is a constant with one of two fixed values, depending upon target range at the time of entry into the initial track phase, and $C_2$ is a single valued constant. These constants may be determined analytically or empirically.

For the initial phase, the operating filter period T is an integer multiple of the phase period $T_j$, and the constant $C_9$ is set equal to zero. That omits the dynamical aiding terms to simplify the range filter computations.

$K_1^a$, $K_2^a$ and $k_3^a$ are constants, each with one of three fixed values, depending upon one of three ranges (high, medium and low) of $SNR_{RNG}$. At the time of entry into initial track, the middle Kalman gain $K_2^a$ is used until the first valid $SNR_{RNG}$ measurement is made after entry.

$A_{lr}$ is the interceptor (own ship) acceleration about its r (roll) axis given by $$A_{lr} = \frac{\Delta V_r}{T_1} \quad (42)$$

where $T_1$ denotes the time interval between the time of the updated motion compensation and the time of the last motion compensation, and $\Delta V_r$ is a velocity vector about the r axis computed from INS data in a manner to be described hereinafter.

In the final track phase, the constant $C_1$ in the system dynamical matrix is replaced by a constant $C_3$, a constant with one of two values depending upon target range. The resulting transition matrix $\Phi_R$ is then denoted $\Phi_{R_b}$. The time T is then the filter iteration period and the set of Kalman gain constants are replaced by $K_1^b$, $K_2^b$ and $K_3^b$. The constant $C_9$ is set equal to one to reinstate the dynamical aiding term.

Referring now to the velocity filter equation, the transition matrix $\Phi_{R_d}$ is as follows:

$$\Phi_{R_d} = I_2 + T A_{R_d} + \tfrac{1}{2} T^2 A_{R_d}^2 \quad 43$$

where $I_2$ is a 2 × 2 identity matrix and the system dynamical matrix $A_{R_d}$ is given by $$A_{R_d} = \begin{bmatrix} 0 & 1 \\ 0 & C_2 \end{bmatrix} \quad (44)$$

$K_2^d$ an $K_3^d$ are constants, each with one of three fixed values depending on $SNR_{VEL}$ as in the range filter. All other terms are as defined hereinbefore.

For final track in the velocity filter the constants $K_2^d$ and $K_3^d$ are replaced by constants $K_2^e$ and $K_3^e$, each of which is again a set of three fixed values selected as a function of $SNR_{VEL}$ for every filter iteration. This provides a Kalman gain factor which is a function of $SNR_{VEL}$, just as a Kalman gain factor is provided in the range filter as a function of $SNR_{RNG}$.

The manner in which own-ship motion compensation calculations are made will now be described. Interceptor motion data including velocity components in the north (N), east (E) and down (D) coordinate system, and interceptor pitch ($\theta$), roll ($\phi_I$) and true heading ($\Psi$) are provided by the inertial navigation system (INS). A vector of first differences is then formed using the corresponding measurements taken approximately 0.2 second earlier:

$$\begin{bmatrix} \Delta V_N(t_i) \\ \Delta V_E(t_i) \\ \Delta V_D(t_i) \end{bmatrix} = \begin{bmatrix} V_N(t_i) - V_N(t_{i-1}) \\ V_E(t_i) - V_E(t_{i-1}) \\ V_D(t_i) - V_D(t_{i-1}) \end{bmatrix} \quad (45)$$

where $t_i$ denotes the time of the updated measurement and $t_{i-1}$ denotes the time of the previous velocity measurement used for motion compensation. Let $T_1$ represent the time interval between these measuremens, as noted hereinbefore. The INS and antenna angular motion data, ($\theta$, $\phi_1$, $\Psi$, $\phi_G$, $\epsilon$, $\eta$) measurements occur midway (±5 m-sec) between the two times at which the above velocity first difference data are taken. The pitch, roll and true heading data from this intermediate measurement are used for motion compensation as shown below. The remaining data needed for this computation are: $\epsilon$ = antenna elevation gimbal angle; $\eta$ = antenna azimuth gimbal angle, and $\phi_G$ = antenna roll gimbal angle. Thus, all data for the tracking filter interceptor motion compensation will be available when the second velocity measurement is made. Coordinate transformation is used to obtain stabilized antenna coordinates $\epsilon_s$, $\eta_s$ and $\rho_s$ from the above INS and antenna angular data.

$$\Phi_1 = \begin{bmatrix} \cos\psi & \sin\psi & 0 \\ -\sin\psi & \cos\psi & 0 \\ 0 & 0 & 1 \end{bmatrix} \quad (46)$$

$$\Phi_2 = \begin{bmatrix} \cos\eta_x \cos\epsilon_x & \sin\eta_x \cos\epsilon_x & -\sin\epsilon_x \\ -\sin\eta_x & \cos\eta_x & 0 \\ \cos\eta_x \sin\epsilon_x & 0 & \cos\epsilon_x \end{bmatrix} \quad (47)$$

$$\Phi_3 = \begin{bmatrix} 1 & 0 & 0 \\ 0 & \cos\zeta_x & \sin\zeta_x \\ 0 & -\sin\zeta_x & \cos\epsilon_x \end{bmatrix} \quad (48)$$

$$\begin{bmatrix} \Delta V_r \\ \Delta V_e \\ \Delta V_d \end{bmatrix} = [\Phi_3][\Phi_2][\Phi_1] \begin{bmatrix} \Delta V_N \\ \Delta V_E \\ \Delta V_D \end{bmatrix} \quad (49)$$

Solving the above matrices will result in the following general equations.

$$\Delta V_r = \Delta V_N \cos(\eta_x + \Psi) \cos\epsilon_x + \Delta V_E \sin(\eta_x + \Psi) \cos\epsilon_x - \Delta V_D \sin\epsilon_x \quad 50$$

$$\Delta V_e = \Delta V_N [\cos(\eta_x + \Psi) \sin\epsilon_x \sin\zeta_x - \sin\eta_x \cos\zeta_x] + \Delta V_E \cos(\eta_x + \Psi) \cos\zeta_x + \Delta V_D \cos\eta_x \sin\zeta_x \quad 51$$

$$\Delta V_d = \Delta V_N [\cos(\eta_x + \Psi) \sin\epsilon_x \cos\zeta_x + \sin(\eta_x + \Psi) \sin\zeta_x] - \Delta V_E \cos(\eta_x + \Psi) \sin\zeta_x + \Delta V_D \cos\epsilon_x \cos\zeta_x \quad 52$$

The terms $\Delta V_r$ and $\Delta V_d$ are also used by the angle tracking filter channels.

To simplify other computations define:

$$A_{lr} = \Delta V_r / T_1 \quad 53$$

$$A_{le} = \Delta V_e / T_1 \quad 54$$

$$A_{ld} = \Delta V_d / T_1 \quad 55$$

The manner in which SNR values are computed will be described, but first the following description will cover the manner in which they are used to determine the actual discriminant noise variances and actual discriminant slopes corresponding to each discriminant measurement utilized by the filters.

SNR data from the computer 13a are used to set the gains of the tracking filters. In both of the velocity and range filters, the gains available are quantized in initial track and final track, as just noted above. In the angle filters, the gains are continuous functions of SNR. Reasonably high SNRs are required for acceptable tracking. Initially the filters will be tracking (mostly extrapolating) at a relatively low SNR because the target will not be centered in the tracking gates. At low SNR levels, the current discriminant data is weighted by the filter gains lighter than under normal tracking because the return signal is weak relative to the noise in the signal.

Various techniques may be employed to compute the discriminants and the SNRs. By way of example, the range gate command, $R_{GC}$, used to place the range gate at the predicted range bin of the target may be used to produce two adjacent range gates. The sign of a target signal from one gate is arbitrarily set negative, and the sign of a target signal from the other is set positive. The range discriminant is then essentially the algebraic sum of two range gated signals. The range tracking filter attempts to center the target between the adjacent gates. This type of tracker is referred to as the "split gate" type. To compute the SNRs, noise measurements are effectively made by averaging signal return in an equal number of range bins, or doppler filters, on each side of the gated range bins, or doppler filters, and subtracting that average from an average value of the two gated signal returns used to form the discriminants, taking into account noise present in the signal. The SNR's are then effectively computed as the ratio of the sum of the split gate signals used to compute the discriminants (less noise) and the noise thus measured. SNR measurements are averaged in the computer 13a over the same number of sampling cycles (typically four) as the preaveraging system 18 for the discriminants.

Split-gate tracking is used for all discriminants. For the velocity discriminants, the technique is directly analogous to that described for range. Two doppler filters are gated and the tracker attempts to maintain the target centered between the two filters. For the azimuth and elevation tracking, range-gated signals from the monopulse radar system are processed as the discriminants. The angle trackers attempt to maintain the target at the antenna axis by driving the antenna to a position such that $(A+C)-(B+D) = 0$ and $(A+B)-(C+D) = 0$. In that manner coherent subtraction of the left and right half of the antenna forms the azimuth discriminants, and the coherent subtraction of the upper and lower half of the antenna forms the elevation discriminant. Note that microwave plumbing on the back of the antenna does the coherent subtraction. Range and velocity discriminants are formed with only the sum channel signal $(A+B+C+D)$.

In each case, the disciminant is a bipolar signal. In the noise free case, its magnitude is dependent on the tracking error as well as target signal magnitude which varies with range and size of target. To reduce the dependence on signal magnitude, the discriminants can be normalized by dividing by some function, $f(M_1, M_2)$, of the target signal, where $M_1$ and $M_2$ are the signals used to form the discriminant. The present system uses the sum as follows:

$$\text{Discriminant} = \frac{M_1 - M_2}{M_1 + M_2} \qquad (56)$$

Normalizing by dividing by the largest of $M_1$ and $M_2$ would give 50% better gain stability over SNR varying from 6 to 30 db, but that normalizing technique would only be possible in range and velocity tracking because in angle tracking $M_1$ and $M_2$ are not known separately, but their sum $(M_1 + M_2)$ is known.

In the noise free case the normalized discriminant magnitude is dependent on the error, and its sign indicates the direction of the error. Receiver noise not only produces measurements with dispersion around where they would be in the noise free case, but actually causes the mean output to be lower. The mean suppression becomes greater with lower signal-to-noise ratio.

Figure 5:
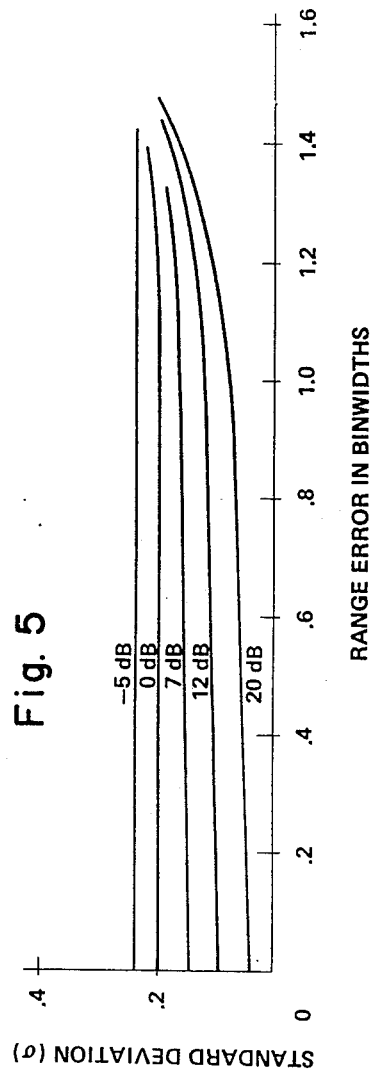
FIGS. 4, 5 and 6 illustrate typical range discriminant characteristics.
Figure 4:
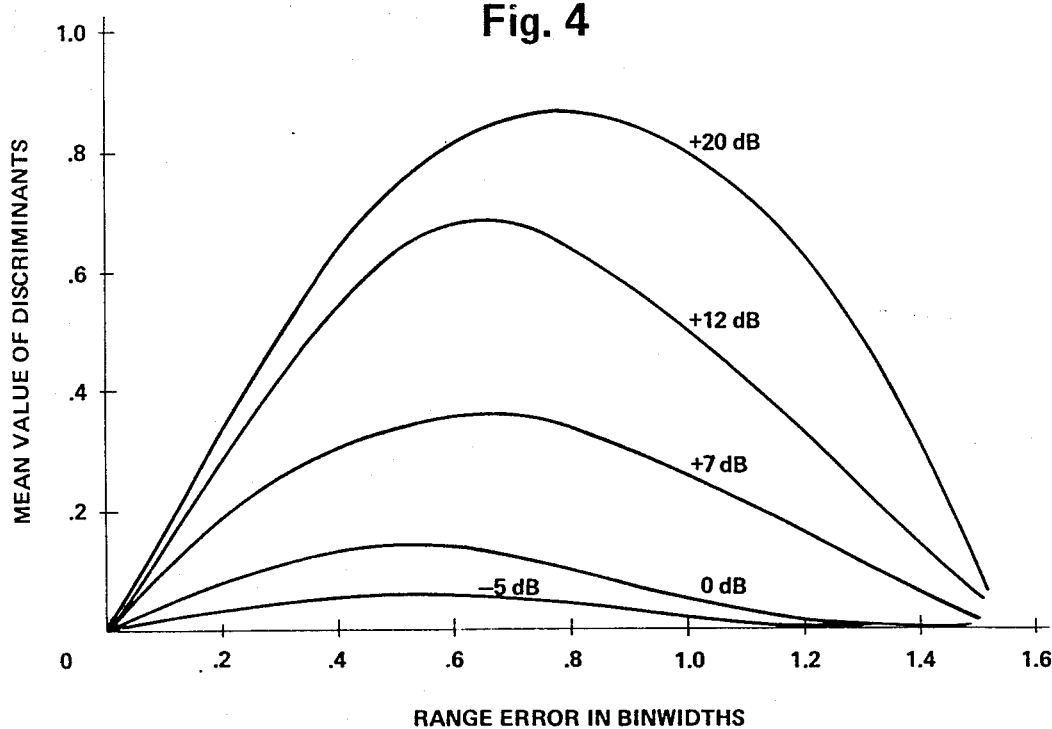
Figure 6:
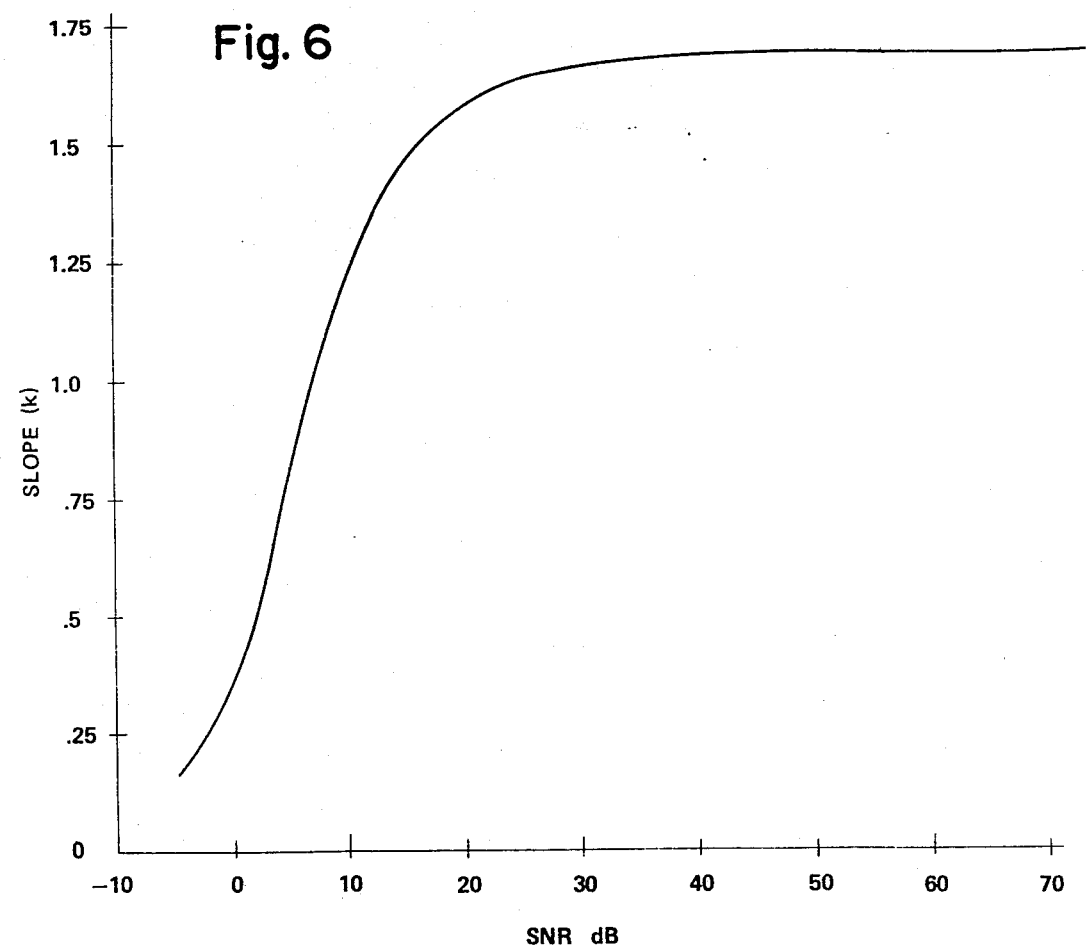

Typical range discriminant characteristics are shown in FIGS. 4, 5 and 6. FIG. 4 shows range discriminant means, i.e., the mean value of discriminants as a function of range error in bin widths for different SNR's of −5, 0, +7, +12 and +20 db. The standard deviations, $\sigma$, are shown in FIG. 5 for the same range errors and SNR's. FIG. 6 shows small signal discriminant slopes. These data can be determined analytically, but are preferably determined experimentally, for use in the selection of the gains in the filters. As noted hereinbefore, each filter can provide optimal tracking performance under instantaneous signal characteristics if provided data on the actual discriminant noise variances, $\sigma_i^2$, and actual discriminant slopes, $k_i$, corresponding to each discriminant measurement, i.e., on a cycle by cycle basis. Once the data of FIGS. 4, 5 and 6 have been established, the noise variances and discriminant slopes can be determined during each filter cycle as a function of discriminants and SNR. The discriminant slope, $k_i$, and the noise variance, $\sigma_i^2$, are used in the calcultions of the Kalman gain, $K_i$. This is, in theory, to be done in each filter during each cycle, but in practice it is fully done only in the angle tracking filters, and even in the angle filters calculations average discriminant slope $k_{a_i} = \frac{1}{2}(K_{e_i} + K_{d_i})$ and an average noise variance $\sigma_{a_i}^2 = \frac{1}{2}(\sigma_{a_i}^2 \sigma_{a_i}^2)$ of the elevation $(e)$ and azimuth $(d)$ channels are used to calculate a Kalman gain, $K_{a_i}$, for use in both angle filters. That is done because the Kalman gain factor is an input to the calculations of the one step covariance matrix, $M_i$, which is quite complex and would require too much time to compute separately for each channel. Instead an average covariance matrix, $M_{a_i}$, is computed for use in both filters using an average Kalman gain.

In the range and velocity filters, the computations are further simplified in the exemplary embodiment to be described hereinafter. That is done by simply providing three precalculated Kalman gain factors for selection based on SNR. The SNR used in each filter is ideally $SNR_{RNG}$ for range and $SNR_{VEL}$ for velocity, but in practice both SNR's may be assumed to be very nearly the same at all times, at least sufficiently so for the accuracy required in using just one SNR for precomputed Kalman gain factors in the range and velocity channels. Consequently, in the exemplary embodiment to be described, $SNR_{RNG}$ could be used to select the Kalman gains $K_{r_i}$ and $K_{r_i}$ for the range and velocity channels. The theory otherwise remains the same for all filters as described hereinbefore in general terms.

In an exemplary embodiment a digital radar data processor is programmed to implement all four filters. Consequently, the estimator 14 will now be described with reference to functional flow charts of a functional filter (FT) Routine in FIGS. 8a, 8b, 8c and 8d, and with reference to detailed flow charts of that routine in FIGS. 9a through 9f.

The FT Routine provides quantities necessary to maintain track. Specifically, the variables generated by FT and passed on to other routines to maintain track are listed below.

$\epsilon_{P_e}$ — Elevation tracking error estimate.

$\omega_{LSP_e}$ — Target elevation LOS rate estimate used to maintain elevation angle tracking.

$\epsilon_{P_d}$ — Azimuth tracking error estimate.

$\omega_{LSP_d}$ — Target azimuth LOS rate estimate used to maintain azimuth angle tracking.

$R_{GC}$ — Range gate command derived by radar controller from $R_{TPR}$ and used to generate the range gate $R_G$.

$V_{GC}$ — Velocity gate command derived by radar controller from $V_{TPV}$ and used to generate the velocity gate $V_G$.

To compute the quantities necessary to maintain angle tracking, FT implements a four-state Kalman filter for both the elevation and azimuth channels. The state vectors of the angle filters are:

$$\begin{bmatrix} \epsilon_{P_e} \\ \omega_{LSP_e} \\ a_{T_d} \\ S_e \end{bmatrix}$$ — Elevation tracking error estimate.
— Target elevation LOS rate estimate.
— Target acceleration (inertial) estimate along antenna d-axis
— Elevation angular scintillation estimate.

$$\begin{bmatrix} \epsilon_{P_d} \\ \omega_{LSP_d} \\ a_{T-e} \\ S_d \end{bmatrix}$$ — Azimuth tracking error estimate.
— Target azimuth LOS rate estimate.
— Target acceleration (inertial) estimate along antenna (−e) axis.
— Azimuth angular scintillation estimate.

To simplify the computational requirements, a single computation of Kalman gains is made for both channels by averaging the measurement characteristics of the two channels. (Note: The Kalman filter is implemented only in the Final Track Mode. In Initial Track Mode, the form of the filter is retained, but the gains are quasi-constants.)

To maintain range tracking, a three-state range filter is implemented. The state vector of the range filter is:

$$\begin{bmatrix} R_{TPR} \\ V_{TPR} \\ a_{TPR} \end{bmatrix}$$ — Range to target estimate
— Range rate of target estimate
— Target acceleration (inertial) estimate along antenna axis
} Based on range discriminant only.

To maintain velocity tracking, a two-state velocity filter is implemented. The state vector of the velocity filter is:

$$\begin{bmatrix} V_{TPV} \\ a_{TPV} \end{bmatrix}$$ — Range rate of target estimate
— Target acceleration (inertial) estimate along antenna axis
} Based on velocity discriminant only.

The range and velocity filters are both implemented in the "Kalman form", but their gains are always selected on the basis of signal-to-noise ratios (SNR's). The measurement inputs to the angle filters are the respective angle discriminants. Because of electronic counter measures considerations, the range filter processes only the range discriminant; the velocity filter processes only the velocity discriminant. Thus, although the last two of the states in the range filter and the two states of the velocity filter mean the same thing, they are derived from different measurements and will, in general, be unequal.

The entries to the FT Routine are listed below:

FT — Called by an executive routine (XT) provided that the discriminants associated with filter cycle ($i$) are completed before the FT call during filter cycle ($i$+1) and FT must be completed before the AT call near the middle of filter cycle ($i$+1).

FT1 — Called by XT to initialize non-zero value filter variables.

FTS1 — Called by FT for scintillation parameters.

FTS2 — Called by FT for the state transition matrix.

FTS3 — Called by FT for motion compensation.

FTS4 — Called by FT for radome compensation.

FTS5 — Called by FT for angle discriminant slopes and residuals.

FTS6 — Called by FT for Kalman gains and covariance update.

FTS7 — Called by FT for angle state vectors update.

FTS8 — Called by FT for own-ship acceleration in antenna coordinates.

Figure 7:
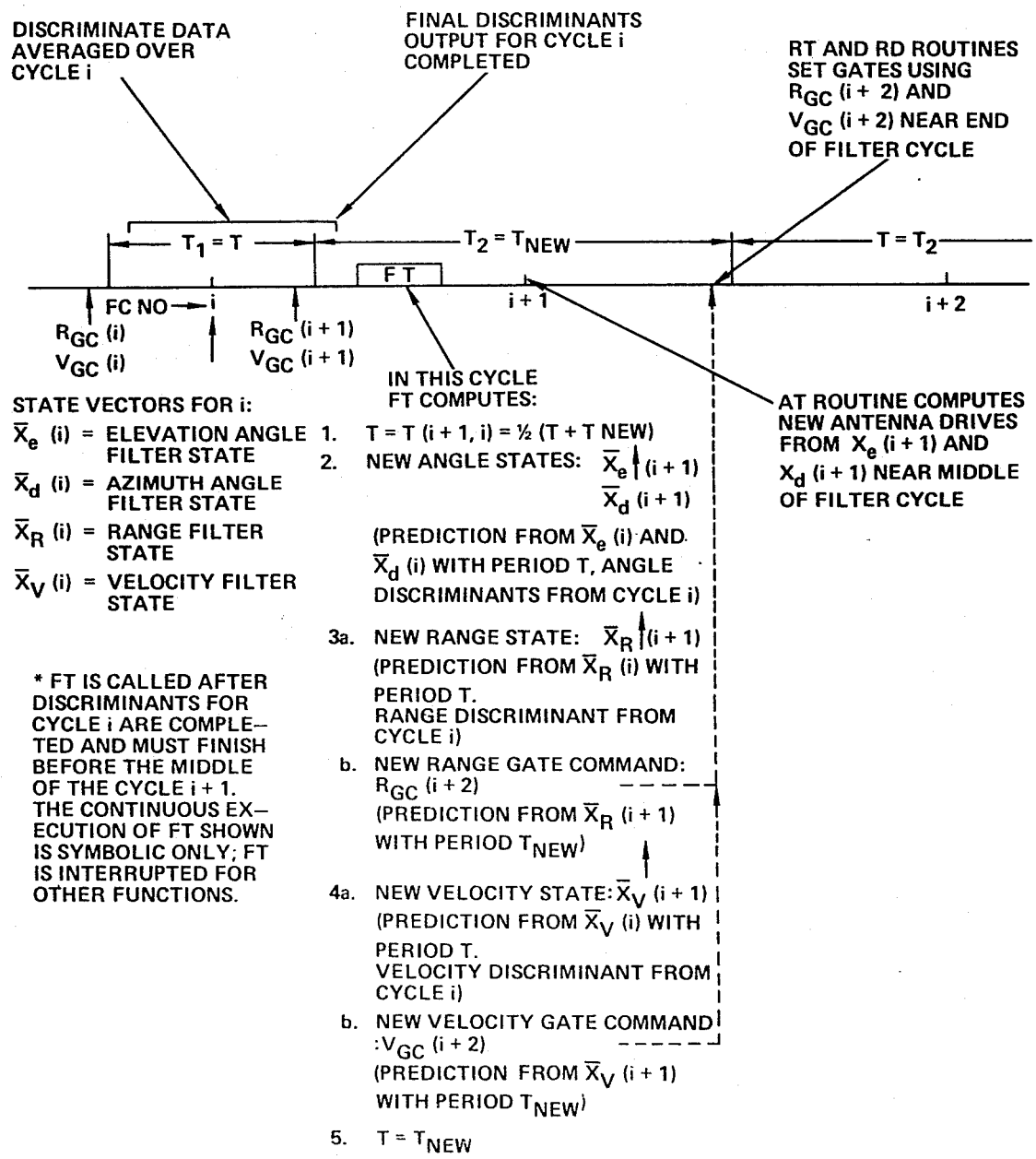
FIG. 7 is a timing diagram of tracking filter functions.

The general nature of the track filtering process will be discussed first, with the aid of FIG. 7. The figure shows two adjacent filter cycles numbered, respectively, $i$ and $i$+1, and portions of a third, $i$+2. The points $i$, $i$+1, etc., are to be considered the mid-points of their respective filter cycles. At the end of the FT computations for cycle $i$, the filter state vectors $\bar{X}_e(i)$, $\bar{X}_d(i)$, $\bar{X}_R(i)$ and $\bar{X}_V(i)$ (in the general case) have been computed with a time reference at the mid-point of cycle $i$. The FT variable for current filter cycle time, T, will equal $T_1$. Assume that discriminant data $\Delta\epsilon_m$, $\Delta\eta_m$, $\Delta V_m$ and $\Delta R_m$ are being collected over cycle $i$.

If the period for filter cycle $i$+1 is different than that of cycle $i$, the Executive (XT) Routine will load the new filter period ($T_2$ in the figure) in the FT variable $T_{NEW}$ before calling FT for cycle $i$+1. Also, output of the final discriminants must be completed before FT is called. Early in the FT computations for cycle $i$+1, the prediction interval from point $i$ to $i$+1, ½(T+$T_{NEW}$), is computed and stored in T. The new state vectors at $i$, using prediction equations with period T and augmented by the discriminant data gathered over $i$ weighted by the filter gains. The range gate command, $R_{GC}(i$+2), for cycle $i$+2, is the range estimate for point $i$+2 computed by pure prediction from the range state at $i$+1, only now using the prediction interval from $i$+1 to $i$+2, $T_{NEW}$. The velocity gate command, $V_{GC}(i$+2), is computed in a similar manner. At the end of FT, $T_{NEW}$ is stored in T as the current filter cycle period.

A special note should be added. If $T_1 \neq T_2$ (as shown in the figure), the gate commands for cycle $i$+1 will be incorrect because the prediction interval from $i$ to $i$+1 was assumed by FT to be T, rather, ½(T+$T_{NEW}$), since, during cycle $i$, FT had no a priori knowledge of $T_{NEW}$. This gate inaccuracy is not a problem, however, because when the filter cycle period changes, discriminant data will not be gathered over the first filter cycle with the new period. Thus, in the figure, FT called during cycle $i$+2 would update the state vectors to point $i$+2 without benefit of discriminant data gathered over $i$+1.

The azimuth and elevation command computations use the tracking error and LOS rate estimates from the new angle state vectors, $\bar{X}_e(i$+1) and $\bar{X}_d(i$+1), to compute and output new antenna drive near the middle of cycle $i$+1. That computation is controlled to be near the center of the filter cycle because that is the time reference point for $\bar{X}_e(i$+1) and $\bar{X}_d(i$+1).

Near the end of filter cycle $i$+1, the radar controller (FIG. 1) computes new range and velocity gate positions $R_G$ and $V_G$ using $R_{GC}(i$+2) and $V_{GC}(i$+2), which are then effective throughout filter cycle $i$+2 and affect the range and velocity discriminants gathered over cycle $i+2$. From the above discussion it can be seen that the range and velocity gate computations are in the form of a two-step prediction process, while the antenna drive computations are in the form of a one-step prediction process.

A functional flow diagram for the tracking filter routine (FT) will now be described with reference to FIGS. 8a – 8d. Reference numerals in parenthesis identify blocks in the flow diagram. At the beginning of FT in FIG. 8a, the return link to the XT Routine is stored in a special FT variable (memory location) and an initial mode check is made (101). If the mode is Initial Track (I/T), the variable $C_{INS}$ is set to zero as a first time final track indicator (102). The averaging (111) of T and $T_{NEW}$ is bypassed in I/T, since the filter periods are all equal in I/T. T and $T_{NEW}$ are set to the I/T period for the current mode by XT before the start of track.

When not in I/T, which is to say while in the Final Track (F/T) Mode, the radar platform (own-ship) accelerations in antenna coordinates are required by the tracking filter. These accelerations are computed (103–110) by differencing inertial navigation system (INS) velocities $V_N$, $V_E$, and $V_U = -V_D$ over a four-filter cycle period (where N, E and D designate the north, east and vertical axes of the INS), dividing by the time of the four-cycle period to produce own-ship accelerations in INS coordinates, then transforming to antenna coordinates using the sines and cosines of aircraft and antenna Euler angles sampled at approximately the center of the four-cycle period. The accelerations $a_{l_r}$, $a_{l_e}$ and $a_{l_d}$ produced by this process are used in the filter computations for the next four-filter cycles, after which they are refreshed by the above process.

The filter cycle counter is $C_{INS}$ and the duration of the four-cycle period is accumulated in $T_{INS}$. On the first cycle of F/T (indicated by $C_{INS} = 0$), the current set of INS velocities is saved in $V_{N_1}$, $V_{E_1}$ and $V_{D_1}$; $C_{INS}$ is set to 1 and $T_{INS}$ to 0 to initialize the acceleration computations. The covariance matrix $M_{a_i}$ for the Kalman filter is also initialized at this point (110). The quantities $\eta_1$, $\eta_2$ and $(T_2 - T_1)$, used in the motion compensation equations, are also initialized in this program branch.

On succeeding filter cycles, $T_{INS}$ is incremented by the previous filter period, T, and $C_{INS}$ is incremented by 1. When $C_{INS} = 3$ the program is on cycle 3 of the four-cycle period. Since FT is called early in a filter cycle, the time point when $C_{INS} = 3$ is shortly after the end of cycle 2 or nearly the mid-point of the four-cycle period. At this time, the current sines and cosines of Euler angles necessary to transform from INS to antenna coordinates are saved in special FT buffer calls. (The sine and cosine of $\psi$ are computed by FT). When $C_{INS}$ reaches 5, the time point is just past the end of cycle 4 of the four-cycle period and $T_{INS}$ equals the sum of the four previous filter periods. At this point $C_{INS}$ is reset to 1 and subroutine 8 (FTS8) is called. This subroutine picks up the current INS velocities and, using these and $V_{N_1}$, $V_{E_1}$, $V_{D_1}$, and $T_{INS}$, computes the average own ship acceleration in INS coordinates, over the last four filter cycles. It then transforms these accelerations to antenna coordinates using the buffer-stored Euler angles mentioned above. These new values of $a_{l_r}$, $a_{l_e}$ and a $a_{l_d}$ are now available to the filter for the next four cycles. Subroutine 8 also stores the current INS velocities in $V_{N_1}$, $V_{E_1}$ and $V_{D_1}$, and sets $T_{INS} = 0$ so that the next acceleration computation cycle is initialized. Finally, in Final Track Mode the old, T, and new, $T_{NEW}$, filter periods are averaged (111) and stored in T as the prediction interval from cycle $i$ to cycle $i+1$ (see FIG. 7). Note that if $T_{NEW}$ has not been changed by XT, then T will simply be the common period of cycles $i$ and $i+1$.

The angle tracking filter is range and velocity dependent. In the next section (112) of FT, the range, $R_{TPA}$, and velocity, $V_{TPA}$, to be used in the angle filter are selected. The signal-to-noise ratio, SNR(D), used to determine if the angle filter should extrapolate, is also selected in this section. SNR(D) is selected as $SNR_{RNG}$ and $R_{TPA}$ is selected as $R_{TPR}(i)$. In the Final Track Mode, $V_{TPV}(i)$ is the best choice for $V_{TPA}$; however, in Initial Track, $V_{TPV}(i)$ is ambiguous and $V_{TPR}(i)$ is used in this case. Finally, $R_{TPA}$ is limited $\geq 512$ ft. to avoid overflows in the angle filter computations.

Figure 8A:
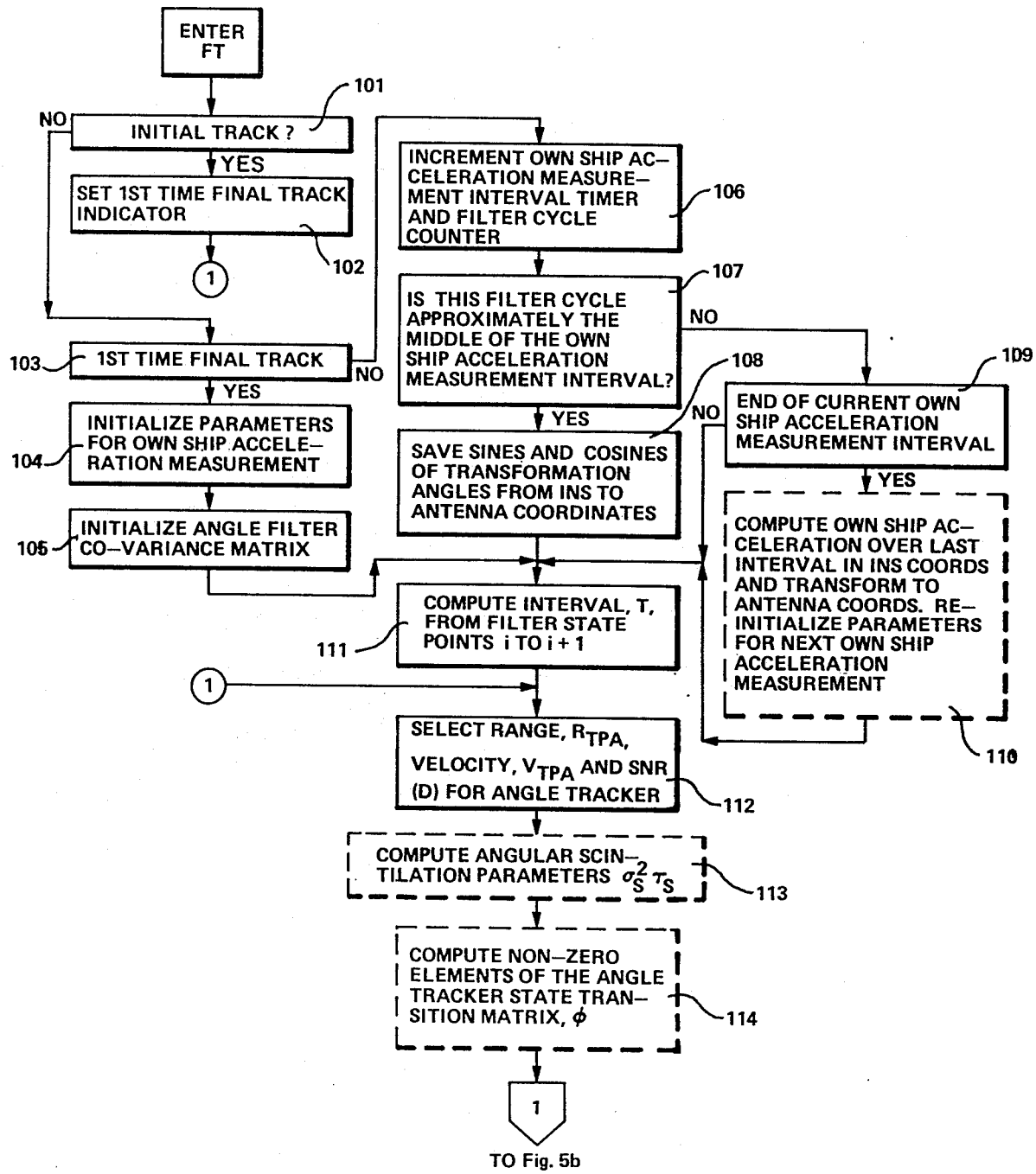
FIGS. 8a–8d illustrate a functional flow diagram for a programmed tracking filter routine.

FT next computes in block 113 the angular scintillation parameters $\sigma_s^2$ and $\tau_s$ by means of subroutine 1 (FTS1), and in the last block 114 of FIG. 8a computes the angle filter state transition matrix, $\Phi(i+1, i)$, using subroutine 2 (FTS2). Only the non-zero and non-unity elements of $\Phi_a$ are computed. Block 113 also computes the $l$ parameters (Eqs. 37a, b).

Figure 8B:
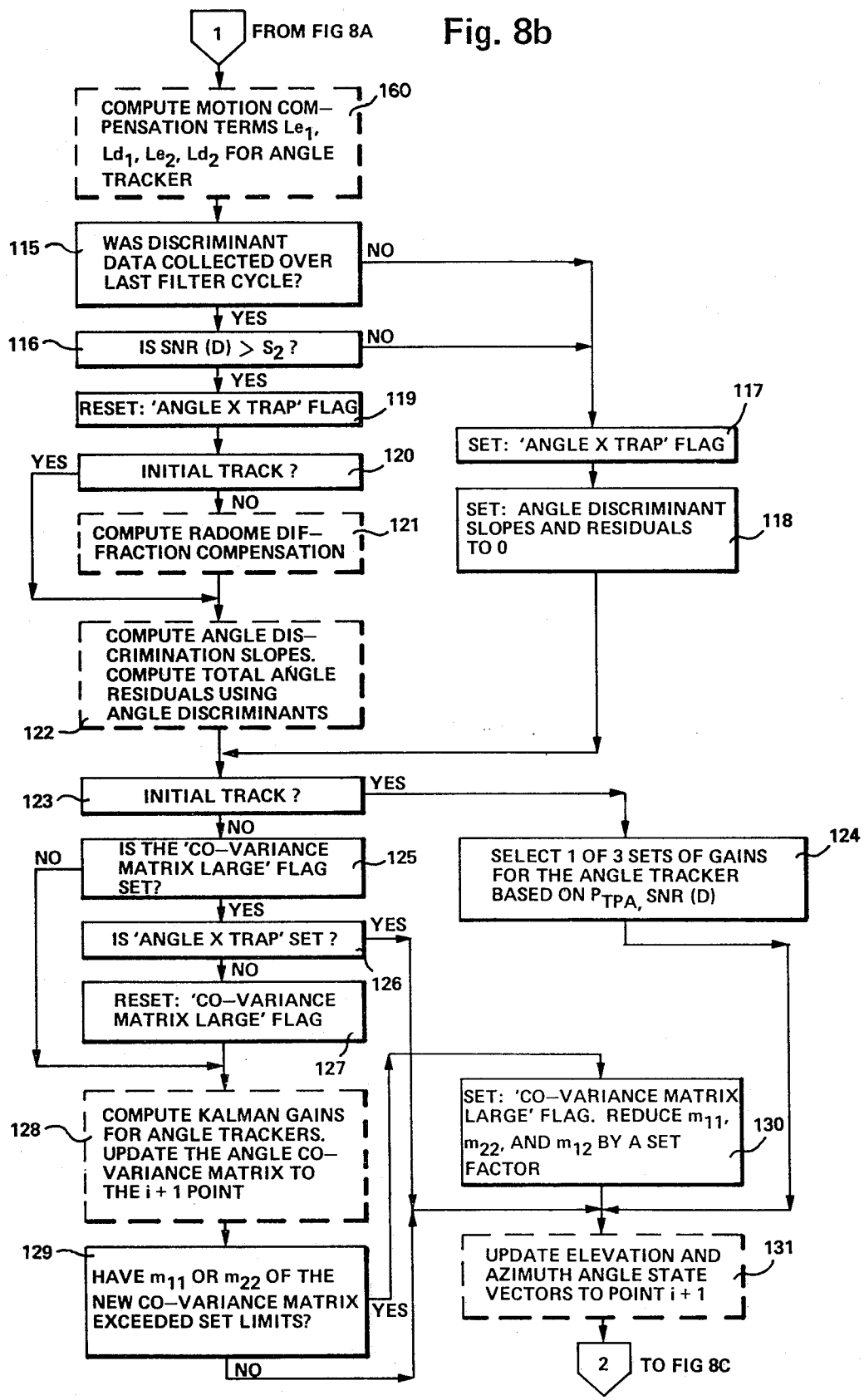
Figure 8C:
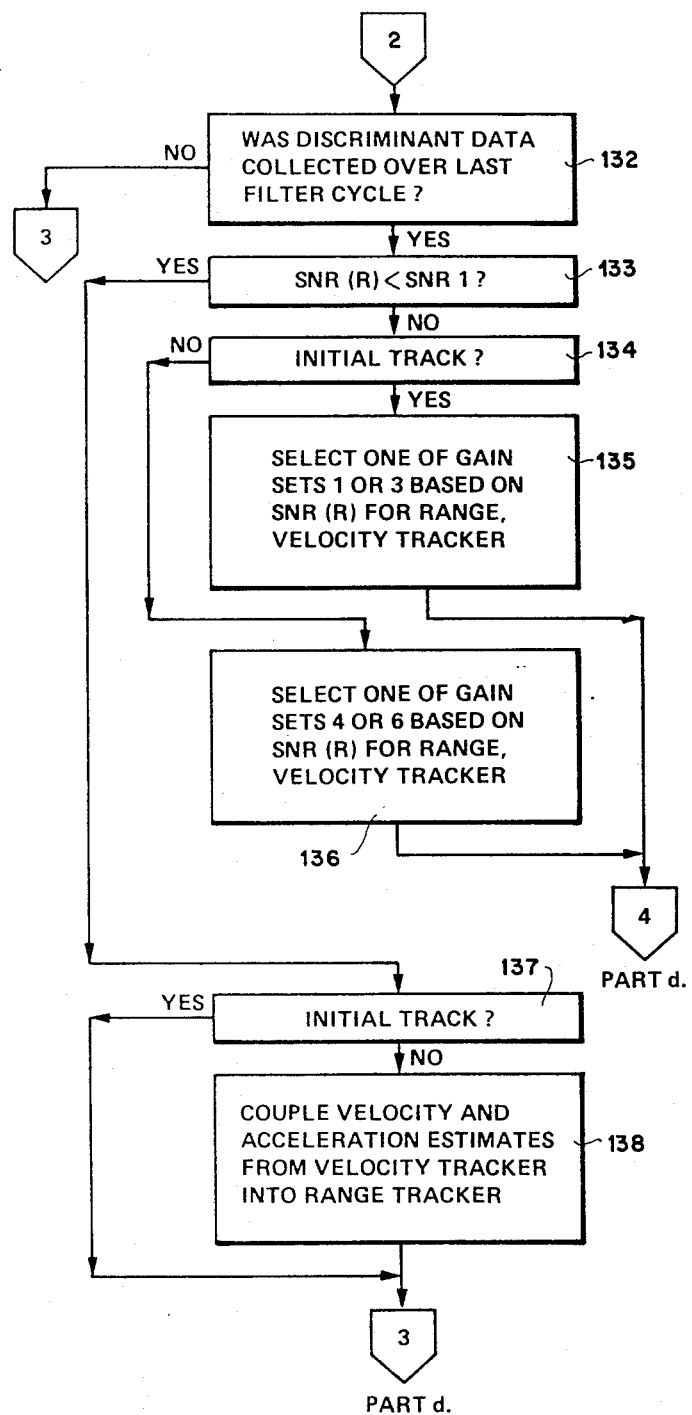
Figure 8D:
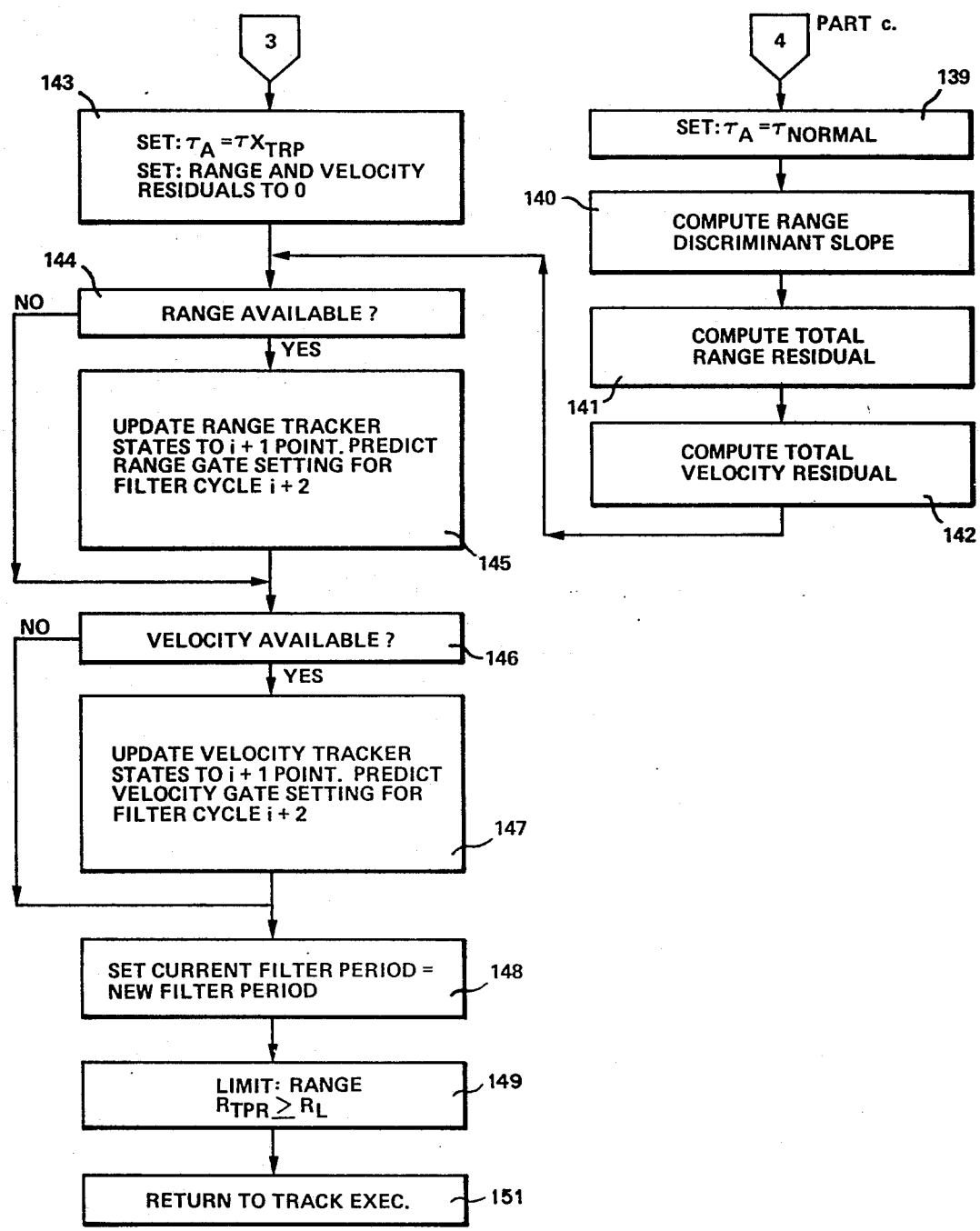

Referring next to FIG. 8b, the FT routine calls a subroutine 3 (FTS3) in block 160 of the flow chart to compute the motion compensation terms $L_{e_1}$, $L_{d_1}$, $L_{e_2}$ and $L_{d_2}$. For initial track, only a portion of the terms are computed to reduce computation time.

If a 'DATAVALID' flag is set (115) to indicate that discriminant data were collected over the previous filter cycle (cycle $i$) and are available for use on cycle $i+1$, which is the YES condition for 115, and if the flag is not set which is the NO condition for 115, or SNR(D) indicates too low an SNR (116), which is the NO condition for 115, the 'ANGLE XTRAP' flag is set (117) and $k_e$, $k_d$, $\Delta_e$ and $\Delta_d$ are set to zero (118). If discriminants are available and SNR(D) is greater than a threshold, the 'ANGLE XTRAP' flag is reset (119). If not in I/T (120), random compensation is computed in block 121 using Subroutine 4 (FTS4), and angle discriminant slopes, $k_e$ and $k_d$, and total angle residuals, $\Delta_e$ and $\Delta_d$, are computed in block 122 using Subroutine 5 (FTS5). The radome compensation calculation is bypassed in initial track to reduce computation time and is needed in final track only if angle discriminant data are used.

The next section of FT computes the gains for the angle filters. If in initial track (123), one of three sets of gains is selected (124), based on $R_{TPA}$. In final track, the angle gains are computed. Some logic is gone through before making these computations. If, in the previous filter cycle, it was determined that one or both of the first two co-variance matrix diagonal terms, $m_{11}$ and $m_{22}$, were becoming large relative to their full scale values, the '$M_a$ MATRIX LARGE' flag will have been set. If that is so (125) and the angle filter is extrapolating (126), this would drive the co-variance matrix even larger. This is clearly undesirable since the $M_a$ matrix must not overflow. Consequently, in this instance, the gain calculation is by-passed and the last Kalman gains computed will be used. If the last $M_a$ matrix were not too large or if the angle filter is not extrapolating, the MATRIX LARGE flag is reset (127) and the Kalman gains, $K_a(i)$, are computed (128) and the covariance matrix is updated to $M_a(i+1)$ by means of Subroutine 6 (FTS6). After this, calculations $m_{11}(i+1)$ and $m_{22}(i+1)$ are examined (129) to see if either one of them is getting too large. If so, the 'M$_a$ MATRIX LARGE' flag is set (130) and $m_{11}(i+1)$, $m_{22}(i+1)$ and $m_{12}(i+1)$ are all reduced by a factor $C_{13}$.

After the gains have been determined, the angle state vectors are updated (131) to the point $i+1$ by means of Subroutine 7 (FTS7) using the states at point $i$, the $\Phi$ matrix, the motion compensation terms and the total angle residuals weighted by the gains. The program then proceeds in FIG. 8c to the range and velocity filter section of FT.

At the beginning of the range and velocity filter calculations, the 'DATAVALID' flag is checked (132) to see if discriminant data were collected over the last filter cycle. If no discriminant data was collected, the program branches to set the extrapolation conditions, but if discriminant data are available, the program will select gains for the range and/or velocity filters provided that the appropriate SNR is not below a certain threshold (SNR1). If the SNR in question is too low (133), the filter will be put into an extrapolation mode. Furthermore, in Final Track Mode, the velocity filter will couple into the range filter under this condition (134 and 135).

For non-extrapolation conditions, and in Initial Track Mode (136) the program provides for the selection of one of two sets of gains in initial track (137) and one of two sets of gains in final track (138). Gain selection is based on $SNR_{RNG}$.

After the gain constants have been selected and stored in variable cells (i.e., predetermined memory locations) the target acceleration model time constant, $\tau_a$, is set (139) at a normal 3 seconds. The range discriminant slope and the total range residual, $\Delta R_M$, is computed (140, 141) as shown on the detailed flow chart of FIGS. 9a – 9f. The total velocity residual, $\Delta V_M$, is also computed (142). Note that the measured discriminants $\Delta R_m = \Delta R_{DSCR}$ and $\Delta V_m = \Delta V_{DSCR}$ are here distinguished from the respective residuals by the capital M subscripts for the residuals.

For the extrapolate condition, $\tau$ filter, is set at 10 seconds and $R_M$ and $V_M$ are both set = 0 in block 143. If range is available from the range filer (144), the two branches of the program now merge to update the range filter state vectors (145). Similarly, if velocity is available from the velocity filter (146) the velocity filter state vectors are updated (147).

At the end of FT, $T_{NEW}$ is installed in T as the current filter period (148), range, $R_{TPR}(i+1)$, is limited to be greater than a positive lower limit, $R_L$, to avoid negative ranges, and control is returned to the executive (XT) Routine, thus completing a tracking filter cycle.

Figure 9A:
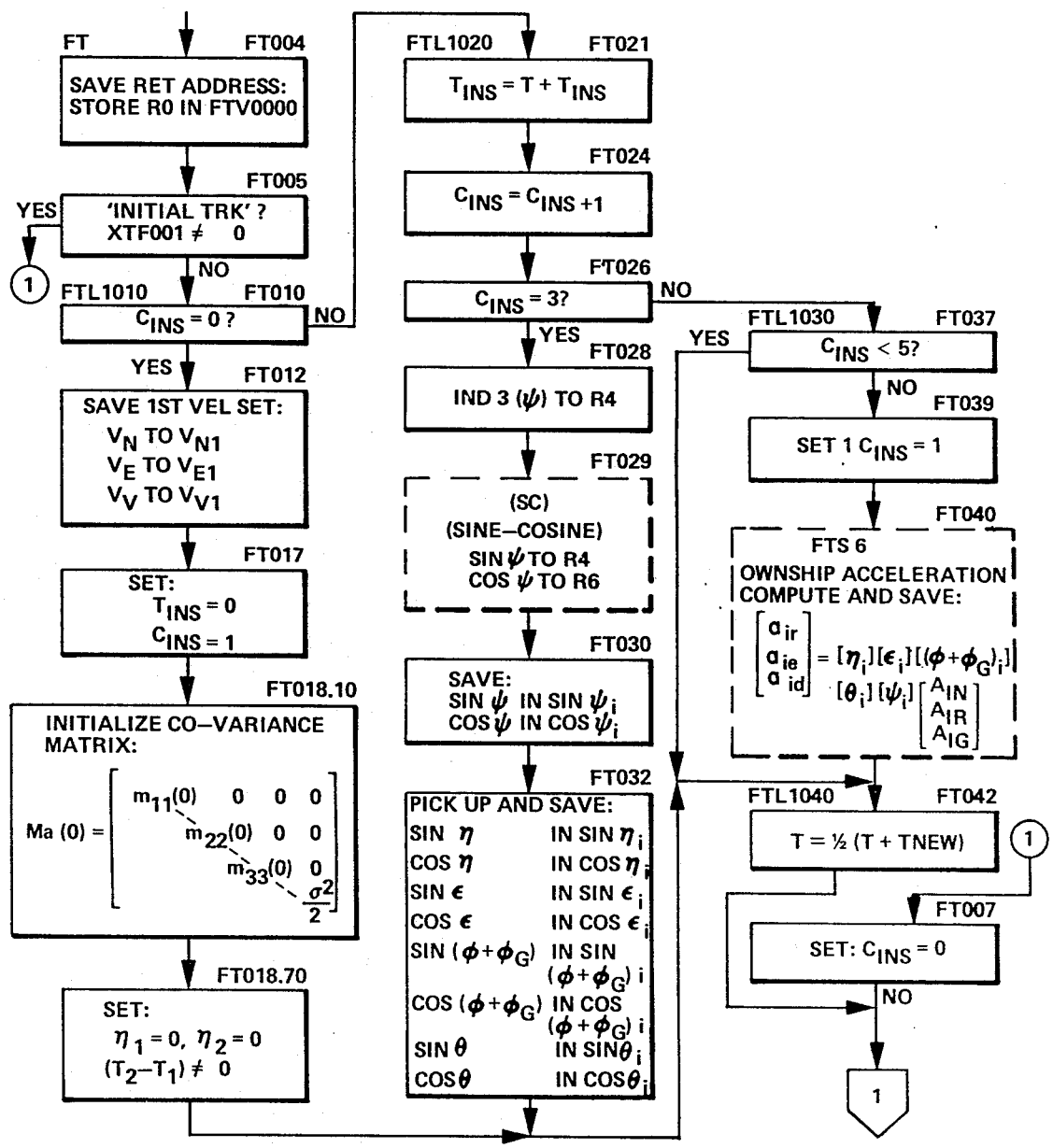

Entering the tracking filter routine (FT) in FIG. 9a the boxes will be identified by the code identifier number. The routine of FIGS. 9a and 1f provide a detailed description of the routine of FIGS. 8a and 8d.

In box FT004 the return address to the executive (control) routine is stored in memory cell FTV0000.

In box FT005 a decision is made for initial track where XTF001 is the initial track flag and if it is not equal to 0 the system is in initial track and the operation goes to box FT007 where the iteration counter $C_{INS}$ is set to 0. If there is not an initial track condition (NO), the system goes to box FT010 in which box $C_{INS}$ represents the counter for computing the own ship's acceleration, and the count is checked to determine if it is equal to 0. If $C_{INS} = 0$ (YES) then the routine initializes the acceleration computations in box FT012. In box FT012, the present A/C velocities are stored and in box FT017, time $T_{INS}$ (the time between velocity samples in order to do the acceleration) is initialized as well as CINS. At this point the covariance matrix of box FT018.10 is initialized.

Then in box FT018.70 $\eta_1$ and $\eta_2$, which are two successive samples of antenna azimuth, are set. Also, two time tags are saved as the difference, which is an initializing computation for the antenna azimuth rate. In box FT042 the filter cycle time is computed.

If $C_{INS}$ is not equal to 0 in box FT010, the flow goes to box FT021 where $T_{INS}$ is incremented in box FT021 and the counter $C_{INS}$ is incremented in box FT024. In box FT026 a check is made to see if counter, $C_{INS}$, contains a value of 3 which is in the middle of the acceleration compute cycle. If YES, the angles describing the rotations from the inertial (INS) axes to the radar axes at this midpoint are saved. In box FT028 the current aircraft heading is then fetched. In box FT029, the sine and cosine of the aircraft heading is computed and the computed values are stored in box FT030. In box FT032 the sines and cosines of the angles required to perform the inertial to antenna coordinate transformation are stored.

If the box FT037 a YES is detected, then the routine is not yet at the end of the acceleration branch compute cycle and if a NO is detected it means that the routine is at the end of the cycle. In box FT037, a determination is made and when going to box FT039 the operation in that box is to reset the counter $C_{INS}$. In box FT040, the own ship acceleration is computed and stored. If the decision in box FT037 is YES, the flow skips its own ship acceleration computations and goes directly to box FT042. Box FT042 computes filter cycle time. In initial track (a YES branch in box FT005) the flow goes to box FT007 where the counter $C_{INS}$ is initialized to zero so that on the first compute cycle of final track, the YES branch from box FT010 will be taken to initialize the acceleration computation.

Figures 1, 9B:
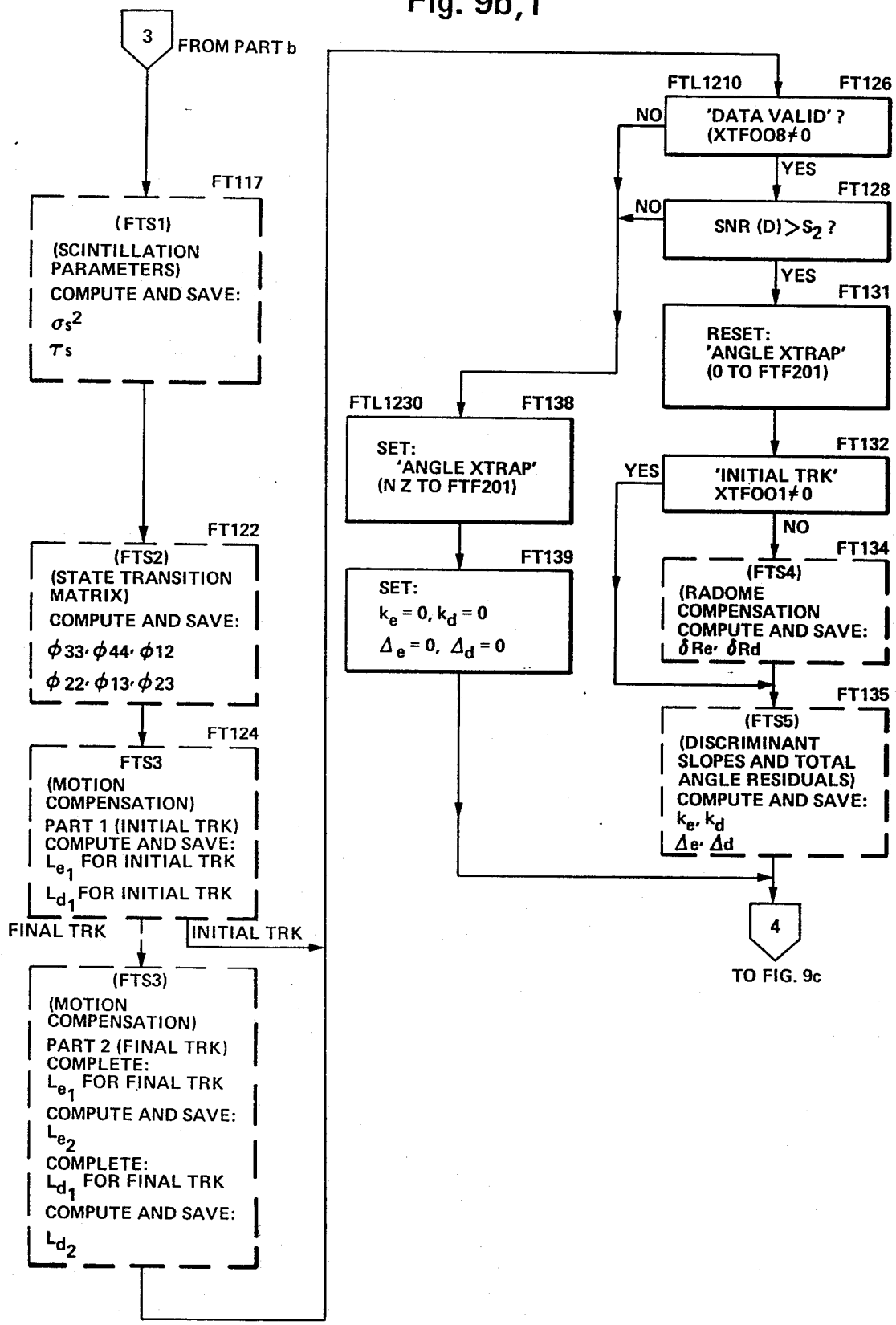
Figure 9B:
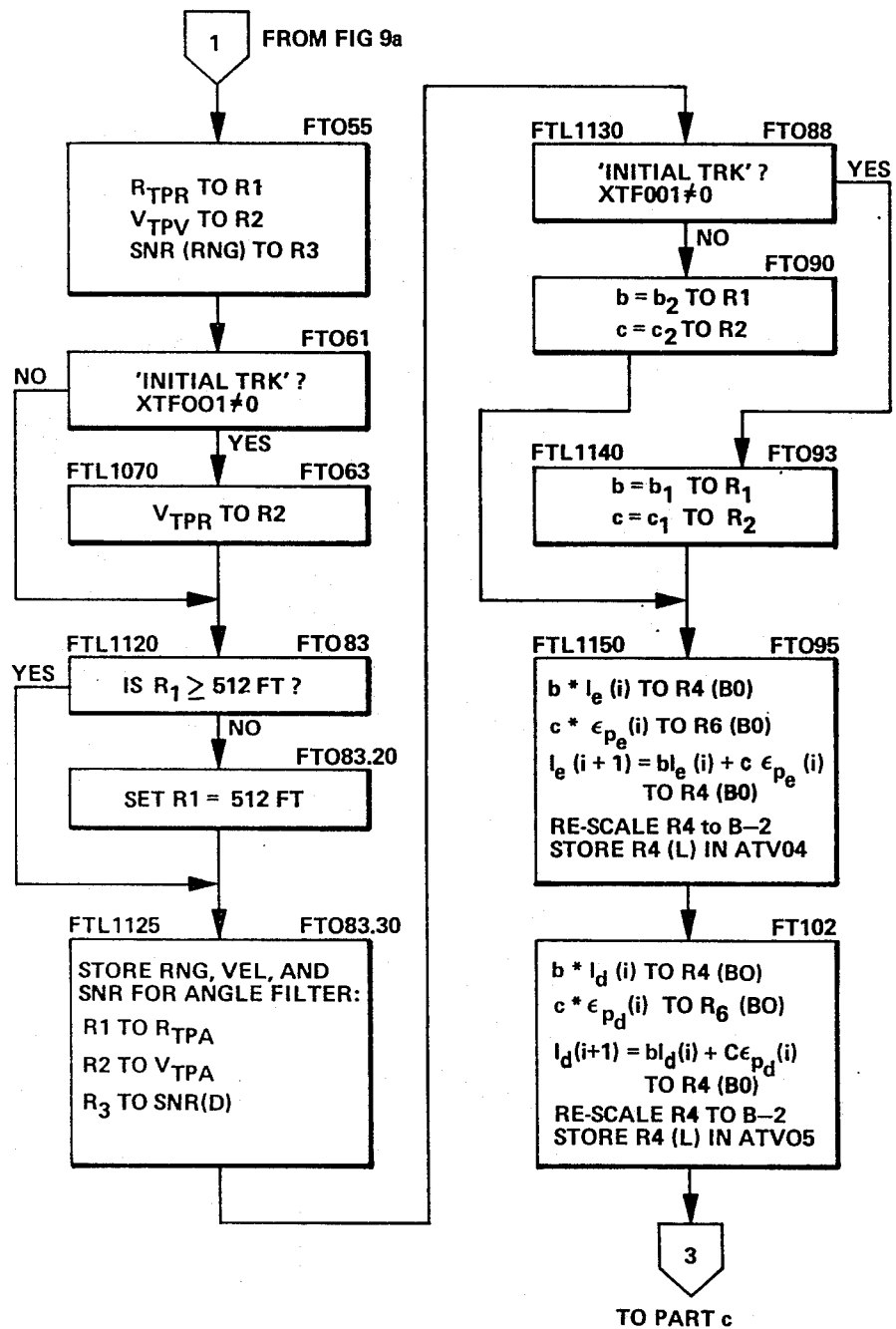

Going from box FT007 to FIG. 9b, box FT055 fetches the range $R_{TPR}$ to register 1 (R1), the range rate $V_{TPV}$ to register 2 (R2) and SNR(RNG) to register 3 (R3). In box FT061, an initial track determination is made an if it is a YES, the operation in box FT063 fetches a different value, $V_{TPR}$, to register 2 (R2) for range rate. If a NO is determined in box FT061, the operation goes directly to box FT083 where register 1 (R1) is examined to determine if it is greater than or equal to 512 feet and if it is not, in box FT083.20 the range is limited to 512 feet so range has a minimum value for computation purposes. If the determination on box FT083 is YES, the operation goes directly to box FT083.30. In the next step in box FT083.30 range, velocity and SNR are stored. In box FT088 an initial track check is again made and if the system is not in initial track the operation goes to box FT090. If the system is in initial track in box FT088, the operation goes to box FT093. Box FT090 and FT093 function to select b and c for digital filtering. In box FT095, a shaping parameter $1_e$ for elevation filtering is computed and stored and in box FT102 a shaping parameter $1_d$ is computed for azimuth filtering and is stored.

Referring now to FIG. 9b-1 and box FT117 the scintillation parameters are computed and stored ($\sigma_s^2$ is the variance of the target scintillation model and $\tau_s$ is the time constant). In box FT122, the state transition matrix is computed and stored in box FT124, both for final and for initial track, part of the L vector for motion compensation is computed and if the system is in initial track, the operation exits to box FT126. If the system is in final track, the operation goes from box FT124 to the following box and computes the remainder of the final track motion compensation terms.

In box FT126, a flag is checked to see if there is valid discriminant data. If the data is valid, the SNR in box FT128 is checked to see if it is above a threshold. If YES, in the box FT131, the flag 'angle extrapolate' is reset meaning the system is not in an angle extrapolate (i.e., the data is valid and being received and there is a satisfactory SNR). In box FT132 a check is made of initial track so that if the system is in initial track, the radome compensation is skipped to save computing time and the operation goes to box FT135. If the result in box FT132 is a NO as to initial track, the routine goes to box FT134 where the radome compensation is computed and stored. In box FT135, the residual (difference between the measured and computed determination of tracking error) is computed and stored. If the data is not valid in box FT126 or the SNR is below a threshold value in box FT128, the operation goes to box FT138 where the flag 'angle extrapolate' is set. In box FT139, the discriminant slopes ($k_e$ and $k_d$) and residuals ($\Delta_e$ and $\Delta_d$) are set equal to zero. In this case external measurement data is not available or is not of sufficient quality to be used.

Figure 9C:
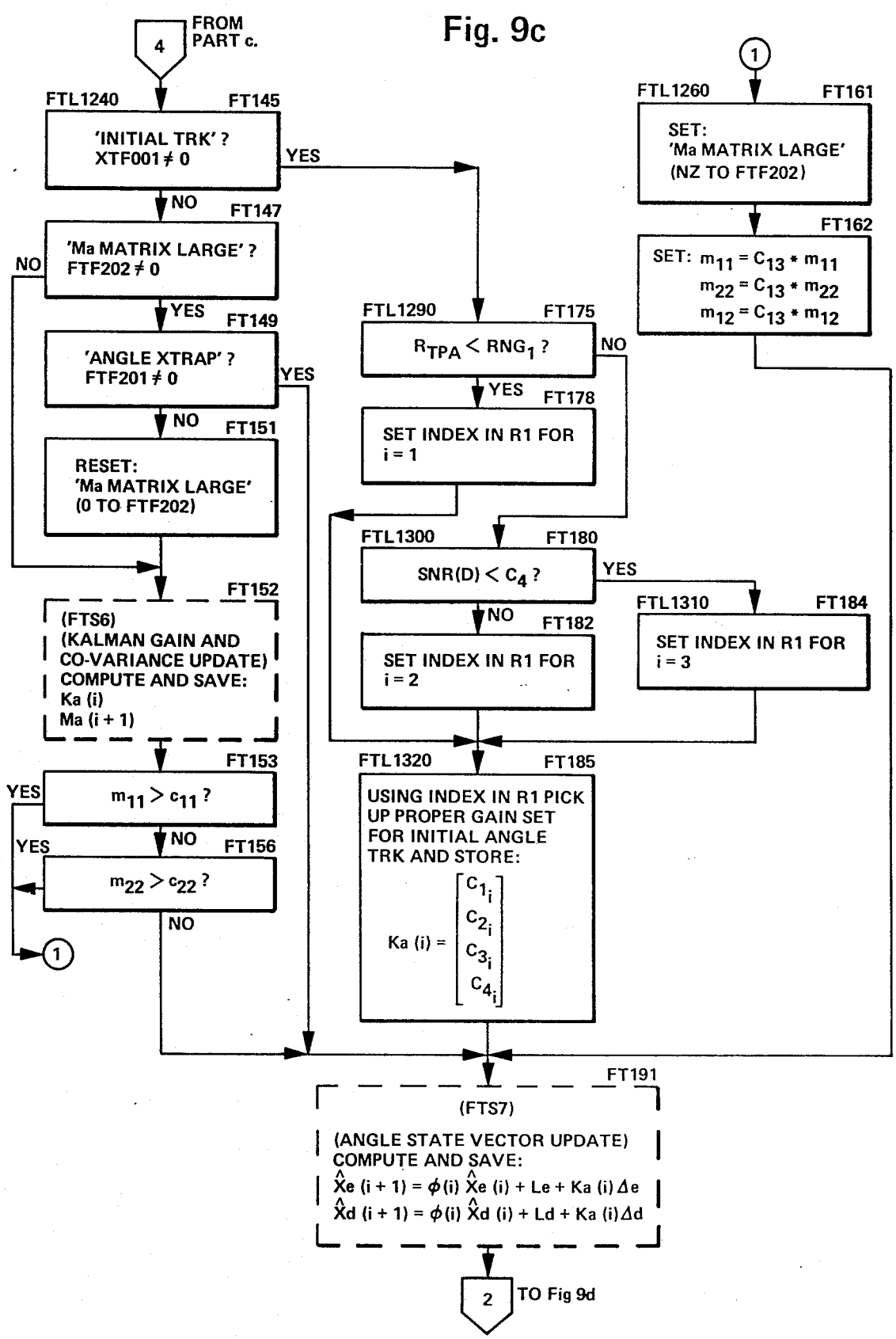

In FIG. 9c, an initial track determination is made in box FT145 and if the result is YES the operation goes to box FT175 where a range determination is made to see if $R_{TPA}$ is less than a threshold $RNG_1$. If the answer in FT175 is YES, the operation goes to box FT178 where the index set into R1 is for gain set 1 followed by the operation proceeding to box FT185. If the answer in box FT175 is NO, the operation goes to box FT180 where a determination is made to see if SNR(D) is less than threshold $C_4$ and if the answer is NO, the operation then proceeds to box FT182 where the index is set in R1 for gain set 2. The operation goes from box FT182 to box FT185.

If the answer in box FT180 is YES, the operation proceeds to box FT184 where the index in R1 is set for gain set 3 with the operation then proceeding to box FT185. In box FT185, the filter gains are selected for initial track based on the gain set index in R1. (Kalman gains are not computed).

If the initial track is NO in box FT145, then the flag is examined in box FT147 to determine if the covariance (Ma) matrix is close to overflow. If the Ma matrix is close to overflow (YES) and the system is in the angle extrapolate mode (YES) as determined in box FT149, then the gain and covariance update is skipped and the last set of gains constants are used with the operation proceeding to box FT191. In box FT151 the matrix large flag is reset to 0 and in box FT152 the Kalman gain and the covariance update are computed and stored. In boxes FT153 and FT156, a determination is made whether the Ma matrix is close to overflow, and if YES, the routine goes to box FT161 to set the flag. The routine from box FT152 goes first to box FT153 where a determination is made whether $M_{11}$ is greater than $C_{11}$ and if it is NO then goes to box FT156 where a determination is made whether $M_{22}$ is greater than $C_{22}$. If the answer is No in box FT156, the operation goes to box FT191. In box FT162 the covariance elements are decreased to minimize chances of overflow. In box FT191, the state vectors are updated based on state transition maxtrix $\phi$, the L vectors and the Kalman gains time the residuals, with the updated state vectors being stored.

Figure 9D:
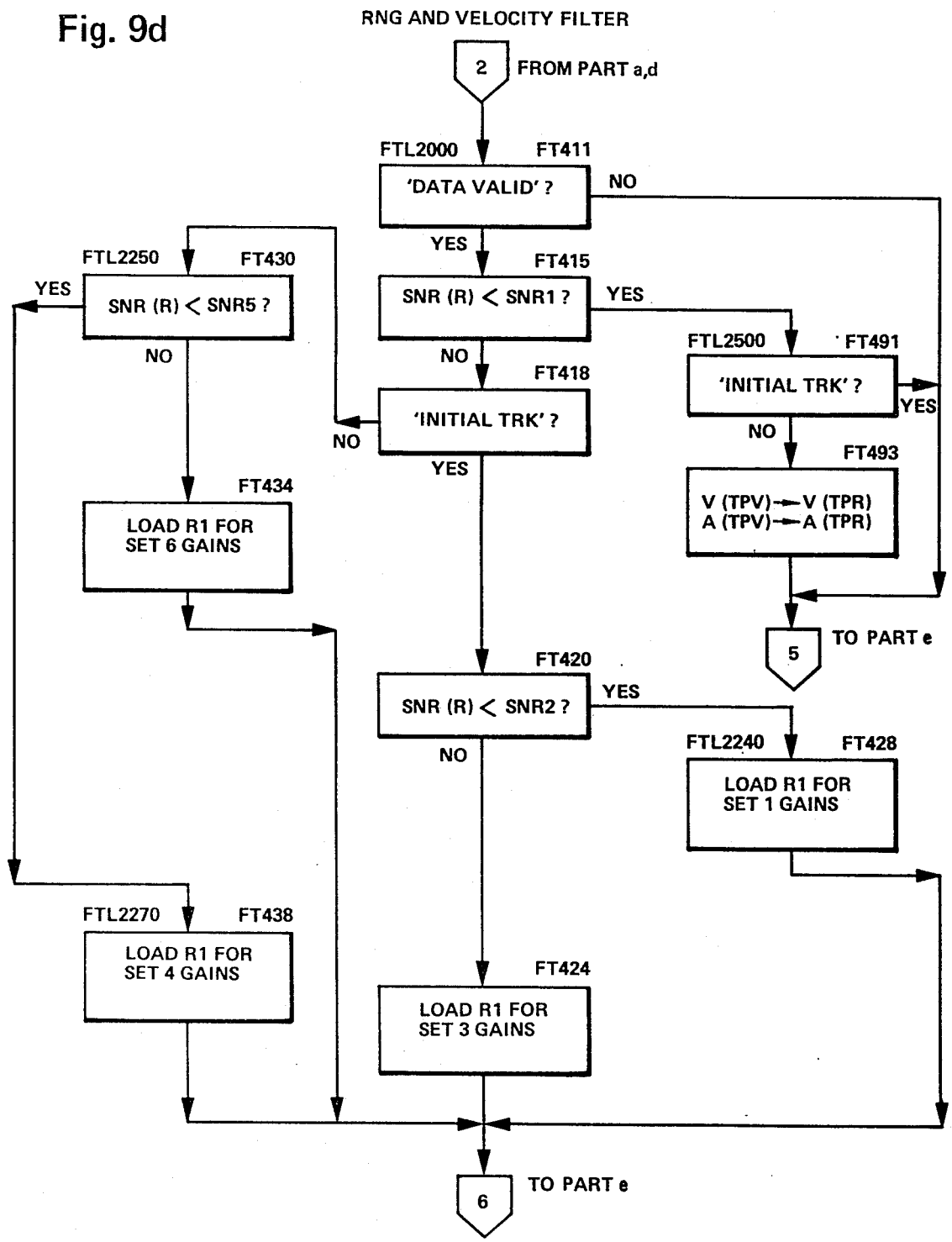

Referring now to FIG. 9d which selects gains for the range and velocity filters based on SNR, a data valid determination is made in box FT411 and if the data if not valid, the operation continues on to box FT495 of FIG. 9e. If the data is valid in box FT411, the routine goes to box FT415 where a check is made to see if SNR(R) is below a minimum threshold (SNR1), and if below, the routine goes to box FT491 which again performs a check of initial track, and if the answer is YES, the routine goes to box FT495 of FIG. 9e. If there is not an initial track condition (NO) in box FT491, the velocity filter estimates are coupled into the range filter estimates in box FT493 and the routine then proceeds to box FT495 of FIG. 9e. If the SNR(R) is below a threshold in box FT411, an initial track check is made in box FT418 and if the track is initial, SNR(R) XNR(R) determination is made in box FT420 and if the answer is NO, set 3 gains are selected in box FT424. If the answer is YES in box FT420, the routine selects set 1 gains in box FT428 and then goes to box FT499 of FIG. 9e. If the system is in final track in box FT418, the routine goes to box FT430 and depending on SNR(R) goes to box FT434 or box FT438. Thus one of two sets of gains are picked based on SNR in boxes FT434 or FT438 with the routine in boxes FT434 and FT438 going to box FT499 of FIG. 9e. The routine also goes from boxes FT428 and FT424 to box FT499 of FIG. 9e.

Referring now to FIG. 9e, when data is not valid or a very low SNR is present the routine goes to box FT495 where the reciprocal of $\tau_A$ (target acceleration model time constant) is set to 1 (10 seconds) in register R7. The routine then goes to box FT496 where the range and velocity residuals are set to zero. The routine goes from box FT496 to box FT533 where the range and velocity residuals are stored and then goes to box FT537 where the filter cycle time and other parameters are set in registers R5, R2, R3 and R4. The routine proceeds from box FT537 to box FT545.10 of FIG. 9f.

In box FT499, the selected gains are picked up using the index in R1 and stored in box FT508, the reciprocal of target acceleration model time constant ($1/\tau a$) is set to 1 (3seconds) in register R7. The operation goes from box FT508 to box FT511 where a determination is made as to whether SNR(R) is greater than a threshold S and if the answer is No proceeds to box FT513 where the range discriminant slope ($k_{R_f}$) is computed. From box FT513, the operation goes to box FT523 where the range residual is computed and from there goes to box FT527 where the frequency representative of PRF is set in R6. The routine proceeds from box FT527 to box FT530 where the velocity residual is computed and then proceeds to box FT533. If the answer is YES in box FT511, the routine goes to box FT522 where $k_{R_f}$ is set equal to a constant, and the routine then goes to box FT523.

Figure 9F:
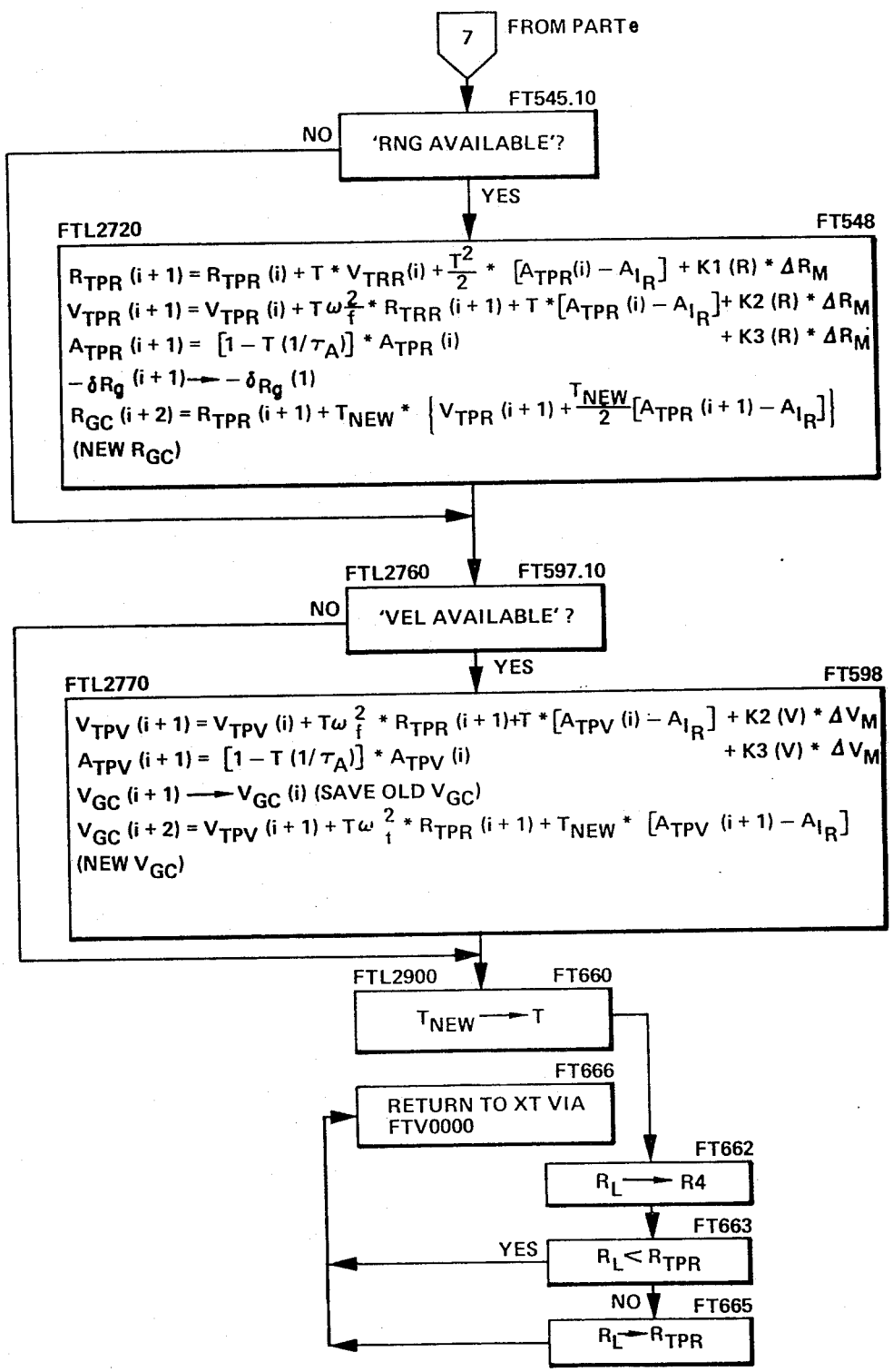

Referring now to FIG. 9f, a range available determination is made in box FT545.10 and if the result is YES, the flow goes to box FT548 in which the update equations are calculated to update the range filter states ($R_{TPR}$, $V_{TPR}$, and $A_{TPR}$). The range gate placement error, $\delta R_g$ is saved for the next cycle. Also a new range gate setting $R_{GC}$ is computed. After the calculations in box FT548, box FT597.10 is entered, to make a velocity available determination, and if the determination is YES, the velocity filter states ($V_{TPV}$ and $A_{TPV}$) are updated in box FT598. The old velocity gate setting is saved. A new velocity gate command, $V_{GC}$, is also computed in this box FT598. The routine proceeds from box FT598 to box FT660 where $T_{NEW}$ the new filter cycle time is stored as the current filter cycle time. If NO in box FT597.10, indicating ECCM conditions, velocity update is skipped and flow goes to FT660. In boxes FT662, FT663 and FT665 which sequentially follow box FT660 the range is limited so as to be not less than $R_L$ (an arbitrary minimum range). In box FT662 a minimum range is set in R4 and in box FT663 a determination is made as to whether the range is above this minimum range. If the answer is NO in box FT663, the operation goes to box FT665 where the minimum range $R_L$ is stored, with the operation then going to box FT666 where the operation returns to the start of the track executive routine via the address in FTV0000 as stored in box FT004 of FIG. 9a. If the answer is YES in box FT663, the routine goes directly to box FT666.

The subroutines FTS1 through FTS8 and FT1 called by the FT routine will now be described in order. Following that antenna control routine, designated AT and its only subroutine ATS1 will be described.

Figure 10:
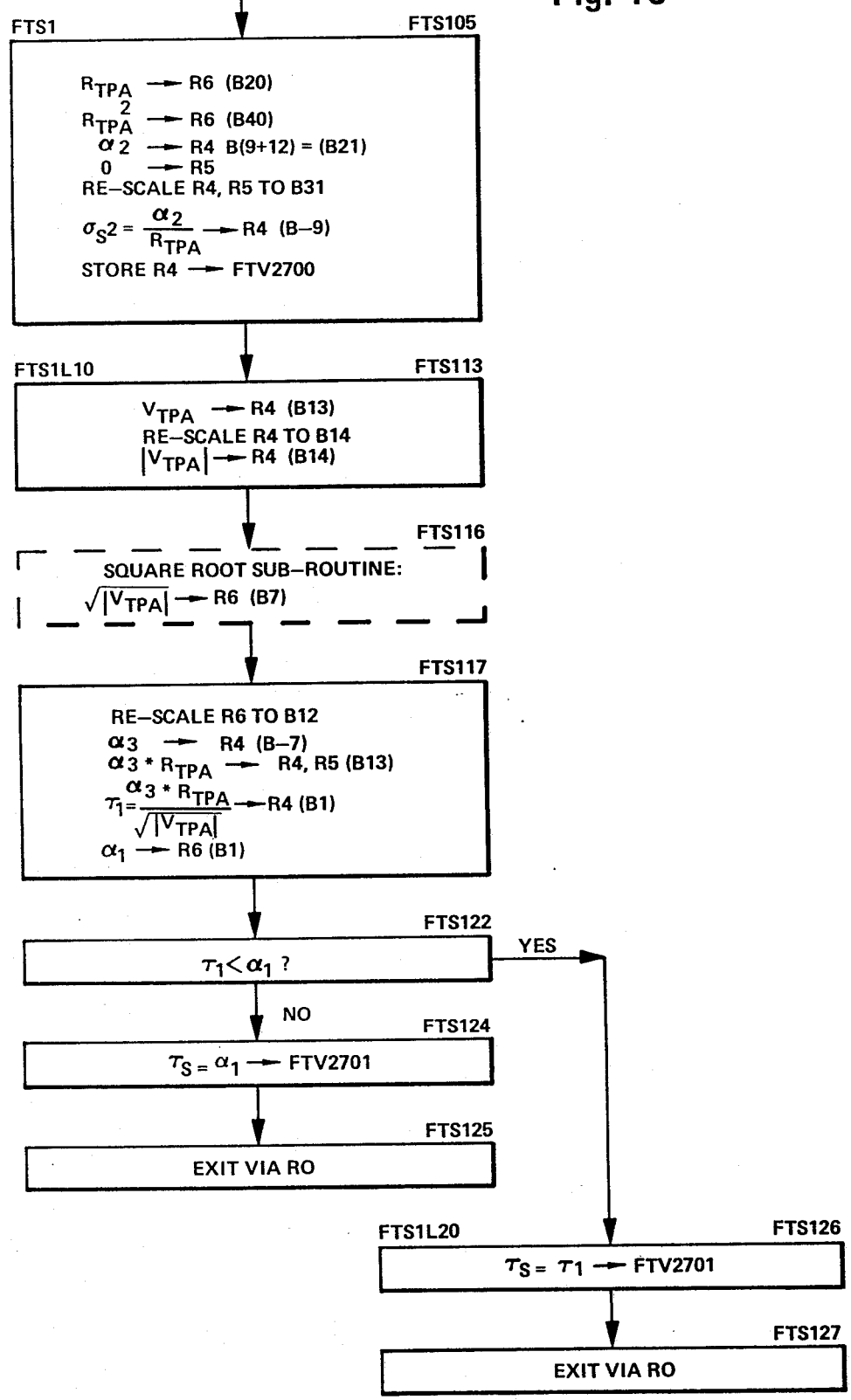
FIGS. 10–18 illustrate flow diagrams of programs for subroutines called out in detailed flow diagrams of FIGS. 9a–9f.

Subroutine FTS1 illustrated in the flow diagram of FIG. 10 is the Angular Scintillation Parameters Subroutine. Its purpose is to compute the variance, $\sigma_s^2$, and the time constant, $\tau_s$, of the angular scintillation noise model for the Tracking Filter Routine (FT). It is called with a BALFTS1, 0 instruction. The subroutine stores $\sigma_s^2$ and $\tau_s$ in FT variable memory. The terms and their equations computed by FTS1 are as follows.

$$\sigma_s^2 = \frac{\alpha_2}{R_{TPA}^2} \tag{57}$$

$$\tau_S = \text{Min of } \left\{ \frac{\alpha_3 \cdot R_{RTPA}}{\sqrt{|V_{TPA}|}}, \alpha_1 \right\} \tag{58}$$

$\alpha_1$, $\alpha_2$ and $\alpha_3$ are constants.

Figure 11:
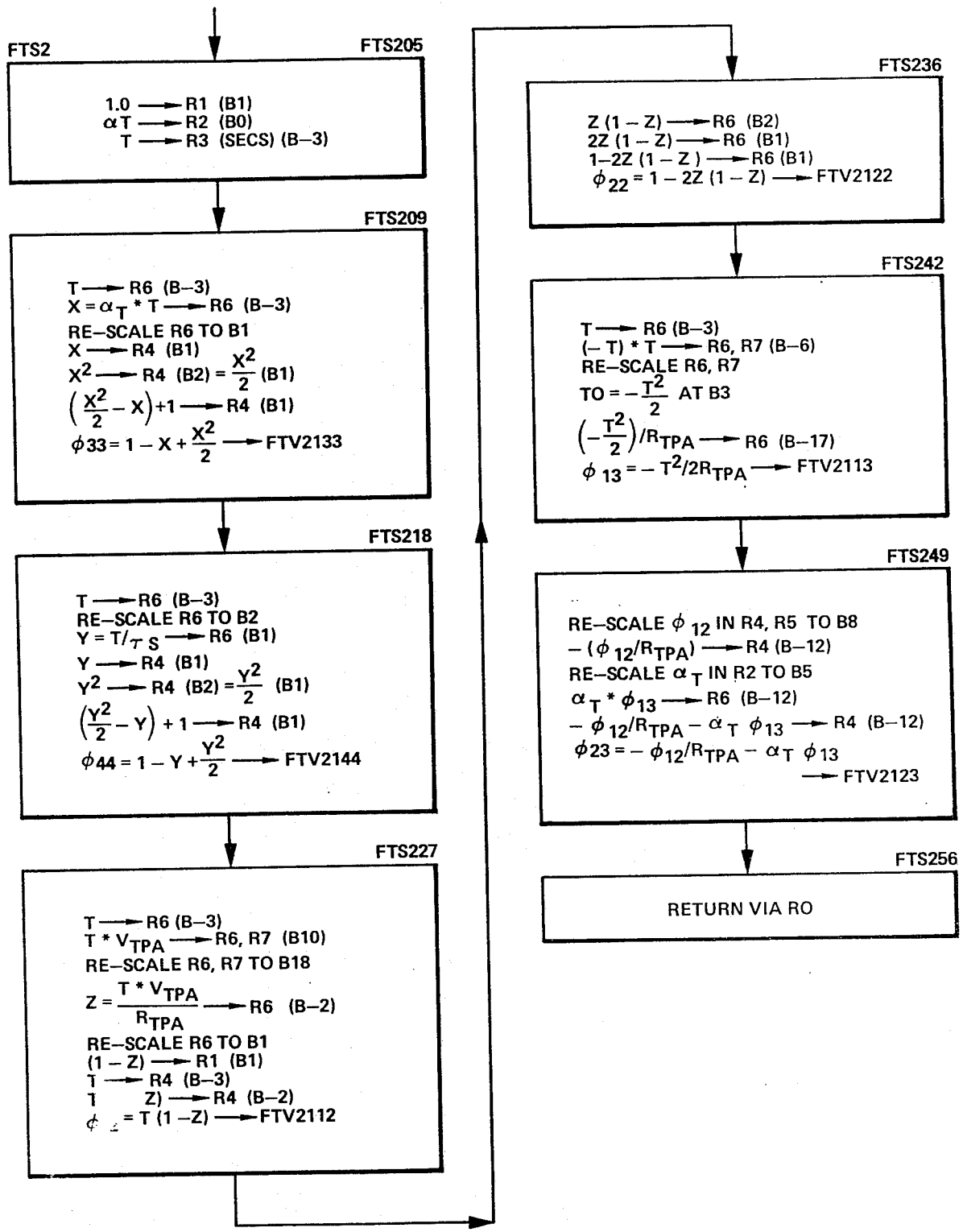

Subroutine FTS2 illustrated in the flow diagram of FIG. 11 is the Angle State Transition Matrix Subroutine. Its purpose is to compute the non-zero and non-unity elements of the angle state transition matrix, $\Phi$, for the Tracking Filter Routine (FT). It is called with a BAL FTS2, 0 instruction. The subroutine stores the computed $\Phi$ elements in FT variable memory.

The angle tracking filter state transition matrix is given by the equation:

$$\Phi(i+1, i) = e^{A(i)T} = I + A(i)T + A^2(i)T^2/2 \tag{59}$$

where
$T$ = Filter prediction interval from point $i$ to $i+1$
$I$ = 4 × 4 unity (identity) matrix $$A(i) = \begin{bmatrix} 0 & 1 & 0 & 0 \\ 0 & -2\frac{V_{TPA}(i)}{R_{TPA}(i)} & -\frac{1}{R_{TPA}(i)} & 0 \\ 0 & 0 & -\frac{1}{\tau_T} & 0 \\ 0 & 0 & 0 & -\frac{1}{\tau_s(i)} \end{bmatrix} \tag{60}$$

$R_{TPA}(i)$ = Range used in angle filter
$V_{TPA}(i)$ = Range rate used in angle filter
$\tau_T$ = Target normal acceleration model time constant (= const)
$\tau_s(i)$ = Angular scintillation model time constant (computed in FTS1)

Computing $\Phi$ from the three-term expansion gives $$\phi = \begin{bmatrix} \phi_{11} & \phi_{12} & \phi_{13} & 0 \\ 0 & \phi_{22} & \phi_{23} & 0 \\ 0 & 0 & \phi_{33} & 0 \\ 0 & 0 & 0 & \phi_{44} \end{bmatrix} \tag{61}$$

where
$\phi_{11} = 1$ $\phi_{12} = T - T^2 V_{TPA}/R_{TPA}$ $\phi_{13} = -T^2/2R_{TPA}$ $\phi_{22} = 1 - 2T V_{TPA}/R_{TPA} + 2 [T V_{TPA}/R_{TPA}]^2$ $\phi_{23} = -T/R_{TPA} + T^2 V_{TPA}/R^2_{TPA} + T^2/(2\tau_T R_{TPA})$ $\phi_{33} = 1 - T/\tau_T + \frac{1}{2} (T/\tau_T)^2$ $\phi_{44} = 1 - T/\tau_s + \frac{1}{2} (T/\tau_s)^2$ The computational steps executed by FTS2 to compute the $\phi$ elements are listed below:

$$x = \alpha_T T \text{ where } \alpha_T = 1/\tau_T = \text{const} \tag{62}$$

$$\phi_{33} = 1 - x + x^2/2 \tag{63}$$

$$Y = T/\tau_s \tag{64}$$

$$\phi_{44} = 1 - Y + Y^2/2 \tag{65}$$

$$Z = T \cdot V_{TPA}/R_{TPA} \tag{66}$$

$$\phi_{12} = T(1 - Z) \tag{67}$$

$$\phi_{22} = 1 - 2Z(1 - Z) \tag{68}$$

$$\phi_{13} = (T^2/2)R_{TPA} \tag{69}$$

$$\phi_{23} = -\phi_{12}/R_{TPA} - \alpha_T \cdot \phi_{13} \tag{70}$$

The six $\phi$ elements are stored in FT variable memory for later use. The zero elements and $\phi_{11}$ are not allocated memory locations.

Figure 12A:
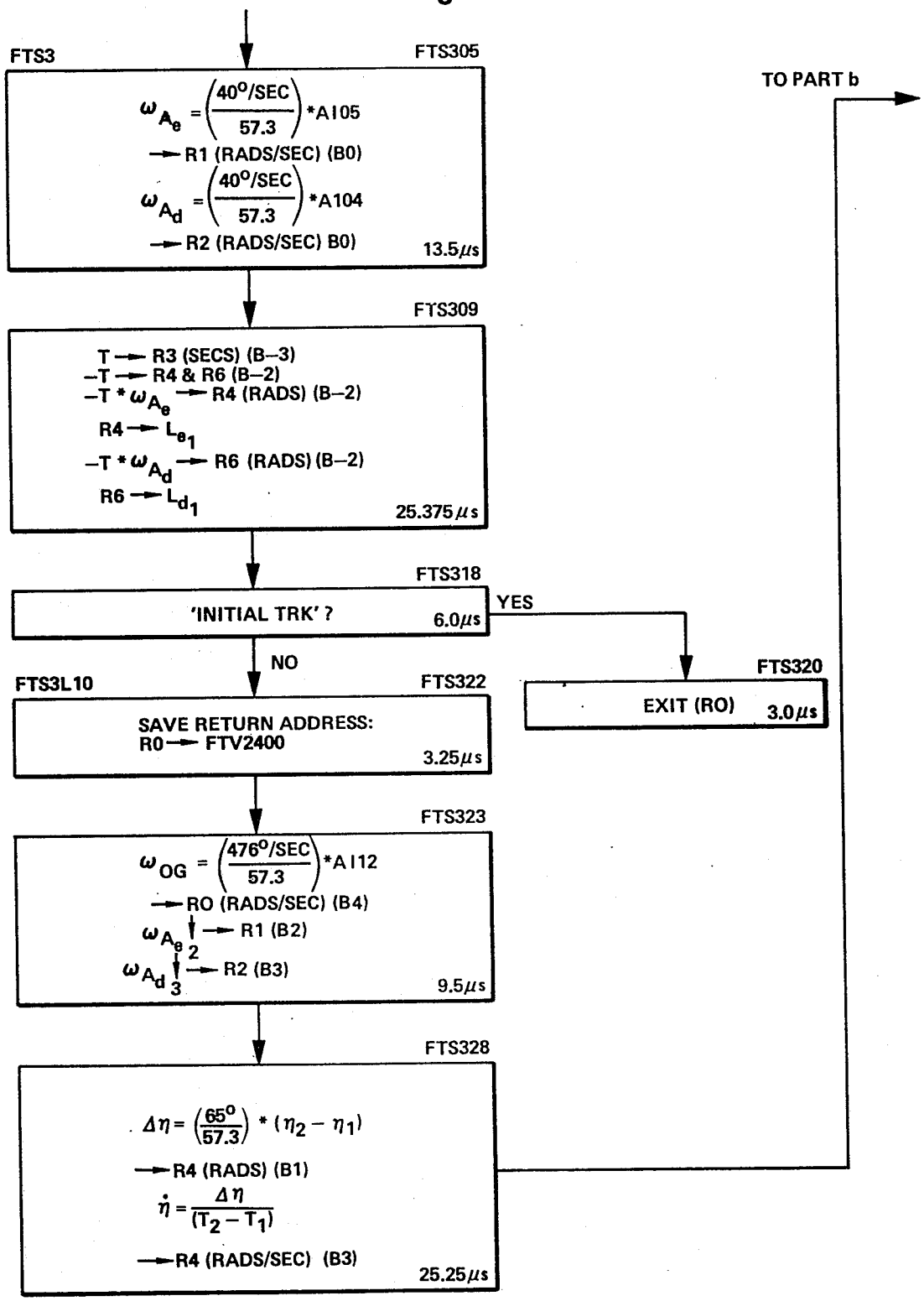
Figure 12B:
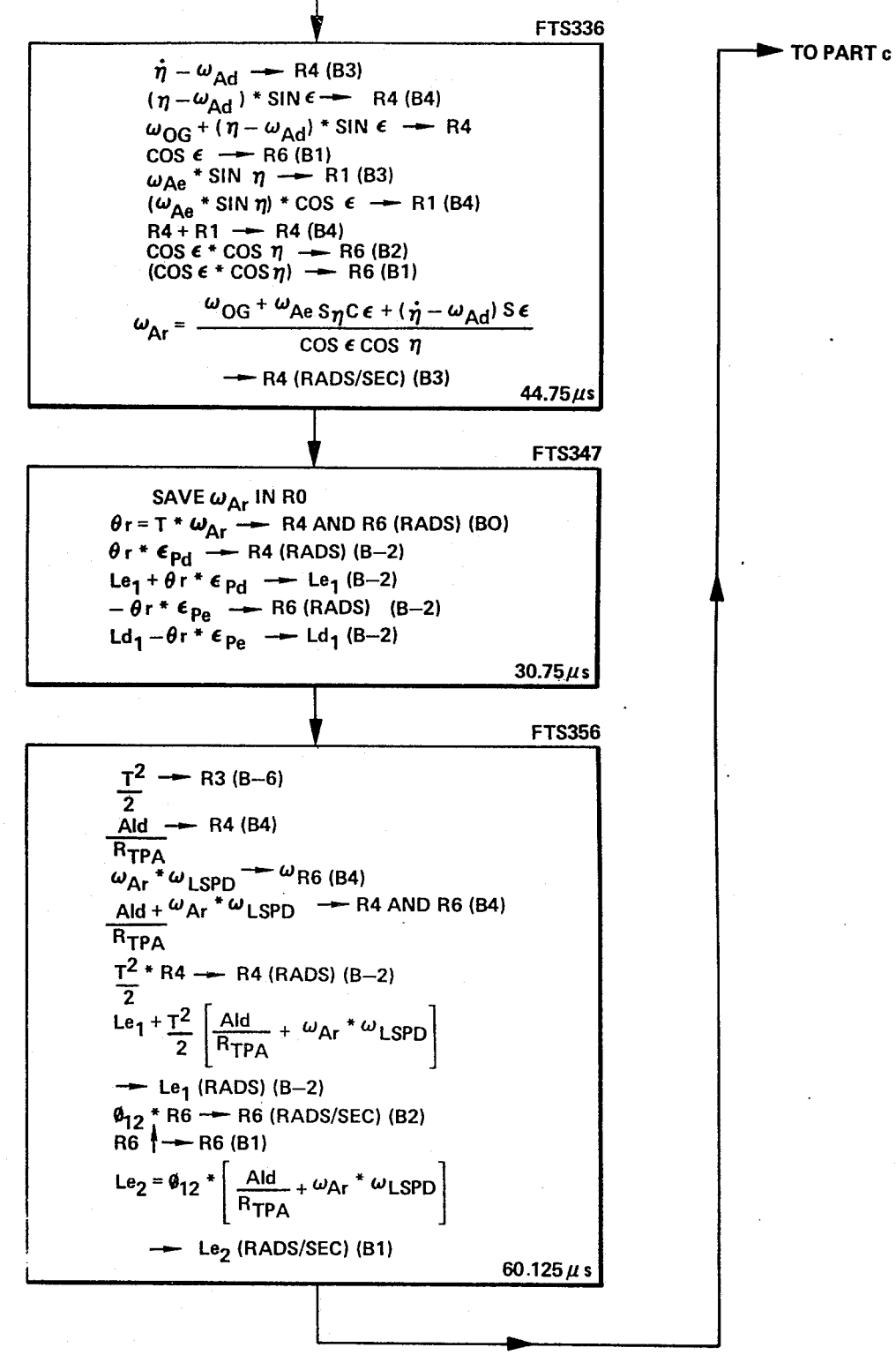
Figure 12C:
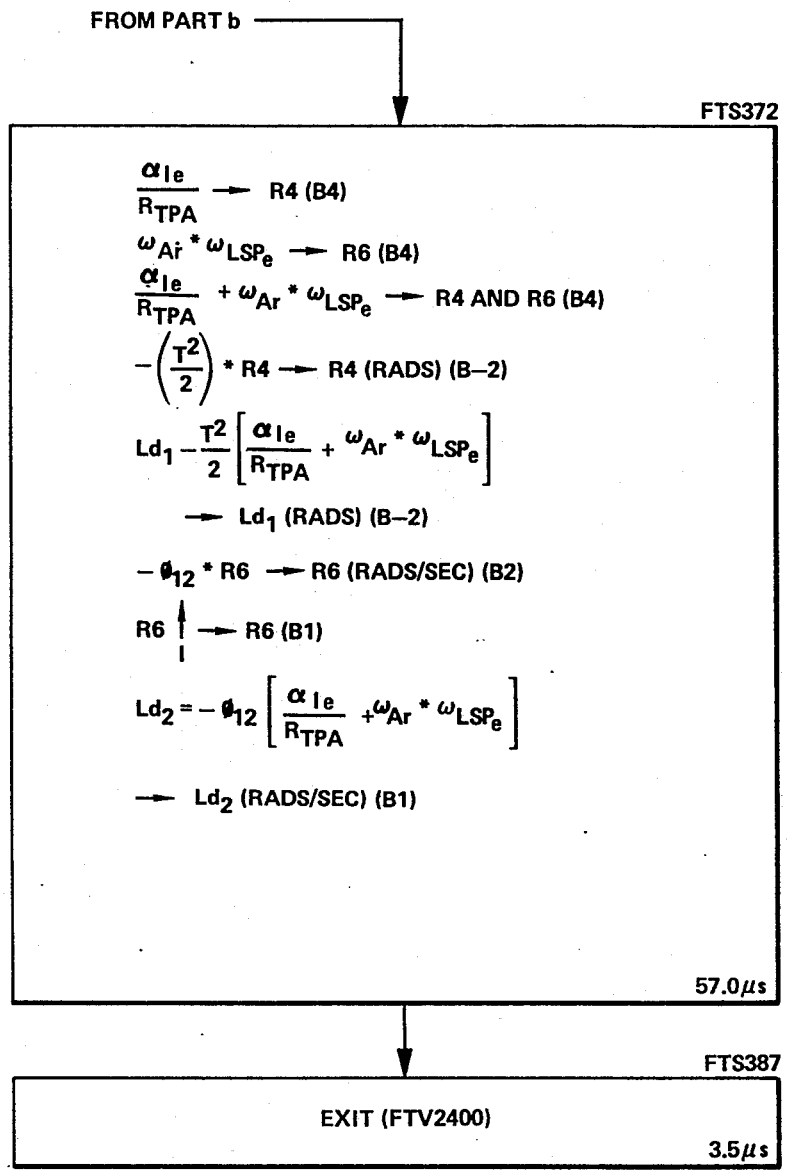

Subroutine FTS3 illustrated in the flow diagram of FIGS. 12a–12c is the Motion Compensation Subroutine. Its purpose is to compute the non-zero elements of the motion compensation vectors, $\bar{L}_e$ and $\bar{L}_d$, used in the angle tracking filter. It is called with a BAL FTS3, 0 instruction. The subroutine stores the computed elements in FT variable memory.

The motion compensation vectors, $\bar{L}_e$ and $\bar{L}_d$, are given by $$\bar{L}_e = \begin{bmatrix} L_{e_1} \\ L_{e_2} \\ 0 \\ 0 \end{bmatrix} \quad \bar{L}_d = \begin{bmatrix} L_{d_1} \\ L_{d_2} \\ 0 \\ 0 \end{bmatrix} \tag{71}$$

For Initial Track $$L_{e_1} = -\int_{t_i}^{t_{i+1}} \omega_e dt \tag{72}$$

$$L_{e_2} = 0 \tag{73}$$

$$L_{d_1} = -\int_{t_i}^{t_{i+1}} \omega_d dt \tag{74}$$

$$L_{d_2} = 0 \tag{75}$$

For Final Track $$L_{e_1} = -\int_{t_i}^{t_{i+1}} \Phi_3 dt + \theta_r \epsilon_{p_d} + \frac{T^2}{2}\left[\frac{a_{1d}}{R_{TPA}} + \omega_{Ar} \omega_{LSP_d}\right] \quad (76)$$

$$L_{e_2} = \Phi_{12}\left[\frac{a_{1d}}{R_{TPA}} + \omega_{Ar} \omega_{LSP_d}\right] \quad (77)$$

$$L_{d_1} = -\int_{t_i}^{t_{i+1}} \omega_d dt - \theta_r \epsilon_{p_e} - \frac{T^2}{2}\left[\frac{a_{1e}}{R_{TPA}} + \omega_{Ar} \omega_{LSP_e}\right] \quad (78)$$

$$L_{d_2} = \theta_{12}\left[\frac{a_{1e}}{R_{TPA}} + \omega_{Ar} \omega_{LSP_e}\right] \quad (79)$$

where
$\omega_e$ = Antenna inertial rate about $e$ over $i$ to $i+1$
$\omega_d$ = Antenna inertial rate about $d$ over $i$ to $i+1$
$\omega_{A\ 355}$ = Measured antenna inertial rate about $r$ at one point in the internal $i$ to $i+1$
$\theta_r = \omega_{Ar} \cdot T$ Other terms have been defined hereinbefore. The simplification in initial track is to reduce computational load only.

The integrals of antenna angular rates over $t_i$ to $t_{i+1}$ are provided by an antenna rate integrating gyro which provides a measured gyro output $$\theta(t_{i+1}) \doteq \theta(t_i) + K_u^{-1} \int_{t_i}^{t_{i+1}} (\omega_A - \omega) dt \quad (80)$$

$$-\int_{t_i}^{t_{i+1}} \omega dt \doteq -T\omega + K_u + [\theta(t_{i+1}) - \theta(t_i)] \quad (81)$$

if $\omega_A$ is assumed constant over the interval $T = t_{i+1} - t_i$.

Since the $\theta$s must be sampled as close as possible to $t_i$ and $t_{i+1}$, FTS3 computes only the $-T\omega_A$ term of the integral, and the second term, involving the $\theta$s, is added later by an antenna control (AT) Routine which adds this term directly to $\epsilon_p(i+1)$, rather than $L_1$, since FT furnishes $\epsilon_p(i+1)$ to AT complete, except for the second term of the above integral. The AT routine will be discussed hereinafter.

In the first part of FTS3, the last values of A105 and A104 input by the XT Routine are picked up and converted to radians/second using stored scale factors. The terms $-T\omega_{Ae}$ and $-T\omega_{Ad}$ are formed and stored as $L_{e_1}$ and $L_{d_1}$, respectively. If the mode is Initial Track, FTS3 exists. ($L_{e_2}$ and $L_{d_2}$ will be zero by virtue of initialization prior to entering track.)

In the Final Track Mode, $L_{e_1}$ and $L_{d_1}$ must be augmented by additional terms and $L_{e_2}$ and $L_{d_2}$ must be computed. After storing the return address, FTS3 computes the antenna rate about the antenna, $r$, axis, $\omega_{Ar}$, given by $$\omega_{Ar} = \frac{\omega_{OG} + \omega_{Ae} \sin \eta \cos \epsilon + (\dot{\eta} - \omega_{Ad}) \sin \epsilon}{\cos \epsilon \cos \eta} \quad (82)$$

$\omega_{OG}$ is the outer (roll) gimbal rate of the antenna given by the last value of A112 converted to radians/second using a stored scale factor. The term $\dot{\eta}$ is computed by differencing two samples of $\eta$, $\eta_2$, and $\eta_1$, saved by XT in FT variable memory, then divided by the time difference, $(T_2 - T_1)$, between the two samples, also saved by XT in an FT dedicated location.

After $\omega_{Ar}$ is computed, the term $\theta_r = T\omega_{Ar}$ is computed and the term $\theta_r \epsilon_{p_d}$ added to $L_{e_1}$ and the term $(-\theta_r \epsilon_{p_e})$ added to $L_{d_1}$.

The term $$\frac{T^2}{2}\left[\frac{a_{1d}}{R_{TPA}} + \omega_{Ar} \omega_{LSP_d}\right]$$

is computed and added to $L_{e_1}$ to complete $L_{e_1}$.

The term $$\phi_{12}\left[\frac{a_{1d}}{R_{TPA}} + \omega_{Ar} \omega_{LSP_d}\right]$$

is computed and stored as $L_{e_2}$.

A similar procedure is used to complete $L_{d_1}$ and to compute $L_{d_2}$. FTS3 exits by execution of an indirect branch to the location containing the saved return address.

Figure 13A:
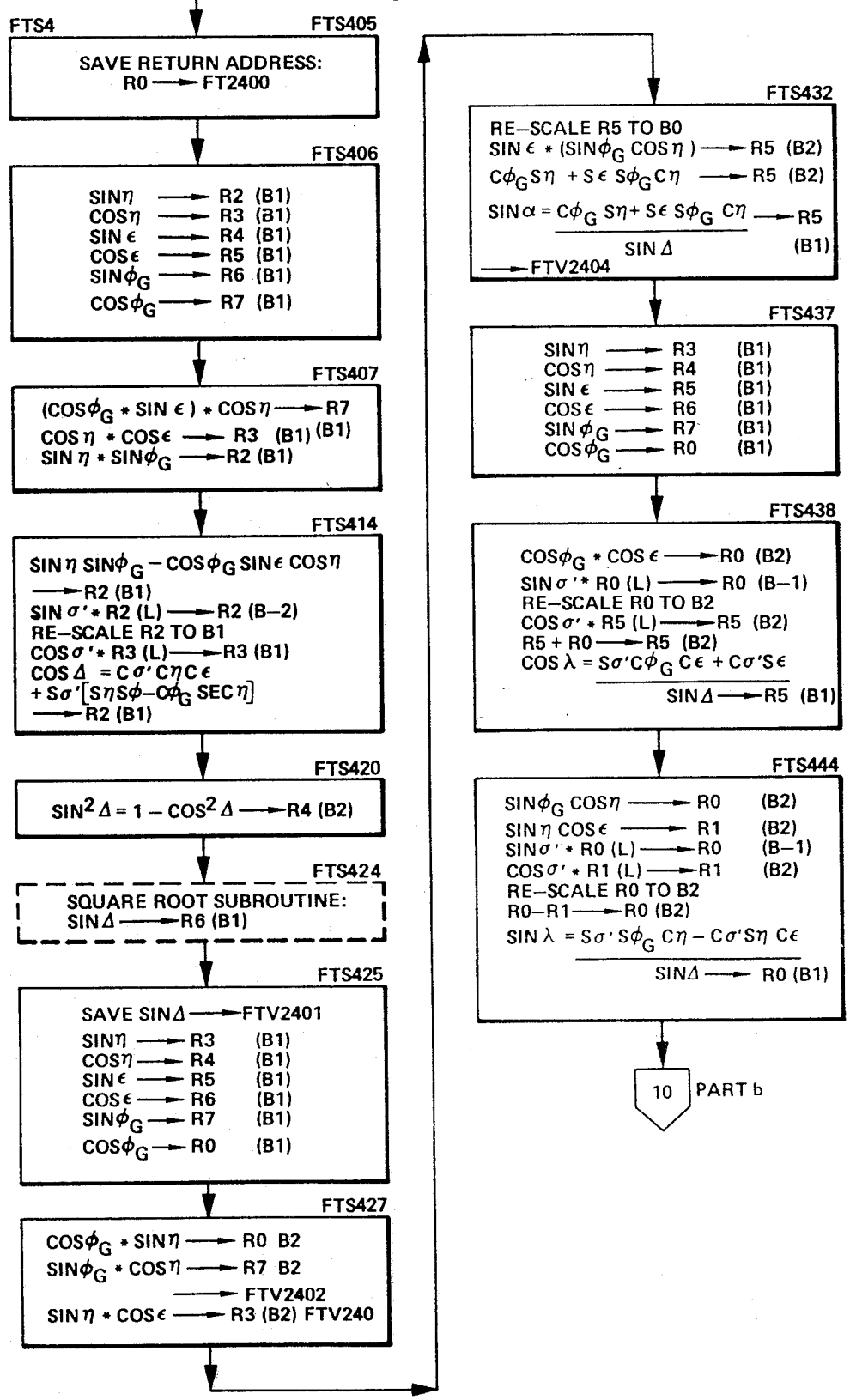
Figure 13B:
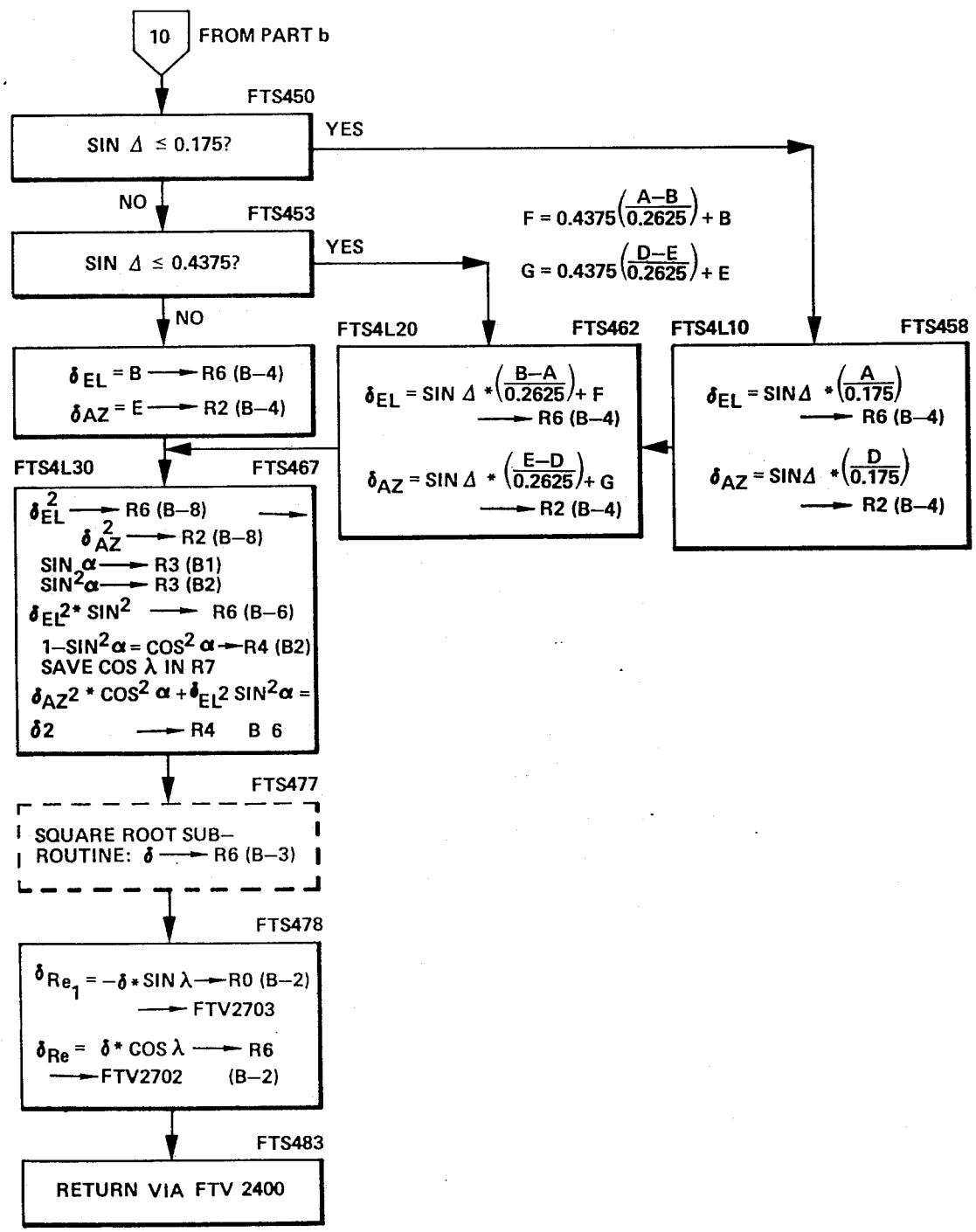

Subroutine FTS4 illustrated in the flow diagram of FIGS. 13a and 13b is the Radome Compensation Subroutine. Its purpose is to compute compensation terms to counteract tracking error measurement perturbations due to radome diffraction of target return signals. Two terms, $\sigma_{R_e}$ and $\sigma_{R_d}$ are computed for the angle tracking filter and represent estimates of elevation and azimuth tracking error indications, respectively, due to radome diffraction effects.

FTS4 is entered only in Final Track Mode and only if the tracking error measurements (angle discriminants) are available. The subroutine stores $\sigma_{R_e}$ and $\sigma_{R_d}$ in FT variable memory for later use. It is called with a BAL FTS4, 0 instruction.

To better understand the nature of the radome compensation computations, an explanation of several definitions is in order.

$i_R, j_R, k_R$ — radome axes
$i_R$ is the radome boresight axis
$j_R$ is along the A/C $j$ axis
$k_R$ completes the right hand set
$i_R$ and $k_R$ form the radome elevation principal plane
$i_R$ and $j_R$ form the radome azimuth principal plane
$\sigma^1$ — radome tilt down angle from A/C FLR; i.e., $i_R$, $j_R$, $k_R$ are obtained by rotating $i, j, k$ through $-\sigma^1$ about the $j$ (or $j_R$) axis.
$\Delta$ — angle between radome boresight and antenna boresight; i.e., $\Delta = \cos^{-1}(i_R \cdot 1_r)$
$\sigma_{EL}$ — beam deflection when $\Delta$ is in elevation principal plane of radome, supplied by radome manufacturer as a three-line segment function of $\Delta$.
$\sigma_{AZ}$ — beam deflection when $\Delta$ is in azimuth principal plane of radome, supplied by radome manufacturer as a three-line segment function of $\Delta$.
$\alpha \Delta, \gamma$ — special Euler angle sequence to transform from radome axes to antenna axes.

The angle $\Delta$ (actually, $\sin\Delta$ is used) is required to select $\sigma_{EL}$ and $\sigma_{AZ}$ from the supplied curves. $\alpha$ is used to interpolate between the curves to determine the total deflection, $\sigma$. The angle $\gamma$ is used to resolve $\sigma$ into $\sigma_{Re}$ and $\sigma_{Rd}$.

The first computations are of the cosine and sine of $\Delta$ as given by the following equations.

$$\cos \Delta = i_R \cdot 1_r = \cos \sigma^1 \cos \epsilon \cos \eta + \sin \sigma^1[\sin\phi_G \sin \eta - \cos \phi_G \sin \epsilon \cos \eta] \quad 83$$

$$\sin \Delta = \sqrt{1 - \cos^2 \Delta} \text{ (assumed to be always positive)} \quad 84$$

Next, sin α, cos λ and sin λ are computed as follows.

$$\sin \alpha = \frac{\cos \phi_G \sin \eta + \sin \phi_G \sin \epsilon \cos \eta}{\sin \Delta} \quad (85)$$

$$\cos \lambda = \frac{\sin \sigma^1 \cos \phi_G \cos \epsilon + \cos \sigma^1 \sin \epsilon}{\sin \Delta} \quad (86)$$

$$\sin \lambda = \frac{\sin \sigma^1 \sin \phi_G \cos \eta - \cos \sigma^1 \cos \epsilon \sin \eta}{\sin \Delta} \quad (87)$$

The quantities $\delta_{EL}$ and $\delta_{AZ}$ are computed as a function of sin Δ. Sin Δ is used rather than Δ to avoid a lengthy $\sin^{-1}$ procedure and because most of the variations in $\delta_{EL}$ and $\delta_{AZ}$ occur at relatively small Δs. One of three linear equations is used for each of $\delta_{EL}$ and $\delta_{AZ}$, depending on the size of sin Δ. The break points for sin Δ are the same for both principal planes.

In general, the angle Δ will not lie in either of the principal planes of the radome. The total beam deflection, δ, is assumed, however, to be always in the Δ plane and toward the radome boresight axis. Since α is the angle between the Δ plane and the radome elevation principal plane, δ can be obtained by interpolating the $\delta_{EL}$, and $\delta_{AZ}$ values according to the formula:

$$\delta = \sqrt{\delta^2_{EL} \cos^2 + \delta^2_{AZ} \sin^2 \alpha} \quad 88$$

Quadratic functions are used where the $j_R$, $k_R$ cross-section of the radome is elliptical in shape and $\sin^2 \alpha$ gives a better interpolation than $|\sin \alpha|$.

Finally, $\delta_{R_d}$ and $\delta_{R_e}$ are obtained by resolving δ through λ. The compensation terms are stored, and FTS4 exits.

Figure 14:
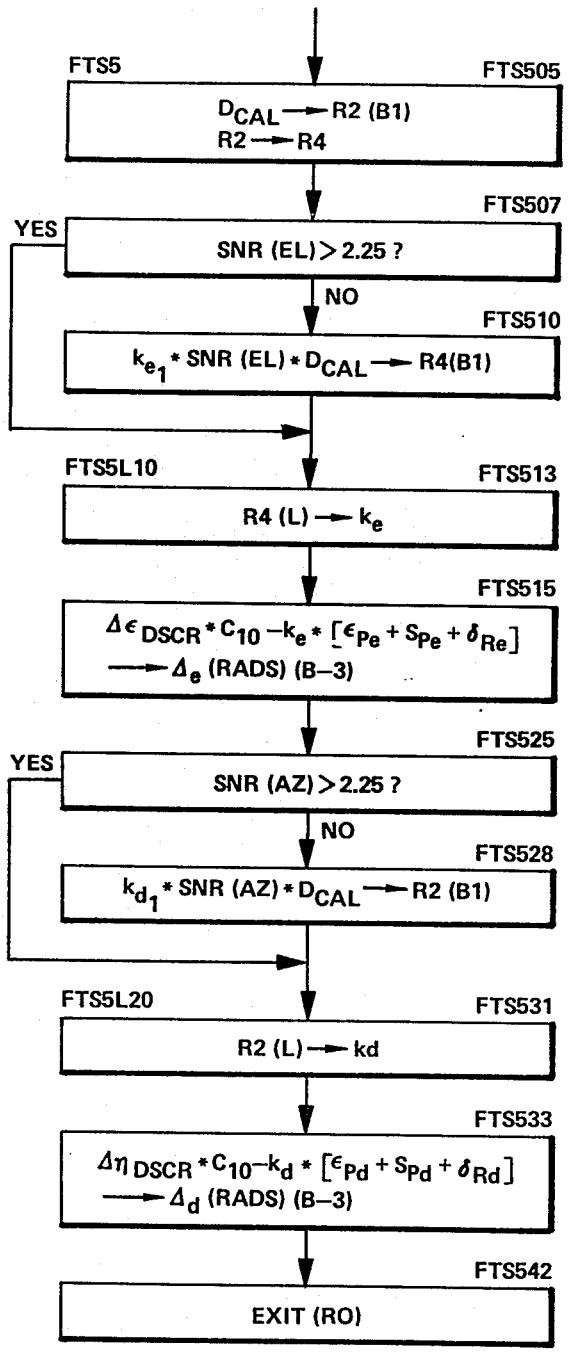
Figure 15A:
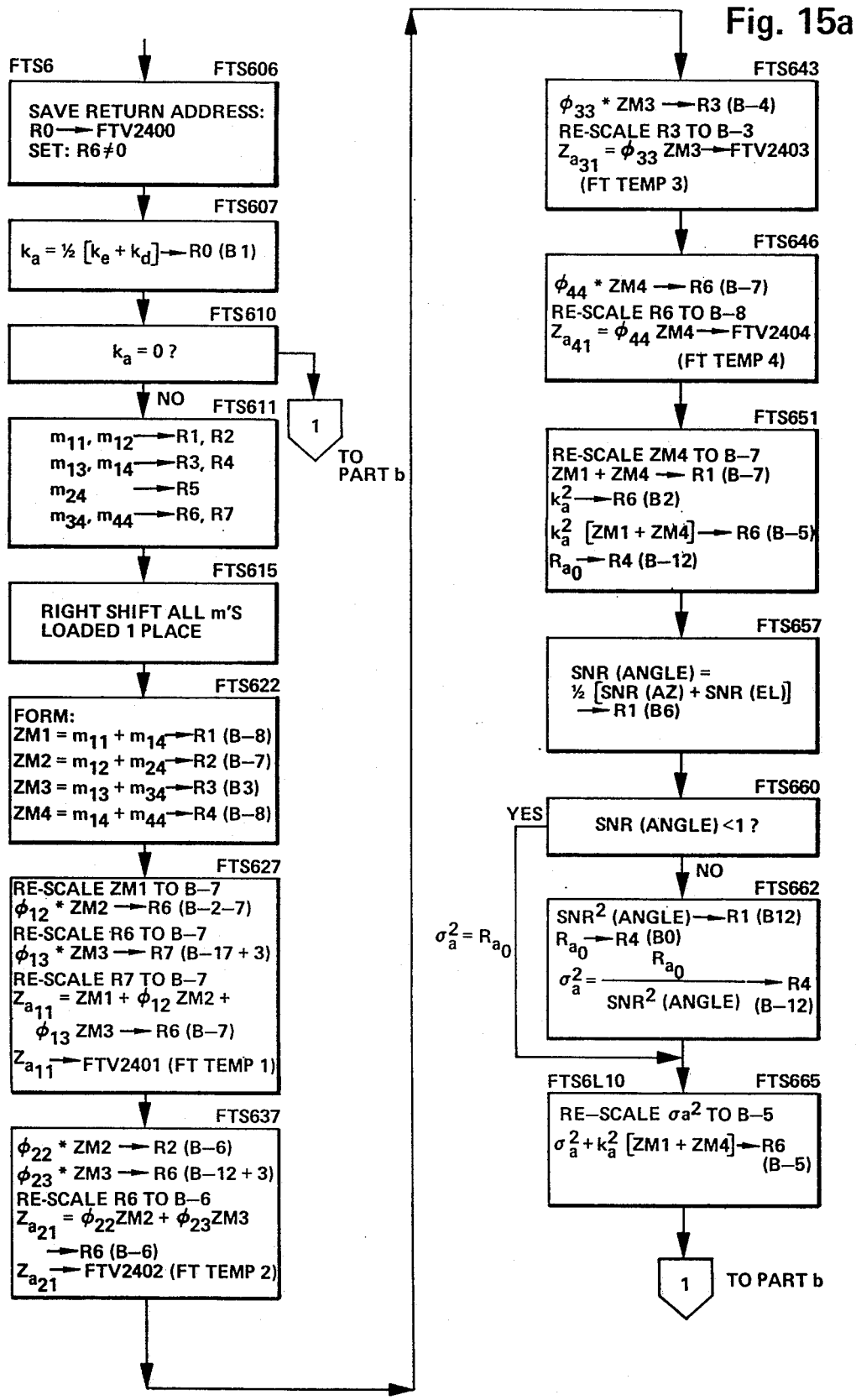
Figure 15B:
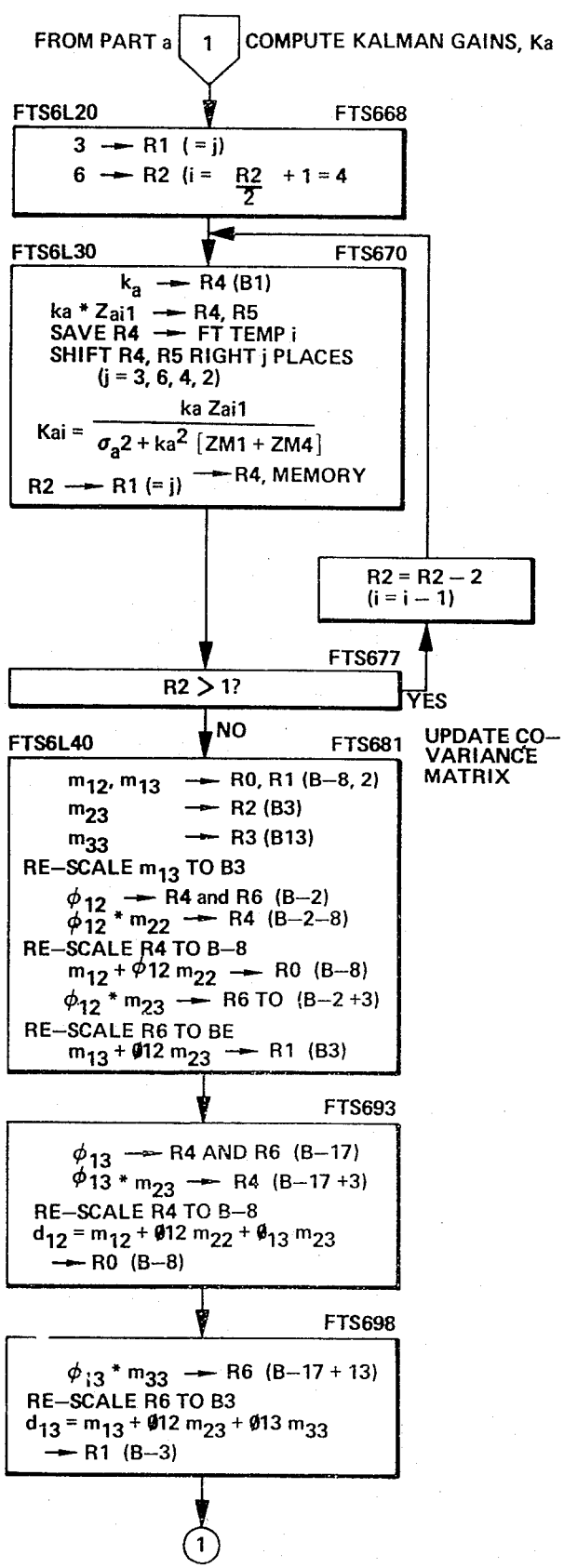
Figure 15B:
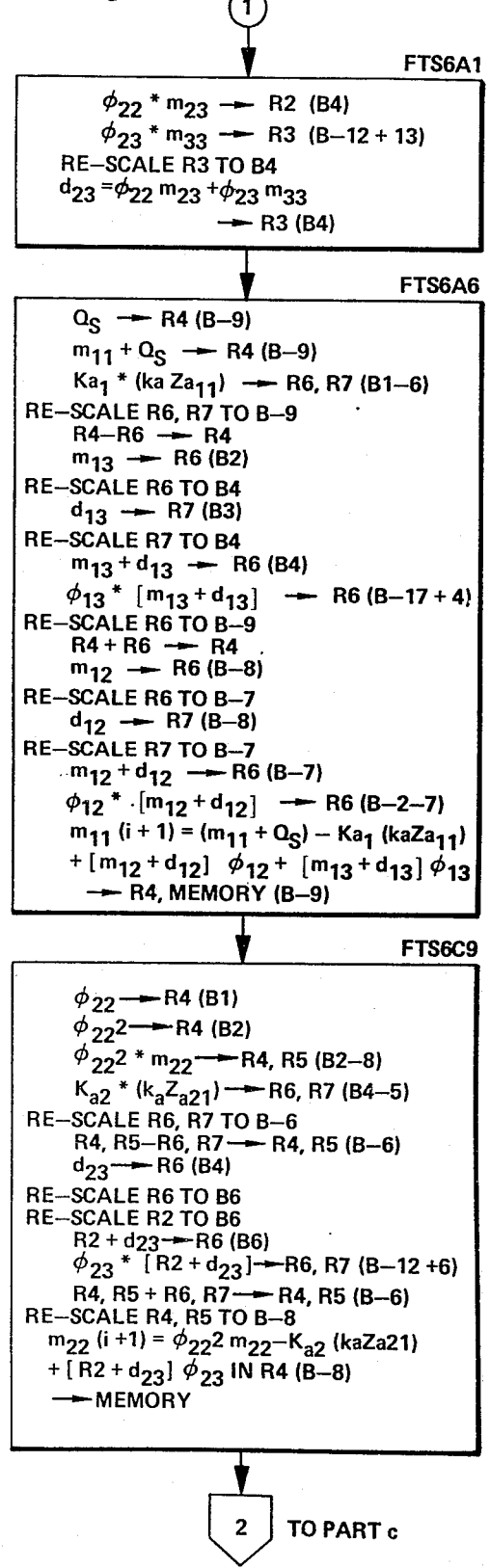
Figure 15C:
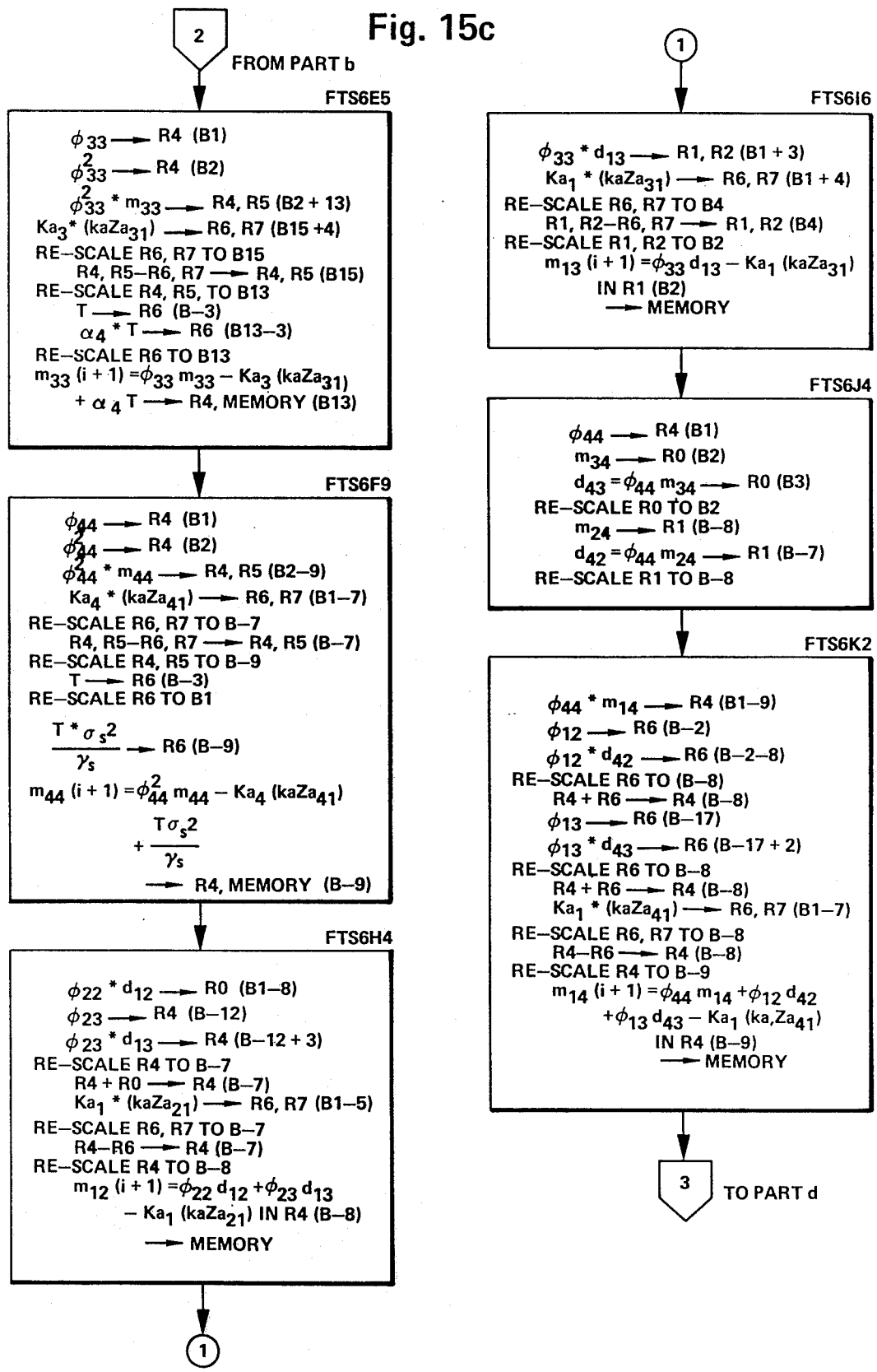
Figure 15D:
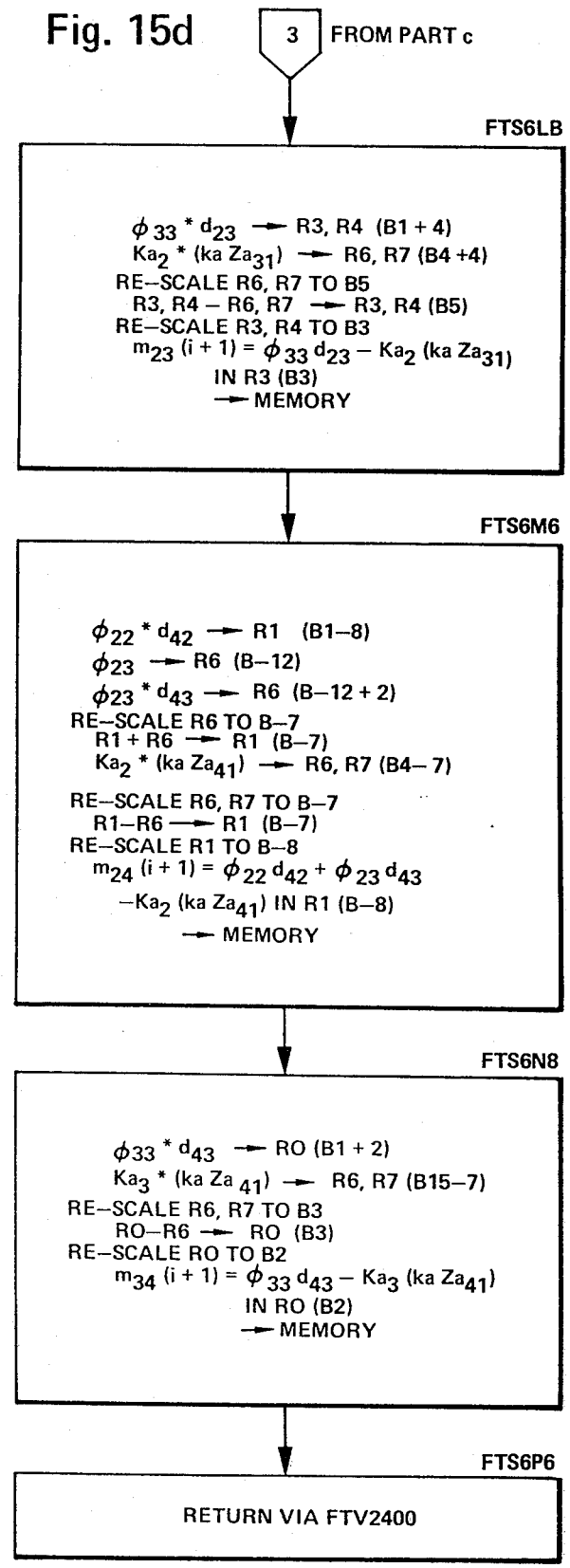

Subroutine FTS5 illustrated in the flow diagram of FIG. 14 is the Angle Discriminant Slopes and Total Residuals Subroutine. Its purpose is to compute the elevation and azimuth angle discriminant slopes, $k_e$ and $k_d$, respectively, and the elevation and azimuth total angle residuals, $\Delta_e$ and $\Delta_d$, respectively. The subroutine is entered whenever angle discriminants are available. The computed terms are stored in FT variable memory for later use. It is called with a BAL FTS5, 0 instruction.

The quantities computed by FTS5 have the following definitions.

1. angle discriminant slope = $\frac{\text{angle discriminant converted to rads}}{\text{measured tracking error in rads}}$ 2. total angle residual = angle discriminant converted to rads − angle discriminant slope times the predicted tracking error in rads The curve of discriminant output versus the measured tracking error is a function of SNR and is not truly linear. A linear relationship is assumed, however, as required by Kalman filter theory and should hold for small tracking errors. The total angle residual is a measure of the noise in the tracking error measurement and the error between the true tracking error and the filter predicted tracking error. The term "tracking error" in the above discussion is meant to include all off boresite effects "seen" by the radar. Thus, tracking error in the above sense includes target off boresite, angular scintillation, and radome diffraction effects.

The BIT calibration variable, $D_{CAL}$, is loaded into R2 and R4. If $SNR_e = SNR(EL)$ is greater than a threshold, then $k_e = D_{CAL}$. If SNR(EL) is small, then $k_e$ is computed as a linear function of $D_{CAL}$ and SNR(EL).

After $k_e$ has been calculated, the elevation total angle residual, $\Delta_e$, is computed:

$$\Delta_e = [\Delta \epsilon_{DSCR}]C_{10} - k_e[\epsilon_{P_e} + S_{P_e} + \delta_{R_e}] \quad 89$$

The constant $C_{10}$ converts the non-dimensional discriminant, $\Delta \epsilon_{DSCR}$, from the DS Routine, to radians. The term $(\epsilon_{P_e} + S_{P_e} + \delta_{R_e})$ represents the filter's estimate of what the radar should measure as a "tracking", or, more properly, an off boresite error.

FTS5 follows a similar procedure to the above discription to compute $k_d$ and $\Delta_d$, and then exits.

Subroutine FTS6 illustrated in the flow diagram of FIGS. 15a through 15d is the Kalman Gains and Covariance Matrix Update Subroutine. Its purpose is to compute Kalman gains for the angle tracking filter and update the angle state vectors covariance matrix to the point i+1. Kalman gains are computed only in final track, and the same gains are used for both angle channels by using the average of the measurement characteristics (discriminant slopes) of the two channels in the gain computation. A single covariance matrix is also used for both angle channels, and the lower (symmetric) off diagonal terms are not carried.

FTS6 is entered only in final track. The Kalman gain matrix, $K_a(i)$, used to weight the angle residuals is computed and stored in FT variable memory. The diagonal and upper off-diagonal terms of $M_a(i+1)$, the angle covariance matrix for point i+1, are also computed and stored in FT variable memory. It is called with a BAL FTS6, 0 instruction.

The equations for the gain, $K_a(i)$, and the updated covariance matrix, $M_a(i+1)$, for a one-step Kalman predictor are given below.

$$K_a(i) = \phi(i) M_a(i) H_a^T(i) [H_a(i) M_a(i) H_a^T(i) + R_a(i)]^{-1} \quad 90$$

$$M_a(i+1) = [\phi(i) - K_a(i) H_a(i)] M_a(i) \phi^T(i) + Q_a(i) \quad 91$$

where
$H_a(i)$ = measurement or observation matrix. To avoid separate gain calculations for each angle channel, $H_a(i)$ is taken to be the average measurement matrix for the elevation and azimuth channels, i.e.

$$H_a(i) = [k_a(i) \; 0 \; 0 \; k_a(i)]$$

where $$k_a(i) = \frac{1}{2} [k_e(i) + k_d(i)]$$

$R_a(i)$ = measurement noise covariance matrix = $\sigma_a^2$ (a scalar in this case)
$Q_a(i)$ = system noise covariance matrix
$M_a(i)$ = angle state vectors' covariance matrix for point i
$\phi(i)$ = angle state transition matrix from point i to point i+1
Define the auxiliary matrix $D_a(i) = \Phi(i) M_a(i)$:

$$D_a(i) = \begin{bmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{bmatrix}_i$$

$$= \begin{bmatrix} \phi_{11} & \phi_{12} & \phi_{13} & 0 \\ 0 & \phi_{22} & \phi_{23} & 0 \\ 0 & 0 & \phi_{33} & 0 \\ 0 & 0 & 0 & \phi_{44} \end{bmatrix}_i \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}_i \quad (92)$$

where $m_{jl} = m_{lj}$ for $j \neq l$

The equation for $K_a(i)$ can now be expanded to yield

Note that since $M_a(i)$ is symmetric, $$\begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}_{i+1} =$$

$$\begin{bmatrix} \phi_{11}-k_aK_{a_1} & \phi_{12} & \phi_{13} & -k_aK_{a_1} \\ -k_aK_{a_2} & \phi_{22} & \phi_{23} & -k_aK_{a_2} \\ -k_aK_{a_3} & 0 & \phi_{33} & -k_aK_{a_3} \\ -k_aK_{a_4} & 0 & 0 & \phi_{44}-k_aK_{a_4} \end{bmatrix}_i \begin{bmatrix} d_{11} & d_{21} & d_{31} & d_{41} \\ d_{12} & d_{22} & d_{32} & d_{42} \\ d_{13} & d_{23} & d_{33} & d_{43} \\ d_{14} & d_{24} & d_{34} & d_{44} \end{bmatrix}_i$$

$$+ \begin{bmatrix} Q_s & 0 & 0 & 0 \\ 0 & 0 & 0 & 0 \\ 0 & 0 & \alpha_4 T & 0 \\ 0 & 0 & 0 & \dfrac{T\sigma_s^2}{\tau_s} \end{bmatrix}_i \quad (97)$$

where $Q_s$ and $\alpha_4$ are constants in the $Q_a$ matrix.

$$\begin{bmatrix} K_{a_1} \\ K_{a_2} \\ K_{a_3} \\ K_{a_4} \end{bmatrix}_i = \begin{bmatrix} k_a(d_{11}+d_{14}) \\ k_a(d_{21}+d_{24}) \\ k_a(d_{31}+d_{34}) \\ k_a(d_{41}+d_{44}) \end{bmatrix}_i [k_a^2(m_{11}+m_{14})+k_a^2(m_{41}+m_{44})+R_a(i)]_i^{-1}$$

$$= \frac{k_a}{k_a^2(m_{11}+2m_{14}+m_{44})+\sigma_a^2} \begin{bmatrix} d_{11}+d_{14} \\ d_{21}+d_{24} \\ d_{31}+d_{34} \\ d_{41}+d_{44} \end{bmatrix}_i \quad (93)$$

Now define the auxiliary variables
$ZM1 = m_{11} + m_{14}$
$ZM2 = m_{12} + m_{24}$
$ZM3 = m_{13} + m_{34}$
$ZM4 = m_{14} + m_{44}$ From the equation there results the following (remembering that $M_a(i)$ is symmetric and $\phi_{11} = 1$)

$Z_{a_{11}} = d_{11} + d_{14} = ZM1 + \phi_{12} ZM2 + \phi_{13} ZM3$ $Z_{a_{21}} = d_{21} + d_{24} = \phi_{22} ZM2 + \phi_{23} ZM3$ \quad 95

$Z_{a_{31}} = d_{31} + d_{34} = \phi_{33} ZM3$ $Z_{a_{41}} = d_{41} + d_{44} = \phi_{44} ZM4$ Finally, the gain matrix can be written $$\begin{bmatrix} K_{a_1} \\ K_{a_2} \\ K_{a_3} \\ K_{a_4} \end{bmatrix}_i = \frac{k_a}{k_a^2[ZM1+ZM4]+\sigma_a^2} \begin{bmatrix} Z_{a_{11}} \\ Z_{a_{21}} \\ Z_{a_{31}} \\ Z_{a_{41}} \end{bmatrix}_i \quad (96)$$

The equation for $M_a(i+1)$ can be written in the form below.

$$M_a(i) \phi^T(i) = D_a^T(i)$$

The return address in RO is saved in FTV2400. A non-zero value is stored in R6 to avoid a possible 0/0 division in case $k_a$ should be 0. The measurement parameter, $k_a$, is formed as the average of the elevation and azimuth angle discriminant slopes. If $k_a = 0$ (extrapolate condition), then the gains should be 0 according to Equation (96). In this case the $Z_a$ terms need not be computed and FTS6 branches directly to the computation of the $K_a$ terms which will result in 0 values by virtue of $k_a = 0$, and a non-zero value for the denominator term in R6.

If $k_a$ is non-zero, FTS6 computes the ZM1 through ZM4 terms (auxiliary variables) and the $Z_{a_{11}}$ through $Z_{a_{41}}$ terms of Equation (95). The $k_a^2$ [ZM1 + ZM4] portion of the denominator is computed in R6. The system measurement noise variance, $\sigma_a^2$, is computed as follows.

$SNR_a = SNR \text{ (angle)} = \frac{1}{2}[SNR(AZ) + SNR(EL)] = \frac{1}{2}[SNR_a + SNR_e]$ $\sigma_a^2 = R_{a_0}$ (a constant) for SNR (angle) < 1

$\sigma_a^2 = \dfrac{R_{a_0}}{SNR^2 \text{ (angle)}}$ for SNR (angle) $\geq 1$

The noise variance is added to R6 to form the complete denominator term for the gain computation.

The four gain terms are computed according to Equation (96) in an index loop. R2 is used as the loop controller (four iterations) and also selects the proper $Z_a$ from temporary storage and routes the computed gain to the proper cell. The terms $k_a Z_{a_{ii}}$ are also saved in the four FT temporary storage cells as they are needed in the covariance update computations to follow. R1 contains a shift count to adjust the $k_a Z_{a_{ii}}$ product to obtain the proper scaling for each $K_a$. Fortunately, there was a simple relationship between the shift count required and the loop counter. After the gains have been computed and stored, FTS6 proceeds to the covariance update computations.

Equation (97) will be used to derive the equations for the covariance matrix update. As a preliminary step to updating the $m$ terms, the program computes the following auxiliary variables in the registers R0 through R3 indicated.

$$d_{12} = m_{12} + \phi_{12}m_{22} + \phi_{13}m_{23} \rightarrow R0$$
$$d_{13} = m_{13} + \phi_{12}m_{23} + \phi_{13}m_{33} \rightarrow R1$$
$$\phi_{22}m_{23} \rightarrow R2 \quad (98)$$
$$d_{23} = \phi_{22}m_{23} + \phi_{23}m_{33} \rightarrow R3$$

The diagonal elements of $M_a(i+1)$ are computed first. From Equation (97), $$m_{11}(i+1) = d_{11} + \phi_{12}d_{12} + \phi_{13}d_{13} - k_aK_{a_1}(d_{11}+d_{14}) + Q_s \quad (99)$$

and using Equations (94) and (95), this expression reduces to $$m_{11}(i+1) = (m_{11}+Q_s) - K_{a_1}(k_aZ_{a_{11}}) + \phi_{12}[m_{12}+d_{12}] + \phi_{13}[m_{13} + d_{13}] \quad (100)$$

Again, from Equations (97), (92) and (95) there results $$m_{22}(i+1) = \phi_{22}d_{22} + \phi_{23}d_{23} - k_aK_{a_2}(d_{21}+d_{24}) = \phi_{22}{}^2m_{22} - K_{a_2}(k_aZ_{a_{21}}) + \phi_{23}[\phi_{22}m_{23}+d_{23}] \quad 101$$

$$m_{33}(i+1) = \phi_{33}d_{33} - k_aK_{a_3}(d_{31}+d_{34}) + \alpha_4T = \phi_{33}{}^2m_{33} - K_{a_3}(k_aZ_{a_{31}}) + \alpha_4T \quad 102$$

$$m_{44}(i+1) = \phi_{44}d_{44} - k_aK_{a_4}(d_{41}+d_{44}) + T\sigma_s{}^2\tau_s = \phi_{44}{}^2m_{44} - K_{a_4}(k_aZ_{a_{41}}) + T\sigma_s{}^2/\tau_s \quad 103$$

Note that the terms $(k_aZ_{a_{ii}})$ were saved in FT temporary storage from the gain computations.

To obtain the update equations for the upper off-diagonal terms, it is sometimes simpler to use the expansion for the corresponding (equal) lower diagonal term. Thus, $$m_{12}(i+1) = m_{21}(i1) = \phi_{22}d_{12} + \phi_{23}d_{13} - k_aK_{a_2}(d_{11}+d_{14}) = \phi_{22}d_{12} + \phi_{23}d_{13} - K_{a_1}(k_aZ_{a_{21}}) \quad 104$$

Since $$K_{a_2} Z_{a_{11}} = K_{a_1} Z_{a_{21}} \quad 105$$

Also $$m_{13}(i+1) = m_{31}(i+1) = \phi_{33}d_{13} - k_aK_{a_3}(d_{11}+d_{14}) = \phi_{33}d_{13} - K_{a_1}(k_aZ_{a_{31}}) \quad 106$$

Before continuing with the off-diagonal updates, the following auxiliary variables are computed in the registers shown.

$$d_{13} = \phi_{44} m_{34} \rightarrow R0$$
$$d_{12} = \phi_{44} m_{24} \rightarrow R1 \quad 107$$

($d_{23}$ is still in R3)

The remaining upper off-diagonal $m$ terms are obtained as follows.

$$m_{14}(i+1) = d_{41}+\phi_{12}d_{42} + \phi_{13}d_{13} - k_aK_{a_1}(d_{41}+d_{44}) = \phi_{44}m_{14} + \phi_{12}d_{42} + \phi_{13}d_{43} - K_{a_1}(k_aZ_{a_{41}}) \quad 108$$

$$m_{23}(i+1) = m_{32}(i+1) = \phi_{33}d_{23} - k_aK_{a_3}(d_{21}+d_{24}) = \phi_{33}d_{23} - K_{a_2}(k_aZ_{a_{31}}) \quad 109$$

$$m_{24}(i+1) = \phi_{22}d_{42} + \phi_{23}d_{43} - k_aK_{a_2}(d_{41}+d_{44}) = \phi_{22}d_{42} + \phi_{23}d_{43} - K_{a_2}(k_aZ_{a_{41}}) \quad 110$$

$$m_{34}(i+1) = \phi_{33}d_{43} - k_aK_{a_3}(d_{41}+d_{44}) = \phi_{33}d_{43} - K_{a_3}(k_aZ_{a_{41}}) \quad 111$$

At the end of the covariance update, FTS6 exits via the return address stored in location FTV2400.

Figure 16:
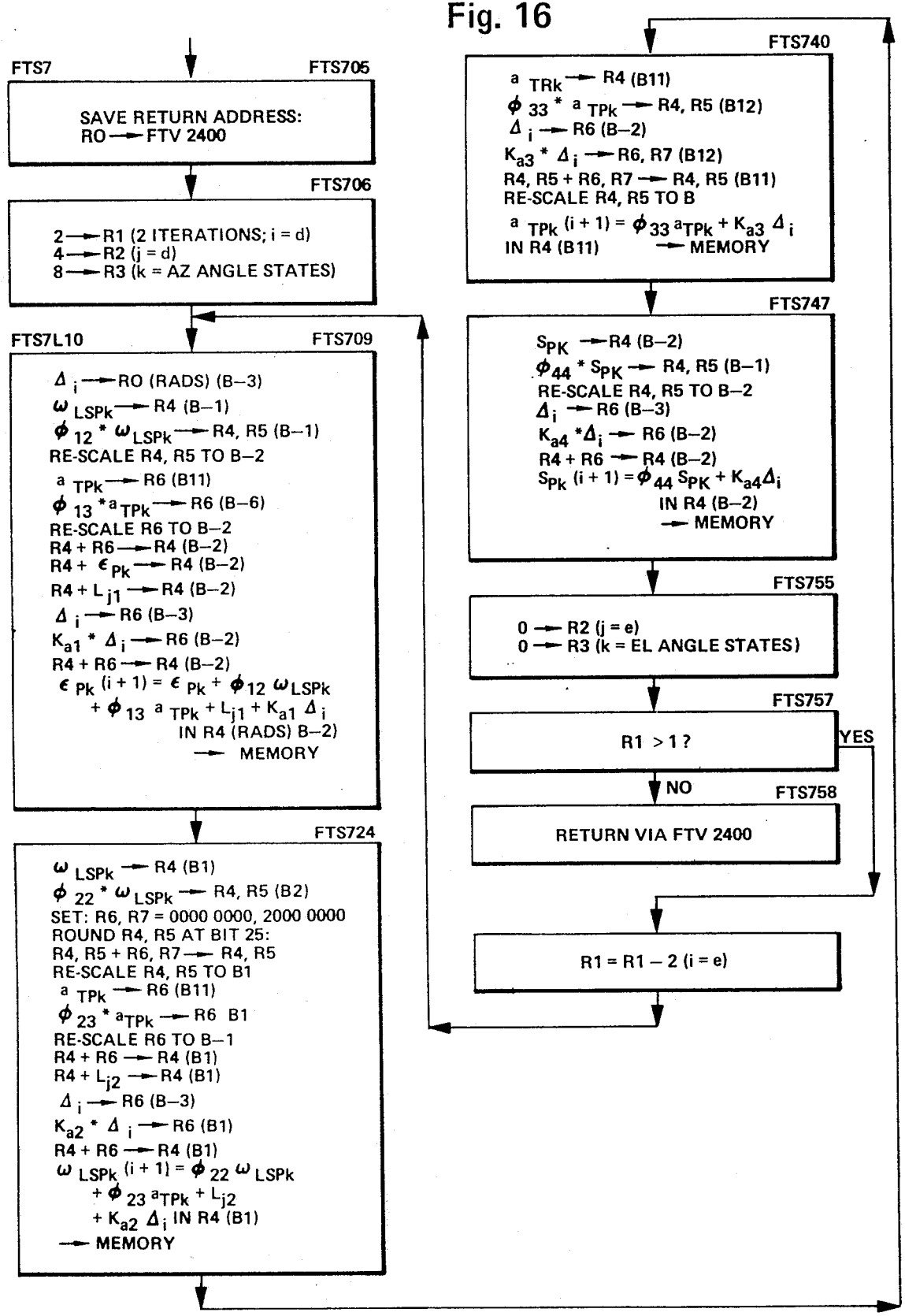

Subroutine FTS7 illustrated in the flow diagram of FIG. 16 is the Angle State Vectors Update Subroutine. Its purpose is to update the angle state vectors, $\overline{X}_e$ and $\overline{X}_d$, to the point $i+1$ using the state vectors at point $i$ and the previously computed state transition matrix, $\phi$, the motion compensation vectors $\overline{L}_e$ and $\overline{L}_d$, the angle filter gain matrix, $\overline{K}_a$, and the total angle residuals $\Delta_e$ and $\Delta_d$. It is called with a BAL FTS, 0 instruction. The new angle state vectors, $\overline{X}_e(i+1)$ and $\overline{X}_d(i+1)$ are stored in FT variable memory.

The vector-matrix equations to update the angle state vectors are shown below.

$$\overline{X}_e(i+1) = \phi(i+1,i) \overline{X}_e(i) + \overline{L}_e(i) + \overline{K}_a(i) \Delta_e \quad 112$$

$$\overline{X}_d(i+1) = \phi(i+1,i) \overline{X}_d(i) + \overline{L}_d(i) + \overline{K}_a(i) \Delta_d \quad 113$$

These equations can be expanded in scalar form to yield the following set of equations computed by FTS7.

$$\epsilon_{re}(i+1) = \epsilon_{re}(i) + \phi_{12}\omega LSP_e(i) + \phi_{13}a_{TP_e}(i) + L_{e_1}(i) + K_{a_1}(i) \Delta_e(i) \quad 114$$

$$\omega_{LSP_e}(i+1) = \phi_{22}\omega_{LSP_e}(i) + \phi_{23}a_{TP_e}(i) + L_{e_2}(i) + K_{a_2}(i) \Delta_e(i) \quad 115$$

$$A_{TP_d}(i+1) = \phi_{33} a_{TP_d}(i) + K_{a_3}(i) \Delta_e(i) \quad 116$$

$$S_{P_e}(i+1) = \phi_{44}S_{P_e}(i) + K_{a_4}(i) \Delta_e(i) \quad 117$$

$$\epsilon_{rd}(i+1) = \epsilon_{rd}(i) + \phi_{12}\omega_{LSP_d}(i) + \phi_{13}a_{TP_e}(i) + L_{d_1}(i) + K_{a_1}(i) \Delta_d(i) \quad 118$$

$$\omega_{LSP_d}(i+1) = \phi_{22}\omega_{LSP_d}(i) + \phi_{23}a_{TP_e}(i) + L_{d_2}(i) + K_{a_2}(i) \Delta_d(i) \quad 119$$

$$a_{TP_e}(i+1) = \phi_{33}a_{TP_e}(i) + K_{a_3}(i) \Delta_d(i) \quad 120$$

$$S_{P_d}(i+1) = \phi_{44}S_{P_d}(i) + K_{a_4}(i) \Delta_d(i) \quad 121$$

Note that the $\phi$ matrix elements and the gains are the same for both channels.

The return address in R0 is saved in FTV2400. Equation sets (118) to (121) and (114) to (118) are computed with the same code, with index registers set to select the proper variables. R1 is used as an iteration counter and also selects the proper angle residual. R2 is used to select the proper L terms and R3 selects the proper state variables. The initial value of 2 for R1 will cause the required two iterations of the code and also select $\Delta_a$ as the angle residual for the first iteration. The initial value of 4 for R2 will select $L_{a_1}$ and $L_{a_2}$ for the equations on the first iteration, and the initial value of 8 for R3 will cause selection of the azimuth states on the first iteration. Equations (118) to (121) are computed first and the updated azimuth states stored in memory.

At the end of the azimuth channel state vector update, R2 and R3 are set to 0. This will cause selection of $L_r$ and $L_e$ and the elevation states, respectively, in the equations on the second iteration. A Branch and Count (BCT) instruction is executed reducing R1 to 0, which will now select $\Delta_e$ for the equations, and the program branches to execute Equations (114) to (118) on the second iteration.

At the end of the elevation channel state vector update, the second execution of the BCT instruction, with R1 now equal to o, leads to the exit instruction, an indirect branch to location FTV2400.

Figure 17:
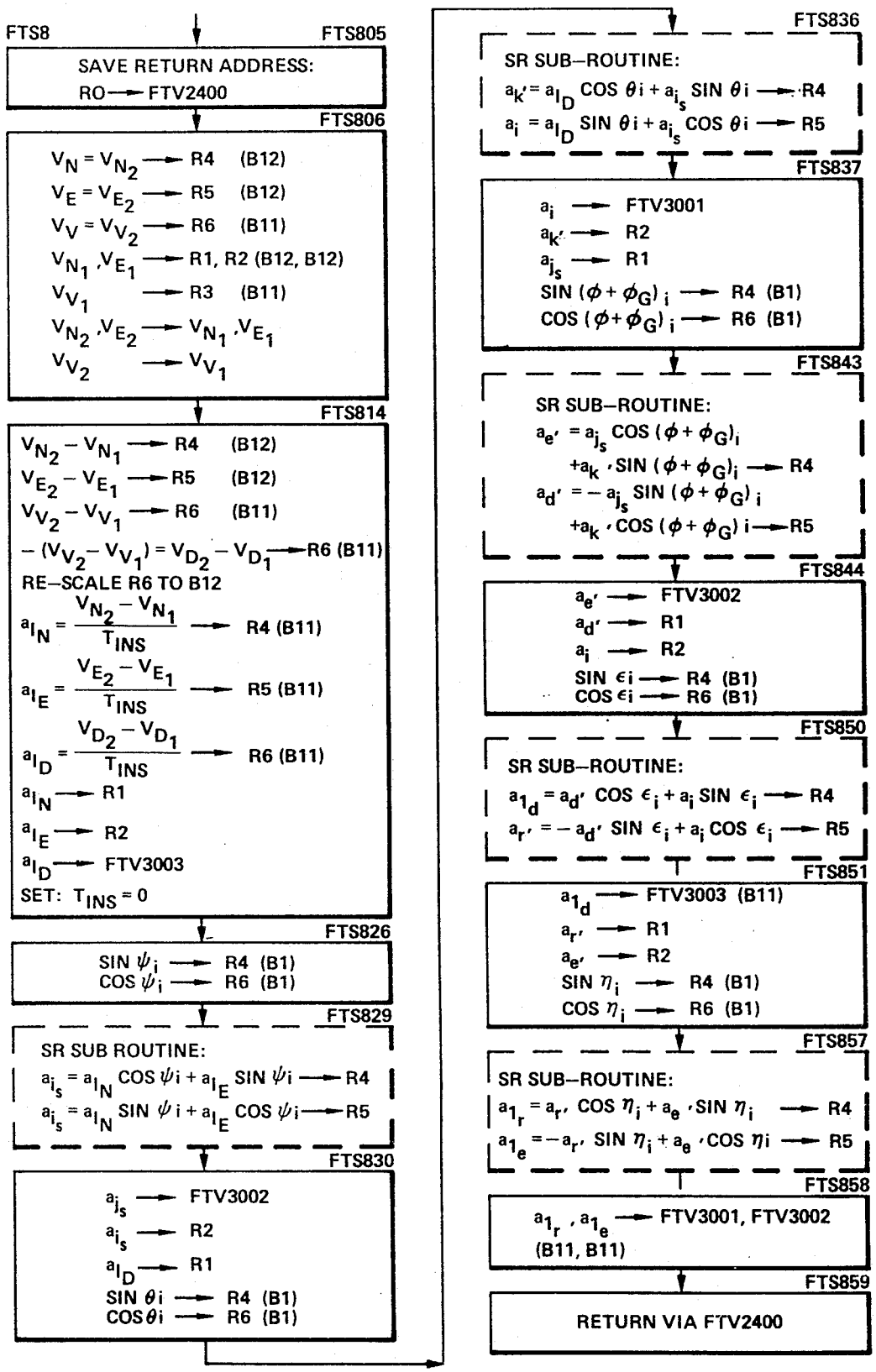

Subroutine FTS8 illustrated in the flow diagram of FIG. 17 is the Ownship Acceleration in Antenna Coordinates Subroutine. Its purpose is to compute the components of own ship acceleration in antenna coordinates for use as aiding terms in the angle, range, and velocity tracking filters. These components are computed every four tracking filter cycles in final track using own ship velocities in N, E, D to $r$, $e$, $d$ Euler transformation angles sampled near the mid-point of the 4-cycle period. Note that the direction D is the same as the vertical direction V, but opposite in sign.

FTS8, called with a BAL FTS8, 0 instruction, is entered every 4-tracking filter cycles in Final Track Mode. Before calling FTS8, the following quantities must be stored in FT variable memory 1. $V_{N_1}$, $V_{E_1}$, $V_{V_1}$ — own ship velocity components in N, E, V near beginning of the 4-cycle period.
2. $T_{INS}$ — time in seconds of the 4-cycle period.
3. Sines and cosines of $\phi_i$, $\theta_i$, $(\phi+\phi_G)_i$, $\epsilon_i$, $\eta_i$ — Euler angles sampled near mid-point of the 4-cycle period. The computed own ship accelerations in antenna coordinates, $a_{l_r}$, $a_{l_e}$, $a_{l_d}$, are stored by the subroutine in FT variable memory.

The fundamental equations used by FTS8 to compute the components of own ship acceleration in antenna coordinates are:

tions. Thus, to compute vector components in frame 2 which is rotated by an angle, $\alpha$, from frame 1, load sin $\alpha$ in R4, cos $\alpha$ in R6, and the two vector components in frame 1 in R1 and R2. Sr then computes:

$$R4 = R1 (\cos \alpha) + R2 (\sin \alpha) \qquad (126)$$
$$R5 = R1 (\sin \alpha) + R2 (\cos \alpha) \qquad (127)$$

Which frame 1 components are input in R1 and R2 and which frame 2 components are output in R4 and R5 can be determined from the matrix equations.

The return address in R0 is stored in FTV2400. The current own ship velocities from the I/O memory area are loaded into R4, R5, and R6 as $V_{N_2}$, $V_{E_2}$, and $V_{V_2}$, respectively. The velocities $V_{N_1}$, $V_{E_1}$, and $V_{V_1}$, valid four filter cycles ago, are loaded into R1, R2, and R3, respectively. Then, the current velocities $V_{N_2}$, $V_{E_2}$, and $V_{V_2}$ are stored in FT buffer cells as $V_{N_1}$, $V_{E_1}$, and $V_{V_1}$ to be used on the next call of FTS8. The velocity differences are formed in R4, R5, and R6 with rescaling of the vertical difference to B12 and sign changing to make the down direction positive. The average own ship N, E, D acceleration components over the last four filter cycles are computed by dividing the velocity differences by the 4-filter cycle time, $T_{INS}$. $T_{INS}$ is cleared to initialize for the following cycle.

A series of five single axis rotation transformations are performed according to Equation (125) using SR as described above. The sines and cosines of the Euler angles transforming N,E,D to $r,e,d$, saved by FT near the middle of the 4-cycle period, are used in this process. The final results, $a_{l_r}$, $a_{l_e}$ and $a_{l_d}$, are stored in FT variable memory for use by the tracking filter over the next four filter cycles. The subroutine exits via the return address stored in location FTV2400.

Figure 18:
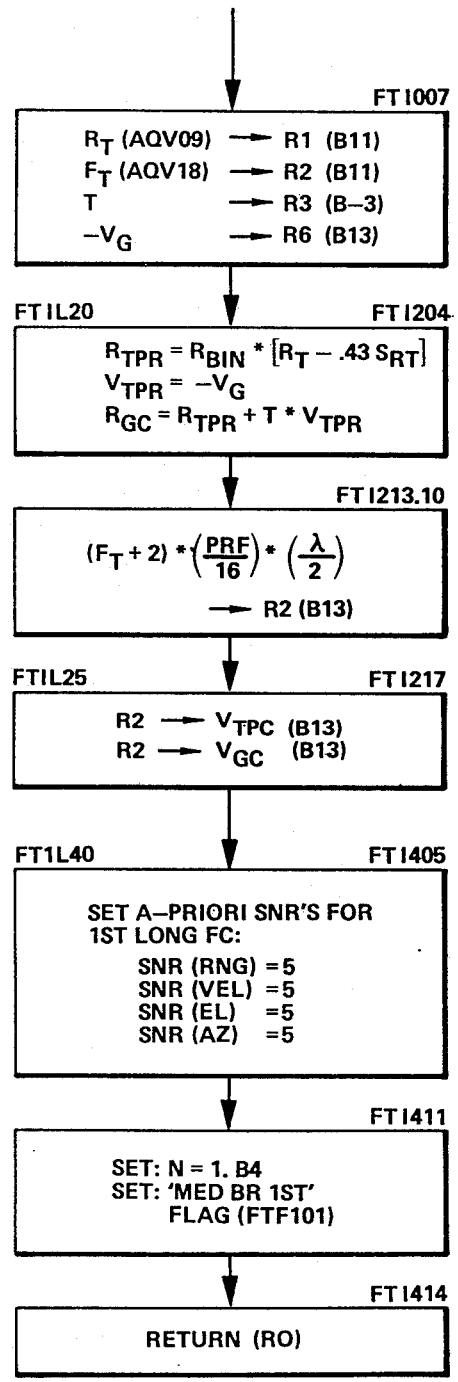

Subroutine FTI illustrated in the flow diagram of FIG. 18 is the Filter Initialization Subroutine. Its purpose is to initialize those FT variables having non-zero values before the start of track. A common entrance is provided for all modes, with mode in FTI directing the program to the proper initialization computations. Results are stored in FT variable memory. It is called with a BAL FTI, 0 instruction.

Before the start of track, the Executive Routine (XT) clears the track data base. Thus, all FT variables and flags requiring zero initial values will be initialized by $$a_{1_N} = \frac{V_{N_2} - V_{N_1}}{T_{INS}} \qquad (122)$$

$$a_{1_E} = \frac{V_{E_2} - V_{E_1}}{T_{INS}} \qquad (123)$$

$$a = \frac{V_{V_1} - V_{V_2}}{T_{INS}} \qquad (124)$$

$$\begin{bmatrix} 1 & 0 & 0 \\ 0 & c(\phi+\phi_G)_i & s(\phi+\phi_G)_i \\ 0 & -s(\phi+\phi_G)_i & c(\phi+\phi_G)_i \end{bmatrix} \begin{bmatrix} c\theta_i & 0 & -s\theta_i \\ 0 & 1 & 0 \\ s\theta_i & 0 & c\theta_i \end{bmatrix} \begin{bmatrix} c\Psi_i & s\Psi_i & 0 \\ -s\Psi_i & c\Psi_i & 0 \\ 0 & 0 & 1 \end{bmatrix}$$

$$\begin{bmatrix} a_{l_N} \\ a_{l_E} \\ a_{l_D} \end{bmatrix} \begin{bmatrix} a_{l_r} \\ a_{l_e} \\ a_{l_d} \end{bmatrix} = \begin{bmatrix} c\eta_i & s\eta_i & 0 \\ -s\eta_i & c\eta_i & 0 \\ 0 & 0 & 1 \end{bmatrix} \begin{bmatrix} c\epsilon_i & 0 & -s\epsilon_i \\ 0 & 1 & 0 \\ s\epsilon_i & 0 & c\epsilon_i \end{bmatrix} \qquad (125)$$

where $V_{N_2}$, $V_{E_2}$, $V_{V_2}$ = own ship velocity components in N,E,V near the end of the 4-cycle period and the other terms have been defined above.

The Single Axis Rotation Subroutine (SR) can be conveniently used to perform the successive 3×3 times 3×1 matrix multiplications required in the computathis process. FTI is called by XT to initialize those FT variables requiring non-zero values.

The range bin number, $R_T$, and the filter hit number, $F_T$, from acquisition, are loaded into R1 and R2, respectively. The initial track period, T, determined by XT, is loaded into R3, and the negative of the last computed own-ship ground velocity, $V_G$, is formed in

R6.

The range filter states and the velocity filter states are initialized according to the following equations.

$$R_{TPR} = R_{BIN} \cdot [R_T + 0.5]$$

$$V_{TPR} = -V_G$$

$$(a_{TPR} = 0 \text{ by track data base clearing}) \qquad 128$$

$$V_{TPV} = (F_T + 2)(MPRF/16)(\lambda/2)$$

$$(a_{TPV} = 0 \text{ by track data base clearing})$$

The initial gate commands are:

$$R_{GC} = R_{TPR} + T \cdot V_{TPR} \qquad 129$$

$$V_{GC} = V_{TPV}$$

A set of a priori SNR's must be stored for use by the FT Routine during the first tracking period equal to a final track filter period for the operating PRF, since SNR's from the SN Routine will not be available during this time.

The variable, N, is initialized at one and the flag used to select a gain of one for the first MPRF burst ranging is set. FTI exits via the return address stored in Ro.

The Antenna Control Routine, AT, illustrated in the flow diagrams of FIGS. 19 and 20a–20d computes the desired antenna drive commands for roll, elevation and azimuth and outputs these commands to the antenna servo through the appropriate analog output signals. The entries to the AT Routine are listed below.

| AT | Called by XT near the middle of the current track filter cycle. |
|---|---|
| ATS1 | Called by XT to output analog values. |

The flag, with its associated symbolic name, is listed below.

| ATF01 | ROLL |
|---|---|

The variables defined and used in the AT Routine are listed below.
ATV01
ATV02
ATV03
ATV04
ATV05
FTV2011
FTV2012
FTV2021
FTV2022

Figure 19:
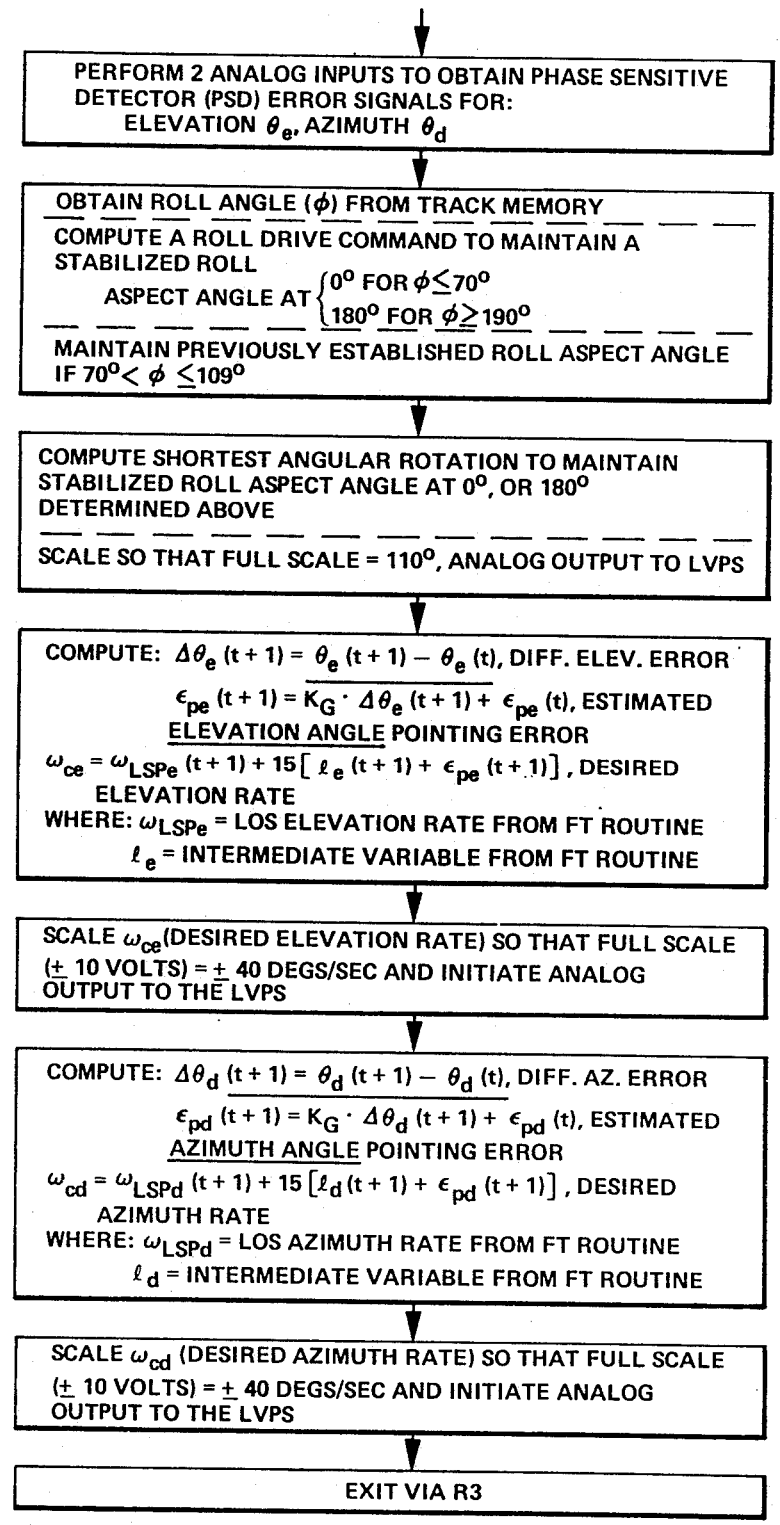
FIGS. 19 and 20a–20d illustrate flow diagrams for azimuth and elevation command computations.
Figure 20A:
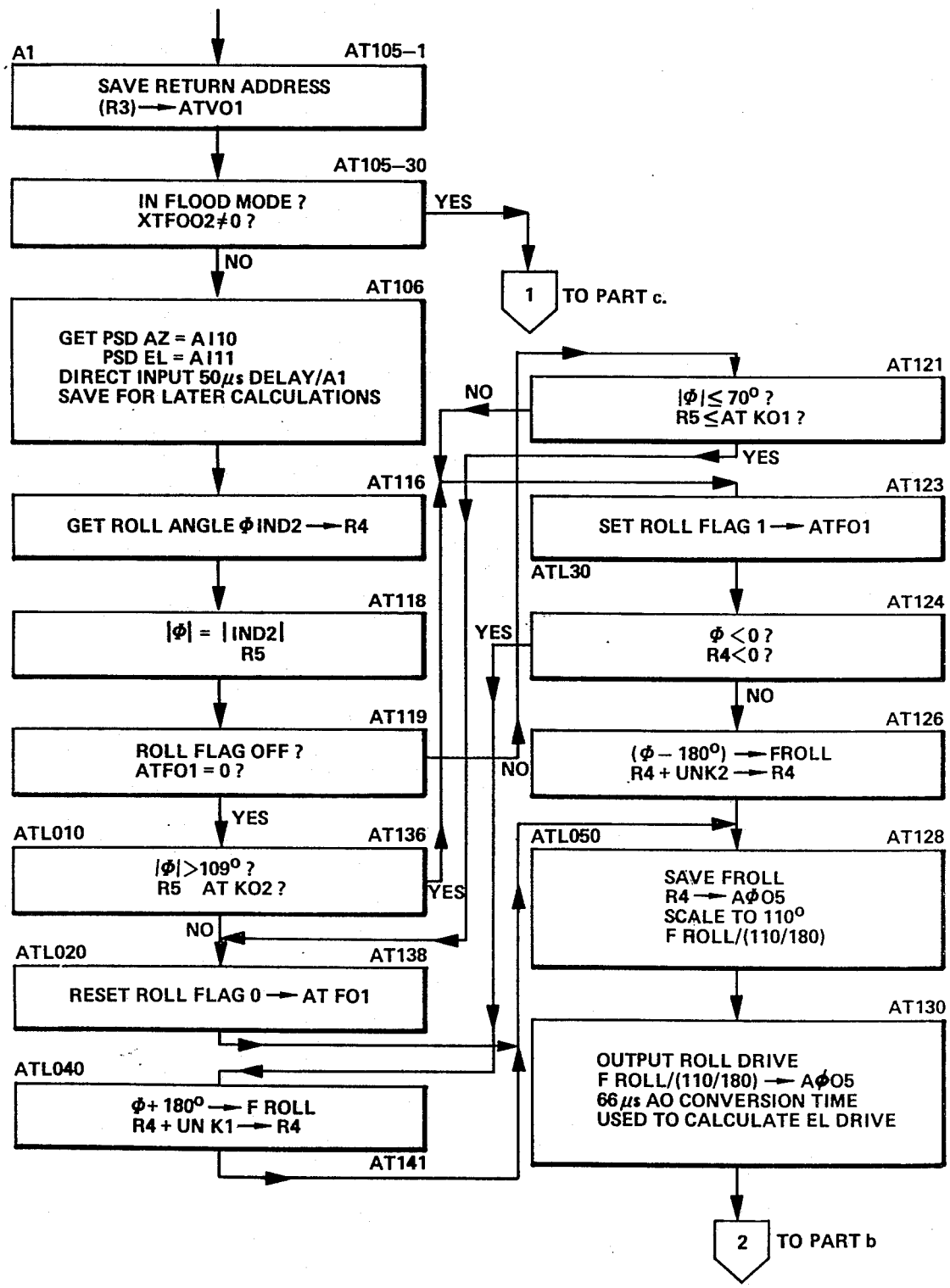
Figure 20B:
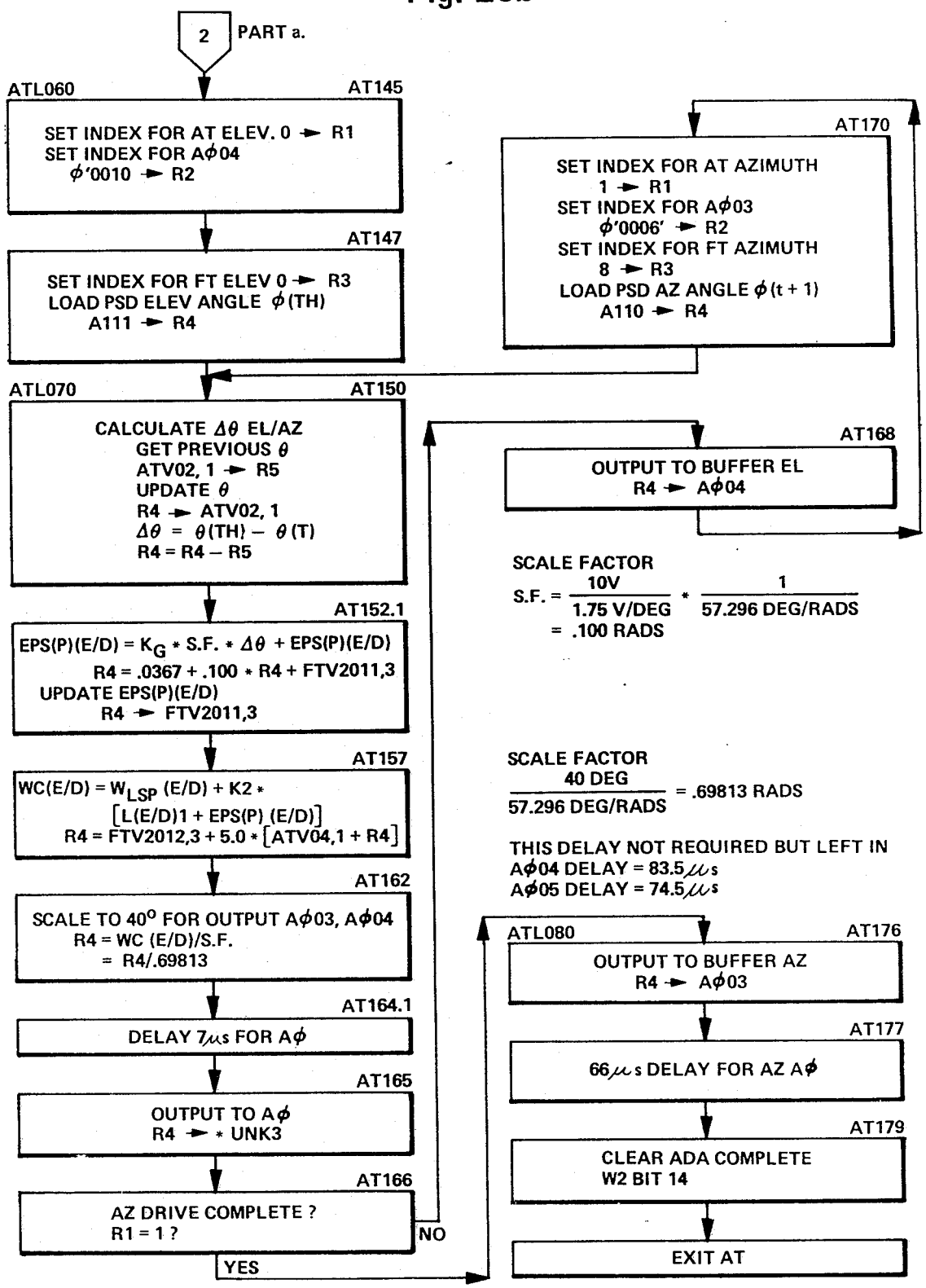
Figure 20C:
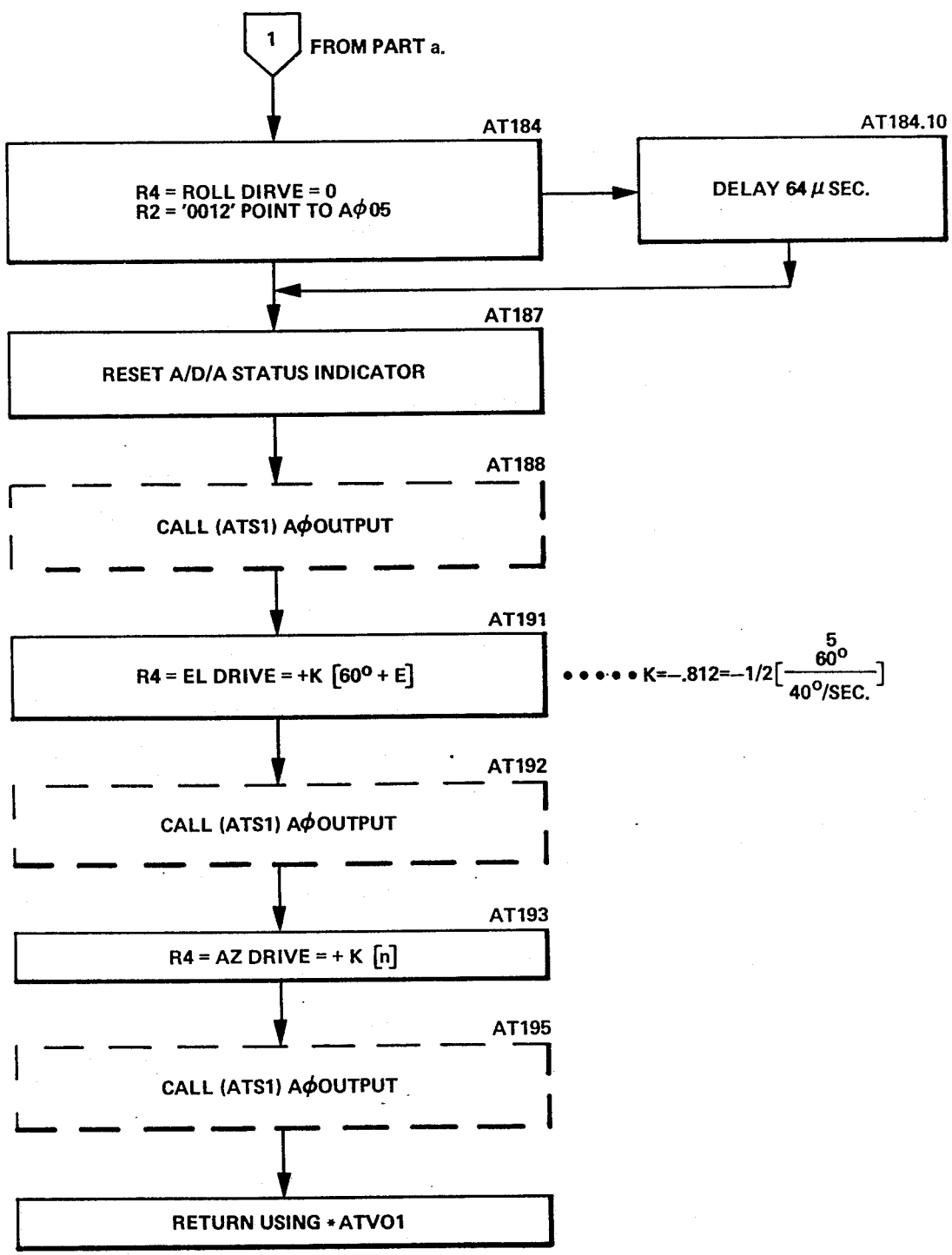
Figure 20D:
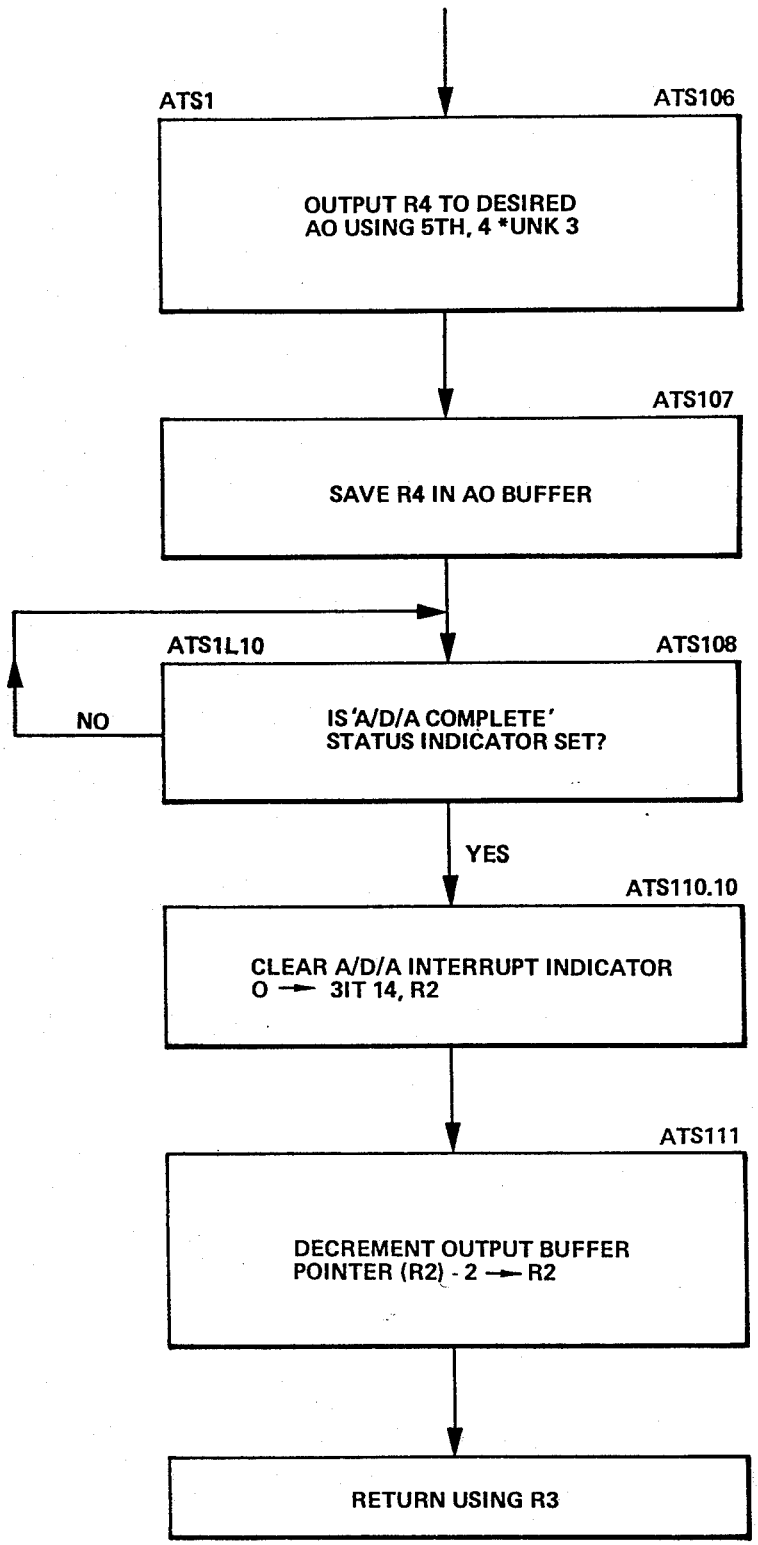

FIG. 19 is a functional flow diagram of the routine AT shown in more detail in flow diagrams 20a–20d. AT performs two analog inputs in the direct mode to obtain analog input word 10 ($\theta_d$, azimuth error angle) and analog input word 11 ($\theta_e$, elevation error angle) from a phase sensitive detector.

The current roll angle, $\phi$, input from the INS is used to determine whether to establish a stablized roll aspect angle at 0° or 180° in the following manner.

The stabilized roll aspect angle is 0° if, $|\phi| \leq 70°$ or $70° < |\phi| \leq 109°$ and the previously established roll aspect angle is 0°.

The stabilized roll aspect angle is 180° if, $|\phi| > 109°$ or $70° < |\phi| \leq 109°$ and the previously established roll aspect angle is 180°.

The shortest angular rotation to maintain the stabilized roll aspect angle (0° or 180° as determined above) is computed. This value is converted to a full scale of ±110° and is output to the antenna servo (LVPS) as analog output word 5.

The analog input, $\theta_e(t+1)$, is used to compute the difference in elevation:

$$\Delta\theta_e(t+1) = \theta_e(t+1) - \theta_e(t) \qquad 130$$

and the estimated elevation angle point error:

$$\epsilon_{p_e}(T+1) = K_G \cdot \Delta\theta_e(t+1) + \epsilon_{p_e}(t) \qquad 131$$

where
  $K_G$ = a constant

The desired elevation rate is computed:

$$\omega_{c_e} = \omega_{LSP_e}(t+1) + 15 [l_e(t+1) + \epsilon_{p_e}(t+1)] \qquad 132$$

where
  $\omega_{LSP_e}$ = the LOS elevation rate from the FT Routine
  $l_e$ = an intermediate variable from the FT Routine
  $\omega_{c_e}$ = scales to ±40°/second at B0 and is output to the antenna servo as analog output word 4.

The computation for the desired azimuth command rate proceeds in a similar manner, where the analog input, $\theta_d(t+1)$, is used to compute the difference in azimuth:

$$\Delta\theta_d(t+1) = \theta_d(t+1) - \theta_d(t); \qquad 133$$

and the estimated azimuth angle pointing error:

$$\epsilon_{p_d}(t+1) = K_G \cdot \Delta\theta_d(t+1) + \epsilon_{p_d}(t). \qquad 134$$

The desired azimuth rate is then $$\omega_{c_d} = \omega_{LSP_d}(t+1) + 15 [l_d(t+1) + \epsilon_{p_d}(t+1)] \qquad 135$$

where
  $\omega_{LSP_d}$ = the LOS azimuth rate from the FT Routine
  $l_d$ = an intermediate variable from the FT Routine
  $\omega_{c_d}$ = scaled to ±40°/second at B0 and is output to the LVPS as analog output word 3.

As indicated hereinbefore, the tracking system employing the present invention wll have an initial and a final tracking phase, i.e., after a target has been acquired, the system utilizes two different track modes. The initial track mode is used to keep a target between the split gates used for range and velocity tracking while the Kalman filter gain inputs are being generated. A final track mode, which uses variable Kalman gains, produces improved tracking with parameter estimates accurate enough to satisfy mission requirements. The same type of discriminate data used by the initial track mode is averaged to produce the discriminate data for the final track mode. Thereafter, average of discriminate data in the final track mode produces measurements with less effective noise. The averaging period is selected to be compatable with the expected variations in target parameters. SNR data produced by averaging signal and noise measurements over a period compatable with their expected variation are used to set track filter gains. A technique for computing the SNR data will now be described in greater detail.

Figure 21A:
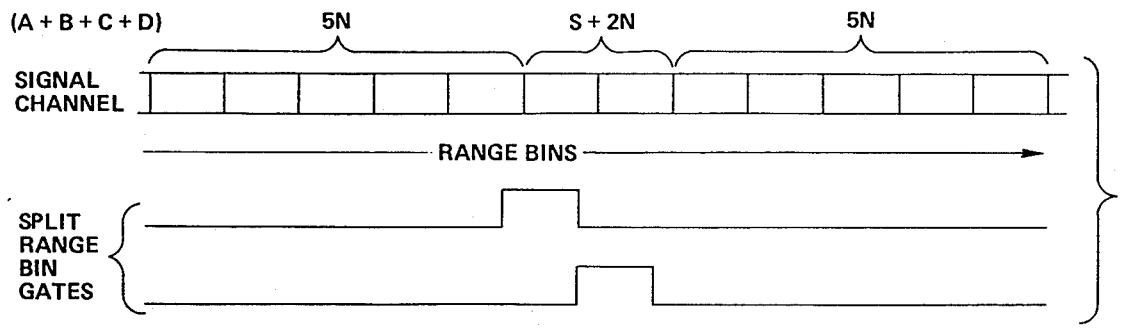
FIGS. 21a and 21b illustrate the technique employed for computing signal-to-noise ratios for use in the flow diagrams of FIGS. 9a–9f.
Figure 21B:
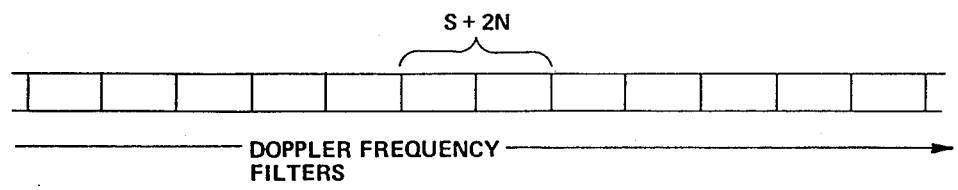

The magnitude of the target signal, S, is essentially measured by measuring the magnitude of whatever is present in the split-gated range bins or doppler filters as shown in FIGS. 21a and 21b, respectively. Since the signal measured in each range bin or doppler filter consists of both signal and noise, some adjustment to the measurement may need to be made to produce the best measure of signal. The magnitude of noise, N, would best be measured in each case after removing the target signal from the split-gated signals. However, this is impossible without removing some clutter which is one component of the noise present. Consequently, to obtain a measure of the noise, return signals are sampled in range bins or doppler filters on each side of the split-gated bins or filters and averaged. Wherever possible, these noise measurements are made by looking in range bins rather than doppler filters because jet engine modulation sidebands may put unwanted signals in the gated noise samples, thereby degrading the noise measurement. Therefore, when range gating is available, range bins are used for the noise measurement in computing the SNR for range, velocity, azimuth and elevation. For example, five cells on each side of the split-gated range bins may be sampled, added and then divided by 10 to form an average noise measurement, N.

Since a ratio, S/N, is required, an average signal measurement, S, must be obtained for the numerator in the case of each SNR. That is accomplished in the case of $SNR_{RNG}$ by obtaining the return signals sampled in the split-gated range bins, forming the sum S+2N, and then subtracting out the averaged noise component present. In other words, recognizing that the target will be in one of the two range bins, if the signal returns from the split-gated bins are added, their sum will be S+2N. If five range cells on either side of the split-gated cells are sampled and added to obtain a noise measurement, the average noise 10N/10 can be formed directly. To remove the component 2N from the signal to be used in the numerator, it is then a simple matter of subtracting two times the average noise signal. The new values of S+2N and N are obtained every 8.6 msec. At the end of a 34.4 msec. period, a smoothed estimate of the signal-to-noise ratio is formed from the four samples of S+2N and N by the computer 13a. The signal and noise samples are obtained from the channel of the radar receiver 11 which receives the sum $(a+b+c+d)$ from the antenna.

The azimuth and elevation signal-to-noise ratios $SNR_a$ and $SNR_e$ are similarly computed by the computer 13a using as the numerator the signal S developed from the split-gated range bins because, while tracking on target, the azimuth signal $(a+b)-(b+d)$ and the elevation signal $(a+b)-(c+d)$ are being driven to zero. To develop an average noise signal, N, in the two azimuth and elevation channels, the computer 13a updates a running average of the signal amplitudes in the azimuth and elevation channels, as sampled every 8.6 msec. At the end of a 34.4 msec. period, the azimuth and elevation signal-to-noise ratios are formed by dividing the signal, S, obtained from the range channel by the respective average azimuth and elevation noise signals developed from samples of the azimuth and elevation channels.

While the computer 13a is shown as receiving its inputs from the signal processor 13, it is recognized that the signal-to-noise ratio computation may actually be performed within the signal processor 13, or within the estimator 14 using the new raw data obtained from the signal processor 13 and processing the raw data with a stored subroutine. Alternatively, the various signal-to-noise ratios may be computed using analog techniques from the output signals of the radar receiver. Analog SNR signals could be sampled and converted to digital form at the end of every 34.4 msec. data accumulation period. Still other techniques will occur to those skilled in the art, particularly in a monopulse tracking radar system employing only two receiver channels, one for the range signal and the other time-shared for the azimuth and elevation signals. Consequently, it is to be understood that the present invention is not directed to techniques for computing the required signal-to-noise ratios, but rather is directed to using the signal-to-noise ratios however computed from signal measurements to adapt the tracking filters in the estimator for the noise environment of the return target signal.

To implement the foregoing routines, the radar data processor which carries out the functions of the estimator 14, i.e., of the tracking filters, and the controllers 15, 16 includes a digital computer which will now be described. That computer may also be used to carry out other system functions, such as the functions of the signal processor 13 and the radar controller 12. Consequently, the full capability of the computer will be set forth in sufficient detail to enable a programmer to not only provide the routines described but also provide other system function, i.e., to enable a programmer to adopt the present invention to a system having a particular environment and operating requirements.

The particular computer chosen for radar data processor is a Model HCM-231 Advanced Aerospace Computer designed and manufactured by Hughes Aircraft Company. It is called, simply, the "RDP" hereinafter. Basically a simplex (uni-processor) machine, the RDP possesses a number of advanced architectural features. These include the use of general purpose processor registers, half-word and full-word instuction types, a central address/data and control bus, system-wide addressing, a modular input-output system, and provisions for growth into a multiprocessor system.

The objective of the following is to describe those features of the RDP with programming significance and to present its instruction set. The description is intended to serve as a detailed reference document for both the application programmer and the computer requirements analyst.

The appendices include a summary of the instruction set in functional "arrow" notation, instruction listings ordered alphabetically and by opcode, a discussion of data transfers over the system main bus, and an explanation of the Read-Only Memory (ROM) subroutines.

The RDP is composed of standard and special purpose functional modules interconnected by a central address/data and control bus to provide maximum flexibility. It uses a modular structure that is capable of being modified and expanded readily if the necessity should arise. It provides considerable programming flexibility via an extensive instruction set that employs both full- and half-word instructions which operate on eight general-purpose processor registers (GPRs). Other aerospace features provided are a real-time clock register, an interrupt indicator register with priority decoding, and a fast-access processor local store. Data can be manipulated as 12-bit, 24-bit, 48-bit, or parallel 12-bit binary numbers in fractional two's complement form. Main memory is configured as one module with a capacity of 16K full-words, although the system could be modified to add other memory modules. The system input-output is completely modular to provide the greatest flexibility possible. It is assembled from standard input-output (I/O) building block modules.

Figure 22:
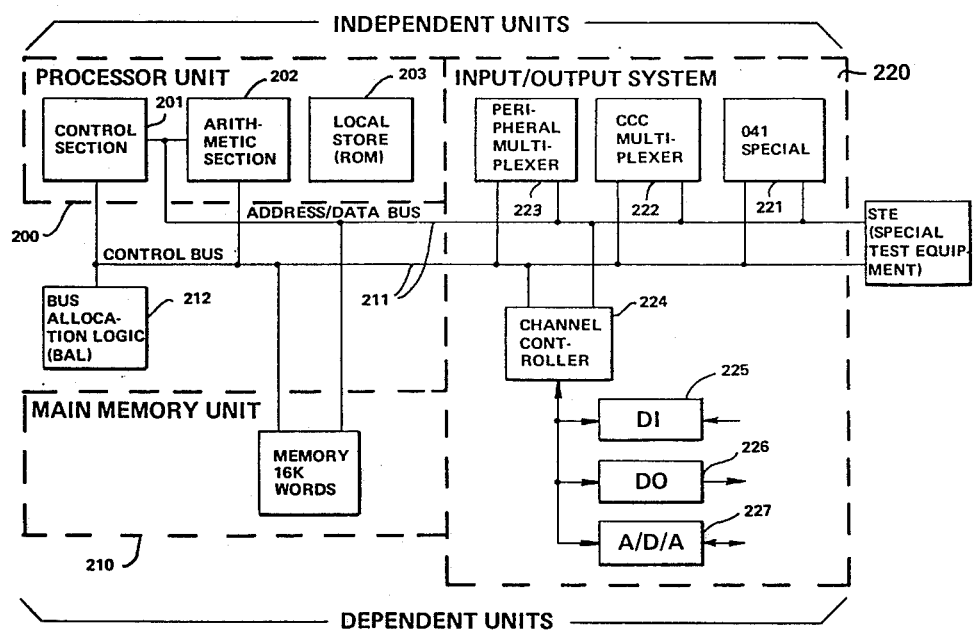
FIG. 22 is a block of a digital computer employed as a radar data processor (RDP) in the system of FIG. 1.

The configuration of a chosen RDP is given in FIG. 22. It consists of the following major elements. A Processor Unit 200 that: fetches instructions, controls instruction execution, and fetches and stores information in a control section 201, performs arithmetic and logical operations in an arithmetic section 202, and provides fast access non-destructive readout (NDRO) storage for frequently used routines in an area called the local store or the Read-only Memory (ROM). A Main Memory 210 that consists of one 16K core module. A Central Communication Bus 211 and Bus Allocation Logic 212 that interconnects all RDP system units. An Input-Output (I/O) System 220 that consists of standard building block modules and special I/O units designed for the application. The special independent units are an interface unit 221 referred to as an "041 Special" a central control computer (CCC) multiplex terminal 222 referred to as a "CMUX", a peripheral multiplex terminal 223 referred to as a "PMUX". Dependent units are a channel controller 224 and three supervised units; a discrete input unit 225, a discrete output unit 226 and an analog-digital-analog converter 227 for analog input (AI) and analog output (AO).

I/O operations are accomplished in either of two modes: direct mode or buffered mode. Direct mode I/O, which is under complete program control, involves the transmission of data items directly between the I/O system and one of eight general purpose processor registers. Generally, one program instruction is required for each data item transfer.

Buffered mode I/O is accomplished by one of the I/O special units 221, 222 and 223 independently of the processor unit operation once an I/O transaction has been initiated. I/O transactions can be accomplished either by the execution of the PCW instruction or by an externally generated start command. Each transaction may involve a variable number of data items. The status of a transaction can be determined by the execution of an LCW Instruction that addresses the I/O control unit in charge of the transaction, except in the case of specially designed control units whose status cannot be sampled.

Each RDP module is categorized as either an independent or dependent unit in the drawings. Only independent units may initiate data transfer requests. All such requests are arbitrated by the bus allocation unit logic that assigns bus cycles to a unique (priority-selected) independent unit request. Requests may be addressed, in general, to other independent units or, more often, to one of the system dependent units, which respond to the request appropriately.

The operational structure of the RDP enables it to perform efficiently a variety of real-time general-purpose aerospace computational tasks:

a. *Main Core Memory of 16K full-words*, each full word containing 24 bits.
b. *Half-word oriented addressing scheme* to provide flexibility in half-word operations.
c. *Word-oriented system-wide data transfer* (24-bit word) for maximum hardware efficiency. (Memory and I/O locations are addressable and alterable by half-word, word, or double-word quantities.)
d. *Machine cycle time of 0.25 $\mu$s* for rapid execution.
e. *Selective memory write protection* for program instruction and constant security.
f. *Eight 24-bit general purpose registers* or GPRs (replacing specialized registers such as index registers, accumulators, M/Q registers, and data registers) to reduce program size and increase processor speed. Three GRPs are used as index registers, in addition to their general functions.
g. *Four 24-bit working registers* (WRs) to contain the following registers in program-addressable locations.
  * Program location counter register
  * Interval timer register
  * Priority-Decoder Interrupt indicator register
  * Interrupt mask bit register
h. *Dual-addressing of GPRs and WRs* so that all memory-addressing instructions (with or without address modification) can perform register-to-register operations for added programming power.
i. *Fast access local store* containing frequently used mathematical subroutines.
j. *Direct addressing of 2048, 24-bit words* (ranging over entire read/write scratchpad memory) without the need for indexing or indirect addressing to facilitate operations involving constants and data stored in memory.
k. *Instruction address modification* via indexing alone, multilevel indirect addressing alone, or multilevel indirect addressing with pre-and/or post-indexing at each level.
l. *Immediate data-storing instructions* for greater storage efficiency and increased speed.
m. *Automatic error condition checking* for arithmetic and shift overflows, division by zero, and illegal write addresses. Detection of any of these conditions triggers an interrupt that passes control to a user-written recovery routine. At the user's option, error conditions may be ignored by masking off selected interrupts.
n. *Three-state condition code* (less than, equal to, greater than zero) for complete six-condition branching flexibility; set by most load, arithmetic, logical, and shift instructions.
o. *Power transient sensing and program shut-down* capability via hardware interrupt.
p. *Program monitoring via watchdog timing logic and interrupt* to provide program error detection and recovery capability.
q. I/O interrupts to indicate status of I/O operations and to provide I/O system control.
r. *Complete, powerful instruction set*, including
  * Half-word and full-word instructions
  * Half-word, parallel half-word, word, and double-word arithmetic operations
  * Multiple register transfer instructions
  * Complete set of logical operations (And, Exclusive and Inclusive Or, One's and Two's Complement)
  * Comparison operations
  * Shift operations: right, left, and circular-single or double word — arithmetic or logical; single word normalize
  * Branch addressing ranging over main memory directly without need for address modification
  * Extensive register-to-register instruction subset Programming the RDP involves some understanding of its data structures and storage allocation, the basic processing elements, its instruction types and address computation techniques, and the operation of its interrupt system. The details of organization and operations that are commonly required to program most efficiently may be grouped into four major areas: data formats and storage allocation; processor; instruction formats and instruction address formation; and interrupt system.

Referring first to data formats, data in RDP system can be represented as full-word, half-word, or double-word elements. The appropriate formats are presented below, followed by a discussion of data information boundaries.

*Full-Word* — The basic data element in the RDP is a 24-bit word. Bit positions within a word are numbered 0 through 23 as follows, and bit position 0 is reserved for the sign (S).

*Half-Word* — An RDP 24-bit word can be divided into 12-bit half-words. Bit positions are numbered 0 through 11 for both half-words; the left half-word has an even system-address, and the right half-word has the next higher odd system-address. Again, bit positions numbered 0 are reserved for the sign (S).

The left and right half-words may be unrelated; however, together they may form a *parallel half-word* operand, and two arithmetic operations may be performed concurrently using two pairs of parallel operands.

*Double-Word* — Two RDP words can be combined to form a 47-bit double word. Bit positions are numbered 0–23 for the most significant half plus sign in bit position 0, and 24–46 for the least significant half. Bit position 47, the least significant bit of the second word (normally numbered 23) is not used, i.e., in double-word operations, the contents of Bit 47 are unpredictable.

Data in any length format can be either arithmetic or non-arithmetic. Whenever aritmetic data are stored in the RDP, the fractional two's complement number system is used with the sign bit appearing in the positions numbered 0 in each data format. In a fractional data representation scheme, data values can range only from −1 to +1. The binary point is understood to be located immediately after the sign bit.

The system has certain restrictions to the positioning of data items relative to the full-word storage location boundaries. Basically, data item boundaries must align with full-word boundaries. The restriction reflects the full-word data fetching by the processor; whenever a half-word quantity is required, the full-word containing it is accessed and the processor retains the required half-word. These restrictions are not a serious inconvenience since data types are usually grouped together for maximum storage allocation efficiency.

The RDP system-wide address structure facilitates modularity, flexibility, and instruction set effectiveness by providing each storage location with an address on a common address continuum. Basically, all storage locations have a system address, whether they are physically in the processor, main memory or input/output system. Further, storage locations external to the computer system can be assigned and referenced by system addresses, requiring only that these locations are provided with an interface connection to the main bus. Up to 8,389,000 full-words (16.8 M half-words) locations can be referenced. Access to this wide range of storage locations is accomplished through the use of a 24-bit system address, which is transmitted over the 24-bit bus also used for parallel data transmission.

Figure 23:
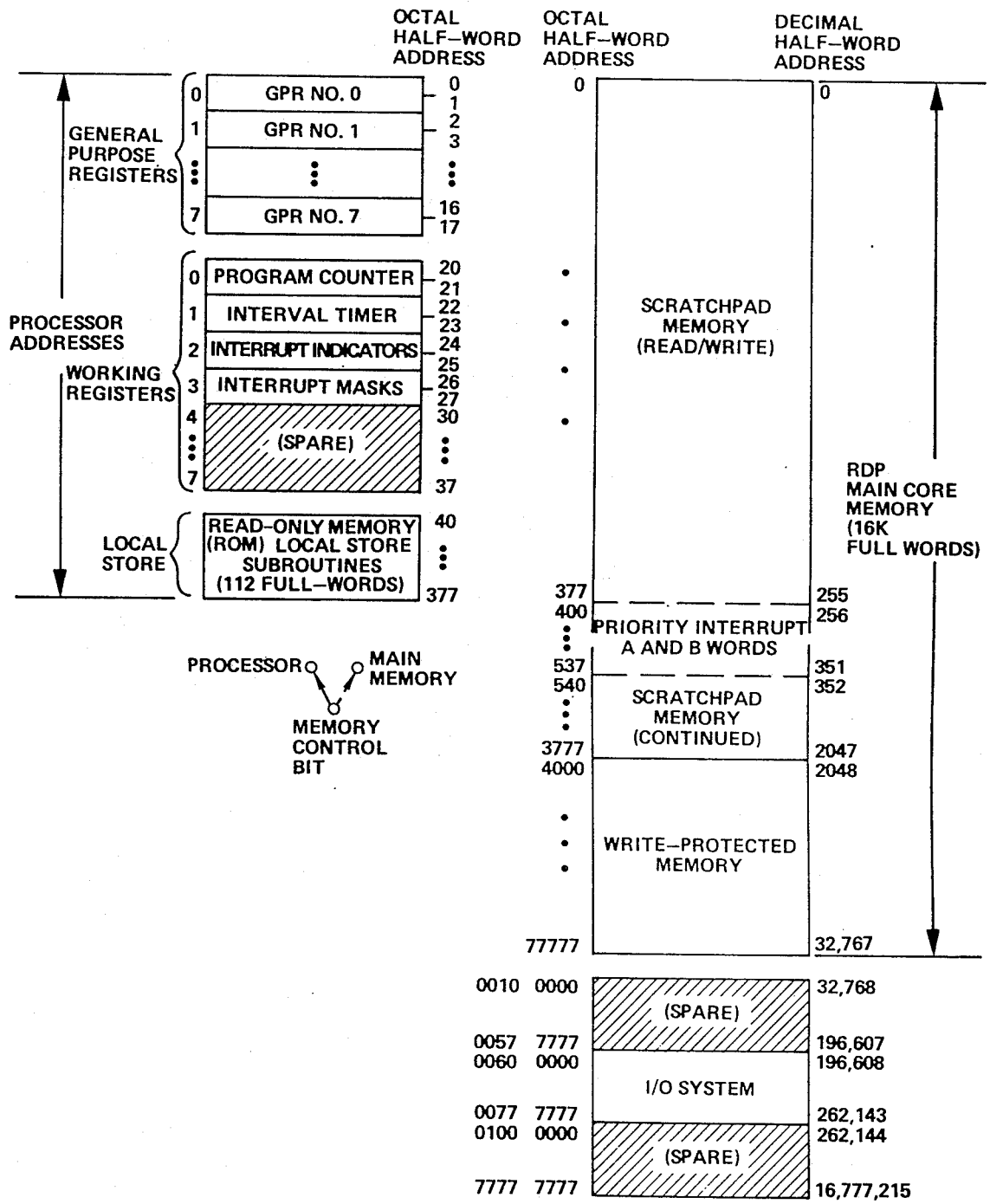
FIG. 23 illustrates the storage allocation assignments for the RDP of FIG. 22.

FIG. 23 contains the RDP storage allocation assignments. Because of the half-word instruction and data word capabilities, RDP addresses are expressed in half-words. The first 256 addresses (octal locations 0–377) reference the general purpose registers, working registers, and local store locations. Although the processor registers also have short, three-bit addresses normally used in instruction words the auxiliary system address allows instructions which nominally utilize an operand in memory to also specify one in a processor register; this capability enhances the power of the instruction set since, for example, an exchange of two registers can be accomplished by the same instruction used to exchange the contents of a register with those of a memory cell.

The RDP processor can, however, be operated in a mode where the first 256 addresses reference main memory locations instead of processor locations; in this case read or write requests with addresses in this range are sent out over the main bus rather than satisfied within the processor. In FIG. 23, the first 256 main memory half-word locations can (only) be referenced in this mode. Special control instructions (SCP and SCM) are used to change processor addressing modes and thereby lock or unlock this block of privileged memory cells.

The rest of the main memory locations in FIG. 23 are addressable in either processing mode. They are partitioned into read/write scratch pad and read only parts, by the memory interface logic; an attempted write into the read only portion is denied and an interrupt transmitted to the processor. Note that part of the scratch pad has been dedicated to the storage of interrupt information.

The I/O system addresses in FIG. 23 are disjointed from, and numerically higher than, those of the processor and main memory. Many of the potential I/O addresses are spares.

Figure 24:
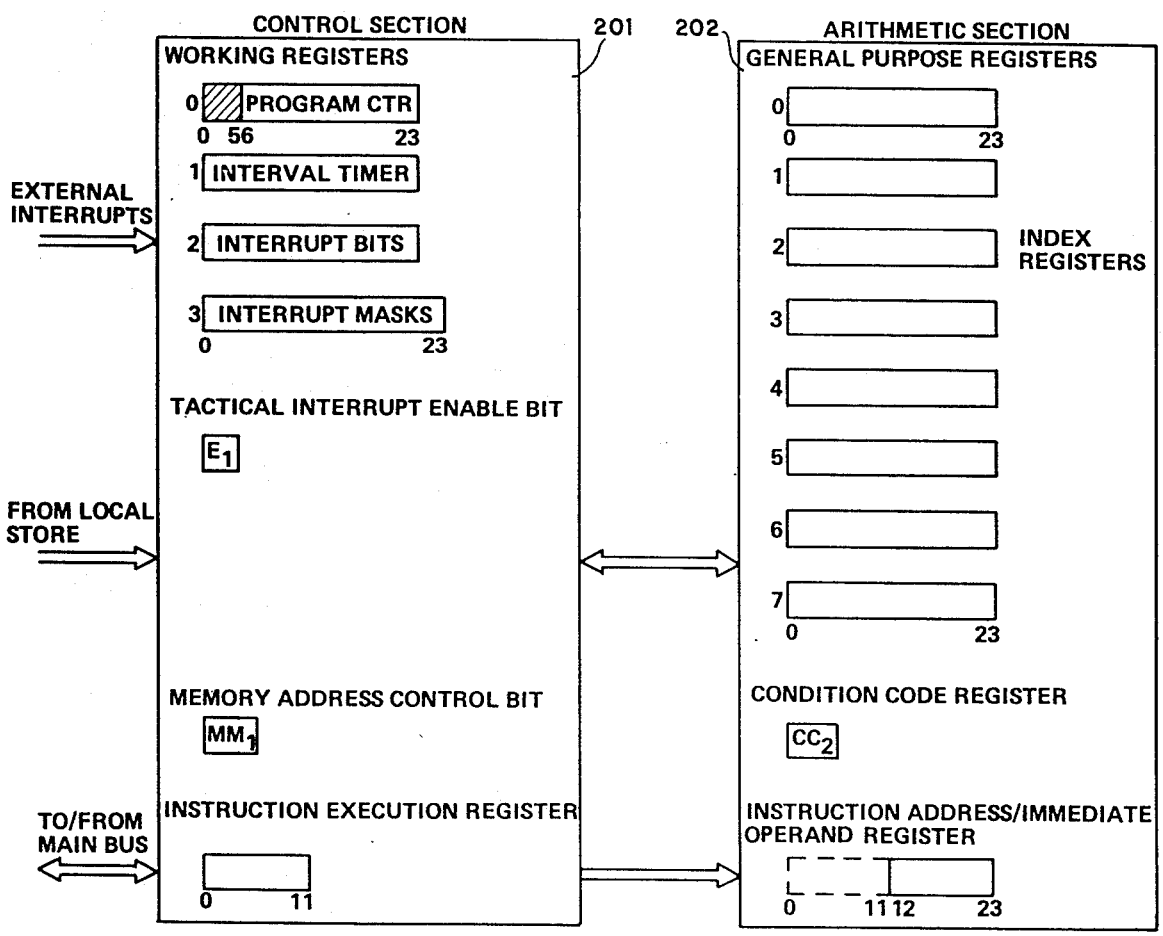
FIG. 24 illustrates schematically the working registers of the RDP of FIG. 22.

The RDP contains certain basic storage elements whose contents or state are directly affected by the program instructions. These elements are discussed below and are depicted in FIG. 24.

The control section 201 is composed of four working registers, control bits used for enabling the tactical interrupts and controlling low-order memory address references, and the instruction execution register — plus other logic necessary to fetch instructions and operands as well as sequence the processor unit.

Each working register is dedicated to a specific function:
- Program Instruction Register (Working Register 0) that is functionally 18 bits in length. It is used to hold the address of the instruction currently being executed.
- Interval Timer Counter (Working Register 1) that contains a 24-bit count of clock timing pulses. Both the timing pulse frequency and effective count size (within 24 bits) have wire-wrap options.
- Interrupt Indicator Register (Working Register 2) that contains the set of priority-ordered interrupt indicators. Bit position 0 corresponds to the highest priority indicator; lower priority indicators are assigned to increasing higher numbered bit positions.
- Interrupt Indicator Mask Register (Working Register 3) that contains the mask bit corresponding to the interrupt indicator register in the same relative bit position.

The instruction execution register contains either the left-most half of full-word instructions or entire half-word instructions. Normally, it received instructions from the processor look-ahead unit (not shown) and not directly from storage.

The arithmetic section 202 consists of eight 24-bit general purpose registers, a 2-bit condition code register, a 24-bit instruction address/operand register — as well as an adder, auxiliary processor register, and the necessary gating and logic to execute instructions and perform address modifications.

A subset of the general purpose registers, registers 1 through 3, may be used as index registers. Otherwise, they are used exactly as the others; i.e., as accumulators, temporary data storage locations, fast-access storage for short instruction sequences, etc. Address indexing is accomplished by adding the index register contents to the instruction immediate address, that is obtained from the instruction address/operand register.

The 2-bit condition code register $CC_2$ indicates the magnitude relative to zero (less than, equal, or greater than) of a particular data item; complete conditional branching is achieved through interrogation of this register. Thus if a branch or non-equality is desired, it will be allowed if the condition code register is in either the less than or greater than state. The allowed states of the condition code register are defined below.

In addition to the foregoing storage elements, there is a special 112-word block of fast access read-only memory designed to hold ROM subroutines.

As in most digital data processing systems, the RDP consists of a set of hardware units than can operate concurrently and that time-share a central communication bus. This organization provides a modular structure that allows the RDP to be tailored to application requirements to be easily augmented if the system needs upgrading during its life span. The modular organization also provides executional speed advantages. For example, operations such as an analog-to-digital conversion, a multiplexed digital output, an arithmetic instruction, and a fetch to memory of the next instruction can all be in progress concurrently.

As a result of this organization, however, the execution time for each individual instruction as well as for entire program segments is affected by several factors that are as follows. The value of each address (computed from the instruction address field, index register contents, and indirect address words) determines which unit contains the desired operand. Each unit in general has a unique access time. Since each unit possesses a fixed priority for bus cycles, the time required to secure the bus depends upon the concurrent requests from the other units. Once bus usage is secured, the time required to process the request depends on the requested unit's status; if concurrently busy, the request must be repeated when the unit is again idle. The previous program instructions and the corresponding system events affect the status of the next instruction lookahead process. This proces determines the actual instruction fetch time delays and also makes memory cycle requests concurrent with normal instruction execution. To aid in the preparation of RDP programs, typical execution time ranges for each instruction are given in Appendix A which sets forth a table of the RDP instruction set.

The RDP interval timer (working register 1 also known as "real-time clock") consists of a 24-bit binary counter that is automatically incremented by unity at the selected rate. The interval timer can be consulted and also set to any desired value by the program. Whenever the interval timer register overflows, an interrupt indicator is set. This device is primarily a means for imposing accurately determined time limits without requiring programmed clock watching.

Associated with the interval timer is some special logic known as the "watchdog timer." This logic monitors the time elapsing since the occurrence of the last interval, the logic generates an overriding (catastrophic) interrupt to indicate that a program error has occurred.

The interval timer is implemented as one of the RDP working registers, since it possesses both a 3-bit working register address and a syste-wide address. Thus, the register count can be "read" via any Load instruction and altered with a Store, Add-to-Memory (ATM), Exchange (X), Selective clear-to-working registers (CSW), or Or-to-Working Register (OW) instruction. The preferred technique for resetting the timer to overflow periodically is to execute an ATM instruction whose system "memory" address is that of the timer register. The two's complement of the period to be timed, measured in counter timing pulses, is the quantity to be added. The number of pulses elapsing since the last overflow is already contained by the timer; therefore, when the period complement is added a clock overflow will occur as desired. Resetting in this manner is error proof; if a timing pulse occurs during the ATM instruction execution, its increment is automatically delayed until the completion of the instruction execution.

The occurrence of an interval timer overflow enables the watchdog logic. This logic is disabled (turned off) by any program alteration of the timer contents. If no such "timer maintenance" is performed before $2^{12}$ clock pulses are generated, the timer register will overflow into bit position 11. When this occurs, the watchdog interval has elapsed and a watchdog interrupt is triggered (i.e., the watchdog timer interrupt indicator bit in WR2 is set). The watchdog interval is approximately 33 milliseconds ($2^{12}$ pulses X 8 microseconds per pulse). Note that the execution of an ATM instruction, primarily to reset the interval timer, will also reset the watchdog logic.

There are 92 different RDP instructions. The instructions utilize 13 format types; these are presented in FIG. 25. Here, R is used to denote a general purpose register via a 2 or 3-bit processor address; superscripts are used to indicate the usage by the instruction of the register. An asterisk (*) is used to denote the indirect addressing flag, indicated by a 1 in bit position zero whenever this option is desired. The letter $m$ is used to denote an instruction immediate address field; if neither indexing nor indirect address modification is utilized, this address becomes the instruction's final effective or global effective address. The letters $y$ and $l$ denote 12-bit or 3-bit immediate data operands, respectively; they are treated as signed, two's complement numbers where the sign bit occupies the most significant (leftmost) bit position within the operand field. Additional instruction format notation is explained in the figure.

The RDP instruction formats are of two basic types — half-word and full-word — that differ in their memory storage requirements. Most half-word format instructions (except the AGE instruction) involve operations that affect registers or control bits located within the Processor and utilize the short processor addresses for these purposes. Full-word format instructions typically affect a general purpose register and can also form system-wide addresses for operands as well. The specific formats are discussed briefly below.

Half-word instructions are used whenever possible since they require half the storage and execute more quickly than an equivalent full-word instruction. The RDP employs four half-word instruction formats: (1) RR (Register-to-Register) used by half-word instructions involving two general purpose registers, (2) RO (Register Operation) used by half-word instructions involving one general purpose register, (3) CO (Control Operation) used by half-word instructions that alter control bit states, (4) AGE (Aerospace Ground Equipment) used exclusively by the AGE instruction.

Full-word instructions provide system-wide addressing capability and maximum operation versatility. Though usually employed to reference memory or I/O system operands, they can also be used to advantage as powerful general purpose register instructions, referencing the registers via their system addresses. Nine full-word formats are used as follows:

1. RM (Register Memory) — Used by instructions involving a general purpose register and an operand stored anywhere within the system.
2. LA (Long Address) — Used by three branching instructions to directly address the total memory system.
3. BC (Branch Conditionally) — Used by six conditional branch instructions to directly address the total memory system.
4. MM (Multiple Memory) — Used by multiple-word data transfer instructions.
5. IA (Immediate Operand) — used by 3-bit immediate-operand storage instructions.
6. IY (Immediate Operand) — Used by 12-bit immediate-operand storage instructions.
7. SH (Shift) — Used by most shifting instructions.
8. BIT (Built-in Test) — Used exclusively by the BIT instruction.
9. LCW (Load Control Word) — Used exclusively by the LCW instruction.

The address modification facilities of the RDP are extremely powerful; direct addressing, indexed addressing, multilevel indirect addressing, and multilevel indirect addressing with indexing are all available. The complete range of system-wide addresses (8.4 million words) can be formed by any indexed address; indirect addresses include, without indexing, over 131,072 words. Each form of address modification is discussed below. All addresses extend to the half-word level.

Three terms are used in connection with RDP instruction address formation: (1) immediate address — the address contained within an instruction or indirect address operand address field; (2) local effective address — the address formed, at any addressing level, by the sum of an immediate address and the contents of an index register, if specified; and (3) effective or global effective address — the final address determined by the instruction address modification process. In the case of direct addressing, the immediate address becomes both the instruction's local and global effective address. This address has a range of 2048 full words for most memory addressing instructions; branch instructions directly range over 16,384 full words.

Most memory-addressing instructions may specify an index register, designated as $R^x$, whose contents will be added to its immediate address to form the instruction's global effective address. Such an address is 24 bits in length and can range over 8.4 million words. General purpose registers 1, 2 or 3 may be designated as an index register via the corresponding 2-bit binary address. (An address value of 00 indicates that indexing is not desired; thus, general purpose register 0 cannot be used as an index register.)

Indirect address formation is specified by setting the indirect address flag bit (bit position 0 denoted in an instruction format by as asterisk) to one. In this case, the instruction's local effective address locates or points to an indirect address operand word stored within the appropriate addressing range. The contents of this word appear in the following format:

| * $R^x$ | E | CC | m |
|---|---|---|---|
| 0 1 2 | 3 | 4 5 | 6 7 8 9 10 11 12 13 14 15 16 17 18 19 20 21 22 |

Here, the fields of bit positions 1, 2 and bit positions 6–23 for $R^x$ and $m$ respectively have the same meaning as in instruction formats. The CC and E fields (bit positions 4, 5 and bit position 3, respectively) are used during system interrupts to store the processor condition code and tactical interrupt enable status. In indirect addressing, the CC and E fields are not interpreted, unless the instruction is a B, BCT, or BAL instruction. In this case, the CC field is examined and if it contains zeros, no CC or E change is made. If the CC field is non-zero, then the CC register is set to the state corresponding to the CC field value and the Tactical Interrupt (TI) flipflop set to the value of the E field.

The interpretation of the local effective address depends upon the state of the indirect address word flag bit; it is set to one, the indirect address operand's local effective address points to a second indirect addressing level. Succeeding indirect address levels are processed until an operand whose flag bit is set to zero has been fetched. The local effective address of this final operand becomes the instruction's global effective address.

Indexing can be employed at any level of indirect addressing — either in forming the indirect operand's address (pre-indexing) or in forming that operand's local effective address (post-indexing). When post indexing is used, an addressing range of 8.4 million words results; if not, the addressing range becomes 131,072 words.

Subroutines normally are entered by executing a Branch and Link (BAL) instruction, which places the calling program's return address in one of the first four general purpose registers (0 through 3). If registers 1 through 3 are used, a return from the subroutine can be accomplished through either indexing or indirect addressing techniques; if register 0 is specified, indirect addressing must be used. See the BAL instruction description in for specific calling sequences.

The RDP allows for a maximum of 24 interrupts, with hardware priority decoding and nesting. Interrupt signals set individual bits (called interrupt indicators) that are subsequently cleared by the programmer. Each interrupt signal consists of either a DC level or a pulse of at least 1 μs duration. Interrupt indicator bits may also be set directly by the program, a capability useful in executive control routines and system test modes.

The indicator bits are retained in the Interrupt Indicator Register (Working Register 2). The highest priority indicator is located in the register's sign bit position, and the others are located in succeeding bit positions in order of decreasing priority. Each interrupt, with the sole exception of the watchdog timer interrupt, can be selectively masked or unmasked via a mask bit in the associated interrupt mask register (Working Register 3). The mask bits in Working Register 3 correspond, bit position by bit position, to the interrupt indicator bits in Working Register 2.

The RDP interrupts are divided into two classes: catastrophic and tactical. Catastrophic interrupts have inherently higher priority than tactical interrupts, though each system interrupt possesses a unique priority level. The following table illustrates the current RDP interrupt system configuration. Three standard catastrophic interrupts are indicated. In order of decreasing priority, these are watchdog timer (unmaskable), power on, and power transient detection. In addition, a spare catastrophic interrupt indicator is available if needed later.

| INTERRUPT PRIORITY | BIT POSITIONS | FUNCTION | CLASS |
|---|---|---|---|
| 0 | 0 | Watchdog Timer | Catastrophic |
| 1 | 1 | -Spare- | Catastrophic |
| 2 | 2 | Power On | Catastrophic |
| 3 | 3 | Power Transient | Catastrophic |
| 4 | 4 | Arithmetic Anomaly | Tactical |
| 5 | 5 | Illegal Write Request | Tactical |
| 6 | 6 | Interval Timer Overflow | Tactical |
| 7 | 7 | -Spare- | Tactical |
| 8 | 8 | MRM Launch Command | Tactical |
| 9 | 9 | Processing Pulse | Tactical |
| 10 | 10 | -Spare- | Tactical |
| 11 | 11 | -Spare- | Tactical |
| 12 | 12 | RSP (039) Crowbar Fired | Tactical |
| 13 | 13 | RSP (041) Crowbar Fired | Tactical |
| 14 | 14 | A/D/A Conversion Complete | Tactical |
| 15 | 15 | RSP Data Transmission Complete | Tactical |
| 16 | 16 | RDP Multiplexer Transmission Complete | Tactical |
| 17 | 17 | CCC MUX Transmission Complete | Tactical |
| 18 | 18 | -Spare- | Tactical |
| 19 | 19 | RDP MUX Data Error | Tactical |
| 20 | 20 | -Spare- | Tactical |
| 21 | 21 | -Spare- | Tactical |
| 22 | 22 | -Spare- | Tactical |
| 23 | 23 | -Spare- | Tactical |

Priority Interrupt Assignments

Each interrupt level has a unique priority assignment and two dedicated full-word memory locations.

All other system interrupts (up to 20) are classified as tactical interrupts. Three are standard: arithmetic anomaly, illegal write request, and interval timer overflow. Interrupts required by the tactical application are added to these. As illustrated in the figure they include interrupts from I/O system modules indicating the completion of I/O data transmission tasks and interrupts originating externally in other avionic subsystems or computer system control panel.

The program exerts control over the interrupt system in three basic ways:
1. At each interrupt level, the interrupt mask bit can be set or reset, thereby affecting the system response to a set indicator.
2. All interrupts are temporarily disarmed for the two instruction execution times following a DSIM (Disable Interrupts Momentarily) instruction. These interrupts are also disarmed temporarily following the alteration of any working register contents by the system.
3. The tactical interrupts as a class can, at any time, be enabled or disabled via the ENT (Enable Tacticals) and DST (Disable Tacticals) instructions. These instructions set and reset a processor control bit. Upon interrupt recognition, the status of this bit is saved (to be restored following the interrupt subroutine execution) and is automatically set to the disable position.

Two memory cells, the interrupt's A and B words, are associated with each interrupt level. An interrupt's A word contains the 18-bit address (right justified in the 24-bit memory word) of the first instruction in the subroutine servicing that interrupt. It's B word provides storage space for an indirect address operand word, which is packed by the control unit at the time of interrupt recognition. It retains the interrupted program's resume location in the operand's address field, and the condition code register and tactical interrupt flip-flop status before the interrupt in the operand's CC and E fields, respectively. The A and B words are located sequentially in memory, and the A word has the lower numerical address.

RDP interrupt recognition is contingent upon various factors that are functions of external signals, program-set control bits, and the processor status. Catastrophic interrupt recognition differs only in that the tactical enabled condition is not required.

An interrupt level becomes set upon receipt of (1) an external interrupt sign or (2) an equivalent program initiated action. While the first such action results in setting the interrupt indicator bit, subsequent interrupts cannot be retained until the bit has been reset. When the tactical interrupts are disabled, none will be recognized even if all other conditions have been met. However, interrupt signals can be accepted and remembered in the disabled state. In the tactical interrupt enabled state, recognition becomes a function of individual interrupt level indicator and mask bits, and the processor state. Interrupt signals are accepted and remembered.

When an interrupt level is masked, a set indicator, if present, is not permitted to cause an interrupt. As before, interrupt signals are accepted and remembered. In the unmasked state (assuming also the enabled state) an interrupt level is effectively in a waiting state. Whenever an interrupt signal at this level is received, it will immediately be considered for recognition by the processor.

A set interrupt indicator, currently unmasked and enabled, is recognized by the processor when: (1) the interrupt system is armed, (2) the processor is between program instruction sequences, and (3) the interrupt has the highest priority among all interrupts with the same status. The processor then executes an interrupt control sequence, described in the next topic, and branches to the interrupt servicing subroutine. The interrupted program location, together with the status of the processor's condition code and tactical enable bit, are stored in the dedicated memory word. If use of general purpose or working registers is required by the interrupt subroutine, their current contents should first be saved and subsequently restored as required by the subroutine. An interrupt indicator bit, once set, is reset by the program; usually by the interrupt-servicing subroutine.

During the execution of an interrupt routine, the tactical enable control bit may be set by an ENT instruction. This action permits the interrupt-servicing subroutine itself to be interrupted by another tactical interrupt, if one is present that meets the other criteria. Thus the urgent portions of an interrupt can be processed first without delay and the remaining portions completed only when other interrupts (selectable through masking) have been recognized.

Programmed interrupt indicator setting can be used to advantage in certain forms of executive program control. For example, tactical interrupt levels can be assigned to each of the avionic program iteration rates, with the higher rate routines given higher priorities. An executive routine, controlled by a periodic interrupt, sets program interrupt indicators as the appropriate iteration rate; following its completion, control is passed to avionic programs in order of their relative urgency.

During the execution of tactical programs, errors may occur that either result in the generation of an unrepresentable operand (as with an arithmetic overflow) or in a program hang-up. Since such occurrences can be a function of variables obtained from the I/O system, or of a spurious noise signal, they may not be detectable before their actual appearances in real time. The RDP system provides hardware detection of several such executional errors and subsequently sets an appropriate interrupt indicator bit.

If the RDP program enters an infinite loop or halts unexpectedly, control is regained via a catastrophic watchdog interrupt. This (unmaskable) interrupt is generated by special logic associated with an interval timer clock; see "Use of the Interval Timer" for further details in its operation. The exact interval elapsing between the occurrence of the error and the generation of the watchdog interrupt is subject to variation, though in most cases it will be less than the interval timer capacity.

Several arithmetic anomalies may occur that result in the setting of a tactical interrupt indicator. These anomalies occur when an operation result cannot be represented correctly as a fractional two's complement number, i.e., in the range $(-1)$ through $(+1 - 2^{-23})$, inclusively. Three specific anomalies are detected by the RDP processor; (1) overflows resulting from an addition or subtraction instructions, (2) saturated quotients resulting from any division instruction involving a dividend whose absolute value exceeds that of the divisor, or equals the divisor if the dividend and divisor are likesigned, and (3) overflows resulting from a left-shift operation in which the operand's sign bit value was changed during the shift. In all cases, the condition code register value after the anomaly is interpreted as follows.

| CC1 | CC2 | MEANING |
|-----|-----|---------|
| 0 | 1 | Result after overflow is negative |
| 1 | 0 | Result after overflow is zero |
| 1 | 1 | Result after overflow is positive |

Note that overflow singularities resulting from two's complement absolute value, or multiply instructions are not detected. These result when $(-1)$ is used as the operand or operands.

If a write request (resulting from a store, exchange, or add to a memory instruction) is generated that addresses a read-only memory cell, it is detected by the memory addressing circuits that in turn set an interrupt indicator. The write request is not allowed.

If the processor attempts to execute a non-existent instruction (i.e., one with a non-used op code combination), an effective no-operation is performed. This condition is not formally detected, and the next program instruction is then executed.

The RDP input-output system interfaces directly or indirectly within the processor via the main bus system of the computer as noted hereinbefore with reference to FIG. 21.

RDP I/O operations are accomplished in either of two modes: direct mode or buffered mode. Direct mode I/O, which is under complete program control, involves the transmission of data items directly between the I/O system and one of the eight general purpose processor registers. Generally, one program instruction is required for each data item transfer.

Buffered mode I/O is accomplished by one of the I/O special units 221–223 in FIG. 22 independently of the processor unit operation once an I/O transaction has been initiated. I/O transactions can be accomplished either by the execution of the PCW instruction or by an externally generated start command. Each transaction may involve a variable number of data items. The status of a transaction can be determined by the execution of an LCW instruction that addresses the I/O control unit in charge of the transaction, except in the case of specially designed control units whose status cannot be sampled. The functioning of the I/O units are described in detail, but first the I/O system address formats and the definitions of various control parameters appearing in thse formats are presented.

Input-output operations, either direct or buffered modes, involve the transmittal of address words to I/O units. In addition, a controlled word is usually required by the special units during buffered mode operation. The two I/O system address formats that apply to both I/O modes are given here. The formal definition of all I/O system control parameters as used in address words or control words is also included.

The RDP system addressing philosophy is to provide unique addresses for all I/O registers and memory locations. As such, an I bit (number 6) in the address structure separates I/O addresses from memory addresses. (I=0 for all memory addresses and I=1 for all non-memory addresses including the control words).

The two basic I/O address formats and the main memory address format for reference are given in Appendix A. One address is used for dependent I/O units (such as channel controllers) and the other for independent units 221-223. The positions and required states of various control parameters are shown. Control bit state combinations other than those given are undefined and thus result in illegal system addresses. In all addresses the first four bits numbers 0-3) are reserved for system-wide addressing whenever more than one computer system is connected. These bits will be 0000 for all local addresses in the RDP application.

The control bit C (number 4) is set to 1 for all control word addresses and to 0 for non-control word addresses such as the memory and other dependent unit addresses.

Various I/O control parameters are required to designate the proper response to an I/O request. The values of the particular control parameters required in a data transmission are specified in the address or control word transmitted to the I/O unit over the address/data bus. Those I/O control parameters that are used in one or more of the standard RDP I/O formats are defined in Appendix A. Most control parameters are used either in address words or control words (not both) and apply to only those formats in which they are specified.

There are three I/O address word formats — the main memory address format, the dependent unit address format, and the independent unit address format.

Because of the system-wide nature of addressing in the RDP architecture, all instructions that can form an effective address specifying 18 or more of the 24-bit full system address can reference locations in the I/O system. Fully 38 of the 92 instructions in the RDP instruction set have this capability. Specifically, they are the instructions that utilize the RM, MM, LA, and IA instruction formats. Thus, no special I/O instructions are required to perform direct mode I/O operations. The instructions that can reference an operand in the I/O system are as follows.

| \  | MEMORY-REFERENCING INSTRUCTIONS | | |
|---|---|---|---|
| Instruction | Name | Instruction | Name |
| (Input) | | (Arithmetic) | |
| L | Load | A | Add |
| LH | Load Half | AH | Add Half |
| LE | Load Right | AD | Add Double |
| LD | Load Double | AP | Add Parallel |
| LM | Load Multiple | AIM | Add Immediate to Memory |
| (Output) | | S | Subtract |
| ST | Store | SH | Subtract Half |
| STH | Store Half | SD | Subtract Double |
| STR | Store Right | SP | Subtract Parallel |
| STD | Store Double | M | Multiply |
| STM | Store Multiple | MH | Multiply Half |
| STI | Store Immediate | MT | Multiply Truncated |
| STHT | Store Half Immediate | D | Divide |
| (Logic) | | (Miscellaneous) | |
| N | AND | | |
| O | OR | B | Branch Unconditional |
| E | Exclusive OR | BAL | Branch and Link |
| C | Compare | BCT | Branch on Count |
| CB | Compare Bits | X | Exchange |
| CH | Compare Half | PCW | Place Control Word |

Most of the direct mode I/O operations probably will be accomplished by those data transfer instructions listed under input and output. These instructions are executed exactly as when a memory location is specified; the I/O system location involved is selected by the instruction effective address. The condition code register is also set or not set just as before.

To perform input and output data operations directly between the RDP arithmetic and control unit and the I/O system, the effective address must be generated and transmitted on the address/data bus in the format (1) given below:

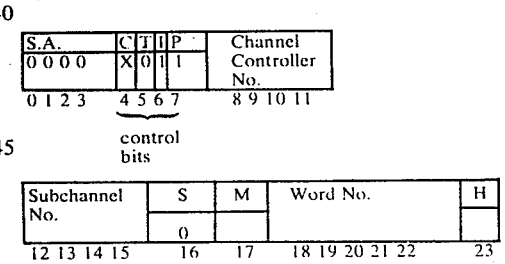

where
S.A. = a "global" system address. Always 0 for RDP.
C = Control Bit C=1 for control word addresses C=0 for non-control word addresses such as the memory.
T = Terminate bit. Not used in RDP.
I=1 Indicates an address outside main memory I=0 for all memory addresses.
P=1 Indicates a Channel Controller and not a special dependent unit (none in RDP) address.
CC No. = Channel Controller number. Since there is only one in the RDP, it is always 0.
S/C No. = Subchannel number. For the A/D/A converter, S/C = 0 and for both the DI and DO modules S/C = 1.
S = Spare. Always 0.
M = AI mode bit. Always 0 for AO's, DI's and DO's.
Word No. = Word Number.

H = Least significant address bit H = 0 for AI's and AO's H = 1 for DI's and DO's.

The address in format (1) can be formed in one of three ways: indexing, indirect addressing, or both. In indexing, one of three general purpose registers (No. 1, 2 or 3) would be loaded with an address operand directly in format (1) before execution of the actual I/O instruction. The effective address computed for the I/O instruction would be the sum of the index register contents and the instructions 12-bit immediate address field (right adjusted). The immediate address ranges over the I/O subchannel address, subchannel word number, and half-word address bit.

If an indirect addressing chain is used to form the effective I/O address, each indirect address operand obeys the standard format. As usual, indexing may be employed at any intermediate level if desired.

If a combination or indirect addressing and indexing is used, the indirect address operand is defined. Note (1) above; it can be formed using either indirect addressing, indexing or both.

The AI's and AO's exist in virtual (I/O) memory as left half-words, each with sign and 11 bits of significance. An AI can be requested with any instruction for which the processor issues a read request (except ATM and AIM). Similarly, an AO can be set with any instruction for which the processor issues a write request. As indicated in the first paragraphs of this discussion, AI's and AO's will be addressed by first loading $R^2$ and then executing the appropriate instruction with indirect addressing to (UNK3), i.e.,

| L.I. 2 (operation) | Y (UNK3) |
| --- | --- |

The value of Y required for the various situations is shown below.

|  | 12 13 S/C Number | 14 | 15 | 16 S | 17 M | 18 19 20 Word Number | 21 | 22 | 23 H |
| --- | --- | --- | --- | --- | --- | --- | --- | --- | --- |
| Indirect AI (No Wait) | → 0 0 | 0 | 0 | 0 | 0 | X X X | X | X | 0 |
| Direct AI (~50µs Wait) | → 0 0 | 0 | 0 | 0 | 1 | X X X | X | X | 0 |
| AO | → 0 0 | 0 | 0 | 0 | 0 | X X X | X | X | 0 | that if an instruction uses (UNK3) as an indirect address operand, the final effective I/O address is the arithmetic sum of bits 6–23 of (UNK3) concatenated with six leading zeros, and the 24-bit contents of the specified index register (non-zero, 2-bit address in the X-field of the following format (2).

| | 0 | 1 | 2 | 3 4 5 6 7 8 | ... | 23 |
| --- | --- | --- | --- | --- | --- | --- |
| (UNK3) = | 0 | | X 10 | 0 0 0 1 1 0 | ... | 0 | where $R^x$ is specified as a post index. Thus, if $R^x$ is loaded via an LI instruction, where the immediate field is the desired S/C No., M, Word No., and H bits, an indirect operation using (UNK3) will result in the correct address generation. Note that indexing is mandatory when using (UNK3). No restrictions need be placed on the index register or indirect address operand contents (any control bit or address field can be altered), but care should be exercised to insure that a legal I/O address results with all possible values of the parameters used.

The Channel Controller 224 of FIG. 22 is one of two dependent units in the RDP system, the other being the main memory. The Channel Controller services three subchannel (S/C) units 225, 226 and 227. The processor can communicate directly with the Channel Controller with any instruction that can specify indirect addressing. The input and output data associated with the Channel Controller can be thought of as existing in a "virtual" memory, with each word of data having a unique (system) address. To obtain input data (DI or AI), the processor would typically execute a load type instruction with an effective address outside of main memory and equal to the address of the particular input word desired. To set output data (DO or AO), the processor would typically execute a store type instruction with again the proper effective address. The general format of the 24-bit address required to address the Channel Controller in the RDP is shown in format The S/C and Word Number addresses for AI's and AO's are not mutually exclusive; the decision to do an input or output is determined by the Channel Controller from the message type lines (read request or write request, respectively) which are set by the processor from the instruction type. The logic permits expansion to 31 AI's and 32 AO's, but currently there are about 20 AI's and 9 AO's. AI 00000 is specifically reserved for 0 volts (ground) for internal use. Full-word load instruction AI requests will result in zeros in the right half of the destination GPR. For full-word stores AO transmittals, the output data must be in the left half of the source GPR.

AI requests may be in one of two forms: Indirect or Direct conversions, depending on the state of bit 17 in the address. If bit 17 is 0, the AI data returned to the main bus and the processor are the result from the prior conversion request, after which a new conversion is initiated for the AI addressed. The purpose for the Indirect capability is to eliminate the loss of processor time resulting from the AI conversion time. To request a specific AI, therefore, requires two indirect type of load instructions. The first AI instruction requests the desired AI when the returned data are ignored. After an ADA completion, a second AI instruction retrieves the desired data. If a round robbin sequence of AI requests were to be executed, i.e., if each AI request addresses the next AI desired, only one instruction per AI (after the first) would be required.

The other AI option is the direct conversion for which bit 17=1. The data returned for a direct request are for the AI addressed by the instruction; however, the processor is stopped until the conversion is completed. The direct instruction requires ~50 microseconds. On indirect AI sequences, the program should normally wait for an ADA interrupt before issuing another AI instruction. It is strongly recommended that programmers do not stack I/O and that, before every AI or AO transactions, they check the ADA completion indicator (w2, bit 14) or otherwise ascertain that a known adequate time period has elapsed since the last transaction.

Important statistics for AI's and AO's are summarized below.

|  | Conversion Time | Word Size | Voltage Range | Resolution |
|---|---|---|---|---|
| AI's | ~50μs | 11 bits + sign | ± 10 V | 5 mv |
| AO's | ~66μs | 11 bits + sign | ± 10 V | 5 mv |

The DI's and DO's exist in virtual (I/O) memory as right half-words. They can be addressed by any of the memory-referencing instructions listed above (except ATM, AIM, and those under Miscellaneous), especially those listed under Input (for DI's) and those listed under Output (for DO's). The addressing will be accomplished by first loading $R^2$ and then by using (UNK3) as described earlier. The virtual memory picture for the DI's and DO's, and the value of Y required for each word, is shown in the following table.

| "Virtual" Memory | | Subchannel | | | S | Value of Y | | | Word No. | | | H |
|---|---|---|---|---|---|---|---|---|---|---|---|---|
| 0  11 | 12 23 | 12 13 | 14 | 15 | 16 | 17 | 18 | 19 | 20 | 21 | 22 | 23 |
| 0 0 0 0 | WD0 0 | 0 0 | 0 | 1 | 0 | 0 | 0 | 0 | 0 | 0 | 0 | 1 |
| 0 0 0 0 | WD1 0 | 0 0 | 0 | 1 | 0 | 0 | 0 | 0 | 0 | 0 | 1 | 1 |
| 0 0 0 0 | WD2 0 | 0 0 | 0 | 1 | 0 | 0 | 0 | 0 | 0 | 1 | 0 | 1 |
| 0 0 0 0 | WD3 0 | 0 0 | 0 | 1 | 0 | 0 | 0 | 0 | 0 | 1 | 1 | 1 |
| 0 0 0 0 | WD4 0 | 0 0 | 0 | 1 | 0 | 0 | 0 | 0 | 1 | 0 | 0 | 1 |
| 0 0 0 0 | WD5 0 | 0 0 | 0 | 1 | 0 | 0 | 0 | 0 | 1 | 0 | 1 | 1 |
| 0 0 0 0 | WD6 0 | 0 0 | 0 | 1 | 0 | 0 | 0 | 0 | 1 | 1 | 0 | 1 |
| 0 0 0 0 | WD7 0 | 0 0 | 0 | 1 | 0 | 0 | 0 | 0 | 1 | 1 | 1 | 1 |

Note that the addresses for DI's and DO's are *identical* for a given word number because the processor interprets, and informs the Channel Controller, that loads and other memory read type instructions are DI requests and that store type instructions are DO transmittals.

Full-word load instruction DI requests *will* result in zeros in the left-half of the destination GPR, and for full-word store DO transmittals, the desired bit pattern must be in the *right* half of the source GPR.

The three independent I/O units 221, 222 and 223 of FIG. 21 are assigned numbers as shown below. The numbers listed correspond to B in PCW, LCW instruction descriptions.

| Unit | Number | Code Name |
|---|---|---|
| 222 | 1 | CMUX |
| 223 | 2 | PMUX |
| 221 | 3 | 041 Special |

The program control capabilites are as follows:

| Code Name | PCW Initiate Command | LCW Status | LCW Terminate |
|---|---|---|---|
| CMUX | No | Yes | No |
| PMUX | Yes | Yes | No |
| 041 Special | No | No | No |

Thus, the CMUX and 041 Special are self-starting by signals received external to the RDP. The program has no terminate capabilities over the three units and *no* status monitoring capabilities over the 041 Special.

All the special units operate in the *full-word* transmission mode only, although some of the data have only 16 bits of significance. All three units provide interrupt signals to the RDP as follows.

| Code Name | Message Completion Interrupt | Message Error Interrupt |
|---|---|---|
| CMUX | Interrupt 17 | Interrupt 18 (Not wired) |
| PMUX | Interrupt 16 | Interrupt 19 |
| 041 Special | Interrupt 15 | No |

The CCC Multiplex Terminal 222 operates as the interface between the CCC data bus and the RDP main Bus. It is slaved to the Central Control Computer (CCC) as reqards message initiation but acts as an independent unit on the RDP Main Bus. The CCC is not to be confused with the processor unit 200. The CCC is an independent ship board computer. The terminal will receive or transmit data in blocks. Every message is preceded by a specified select word from the foregoing table, issued from the CCC over one of two redundant party line busses.

| data/Command | Control Field | | T/R | Word Count | | | Parity |
|---|---|---|---|---|---|---|---|
| 4 | 8 | 9 | 10 | 11 | 12 | 13 | 14 15 16 |
| 1 | 0 | 0 | 0 | 1 | 0 | 0 | 0 1 0 |
| 0 | 0 | 0 | 1 | 1 | 1 | 0 | 1 1 0 |
| 0 | 0 | 1 | 0 | 1 | 0 | 0 | 1 1 1 |
| 0 | 0 | 1 | 1 | 1 | 0 | 1 | 0 0 1 |
| 0 | 1 | 0 | 0 | 0 | 1 | 0 | 0 0 0 |
| 0 | 1 | 0 | 1 | 0 | 0 | 0 | 0 1 0 |

The unit address in bit positions 0—3 is 1010 in all cases as there is only one multiplexer, and the first 3-bit position of the control field is always zero. The maximum length of message is 15 words, each word containing 16 bits plus a parity bit. In the RDP memory, the 16 bits will be MSB aligned (bit zero) and will always contain trailing zeros (bits 16 to 23). The parity bit is used only by the terminal and does not appear in the RDP memory.

Once the unit begins to receive or send a data word or a select word, that word is carried to completion (all 17 bits). After a select word is received and recognized, the terminal is committed to the message length prescribed, except under the following conditions:
1. Loss of clock on the bus in use
2. Inability to perform a data transfer with the RDP memory within five microseconds
3. In receive mode, the absence of the first bit of an expected data word.

An invalid select word (invalid or data drop-out) is ignored by the terminal. An invalid received data word, with the exception of a data drop-out in the first bit, is noted as being bad and *not stored* in the RDP memory. In other words, if any word of a message is invalid, that word will not be updated, but all other words that were valid will be.

With this scheme the CCC has the capability of updating any contiguous group of data in any message by providing the proper starting address (no necessarily the full message count) and sending any number (up to that count) of data words.

The word address for data in memory is composed of a fixed and a variable part, the variable part being the message code contained in the select-word and the word-counter value. The word counter decrements from the original select-word count to obtain memory addresses. Consequently, data words are stored or read in decreasing address fashion, proceeding from the first (largest address) sequentially to the last (word address one).

Messages are limited to 15 words maximum and addresses are allocated in 16-word blocks to permit the sixteenth word (address zero) to be used as a validity tag. In this address scheme there will be unused addresses in some block since all messages will not necessarily contain 15 words. The fixed parts of the word addresses are set by jumpering at the base plate.

The message code in the instruction tells which message is currently active, or was most recently active. The word count is the current word pointer. At the termination of a message, the last LCW word is stored in address zero of the message block as the validity tag. It also remains available as an LCW word until the next select word arrives. If the message was terminated properly, the word count in the tag word and final LCW word will be zero. If the message was improperly terminated (i.e., loss of clock on bus in use, inability to access RDP main bus, or absence of first bit of received data), then the word count in the tag word and final LCW word is the value at message termination. If input data have bad parities or data drop outs (except in first bit), then the invalid bit is set to 1 and remains at 1 for the remainder of the message, including the tag word. In this case the data are not stored, but the message transaction continues. An interrupt indicator (W2, bit 17) is set = 1 whenever a message terminates.

The RSP Special receives data from the RSP's interface data assembler (IDA). The RSP Special receives the data as 30 half-words which it packs into 15 full-words and transmits to main memory locations 767–753 (full-word 752 is a spare). At the completion of the transaction the RSP Special sets its completion interrupt indicator (W2, bit 15) = 1.

The program has no PCW or LCW capabilities with this unit. The BIT instruction is the only control function available to software over the operation of this unit. Details of the message structure can be found in other documents.

The RSP multiplexer performs two major functions in the tactical mode: 1) receives a fixed block length message from the INS and stores it in main memory, and 2) fetches message blocks from main memory and transmits them to the RSP Special unit. Once a transaction is initiated by the program, the PMUX performs its tasks independently of the processor. The program cannot terminate a transaction once it is initiated.

A fixed block of main memory has been assigned for PMUX messages. The block can be thought of as consisting of eight sub-blocks of 16 full-words each, for a total of 128 full-words. Each sub-block is associated with a possible PMUX transaction.

APPENDIX A

Instruction Set

The Instruction Set consists of 92 instructions. Each instruction is described individually. The instruction descriptions make use of a common notation to describe the various instruction format fields and the hardware registers. This notation is summarized in the following table.

A — Normally designates a 12-bit immediate address (certain branch instructions do provide a 15-bit address)
B — I/O Control Unit
I — Immediate Data (3 bits; signed 2-bit integer)
K — Count (3 bits or 6 bits)
O — Mnemonic op code
$R^a$ — General purpose register used as a destination register ($0 \leq a \leq 7$)
$R^x$ — General purpose register used as a source register ($0 \leq x \leq 3$)
$R^x$ — General purpose register used as an index register ($1 \leq x \leq 3$)
$R_{AGE}$ — Designates the AGE control register
$R_{BIT}$ — Designates the set of distributed BIT flip-flops
$W^a$ — Working register used as a destination register ($0 \leq a \leq 3$)
Y — Immediate data (12 bits; signed 11-bit integer)
* — Indirect address flag The instruction descriptions themselves are grouped by function for convenient reference. The seven functional groups are listed below.

| Functional Group | Number Instructions |
| --- | --- |
| Data Transfer | 17 |
| Arithmetic | 28 |
| Logic | 19 |
| Shift | 9 |
| Branch | 9 |
| Processor Control | 8 |
| Input/Output (I/IO) Control | 2 |
| | 92 |

RDP instruction is described in terms of 11 items in a systematic format; this format and the notation used to define it are as follows:

MNEMONIC[1] INSTRUCTION NAME[2] SYMBOLIC
INSTRUCTION                                              SYNTAX[3]
            INSTRUCTION         [4]
            FORMAT
0 1 2 3 ...                           n
USAGE[5]
OPERATION[6]

-continued

EFFECTIVE IMMEDIATE OPERAND⁽⁷⁾
INDICATORS⁽⁸⁾
EFFECTIVE ADDRESS⁽⁹⁾
TIMING⁽¹⁰⁾
EXAMPLE⁽¹¹⁾

Where:
1. MNEMONIC is the symbolic op code name.
2. INSTRUCTION NAME is the instruction's descriptive title.
3. SYMBOLIC INSTRUCTION SYNTAX is the form of the in-instruction's symbolic representation. The notation defined for expressing three symbolic representations is given in the foregoing table. Required syntax items are underlined, whereas optional items are not. The meaning of the symbolic in-instruction syntax is illustrated below.

| SYNTAX: | O,R$^a$ | *A,R$^x$ |
|---|---|---|
| SYMBOLIC INSTRUCTION: | A,1 | TEMP,2 |

In the above symbolic instruction example: A is a mnemonic op code meaning add memory to register; 1 specifies R$^1$ as the register to be incremented; TEMP is a symbolic address; 2 specifies R$^2$ as the index register whose contents are needed to TEMP to give the effective address.

4. INSTRUCTION FORMAT illustrates the particular format used by the instruction. Additional notation used to designate in-instruction format fields is given in the foregoing table.
5. USAGE is a functional description of the instruction actions, oriented to convey an intuitive feeling for its utilization.
6. OPERATION is a specific description of the detailed sequence of actions that the instruction initiates.
7. EFFECTIVE IMMEDIATE OPERAND describes the formation of immediate operands from immediate data instruction fields. (This item is defined for immediate instruction only.)
8. INDICATORS describes the setting of any indicators as a result of the execution of the instruction. Usually the indicators thus affected will be either the condition code register or one of the interrupt indicator register bits.
9. EFFECTIVE ADDRESS describes the options (if any) that may be used in forming the instruction's final operand address.
10. TIMING provides a range of nominal execution times (in microseconds) to be expected. The range limits are given, corresponding to the cases of no instruction look-ahead benefit (the longer time) and of complete look-ahead benefit (the shorter time). In general, the actual execution time may be between these limits at increments of 0.25 $\mu$s. For those instructions capable of indirect addressing, the nominal timing penalty per addressing level is also given. In determining the timing values, the following assumptions were made:
   a. No bus cycle conflicts occur; add 0.25 $\mu$s per conflict
   b. No memory cycle conflicts occur; add 0.75 to 1.5 $\mu$s per conflict
   c. Operands and instructions are located in the main memory; for local processor locations, subtract 0.5 $\mu$s
   d. The memory cycle time is 1.5 $\mu$s
11. EXAMPLE: For some instructions, one or more examples are given to illustrate the instruction's operation. Where included, they are intended to help explain the action of the instruction and not necessarily to demonstrate their full capability.

DATA TRANSFER INSTRUCTIONS

Data transfer instructions operate on double-word (48-bit), full-word (24-bit), or half-word (12-bit) data fields. Load instructions load information into a data field of one or more of the eight general purpose registers. These instructions do not alter the information source location contents; however, all load instructions set the condition code register, thereby providing the following information about the information loaded into the affected general purpose register.

| Condition Code Setting, bit | | Data Field Value |
|---|---|---|
| 1 | 2 | |
| 0 | 1 | Negative |
| 1 | 0 | Zero |
| 1 | 1 | Positive |

Store instructions alter only that portion of the storage location contents that correspond in length and position to the information field specified by the store instruction. These instructions do not set the condition code register and do not affect the contents of the data item source location — unless this location happens also to be referenced by the instruction effective address.

The exchange instruction performs both a load and store operation, setting the condition code register by the data word loaded from the storage location specified by the effective address.

| L | — Load | O,R$^a$ | *A,R$^x$ |
|---|---|---|---|
| * R$^x$ | 00 | R$^a$ | Address (2048 full-words) |
| 0 1 2 3 4 5 6 7 8 9 10 11 12 13 14 15 16 17 18 19 20 21 22 23 | | | |

USAGE

Load register loads one of the eight general purpose registers with the contents of the effective address. The effective address is not restricted to the main memory, and may be used to load from an I/O address, another general purpose register, or any other valid system address.

OPERATION

The contents of the computed effective address are loaded into general purpose register R$^a$. The contents of the source of the data are not disturbed.

INDICATORS

The condition code register is set by the data loaded into general purpose register R$^a$.

EFFECTIVE ADDRESS

Indirect addressing and indexing may be specified. A full 24-bit word is accessed. The least significant bit of effective address is not decoded.

TIMING, μs

| Indirect Address, μs/level | Look-Ahead Status Complete | None |
|---|---|---|
| 1.5 | 2.0 | 3.5 |
| LG — Load from Register | O,R$^a$ | R$^c$ |

| R$^c$ | 01 | R$^a$ |
|---|---|---|
| 0 1 2 3 4 5 6 7 8 9 10 11 | | |

USAGE

Load from Register is used to transfer the contents of one general purpose register to another.

OPERATION

The contents of a general purpose register R$^c$ are read nondestructively and stored in R$^a$.

INDICATORS

The condition code register is set to reflect the condition of the transferred data. Note that R$^a$ and R$^c$ may be the same register.

TIMING, μs

| | Look-Ahead Status Complete | None |
|---|---|---|
| | 0.50 | 1.50 |
| LH — Load Half | O,R$^a$ | *A,R$^x$ |

| * R$^x$ | 02 | R$^a$ | Address (4096 half-words) |
|---|---|---|---|
| 0 1 2 3 4 5 6 7 8 9 10 11 12 13 14 15 16 17 18 19 20 21 22 23 | | | |

USAGE

Load Half is used the same Load, with Load,with the exception that a 12-bit half-word operand is loaded into the left half of the designated general purpose register. As in Load, the operand may come from core memory, another general purpose register, an I/O unit, or any other addressable data storage locations.

OPERATION

The half-word specified by the computed effective address is transferred to the left half of the register, R$_l^a$. The right half of the register, R$_r^a$, , is cleared to all zero's. The source of the data is unaltered.

INDICATORS

The data loaded into R$_l^a$ set the condition code register.

EFFECTIVE ADDRESS

Indexing or multiple level indirect addressing with indexing at any level may be utilized to access the half-word operand. The least significant bit of the computed effective address can be thought of as pointing to the left (0) or right (1) half of a full word.

TIMING, μs

| Indirect Address μs/level | Look-Ahead Status Complete | None |
|---|---|---|
| | 1.5 | 2.0 | 3.5 |
| LHG — Load Half from Register | O,R$^a$ | R$^c$ |

| R$^c$ | 03 | R$^a$ |
|---|---|---|
| 0 1 2 3 4 5 6 7 8 9 10 11 | | |

USAGE

Load Half from Register is a short instruction used to transfer only the left half (most significant 12 bits) of one general purpose register to another. The right half of the destination register is cleared to all zero's.

OPERATION

The contents of R$_l^c$ are loaded into R$_l^a$. R$_r^a$ is set to zero. R$^c$ is unchanged.

INDICATORS

The transferred data set the condition code register. Note that R$^a$ and R$^c$ may be the same GPR, thus clearing its right half while setting the condition code.

TIMING, μs

| | Look-Ahead Status Complete | None |
|---|---|---|
| | 0.5 | 1.5 |
| LR — Load Right | O,R$^a$ | *A,R$^x$ |

| * R$^x$ | 05 | R$^a$ | Address (4096 half-words) |
|---|---|---|---|
| 0 1 2 3 4 5 6 7 8 9 10 11 12 13 14 15 16 17 18 19 20 21 22 23 | | | |

USAGE

Load Right is used to load a 12-bit left or right half-word operand into the *right half* of the designated general purpose register. The half-word operand may come from main memory, a general purpose register, or any other addressable location.

OPERATOR

The half-word specified by the computed effective address is transferred to the right half of the register, R$_r^a$. The left half of the register, R$_l^a$, is cleared to all zero's.

INDICATORS

The data loaded into R$_r^a$ sets the condition code register.

EFFECTIVE ADDRESS

Indexing or indirect addressing may be utilized to access the half-word operand. The least significant bit of the computed effective address (which is not decoded for instructions referencing full-word operands) indicates either the left (0) or right (1) half of a full-word memory location.

TIMING, μs

| | Indirect Address μs/level | Look-Ahead Status | |
|---|---|---|---|
| | | Complete | None |
| LD — Load Double | 1.5 | 2.0 O,R$^a$ | 3.5 *A,R$^x$ |

| *R$^x$ | 06 | R$^a$ | Address (2048 double-word pair) |
|---|---|---|---|
| 0 1 2 3 4 5 6 7 8 9 10 11 12 13 14 15 16 17 18 19 20 21 22 23 | | | |

USAGE

Load Double places two successive full-words into two successive general purpose registers and is particularly useful for double precision arithmetic. It is not redundant with the Load Multiple instruction, since the complete operand address modification capabilities are available.

OPERATION

The full-word contents of the effective address and the full-word contents of the succeeding locations are loaded into R$^a$ and R$^{(a+1)}$ mod 8, respectively.

INDICATORS

The arithmetic condition of the word transferred into R$^a$ sets the condition code register.

EFFECTIVE ADDRESS

Indexing and indirect addressing are allowed and two 24-bit words are fetched. The least significant bit of the computed effective address is not decoded.

TIMING, μs

| | Indirect Address, μs/level | Look-Ahead Status | |
|---|---|---|---|
| | | Complete | None |
| | 1.5 | 4.5 | 6.0 |

EXAMPLE 1: LD,3 ABC

| | Before Execution | After Execution |
|---|---|---|
| (ABC) | '00000000' | '00000000' |
| (ABC+2) | '01234567' | '01234567' |
| (R$^3$) | XXXXXXXX | '00000000' |
| (R$^4$) | XXXXXXXX | '01234567' |
| (CC) | XX | 10 |
| (DEF) | '01234567' | '01234567' |
| (DEF+2) | '00000000' | '00000000' |
| (R$^7$) | XXXXXXXX | '01234567' |
| (R$^0$) | XXXXXXXX | '00000000' |
| (CC) | XX | 11 |

| LM — Load Multiple | | | O,R$^a$,K *A |
|---|---|---|---|
| K | 04 | R$^a$ | Address (2048 full-words) |
| 0 1 2 3 4 5 6 7 8 9 10 11 12 13 14 15 16 17 18 19 20 21 22 23 | | | |

USAGE

Load Multiple causes a sequential set of full data words to be loaded into a sequential set of general purpose registers. The set of data words need not come only from main memory.

OPERATION

General purpose register R$^a$ is loaded with the contents of the location specified by the effective address. R$^{(a+1)}$ mod 8 is loaded from the effective address +2 (half-words). This process continues sequentially, until K general purpose registers have been loaded. (Should K = 0, all eight general purpose registers will be loaded as described above.)

INDICATORS

The condition code register is set by the word loaded into R$^{(a+1)}$ mod 8.

EFFECTIVE ADDRESS

Indirect addressing is unconditional and is always used to compute the effective address. Indexing may be specified at any level, except the first, of multilevel indirect address operations.

TIMING, μs

| | Indirect Address, μs/level | Look-Ahead Status | |
|---|---|---|---|
| | | Complete | None |
| LI — Load Immediate | 1.5 | (2.0)K O,R$^a$ | (2.0)K+1.5 Y |

| 0 | 24 | R$^a$ | Immediate Operand |
|---|---|---|---|
| 0 1 2 3 4 5 6 7 8 9 10 11 12 13 14 15 16 17 18 19 20 21 22 23 | | | |

USAGE

The Load Immediate instruction can be used to rapidly load certain constants into a general purpose register without the need for a separate operand location, since the operand is stored in the instruction itself. For example, a full register can be loaded with an index value in the range of integers $-2048 \leq$ integer value $\leq 2047$, or a fractional value in the range $-2^{-12} \leq$ fractional value $\leq 2^{-12}-2^{-23}$. If the intent of the programmer is to load a constant into the right-hand half-word, the integer range remains the same and the fractional range is $-1 \leq$ fractional value $\leq 1-2^{-12}$. Note that in the latter case, the left-hand word is set to either all zero's or all ones.

OPERATION

The effective immediate operand is loaded into register R$^a$.

INDICATORS

The data loaded into R$^a$ set the condition code register.

EFFECTIVE IMMEDIATE OPERAND

Bits 12 through 23 of the effective immediate operand are taken directly from the IMMEDIATE OPERAND field of the LI instruction. Bits 0 through 11 of the effective immediate operand are set equal to bit 12 of the IMMEDIATE OPERAND (i.e., the sign bit of the IMMEDIATE OPERAND half-word is extended).

TIMING, μs

| | Look-Ahead Status | |
|---|---|---|
| | Complete | None |
| LHI — Load Half Immediate | 0.5 O,R$^a$ | 1.5 Y |

| 2 | 24 | R$^a$ | Immediate Operand |
|---|---|---|---|

-continued

| Look-Ahead Status | |
|---|---|
| Complete | None |

0 1 2 3 4 5 6 7 8 9 10 11 12 13 14 15 16 17 18 19 20 21 22 23

USAGE

Load Half Immediate is used to load a constant into the left-hand half-word of a general purpose register. The right-hand half-word is set to all zero's.

OPERATION

The 12-bit IMMEDIATE OPERAND field of the instruction is transferred to $R_l{}^a$. $R_r{}^a$ is set to zero.

INDICATORS

The condition code register is set according to the constant loaded into $R_l{}^a$.

TIMING, $\mu s$

| | Look-Ahead Status | |
|---|---|---|
| | Complete | None |
| ST — Store | 0.5 | 1.5 |
| | | O,$R^a$   *A,$R^r$ |
| * $R^r$    10 | $R^a$ | Address (2048 full-words) |

0 1 2 3 4 5 6 7 8 9 10 11 12 13 14 15 16 17 18 19 20 21 22 23

USAGE

The Store instruction stores the contents of one of the eight general purpose registers into the effective address. While typically used to store a general purpose register into main memory, this instruction may be used to transfer a general purpose register to any addressable location in the system. Similarly to Load, Store may be used to index or indirectly address the destination of a register-to-register transfer. However, as opposed to Load, the condition code register is not set.

OPERATION

The contents of general purpose register $R^a$ are stored in the location specified by the computed effective address. The contents of $R^a$ are not distributed by the transfer.

INDICATORS

None

EFFECTIVE ADDRESS

Indirect addressing and indexing may be specified to compute the effective address. A full 24-bit word is transferred. The least significant bit (half-word pointer) of the computed effective address is not decoded.

TIMING, $\mu s$

| | Indirect Address, $\mu s$/level | Look-Ahead Status | |
|---|---|---|---|
| | | Complete | None |
| STH — Store Half | 1.5 | 1.5 | 3.25 |
| | | | O,$R^a$ *A,$R^r$ |
| * $R^r$    12 | $R^a$ | Address (4096 half-words) | |

-continued

| | Look-Ahead Status | |
|---|---|---|
| Indirect Address, $\mu s$/level | Complete | None |

0 1 2 3 4 5 6 7 8 9 10 11 12 13 14 15 16 17 18 19 20 21 22 23

USAGE

Store Half is used as Store, except that a 12-bit half-word operand from the *left half* of the designated general purpose register is stored into the effective address location. As in Store, the destination of the operand is not restricted to main memory.

OPERATION

The data in the left half of the register, $R_l{}^a$, are stored in the half-word specified by the computed effective address. The other half of the corresponding full-word is not changed. The contents of $R_l{}^a$ and $R_r{}^a$ remain the same. (Exception: When the effective half-word is in a working register, the contents of $R_r{}^a$ will also be stored in the WR's remaining half-word, i.e., the half-word which was not addressed by the instruction.)

INDICATORS

None.

EFFECTIVE ADDRESS

Indexing or multiple level indirect addressing with indexing at any level may be utilized to reference the half-word storage location. The least significant bit of the effective address specifies the left (0) or right (1) half of the full-word storage location.

TIMING, $\mu s$

| | Indirect Address, $\mu s$/level | Look-Ahead Status | |
|---|---|---|---|
| | | Complete | None |
| STR — Store Right | 1.5 | 1.5 | 3.25 |
| | | | O,$R^a$ *A,$R^r$ |
| * $R^r$   15 | $R^a$ | Address (4096 half-words) | |

0 1 2 3 4 5 6 7 8 9 10 11 12 13 14 15 16 17 18 19 20 21 22 23

USAGE

Store Right is used to store the right half of a designated general purpose register into a 12-bit half-word storage location. The storage location may be in main memory, another general purpose register, or any other addressable location.

OPERATION

The contents of $R_r{}^a$ are stored into the half-word storage location specified by the computed effective address. The contents of $R^a$ and of the half-word adjacent to the selected storage location remain unchanged. (Exception: When the effective half-word is in a working register, the contents of $R_l{}^a$ will also be stored in the WR's remaining half-word, i.e., the half-word which was not addressed by the instruction.)

INDICATORS

None.

EFFECTIVE ADDRESS

Indexing or indirect addressing may be utilized in forming the effective address. The least significant bit of the computed effective address indicates either the left (0) or right (1) half of a full-word storage location.

TIMING, μs

| | Indirect Address μs/level | Look-Ahead Status | |
|---|---|---|---|
| | | Complete | None |
| STD — Store Double | 1.5 | 1.5 O,R$^a$ | 3.25 *A,R$^r$ |

| * R$^r$ | 16 | R$^a$ | Address (2048 double-word pair) |
|---|---|---|---|
| 0 1 2 3 4 5 6 7 8 9 | 10 11 12 13 | 14 15 | 16 17 18 19 20 21 22 23 |

USAGE

Store Double takes the contents of two successive general purpose registers and places them in two successive full-word storage locations. It is particularly useful for double precision arithmetic.

OPERATION

The full word contents of R$^a$ and R$^{(a+1)}$ mod 8 are stored in effective address and the effective address +2, respectively.

INDICATORS

None

EFFECTIVE ADDRESS

Indexing and indirect addressing are allowed and two 24-bit words are stored. The least significant bit of the instruction computed effective address is ignored.

TIMING, μs

| | Indirect Address, μs/level | Look-Ahead Status | |
|---|---|---|---|
| | | Complete | None |
| STM — Store Multiple | 1.5 | 3.5 O,R$^a$,K | 5.25 *A |

| K | 14 | R$^a$ | Address (2048 full-words) |
|---|---|---|---|
| 0 1 2 3 4 5 6 7 8 9 | 10 11 12 13 | 14 15 | 16 17 18 19 20 21 22 23 |

USAGE

Store Multiple causes a sequence of full data words to be transferred from a sequential subset of general purpose registers to a sequence of storage locations. The sequence of storage locations need not be in main memory.

OPERATION

The location specified by the computer effective address is loaded with the contents of R$^a$. The succeeding full-word storage location is loaded with the contents of R$^{(a+1) \mod 8}$. This process continues, sequentially, until K general purpose registers have been stored into K successive storage locations. (Should K = 0, all eight general purpose registers will be stored.)

INDICATORS

None.

EFFECTIVE ADDRESS

Indirect addressing is unconditional and is *always* used to compute the STM effective address. Indexing may be specified at any level of multilevel indirect address operations, except the first.

TIMING, μs

| | Indirect Address, μs/level | Look-Ahead Status | |
|---|---|---|---|
| | | Complete | None |
| STI — Store Immediate | 1.5 | (1.5)K O,I | (1.5) K+1.0 K=8; Use 14.5μs *A,R$^r$ |

| * R$^r$ | 11 | 1 | Address (2048 full-words) |
|---|---|---|---|
| 0 1 2 3 4 5 6 7 8 9 | 10 11 12 13 | 14 15 | 16 17 18 19 20 21 22 23 |

USAGE

The Store Immediate instruction can be used to store one of eight constants (including zero) into a full-word storage location without the need for a separate data source, since the data are stored in the instruction itself. For example, a full-word storage location can be loaded with an index value in the range of integers −4 ≤ integer value ≤ 3. STI serves as a generalized store zero instruction for full-word data cells.

OPERATION

The effective immediate operand is stored in the effective address full-word.

EFFECTIVE IMMEDIATE OPERAND

Bits 22 and 23 of the effective immediate operand are copies from bits 10 and 11, respectively, of the IMMEDIATE OPERAND field of the STI instruction. Bits 0 through 21 are duplicates of bit 9 of the IMMEDIATE OPERAND (i.e., the sign bit of the IMMEDIATE OPERAND field is extended).

INDICATORS

None.

EFFECTIVE ADDRESS

Indexing and indirect addressing may be specified. A full-word storage location is specified. The least significant bit of the instruction computed effective address is ignored.

TIMING, μs

| | Look-Ahead Status | |
|---|---|---|
| | Complete | None |
| STHI — Store Halfword Immediate | 1.5 O,I | 3.25 *A,R$^r$ |

| * R$^r$ | 13 | 1 | Address (4096 half-words) |
|---|---|---|---|
| 0 1 2 3 4 5 6 7 8 9 | 10 11 12 13 | 14 15 | 16 17 18 19 20 21 22 23 |

USAGE

Store Halfword Immediate is used to load one of eight constants (including zero) into a right or left hand half of a full-word storage location without disturbing the other half. A half-word can be loaded with an index value in the range of integers −4 ≤ integer value ≤ 3

STHI serves as a generalized store zero instruction for halfword data cells.

OPERATION

The effective immediate operand is stored in the effective address half-word. The other half of the corresponding full word is not effected. (Exception: When the effective half-word is in a working register, the contents of the other half of the WR are affected in an unpredictable manner.)

EFFECTIVE IMMEDIATE OPERAND

The least significant 2 bits are copied directly from bits 10 and 11 of the immediate operand. The most significant 10 bits (including the sign bit) are duplicates of bit 9 of the immediate operand field (i.e., the sign bit is extended).

INDICATORS

None.

EFFECTIVE ADDRESS

Indexing and indirect addressing may be utilized to compute the half-word storage effective address.

TIMING, μs

| | Look-Ahead Status | |
|---|---|---|
| | Complete | None |
| | 1.5 | 3.25 |

X — Exchange Register and Memory     O,R$^a$     *A,R$^r$

| * R$^r$ | 07 | R$^a$ | Address (2048 full-words) |
|---|---|---|---|

0 1 2 3 4 5 6 7 8 9 10 11 12 13 14 15 16 17 18 19 20 21 22 23

USAGE

The Exchange Register and Memory instruction can exchange the contents of a specified general purpose register with those of a full-word storage location in main memory.

OPERATION

The contents of the computed effective address location are read into a full-word buffer register; the contents of general purpose register R$^a$ are then stored in the location specified by the effective address, followed by loading R$^a$ from the buffer register.

INDICATORS

The condition code register is set by the data loaded into R$^a$.

EFFECTIVE ADDRESS

Indexing and indirect addressing are allowed. The least significant bit of the instruction address field and any indirect address operand address fields are ignored.

TIMING, μs

| Indirect Address, μs/level | Look-Ahead Status | |
|---|---|---|
| | Complete | None |
| 1.5 | 3.5 | 5.50 |

This arithmetic instruction set performs fixed-point arithmetic in the fractional two's complement number system. The first operand with the exception of the Add Immediate Memory is located in one of the eight general purpose registers, while the second operand may be located in main memory, local store, the instruction immediate operand field, another (or the same) general purpose register, or generally in any valid system addressable storage location. All arithmetic instructions set the condition code register with the results of the operation, thus the following information is provided.

| Condition Code 1 | Setting, bits 2 | Result Value |
|---|---|---|
| 0 | 1 | Negative |
| 1 | 0 | Zero |
| 1 | 1 | Positive |

In addition, if an arithmetic overflow occurs or a division by zero is attempted, bit 4 of the interrupt indicator register (working register 2) is set to signify that an arithmetic anomaly has occured. This interrupt indicator is maskable under program control.

A — Add     O,R$^a$     *A,R$^r$

| * R$^r$ | 40 | R$^a$ | Address (2096 full-words) |
|---|---|---|---|

0 1 2 3 4 5 6 7 8 9 10 11 12 13 14 15 16 17 18 19 20 21 22 23

USAGE

Add is used to form the two's complement sum (standard binary arithmetic) of a storage location and a general purpose register and store the sum in that same register.

OPERATION

The contents of R$^a$ are replaced by the sum of the full-word contents of the global effective address and the previous contents of R$^a$. Thus, while the addend in memory is preserved, the general purpose register augend is replaced by the sum.

INDICATORS

An overflow condition sets the arithmetic anomalies indicator in the interrupt indicator register to a logical 1. The condition code register is set by the sum.

EFFECTIVE ADDRESS

Indexing and multilevel indirect addressing are allowed. A full 24-bit operand is accessed and the least significant bit (bit 23) of the global effective address is not decoded.

TIMING, μs

| Indirect Address, μs/level | Look-Ahead Status | |
|---|---|---|
| | Complete | None |
| 1.5 | 2.0 | 3.5 |
| AG — Add Register | O,R$^a$ | R$^r$ |

| R$^r$ | 41 | R$^a$ |
|---|---|---|

0 1 2 3 4 5 6 7 8 9 10 11

USAGE

Add Register is used to rapidly add the contents of two general purpose registers.

OPERATION

The augend in $R^a$ is replaced by the sum of itself and the addend in $R^c$. $R^c$ is left unchanged.

INDICATORS

The arithmetic anomalies indicator is set if an overflow occurs. The sum, which appears in $R^a$, sets the condition code registers.

TIMING, µs

|  | Look-Ahead Status |  |  |
|---|---|---|---|
|  | Complete | None |  |
| AH — Add Half | 0.5 | 1.5 |  |
|  |  | O,$R^a$ | *A,$R^r$ |
| * $R^r$ | 42 | $R^a$ | Address (4096 half-words) |
| 0 1 2 3 4 5 6 7 8 9 10 11 12 13 14 15 16 17 18 19 20 21 22 23 | | | |

USAGE

The Add Half instruction is used to perform half-word arithmetic on the left half of a general purpose register. The contents of a half-word storage location are added to the left half of the designated general purpose register.

OPERATION

The half-word contents of the global effective address are added to the contents of $R_l^a$, and the sum is subsequently stored in $R_l^a$. The storage location and $R_r^a$ pointed to by the global effective address are left unchanged.

INDICATORS

The halfword sum sets the condition code register, and an overflow result sets the arithmetic anomalies indicator in the interrupt indicator register to a logical 1.

EFFECTIVE ADDRESS

The global effective address refers to a 12-bit half-word operand and may be formed through indexing and multilevel indirect addressing.

TIMING, µs

|  | Indirect Address, µs/level | Look-Ahead Status | |
|---|---|---|---|
|  |  | Complete | None |
|  | 1.5 | 2.0 | 3.5 |
| AHG — Add Half Register |  | O,$R^a$ | $R^c$ |
| $R^c$ | 43 | $R^a$ |  |
| 0 1 2 3 4 5 6 7 8 9 10 11 | | | |

USAGE

Add Half Register is a short instruction used to rapidly add the *left halves* of two general purpose registers.

OPERATION

The half-word contents of $R_l^a$ and $R_l^c$ are added, and the sum is stored in $R_l^a$. The full-word contents of $R^c$ are unchanged, and the contents of $R_r^a$ also remain unchanged.

INDICATORS

The arithmetic anomalies indicator in the interrupt register is set upon an overflow in the half-word sum. The condition code register is also set by the algebraic condition of the sum.

TIMING, µs

|  | Look-Ahead Status |  |  |
|---|---|---|---|
|  | Complete | None |  |
|  | 0.5 | 1.5 |  |
| AD — Add Double |  | O,$R^a$ | *A,$R^r$ |
| * $R^r$ | 46 | $R^a$ | Address (2048 double-word pair) |
| 0 1 2 3 4 5 6 7 8 9 10 11 12 13 14 15 16 17 18 19 20 21 22 23 | | | |

USAGE

Add Double is useful for double precision arithmetic and is used to add a double-word length addend in storage to a double precision augend in two general purpose registers.

OPERATION

The contents of the full-word storage location specified by the computed effective address together with those of the next higher address, full-word are treated as a double-length (46-bit + sign) operand. This operand is added to the contents of general purpose registers $R^a$ and $R^{(a+1)}$ mod 8. Double-length operands possess a single sign bit that is stored in bit position 0 of the most significant operand word. The least significant 23 bits of a double-length operand are stored left-justified in the least significant word; bit 23 of this word is always zero.

INDICATORS

If the computer sum overflows, the arithmetic anomalies indicator in the interrupt indicator register will be set. The condition code register is set by the most significant word; i.e., the final contents of $R^a$.

EFFECTIVE ADDRESS

The global effective address, which may be formed by indexing and multilevel indirect addressing, points to the first or most significant full-word of a double word operand.

TIMING, µs

|  | Indirect Address, µs/level | Look-Ahead Status | |
|---|---|---|---|
|  |  | Complete | None |
|  | 1.5 | 4.5 | 6.0 |
| AP — Add Parallel |  | O,$R^a$ | *A,$R^r$ |
| * $R^r$ | 44 | $R^a$ | Address (2048 full-words) |
| 0 1 2 3 4 5 6 7 8 9 10 11 12 13 14 15 16 17 18 19 20 21 22 23 | | | |

USAGE

The Add Parallel instruction is used to simultaneously add two adjacent half-words in storage to two half-words in a general purpose register. The two half-words in storage must be in the left and right halves of a full-word and cannot cross over a full-word boundary.

OPERATION

The right half-word of the contents of the global address is added to $R_r{}^a$ and the sum stored in $R_r{}^a$. The left half-word is added to $R_l{}^a$ and the sum stored in $R_l{}^a$.

INDICATORS

An overflow in the *left-half* sum will cause the arithmetic anomaly indicator in the interrupt indicator register to be set. The condition code register is set by the *left-half* sum.

EFFECTIVE ADDRESS

The global effective address refers to a full-word and the least significant bit of the computed effective address is not decoded. Indexing and indirect addressing are allowed.

TIMING, μs

|  | Indirect Address, μs/level | Look-Ahead Status Complete | None |
|---|---|---|---|
|  | 1.5 | 2.0 | 3.5 |

EXAMPLE 1: AP,2 ABC

|  | Before Execution | After Execution |
|---|---|---|
| (ABC) | '3333 5555' | '3333 5555' |
| (R²) | '2222 4444' | '5555 2221' |
| (CC) | XX | 01 |
| AOG | — Add Parallel (G) Register | O,R" R' |

R' 45 R"
0 1 2 3 4 5 6 7 8 9 10 11

USAGE

Add Parallel Register is a short instruction used to simultaneously add two half-words in one general purpose register to two half-words in another general purpose register.

OPERATION

The contents of $R_l{}^a$ are added to the contents of $R_l{}^c$ and the sum stored in $R_l{}^a$. The contents of $R_r{}^a$ are added to the contents of $R_r{}^c$ and the sum stored in $R_r{}^a$. $R^c$ is left unchanged.

INDICATORS

The condition code register is set according to the *left half* sum. The arithmetic anomaly in the interrupt indicator register is set if the left-half sum overflows.

TIMING, μs

| Look-Ahead Status Complete | None |  |
|---|---|---|
| 0.5 | 1.5 |  |

AI — Add Immediate    O,R"  Y

| 1 | 24 | R" | Immediate Operand |

0 1 2 3 4 5 6 7 8 9 10 11 12 13 14 15 16 17 18 19 20 21 22 23

USAGE

Add Immediate can be used to add certain constants to a full-word general purpose register without the operand storage space that would be required if Add were used. For integer constants, the entire range $-2048 \leq$ integer value $\leq +2047$ is covered. For fractional constants, the range $-2^{-12} \leq$ fractional value $\leq 2^{-12} - 2^{-23}$ is covered. Therefore, a complementary Subtract Immediate instruction is not needed.

OPERATION

The effective immediate operand is added to $R^a$ and the sum stored in $R^a$.

INDICATORS

The sum sets the condition code register. An overflow condition is not sensed.

EFFECTIVE IMMEDIATE OPERAND

Bits 12 through 23 of the effective immediate operand are copied identically from bits 12 through 23 of the immediate operand field. Bits 0 through 11 of the effective immediate operand are all identical to bit 12 of the immediate operand field (sign bit extension).

TIMING, μs

| Look-Ahead Status Complete | None |
|---|---|
| 0.5 | 1.5 |

AHI — Add Half Immediate   O,R"   Y
3   24   R"   Immediate Operand
0 1 2 3 4 5 6 7 8 9 10 11 12 13 14 15 16 17 18 19 20 21 22 23

USAGE

Add Half Immediate can be used to rapidly add any half-word constant to the left half of a general purpose register without the half-word operand storage space and extra time required for Add Half. Note that a Subtract Half Immediate instruction would be redundant since both positive and negative constants are accommodated by the immediate operand field.

OPERATION

The immediate operand is treated as a half-word two's complement addend and added to $R_l{}^a$. The sum is stored in $R_l{}^a$. $R_r{}^a$ is unchanged.

INDICATORS

The condition code register is set according to the algebraic condition of the sum. An overflow condition is not sensed.

TIMING, μs

| Look-Ahead Status Complete | None |  |
|---|---|---|
| 0.5 | 1.5 |  |

AIM — Add Immediate to Memory   O,I   *A,R'
* R'   47   I   Address (2048 full-words)
0 1 2 3 4 5 6 7 8 9 10 11 12 13 14 15 16 17 18 19 20 21 22 23

USAGE

The Add Immediate to Memory instruction can be used to add one of eight constants to any addressable storage location (with the exception of the eight GPRs) without the need for a separate data source, as the operand is stored in the instruction itself. Typical applications are the incrementing or decrementing of an integer count value with $-4 \leq$ integer value $\leq +3$.

OPERATION

The effective immediate operand is added to the contents of the global effective address, and the sum is subsequently stored in the global effective address.

EFFECTIVE IMMEDIATE OPERAND

Bits 22 and 23 of the effective immediate operand are copied from bits 10 and 11, respectively, of the immediate operand field. Bits 0 through 21 are duplicated from bit 9 (i.e., the sign bit of the immediate operand field is extended).

INDICATORS

The condition code register is set by the computed sum. An overflow condition sets the arithmetic anomalies indicator in the interrupt indicator register.

EFFECTIVE ADDRESS

Indexing and indirect addressing may be specified. Since a full-word is accessed, the least significant bit of the computed effective address is not decoded. A GPR cannot be referenced by the global effective address.

TIMING, μs

| Indirect Address, μs/level | Look-Ahead Status | |
|---|---|---|
| | Complete | None |
| 1.5 | 4.0 | 6.0 |

ATM — Add to Memory  O,R$^a$  *A,R$^r$
* R$^r$  57  R$^a$  Address (2048 full-words)
0 1 2 3 4 5 6 7 8 9 10 11 12 13 14 15 16 17 18 19 20 21 22 23

USAGE

Add to Memory is used to add a general purpose register to a storage location (which cannot be a GPR).

OPERATION

The contents of R$^a$ are added to the full-word contents of the global effective address and the sum subsequently stored in the global effective address. R$^a$ is left unchanged.

INDICATORS

The computed sum sets the arithmetic anomalies indicator in the interrupt indicator register if an overflow occurs. The condition code is set by the sum.

EFFECTIVE ADDRESS

Indexing and indirect addressing are allowed. The least significant bit (half-word pointer) of the computed effective address is not decoded. A GPR cannot be referenced by the global effective address.

TIMING, μs

| Indirect Address, μs/level | Look-Ahead Status | |
|---|---|---|
| | Complete | None |
| 1.5 | 3.0 | 5.5 |

S — Subtract  O,R$^a$  *A,R$^r$
* R$^r$  50  R$^a$  Address (2048 full-words)

-continued

| Indirect Address, μs/level | Look-Ahead Status | |
|---|---|---|
| | Complete | None |

0 1 2 3 4 5 6 7 8 9 10 11 12 13 14 15 16 17 18 19 20 21 22 23

USAGE

Subtract is used to form the two's complement difference (standard binary arithmetic) of a storage location and a general purpose register. The difference is stored in the general purpose register.

OPERATION

The contents of R$^a$ are replaced by the difference of the full-word subtrahend in the global effective address and the full-word minuend in R$^a$. The subtrahend is not changed.

INDICATORS

An overflow condition sets the arithmetic anomalies in the interrupt indicator register to a logical 1. The condition code register is set by the difference.

EFFECTIVE ADDRESS

Indexing and multilevel indirect addressing are allowed. A full 24-bit operand is accessed and the least significant bit of the global effective address is not decoded.

TIMING, μs

| Indirect Address, μs/level | Look-Ahead Status | |
|---|---|---|
| | Complete | None |
| .1.5 | 2.0 | 3.5 |

SG— Subtract (G) Register  O,R$^a$  R$^r$
R$^r$  51  R$^a$
0 1 2 3 4 5 6 7 8 9 10 11

USAGE

Subtract Register is used to rapidly subtract one general purpose register from another; SG can thus be used to clear a GPR to all zero's.

OPERATION

The minuend in R$^a$ is replaced by the difference of itself and the subtrahend in R$^r$. R$^r$ is left unchanged.

INDICATORS

The arithmetic anomalies indicator is set if an overflow occurs. The difference, which appears in R$^a$, sets the condition code register.

TIMING, μs

| | Look-Ahead Status | |
|---|---|---|
| | Complete | None |
| | 0.5 | 1.5 |

SH — Subtract Half  O,R$^a$  *A,R$^r$
* R$^r$  52  R$^a$  Address (4096 half-words)
0 1 2 3 4 5 6 7 8 9 10 11 12 13 14 15 16 17 18 19 20 21 22 23

USAGE

The Subtract Half instruction is used to perform half-word arithmetic on the left half of a general purpose register. The contents of a half-word storage location are subtracted from the left half of a general purpose register.

OPERATION

The half-word subtrahend in the global effective address is subtracted from the half-word minuend in $R_t^a$, and the difference is stored in $R_t^a$. The storage location point to by the global effective address is left unchanged. $R_r^a$ is left unchanged.

INDICATORS

The difference sets the condition code register, and an overflow result sets the arithmetic anomalies indicator in the interrupt indicator register to a logical 1.

EFFECTIVE ADDRESS

The global effective address points to a 12-bit half-word operand and may be formed through indexing and multilevel indirect addressing.

TIMING, μs

| Indirect Addressing, μs/level | Look-Ahead Status | |
|---|---|---|
| | Complete | None |
| 1.5 | 2.0 | 3.5 |

SHG — Subtract Half (G)  Register
$R^r$    53    $R^a$          O,$R^a$    $R^c$
0 1 2 3 4 5 6 7 8 9 10 11

USAGE

Subtract Half Register is a short instruction used to rapidly subtract the *left half* of one general purpose register from the left half of another. An SHG can be used to clear the left half of a GPR to zero's.

OPERATION

The half-word subtrahend in $R_t^c$ is subtracted from the half-word minuend in $R_t^a$, and the difference is stored in $R_t^a$. The full-word contents of $R^c$ are unchanged, and the contents of $R_r^a$ also remain unchanged.

INDICATORS

The arithmetic anomalies indicator in the interrupt indicator register is set upon an overflow in the half-word difference. The condition code register is also set by the algebraic condition of the difference.

TIMING, μs

| | Look-Ahead Status | |
|---|---|---|
| | Complete | None |
| SD — Subtract Double | 0.5 | 1.5 |
| | | O,$R^a$   *A,$R^c$ |

*  $R^c$    56    $R^a$    Address (2048 full-word pair)
0 1 2 3 4 5 6 7 8 9 10 11 12 13 14 15 16 17 18 19 20 21 22 23

USAGE

Subtract Double is particularly useful for double precision arithmetic and is used to subtract a double-word length operand in storage from a double-word length operand in two general purpose registers. SD can be used to clear two registers to all zero's.

OPERATION

The contents of full-word storage location specified by the computed effective address together with those of the next higher address full-word are treated as a double length (46-bit + sign) operand. This operand is subtracted from the contents of the general purpose registers $R^a$ and $R^{(a+1)}$ mod 8 (which also contain a double length operand), and the double length difference is stored in $R^a$ and $R^{(a+1)}$ mod 8. Double length operands possess a single sign bit that is stored in bit position 0 of the most significant operand word. The least significant 23 bits of a double length operand are stored left-justified in the least significant word; bit 23 of this word is always zero.

INDICATORS

If the computed difference overflows, the arithmetic anomalies indicator in the interrupt indicator register will be set. The condition code register is set by by the most significant difference word; i.e., by the final contents of $R^a$.

EFFECTIVE ADDRESS

The global effective address, which may be formed by indexing and multilevel indirect addressing, points to the first or most significant full-word of a double-word operand.

TIMING, μs

| Indirect Address, μs/level | Look-Ahead Status | |
|---|---|---|
| | Complete | None |
| 1.5 | 4.5 | 6.0 |
| SP — Subtract Parallel | | O,$R^a$   *A,$R^c$ |

*  $R^c$    54    $R^a$    Address (2048 full-words)
0 1 2 3 4 5 6 7 8 9 10 11 12 13 14 15 16 17 18 19 20 21 22 23

USAGE

The Subtract Parallel instruction is used to simultaneously subtract two adjacent half-words in storage from two half-words in a general purpose register. The two half-words in storage must be in the left and right halves of a full-word and cannot cross over a full-word boundary.

OPERATION

The right half-word of the contents of the global effectiveness address are subtracted from $R_r^a$ and the difference stored in $R_r^a$. The left half-word is subtracted from $R_t^a$ and the difference stored in $R_t^a$.

INDICATORS

An overflow in the left half difference will cause the arithmetic anomalies indicator in the interrupt indicator register to be set. The condition code register is set by the *left half* difference.

EFFECTIVE ADDRESS

The global effective address points to a full-word and the least significant bit of the ADDRESS field and any referenced index register is not decoded. Indexing and indirect addressing are allowed.

TIMING, μs

| Indirect Address, μs/level | Look-Ahead Status | |
|---|---|---|
| | Complete | None |
| 1.5 | 2.0 | 3.5 |

SPG — Subtract parallel (G) Register   O,R$^a$   R$^c$

| R$^c$ | 55 | R$^a$ |
|---|---|---|
| 0 1 2 3 4 5 6 7 8 9 10 11 | | |

USAGE

Subtract Parallel Register is a short instruction used to simultaneously subtract two half-words in one general purpose register from two half-words in another general purpose register.

OPERATION

The contents of a R$_l^c$ are subtracted from the contents of R$_l^a$ and the result stored in R$_l^a$. The contents of R$_r^c$ are subtracted from the contents of R$_r^a$ and the difference stored in R$_r^a$. R$^c$ is left unchanged.

INDICATORS

The condition code register is set according to the *left-half* difference. The arithmetic anomalies indicator in the interrupt indicator, register is set if the *left half* difference overflows.

TIMING, μs

| | Look-Ahead Status | |
|---|---|---|
| | Complete | None |
| M — Multiply | 0.5 O,R$^a$ | 1.5 *A,R$^r$ |

| * | R$^r$ | 60 | R$^a$ | Address (2048 full-word) |
|---|---|---|---|---|
| 0 1 2 3 4 5 6 7 8 9 10 11 12 13 14 15 16 17 18 19 20 21 22 23 | | | | |

USAGE

The Multiply instruction is used to form the double-word length product of a single-word length multiplicand located in a general purpose register and a single-word length multiplier located in storage. The product is stored in two consecutively addressed general purpose registers.

OPERATION

The contents of general purpose register R$^a$ are multiplied by the contents of the computed effective address location. The double-word length product is stored into general purpose registers R$^a$ and R$^{(a+1) \bmod 8}$. R$_o^a$ contains the most significant product word; R$_o^a$ is the product sign bit. R$^{(a+1) \bmod 8}$ contains the least significant 23-bit product word; this word is left-justified with bit 23 always set to 0.

INDICATORS

The final contents of R$^a$ are used to set the condition code register.

EFFECTIVE ADDRESS

Indirect addressing and indexing may be specified in computing the multiple address. The least significant bit (No. 23) of the effective address is not decoded.

TIMING, μs

| Indirect Address, μs/level | Look-Ahead Status |
|---|---|
| | Complete |
| 1.5 | 5.25 |

MG — Multiply Register   O,R$^a$   R$^c$

| R$^c$ | 61 | R$^a$ |
|---|---|---|
| 0 1 2 3 4 5 6 7 8 9 10 11 | | |

USAGE

The Multiply Register instruction is used to form the double-word length product of two single-word length operands both located in general purpose registers. The product is stored in two consecutively addressed general purpose registers.

OPERATION

The contents of general purpose register R$^c$ (the multiplier) are multiplied by the contents of general purpose register R$^a$ (the multiplicand). The double-word length product is stored in general purpose register's R$^a$ and R$^{(a+1) \bmod 8}$. R$_o^a$ contains the most significant product word; R$^a$ is the product sign bit. R$^{(a+1) \bmod 8}$ contains the least significant 23-bit product word; this word is left-justified with bit 23 always set to 0.

INDICATORS

The final contents of R$^a$ are used to set the condition code register.

TIMING, μs

| | Look-Ahead Status |
|---|---|
| | Complete |
| MT — Multiply Truncated | 4.75 O,R$^a$   *A,R$^r$ |

| * | R$^r$ | 21 | R$^a$ | Address (2048 full-words) |
|---|---|---|---|---|
| 0 1 2 3 4 5 6 7 8 9 10 11 12 13 14 15 16 17 18 19 20 21 22 23 | | | | |

USAGE

Multiply Truncated is used to form a single-word length product of a single word length multiplicand located in a general purpose register by a single-word length multiplier located in storage. The most significant product word is stored in the general purpose register.

OPERATION

The contents of general purpose register R$^a$ are multiplied by the contents of the computed effective address location. The most significant product word is stored in general purpose register $R^a$; the least significant product half is lost. $R^{(a+1) \bmod 8}$ is not changed.

INDICATORS

The final contents of $R^a$ are used to set the condition code register.

EFFECTIVE ADDRESS

Indirect Addressing and indexing may be specified in computing the multiplier address. The least significant bit (No. 23) of the effective address is not decoded.

TIMING, μs

| | Look-Ahead Status | |
|---|---|---|
| Indirect Addressing, μs/level | | Complete |
| 1.5 | | 5.25 |
| MH — Multiply Half | O,$R^a$ | *A,$R^x$ |

| * | $R^x$ | 62 | $R^a$ | Address (4096 half-words) |
|---|---|---|---|---|

0 1 2 3 4 5 6 7 8 9 10 11 12 13 14 15 16 17 18 19 20 21 22 23

USAGE

Multiply Half is used to form the full-word length product of a left half-word multiplicand located in a general purpose register and a half-word multiplier located in storage. The product is stored in the general purpose register.

OPERATION

The contents of the left half of general purpose register $R^a$ (i.e., $R_l{}^a$) are multiplied by the contents of the half-word specified by the computed effective address. The full-word product is stored in general purpose register $R^a$. The previous contents of $R_r{}^a$ are lost.

INDICATORS

The final contents of $R^a$ are used to set the condition code register.

EFFECTIVE ADDRESS

Indirect Addressing and indexing may be used in computing the multiplier address. The least significant address bit indicates which storage word half is to be used; 0 refers to the left and 1 to the right.

TIMING, μs

| | Look-Ahead Status | |
|---|---|---|
| Indirect Address, μs/level | | Complete |
| 1.5 | | 3.75 |
| MHG — Multiply Half Register | O,$R^a$ | $R^x$ |

| | $R^x$ | 63 | $R^a$ |
|---|---|---|---|

0 1 2 3 4 5 6 7 8 9 10 11

USAGE

The Multiply Half Register instruction is used to form the full-word length product of two half-word operands that are both located in general purpose registers. The product is stored in a general purpose register.

OPERATION

The contents of the left half of general purpose register $R^a$ (the multiplicand) are multiplied by those of the left half of general purpose register $R^c$ (the multiplier). The full-word product is stored in general purpose register $R^a$. The previous contents of $R_r{}^a$ are lost.

INDICATORS

The final contents of $R^a$ are used to set the condition code register.

TIMING, μs

| | Look-Ahead Status Complete | | |
|---|---|---|---|
| | 3.25 | | |
| MHI — Multiply Half, Immediate | | O,$R^a$ | Y |

| 6 | 24 | $R^a$ | Immediate Operand |
|---|---|---|---|

0 1 2 3 4 5 6 7 8 9 10 11 12 13 14 15 16 17 18 19 20 21 22 23

USAGE

Multiply Half, Immediate can be used to multiply the left half of a general purpose register by any half-word constant directly without the need of additional half-word operand storage space. The full-word product is stored in the general purpose register. MHI is particularly useful for scaling operations in half-word arithmetic.

OPERATION

The contents of the left half of general purpose register $R^a$ (the multiplicand) are multiplied by the instruction immediate operand, which is treated as a signed, half-word multiplier. The full-word length product is stored in general purpose register $R^a$. The previous contents of $R_r{}^a$ are lost.

INDICATORS

The final contents of $R^a$ are used to set the condition code register.

TIMING, μs

| | Look-Ahead Status Complete | |
|---|---|---|
| | 3.25 | |
| D — Divide | O,$R^a$ | *A,$R^x$ |

| * | $R^x$ | 76 | $R^a$ | Address (2096 full-words) |
|---|---|---|---|---|

0 1 2 3 4 5 6 7 8 9 10 11 12 13 14 15 16 17 18 19 20 21 22 23

USAGE

The Divide instruction is used to divide a double-word length dividend located in two consecutive general purpose registers by a single-word length divisor located in storage. Both the single-word length quotient and remainder are stored in general purpose registers.

OPERATION

The contents of general purpose register $R^a$ and those of $R^{(a+1) \bmod 8}$ are treated as a double-length dividend which is divided by the single-word length divisor in storage specified by the computed effective address. The single-word length quotient is stored in general purpose register $R^a$ and the single-word length remainder stored in $R^{(a+1) \bmod 8}$. Saturation division is performed; the quotient is set to $(-1)$ or $(1-2^{-23})$ depending on operand signs whenever the fractional quotient range is exceeded, and the remainder is set to zero. The non-zero remainders have the same sign as the dividend.

INDICATORS

The final contents of $R^a$ are used to set the condition code register. If a division by zero is attempted or a saturated quotient generated, the arithmetic anomaly indicator bit is set to 1.

EFFECTIVE ADDRESS

Indirect Addressing and indexing may be specified in computing the divisor address. The least significant bit (No. 23) of the effective address is not decoded.

TIMING, μs

| Indirect Address, μs/level | Look-Ahead Status Complete | | |
|---|---|---|---|
| 1.5 | 15.00 | | |
| DG — Divide Registers by Register | | O,$R^a$ | $R^c$ |
| $R^c$ | 77 | $R^a$ | |
| 0 1 2 3 4 5 6 7 8 9 10 11 | | | |

USAGE

Divide Registers by Register is used to divide a double-word length dividend located in two consecutive general purpose registers by a single-word length divisor located in another general purpose register. Both quotient and remainder are saved. This instruction is shorter and faster than D.

OPERATION

The contents of general purpose register $R^a$ and those of $R^{(a+1) \bmod 8}$ are treated as a double-word length dividend which is divided by a single-word length divisor located in general purpose register $R^c$. The single-word length quotient is stored in general purpose register $R^a$, and the single-word length remainder stored in $R^{(a+1) \bmod 8}$. Saturation division is performed where the quotient is set to $(-1)$ or $(1-2^{-23})$ depending on operand signs whenever the fractional quotient range is exceeded, and the remainder set to zero. Non-zero remainders have the same sign as the dividend.

INDICATORS

The final contents of $R^a$ are used to set the condition code register. If a division by zero is attempted or a saturated quotient generated, the arithmetic anomaly indicator bit is set to 1.

TIMING, μs

| | Look-Ahead Status Complete | | |
|---|---|---|---|
| | 14.50 | | |
| DT — Divide Truncated | | O,$R^a$ | *A,$R^x$ |
| * | $R^x$ | 37 | $R^a$ | Address (2048 full-words) |

-continued

| Look-Ahead Status Complete |
|---|
| 0 1 2 3 4 5 6 7 8 9 10 11 12 13 14 15 16 17 18 19 20 21 22 23 |

USAGE

The Divide Truncated instruction is used to divide a single-word length divided located in a general purpose register by a single-word length divisor located in storage. The singleword length quotient is stored in the general purpose register, and the remainder is lost. DT is preferred over D wherever 24-bit dividend precision is sufficient, since one general purpose register is freed.

OPERATION

The contents of general purpose register $R^a$ (the dividend) are divided by those of the single-word length divisor specified by the computed effective address. The single-word length quotient is stored in general oyroise register $R^a$, and the remainder is lost. Saturation division is performed where the quotient is set to $(-1)$ or $(1-2^{-23})$ depending on operand signs whenever the fractional quotient range is exceeded. $R^{(a+1) \bmod 8}$ is not changed.

INDICATORS

The final contents of $R^a$ are used to set the condition code register. If division by zero is attempted or a saturated quotient generated, the arithmetic anomaly indicator bit is set to 1.

EFFECTIVE ADDRESS

Indirect Addressing and indexing may be specified in computing the divisor address. The least significant bit (No. 23) of the effective address is not decoded.

TIMING, μs

| Indirect Address, μs/level | Look-Ahead Status Complete | | |
|---|---|---|---|
| 1.5 | 15.00 | | |
| DHI — Divide Half Immediate | | O,$R^a$ | Y |
| 7 | 24 | $R^a$ | Immediate Operand |
| 0 1 2 3 4 5 6 7 8 9 10 11 12 13 14 15 16 17 18 19 20 21 22 23 | | | |

USAGE

Divide Half Immediate is used to divide a full-word length dividend located in a general purpose register by a half-word constant directly, without the need of additional half-word operand storage space. DHI is particularly useful for scaling operations in half-word arithmetic.

OPERATION

The contents of general purpose register $R^a$ are divided by the instruction immediate operand, which is treated as a signed, half-word divisor. The half-word quotient is stored in the left half of general purpose $R^a$, and the half-word remainder in its right half. Saturation division is performed; the quotient is set to $(-1)$ $(1-2^{11})$ depending on operand signs whenever the fractional quotient range is exceeded, and the remainder set to zero. Non-zero remainders have the same sign as the dividend.

INDICATORS

The final content of $R_i{}^a$ are used to set the condition code register. If a division by zero is attempted or a saturated quotient generated, the arithmetic anomaly indicator bit is set to 1.

TIMING, μs

| Look-Ahead Status |
|---|
| Complete |
| 8.50 |

LOGICAL INSTRUCTIONS

This instruction set has two types of logical instructions. The logical instructions that perform And, Or, Compare, or Clear operations involve two operands; the first is always located in one of the processor registers while the second is located in main memory, local store, a general purpose register, or an immediate operand field in the instruction format. The logical instructions that perform complementing or absolute value operations involve a single operand that is always located in a general purpose register. All logical instructions except CSW and OW set the condition code register with the results of the operation and thus provide the following information.

| Condition Code Setting, bits | | Result Value |
|---|---|---|
| 1 | 2 | |
| 0 | 1 | Negative |
| 1 | 0 | Zero |
| 1 | 1 | Positive |

N — AND Memory to Register  O,$R^a$  *A,$R^r$

| * | 74 | $R^a$ | Address (2048 full-words) |
|---|---|---|---|
| $R^r$ | | | |
| 0 1 2 3 4 5 6 7 8 9 10 11 12 13 14 15 16 17 18 19 20 21 22 23 | | | |

USAGE

The And instruction is used to form the logical "AND" of a full-word storage location and a general purpose register and to store the result in that same register.

OPERATION

The contents of general purpose register $R^a$ are logically AND'd with those of the storage location specified by the computed effective address. The result is returned to $R^a$, and the storage location contents remain unchanged.

INDICATORS

The condition code register is set by the final contents of $R^a$.

EFFECTIVE ADDRESS

Indexing and indirect addressing may be used in computing the effective address. A 24-bit operand is accessed. The least significant bit (No. 23) of the effective address is not decoded.

TIMING, μs

| Indirect Address, μs/level | Look-Ahead Status | |
|---|---|---|
| | Complete | None |
| 1.5 | 2.0 | 3.5 |

NG — AND Register to Register  O,$R^a$  $R^c$

| $R^c$ | 75 | $R^a$ |
|---|---|---|
| 0 1 2 3 4 5 6 7 8 9 10 11 | | |

USAGE

And Register to Register is used to form the logical "AND" of two full-word general purpose registers and to store the result in one. This instruction executes more quickly than N and can be stored in a half-word storage location.

OPERATION

The contents of general purpose register $R^a$ are logically AND'd with those of register $R^c$. The result is stored in register $R^a$, and the contents of $R^c$ remain unchanged.

INDICATORS

The condition code register is set by the final contents of $R^a$.

TIMING, μs

| Look-Ahead Status | |
|---|---|
| Complete | None |
| 0.5 | 1.5 |

E — Exclusive OR Memory to Register  O,$R^a$  *A,$R^r$

| * $R^r$ | 66 | $R^a$ | Address (2048 full-words) |
|---|---|---|---|
| 0 1 2 3 4 5 6 7 8 9 10 11 12 13 14 15 16 17 18 19 20 21 22 23 | | | |

USAGE

Exclusive or Memory to Register is used to form the logical exclusive "OR" of a full-word storage location and a general purpose register and to store the result in that same register.

OPERATION

The contents of general purpose register $R^a$ are logically "OR'd" (exclusively) with those of the storage location specified by the computed effective address. The result is returned to $R^a$ and the storage location contents remain unchanged.

INDICATORS

The condition code register is set by the final contents of $R^a$.

EFFECTIVE ADDRESS

Indexing and indirect addressing may be used in computing the effective address. A 24-bit operand is accessed. The least significant bit (No. 23) of the effective address is not decoded.

TIMING, μs

| | Look-Ahead Status | |
|---|---|---|
| | Complete | None |
| NG — AND Register to Register | 2.0 | 3.5 O,R" R' |
| R' 75 R" | | |
| 0 1 2 3 4 5 6 7 8 9 10 11 | | |

USAGE

And Register to Register is used to form the logical AND of two full-word general purpose registers and the store the result in one. This instruction executes more quickly than N and can be stored in a half-word storage location.

OPERATION

The contents of general purpose register R" are logically AND'd with those of register R'. The result is stored in register R", and the contents of R' remain unchanged.

INDICATORS

The condition code register is set by the final contents of R".

TIMING, μs

| Look-Ahead Status | |
|---|---|
| Complete | None |
| 0.5 | 1.5 |
| E — Exclusive OR Memory to Register | O,R" *A,R' |
| *R' 66 R" Address (2048 full-words) | |
| 0 1 2 3 4 5 6 7 8 9 10 11 12 13 14 15 16 17 18 19 20 21 22 23 | |

USAGE

Exclusive Or Memory to Register is used to form the logical exclusive "Or" of a full-word storage location and a general purpose register and to store the result in that same register.

OPERATION

The contents of general purpose register R" are logically OR'd (exclusively) with those of the storage location specified by the computed effective address. The result is returned to R" and the storage location contents remain unchanged.

INDICATORS

The condition code register is set by the final contents of R".

EFFECTIVE ADDRESS

Indexing and indirect addressing may be used in computing the effective address. A 24-bit operand is accessed. The least significant bit (No. 23) of the effective address is not decoded.

TIMING, μs

| | Look-Ahead Status | |
|---|---|---|
| Indirect Address, μs/level | Complete | None |
| | 1.5 | 2.0 | 3.5 |
| 0 — OR Memory to Register | | O,R" *A,R' |
| *R' 64 R" Address (2048 full-words) | | |
| 0 1 2 3 4 5 6 7 8 9 10 11 12 13 14 15 16 17 18 19 20 21 22 23 | | |

USAGE

The Or Memory to Register instruction is used to form the logical inclusive OR of a full-word storage location and a general purpose register and to store the result in that same register.

OPERATION

The contents of general purpose register R" are logically OR'd (inclusively) with those of the storage location specified by the computed effective address. The result is returned to R", and the storage location contents remain unchanged.

INDICATORS

The condition code register is set by the final contents of R".

EFFECTIVE ADDRESS

Indexing and indirect addressing may be used in computing the effective address. A 24-bit operand is accessed. The least significant bit (No. 23) of the effective address is not decoded.

TIMING, μs

| | Look-Ahead Status | |
|---|---|---|
| Indirect Address, μs/level | Complete | None |
| | 1.5 | 3.0 | 3.5 |
| OG — OR Register to Register | | O,R" R' |
| R' 65 R" | | |
| 0 1 2 3 4 5 6 7 8 9 10 11 | | |

USAGE

Or Register to Register is used to form the logical inclusive OR of two full-word general purpose registers and to store the results in one. This instruction executes more quickly than O and can be stored in a half-word storage location.

OPERATION

The contents of general purpose register R" are logically OR'd (inclusively) with those of register R'. The result is stored in register R", and the contents of R' remain unchanged.

INDICATORS

The condition code register is set by the final contents of R".

TIMING, μs

| Look-Ahead Status |
|---|
| Complete |
| 2.5 |

-continued

| | Look-Ahead Status | |
| --- | --- | --- |
| | Complete | |
| OW — OR Register to Working Register | O,R^c | W^a |
| W^a  67  R^c | | |
| 0 1 2 3 4 5 6 7 8 9 10 11 | | |

USAGE

The Or Register to Working Register instruction is used to form the logical inclusive Or of a full-word general purpose register to a full-word working register and to store the result in the working register. OW is particularly useful for setting interrupt indicator mask bits in $W^3$ (working register 3).

OPERATION

The contents of general purpose register $R^c$ are logically OR'd inclusively with those of working register $W^a$. The result is returned to $W^a$ and the contents of $R^c$ remain unchanged.

INDICATORS

None.

TIMING, μs

| Look-Ahead Status | | |
| --- | --- | --- |
| Complete | None | |
| 0.5 | 1.5 | |
| CSW — Clear Selective Working | O,R^c | W^a |
| W^a  27  R^c | | |
| 0 1 2 3 4 5 6 7 8 9 10 11 | | |

USAGE

Clear Selective Working instruction is used to clear to zero individual bits within a working register as selected by set bits (i.e., 1's) in a general purpose register. CSW is particularly useful resetting interrupt indicator and interrupt mask bits.

OPERATION

The contents of general purpose register $R^c$, logically inverted, are AND'd with the contents of working register $W^a$, and the result is stored in $W^a$. The contents of $R^c$ remain unchanged.

INDICATORS

None.

TIMING, μs

| Look-Ahead Status | | |
| --- | --- | --- |
| Complete | None | |
| 0.5 | 1.5 | |
| K — One's Complement Register | O,R^a | |
| 0  25  R^a | | |
| 0 1 2 3 4 5 6 7 8 9 10 11 | | |

USAGE

The One's Complement Register instruction is used to form the one's complement of the full-word contents of a general purpose register and to store the results in that same register.

OPERATION

The contents of general purpose register $R^a$ are replaced by their one's complement.

INDICATORS

The condition code register is set by the final contents of $R^a$.

TIMING, μs

| Look-Ahead Status | | |
| --- | --- | --- |
| Complete | None | |
| 0.5 | 1.5 | |
| KH — One's Complement Register Left Half | O,R^a | |
| 2  25  R^a | | |
| 0 1 2 3 4 5 6 7 8 9 10 11 | | |

USAGE

One's Complement Register Left Half is used to form the one's complement of a general purpose register's left half and store the result in the left half of the same register.

OPERATION

The contents of $R_l^a$ are replaced by their one's complement. The contents of $R_r^a$ remain unchanged.

INDICATORS

The condition code register is set by the final contents of $R_l^a$.

TIMING, μs

| Look-Ahead Status | | |
| --- | --- | --- |
| Complete | None | |
| 0.5 | 1.5 | |
| T — Two's Complement Register | O,R^a | |
| 1  25  R^a | | |
| 0 1 2 3 4 5 6 7 8 9 10 11 | | |

USAGE

The Two's Complement Register instruction is used to form the two's complement of the full-word contents of a general purpose register and to store the results in that same register.

OPERATION

The contents of general purpose register $R^a$ are replaced by their two's complement.

INDICATORS

The condition code register is set by the final contents of $R^a$.

TIMING, μs

| Look-Ahead Status | | |
| --- | --- | --- |
| Complete | None | |
| 0.5 | 1.5 | |
| TH — Two's Complement Register Left Half | O,R^a | |
| 3  25  R^a | | |
| 0 1 2 3 4 5 6 7 8 9 10 11 | | |

USAGE

Two's Complement Register Left Half is used to form the two's complement of a general purpose register's left half and to store the result in the left half of the same register.

OPERATION

The contents of $R_l^a$ are replaced by their two's complement. The contents of $R_r^a$ remains unchanged.

INDICATORS

The condition code register is set by the final contents of $R_l^a$.

TIMING, $\mu$s

| | Look-Ahead Status | |
|---|---|---|
| | Complete | None |
| | 0.5 | 1.5 |
| ABS — Absolute Value of Register | | O,$R^a$ |
| 5  25  $R^a$ | | |
| 0 1 2 3 4 5 6 7 8 9 10 11 | | |

USAGE

Absolute Value of Register is used to form the absolute value of the full-word contents of a general purpose register and to store the result in that same register.

OPERATION

The contents of general purpose register $R^a$, treated as a signed two's complement number, are replaced by their absolute numerical value.

INDICATORS

The final contents of $R^a$ are used to set the condition code register.

TIMING, $\mu$s

| | Look-Ahead Status | |
|---|---|---|
| | Complete | None |
| | 0.5 | 1.5 |
| C — Compare Register to Memory | | O,$R^a$  *A,$R^x$ |
| * $R^x$  70  $R^a$ | | Address (2048 full-words) |
| 0 1 2 3 4 5 6 7 8 9 10 11 12 13 14 15 16 17 18 19 20 21 22 23 | | |

USAGE

Compare Register to Memory is used to arithmetically compare the full-word contents of a storage location to those of a general purpose register. It provides a means of setting the condition code register directly without altering either operand.

OPERATION

If the sign bits of the contents of the storage location specified by the computed effective address and the contents of general purpose register $R^a$ are the same, then the contents of the computed effective address are subtracted from the contents of general purpose register $R^a$ and the result sets the condition code register which indicates their relative magnitudes. If the sign bits of the contents of the computed effective address and the general purpose register are not the same, then the condition code register is set to the sign bit of general purpose register $R^a$. The contents of both $R^a$ and the computed effective address remain unchanged.

INDICATORS

The condition code register is set as described above under OPERATION.

EFFECTIVE ADDRESS

Indexing and indirect addressing may be used in computing the effective address. A 24-bit operand is accessed. The least significant bit (No. 23) of the effective address is not decoded.

TIMING, $\mu$s

| Indirect Address. | Look-Ahead Status | |
|---|---|---|
| $\mu$s/level | Complete | None |
| 1.5 | 2.0 | 3.5 |
| CG — Compare Register to Register | | O,$R^a$  $R^c$ |
| $R^c$  71  $R^a$ | | |
| 0 1 2 3 4 5 6 7 8 9 10 11 | | |

USAGE

The Compare Register to Register instruction is used to arithmetically compare the contents of two general purpose registers. It provides a means of setting the condition code register directly without altering either operand. CG executes more quickly than C and can be stored in a half-word storage location.

OPERATION

If the sign bits of the contents of general purpose registers $R^a$ and $R^c$ are the same, then the contents of general purpose register $R^c$ are substracted from those of general purpose register $R^a$ and the condition code register set to indicate their relative magnitudes. If the sign bits of the contents of general purpose registers $R^a$ and $R^c$ are not the same, then the condition code register is set to the sign bit of general purpose register $R^a$. The contents of both general purpose registers $R^a$ and $R^c$ remain unchanged.

INDICATORS

The condition code register is set as described above under OPERATION.

TIMING, $\mu$s

| | Look-Ahead Status | |
|---|---|---|
| | Complete | None |
| | 0.5 | 1.5 |
| CH — Compare Register Left Half to Memory Half | | O,$R^a$  *A,$R^x$ |
| * $R^x$  72  $R^a$ | | Address (2048 full-words) |
| 0 1 2 3 4 5 6 7 8 9 10 11 12 13 14 15 16 17 18 19 20 21 22 23 | | |

USAGE

Compare Register Left Half to Memory Half is used to arithmetically compare a half-word storage location to the left half of a general purpose register. It provides a means of setting the condition code register directly without altering either operand.

OPERATION

If the sign bits of the contents of the half-word storage location specified by the computed effective address and the contents of general purpose register $R^a$ are the same, then the contents of the half-word location specified by the computed effective address are substracted from the left half of general purpose register $R^a$ and the condition code register set properly to indicate their relative magnitudes. If the sign bits of the contents of the computed effective address and general purpose register are not the same, then the condition code register is set to the sign bit of general purpose register $R^a$. The contents of both $R^a$ and the computed effective addresss remain unchanged.

INDICATORS

The condition code register is set as described above under OPERATION.

| CH — Compare Register Left Half to Memory Half | | O,$R^a$ | *A,$R^r$ |
|---|---|---|---|
| * $R^r$ | 72 | $R^a$ | Address (2048 full-words) |
| 0 1 2 3 4 5 6 7 8 9 10 11 | 12 13 14 15 | 16 17 18 19 | 20 21 22 23 |

USAGE

Compare Register Left Half to Memory Half is used to arithmetically compare a half-word storage location to the left half of a general purpose register. It provides a means of setting the condition code register directly without altering either operand.

OPERATION

If the sign bits of the contents of the half-word storage location specified by the computed effective address and the contents of general purpose register $R^a$ are the same, then the contents of the half-word location specified by the computed effective address are subtracted from the left half of general purpose register $R^a$ and the condition code register set properly to indicate their relative magnitudes. If the sign bits of the contents of the computed effective address and general purpose register are not the same, then the condition code register is set to the sign bit of general purpose register $R^a$. The contents of both $R^a$ and the computed effective address remain unchanged.

INDICATORS

The condition code register is set as described above under OPERATION.

EFFECTIVE ADDRESS

Indexing and indirect addressing may be used in computing the effective address. A 12-bit operand is accessed. The least significant address bit indicates which storage word half is addressed; 0 refers to the left and 1 to the right half.

TIMING, μs

| | Look-Ahead Status | |
|---|---|---|
| Indirect Address, μs/level | Complete | None |
| 1.5 | 2.0 | 3.5 |

| CHG — Compare Half Register to Half Register | | O,$R^a$ | $R^r$ |
|---|---|---|---|
| $R^r$ | 73 | $R^a$ | |
| 0 1 2 3 4 5 6 7 8 9 10 11 | | | |

USAGE

The Compare Half Register to Half Register instruction is used to arithmetically compare the contents of two general purpose register left halves. It provides a means of setting the condition code register directly without altering either operand.

OPERATION

If the sign bits of the contents of general purpose registers $R^a$ and $R^c$ are the same, then the contents of general purpose register $R_t^c$ and the condition code register set to indicate their relative magnitudes. If the sign bits of the contents of general purpose registers $R^a$ and $R^c$ are not the the same, then the condition code register is set to the sign bit of general purpose register $R^a$. The contents of both general purpose registers $R^a$ and $R^c$ remain unchanged.

INDICATORS

The condition code register is set as described above under OPERATION.

TIMING, μs

| | Look-Ahead Status | |
|---|---|---|
| | Complete | None |
| | 0.5 | 1.5 |

| CI — Compare Immediate | | O,$R^a$ | Y |
|---|---|---|---|
| 4 | 24 | $R^a$ | Immediate Operand |
| 0 1 2 3 4 5 6 7 8 9 10 11 | 12 13 14 15 | 16 17 18 19 | 20 21 22 23 |

USAGE

The Compare Immediate instruction is used to arithmetically compare the full contents of a general purpose register to a constant stored directly within the instruction word. This constant can range between $-2048$ and $2047$ if considered as an integer value or between $-2^{-12}$ and $2^{-12}-2^{-23}$ as a fractional value. CI can be executed more rapidly than C and is also more efficient of storage.

OPERATION

If the sign bits of the effective immediate operand and the contents of general purpose register $R^a$ are the same, then the effective immediate operand is subtracted from the contents of general purpose register $R^a$ and the condition code register set properly to indicate their relative magnitudes. If the sign bit of the effective immediate operand and general purpose register $R^a$ are not the same, then the condition code register is set to the sign bit of general purpose register $R^a$. The contents of $R^a$ remain unchanged.

INDICATORS

The condition code register is set as described above under OPERATION.

EFFECTIVE IMMEDIATE OPERAND

BITS 12 through 23 of the effective immediate operand are identical to bits 12 through 23, respectively, of the immediate operand field. Bits 0 through 11 of the effective immediate operand are all identical to bit 12 of the IMMEDIATE OPERAND field (sign bit extension).

TIMING, μs

| | Look-Ahead Status | |
|---|---|---|
| | Complete | None |
| | 0.5 | 1.5 |
| CHI — Compare Half Immediate | O,R<sup>a</sup> | Y |

| 5 | 24 | R<sup>a</sup> | Immediate Operand |
|---|---|---|---|
| 0 1 2 3 4 5 6 7 8 | 9 10 11 | 12 13 14 | 15 16 17 18 19 20 21 22 23 |

USAGE

Compare Half Immediate is used to arithmetically compare the left half contents of a general purpose register to a constant stored directly within the instruction word. This constant can range between −2048 and 2047 if considered as an integer value, or between $-2^{-12}$ and $2^{-12}-2^{-23}$ as a fractional value. CHI can be executed more quickly than CH and is also more efficient of storage.

OPERATION

If the sign bits of the effective immediate operand and the contents of general purpose register R<sup>a</sup> are the same, then the effective immediate operand is subtracted from the contents of general purpose register R<sup>a</sup> and the condition code register set properly to indicate their relative magnitudes. If the sign bits of the effective immediate operand and general purpose register are not the same, then the condition code register is set to the sign bit of general purpose register R<sup>a</sup>. The contents of R<sup>a</sup> remain unchanged.

INDICATORS

The condition code register is set as described above under OPERATION.

EFFECTIVE IMMEDIATE OPERAND

The effective immediate operand is identical to the instruction IMMEDIATE OPERAND.

TIMING, μs

| | Look-Ahead Status | |
|---|---|---|
| | Complete | None |
| | 0.5 | 1.5 |
| CB — Compare Bits | | O,R<sup>a</sup> *A,R<sup>r</sup> |

| * R<sup>r</sup> | 34 | R<sup>a</sup> | Address (2048 full-words) |
|---|---|---|---|
| 0 1 2 3 4 5 6 7 8 | 9 10 11 | 12 13 14 | 15 16 17 18 19 20 21 22 23 |

USAGE

The Compare Bits instruction is used to test for the set condition (i.e., 1) for those bits, in a general purpose register, selected by a mask word located in storage. This instruction is particularly useful in testing for specific bit patterns in data or control words.

OPERATION

For each bit set to 1 in the storage location mask word specified by the computed effective address, the corresponding bit is tested for the set condition. If all bits specified by the mask bit were set, the condition code register is set to 2 — the equality state. If all bits were not set, the condition code register is set to 1. The mask word contents are not changed.

INDICATORS

The condition code register is set as described above under OPERATION.

EFFECTIVE ADDRESS

Indexing and indirect addressing may be used in computing the effective address. A 24-bit mask word is accessed. The least significant bit (No. 23) of the effective address is not decoded.

TIMING, μs

| Indirect Address, μs/level | Look-Ahead Status | |
|---|---|---|
| | Complete | None |
| 1.5 | 3.0 | 3.5 |

| EXAMPLE 1: CB,1 Mask 1 | | |
|---|---|---|
| Before Execution | | After Execution |
| (Mask 1) | '01000507' | '01000507' |
| (R<sup>1</sup>) | '01234567' | '01234567' |
| (CC) | XX | 10 |
| EXAMPLE 2: CB,1 Mask 2 | | |
| Before Execution | | After Execution |
| (Mask 2) | '00204013' | '00204013' |
| (R<sup>1</sup>) | '01234567' | '01234567' |
| (CC) | XX | 01 |

SHIFT INSTRUCTIONS

This instruction set contains nine shift instructions that perform arithmetic shifts, logical shifts, and rotations of 24-bit and 48-bit operands; a 24-bit normalizing shift is also provided.

All shift instructions except SLCT share a single operation code and use the following format.

| R<sup>r</sup> | 22 | R<sup>a</sup> | OPE | COUNT |
|---|---|---|---|---|
| 0 1 2 3 4 5 6 7 8 | 9 10 11 | 12 13 14 | 15 16 17 | 18 19 20 21 22 23 |

Bit positions 15 through 17 comprise an extended opcode field that specifies the type of shift to be performed.

| Opcode Extender (OPE) Field Bit | | | |
|---|---|---|---|
| 15 | 16 | 17 | Shift Type |
| 0 | 0 | 0 | Shift Right, Arithmetic |
| 0 | 0 | 1 | Shift Right, Logical |
| 0 | 1 | 0 | Shift Right Double, Arithmetic |
| 0 | 1 | 1 | Shift Right Double, Logical |
| 1 | 0 | 0 | Shift Left, Cyclic |
| 1 | 0 | 1 | Shift Left |
| 1 | 1 | 0 | Shift Left Double, Cyclic |
| 1 | 1 | 1 | Shift Left Double, Arithmetic |

Each instruction operates on one of the eight general purpose registers, which is specified in bits 9 through 11. Bits 18 through 23 comprise the 6-bit immediate count field, but this count can be modified by an indexing operation before execution of the shift instruction; in this case, the right-most six bits of the resulting effective count are used to specify the shift length. The count field has no sign bit; all counts are assumed to be positive in the direction specified by the opcode extender field.

Double-register shift operations treat the contents of two adjacent general purpose register pairs as a single double-word operand 48 bits in length. Double arithmetic operands possess a single sign bit, which is located in the second (low-order) register contains its most significant data bit; bit 23 of this register is arbitrary.

All shift instructions set the condition code register at the completion of the shift, to provide the following information:

| Condition Code Setting | | Shift Type |
|---|---|---|
| 1 | 2 | |
| 0 | 1 | Negative |
| 1 | 0 | Zero (loss of arithmetic significance) |
| 1 | 1 | Positive |

In addition, if, during the execution of a left shift, SLCT and cyclic shift excepted, a change in the sign bit occurs, then bit 4 of the interrupt Indicator Register ($w^2$) is set to signify that an arithmetic anomaly has occurred. This interrupt indicator is maskable under program control.

| SRA — Shift Right, Arithmetic | | | O,R$^a$ | K,R$^r$ |
|---|---|---|---|---|
| R$^r$ | 22 | R$^a$ | 0 0 0 | Count |
| 0 1 2 3 4 5 6 7 8 9 10 11 12 13 14 15 16 17 18 19 20 21 22 23 | | | | |

USAGE

Shift Right, Arithmetic is used to right shift single-word length arithmetic operands located in a general purpose register. The original sign bit is copied and inserted into the vacated bit positions. This instruction also provides a more rapid means of dividing by a power of two than the use of any divide instruction.

OPERATION

The contents of the specified general purpose register (R$^a$) are shifted 1 bit position to the right — the number of times specified by the effective count. At each step, the sign bit is copied into the vacated bit position (No. 0), and bit 23 is lost.

INDICATORS

The final contents of R$^a$ are used to set the condition code register.

EFFECTIVE COUNT

The effective count is a 6-bit quantity copied from the instruction count field but which may optionally be modified by indexing.

TIMING, $\mu$s

Look-Ahead Status Complete ($K+\phi+8$)/8

$\phi = \begin{cases} 1 \text{ for odd K} \\ 0 \text{ for even K} \end{cases}$

| SRL — Shift Right, Logical | | | O,R$^a$ | K,R$^r$ |
|---|---|---|---|---|
| R$^r$ | 22 | R$^a$ | 0 0 1 | Count |

-continued

Look-Ahead Status Complete ($K+\phi+8$)/8

$\phi = \begin{cases} 1 \text{ for odd K} \\ 0 \text{ for even K} \end{cases}$

| 0 1 2 3 4 5 6 7 8 9 10 11 12 13 14 15 16 17 18 19 20 21 22 23 |
|---|

USAGE

Shift Right, Logical is used to right-shift single-word length logical operands located in a general purpose register. Leading zeros are inserted into vacated bit positions.

OPERATION

The contents of the specified general purpose register (R$^a$) are shifted 1 bit position to the right — the number of times specified by the effective count. At each step, a zero is inserted into bit position 0 following the right shift, and bit 23 is lost.

INDICATORS

The final contents of R$^a$ are used to set the condition code register.

EFFECTIVE COUNT

The effective count is a 6-bit quantity copied from the instruction count field but which may optionally be modified by indexing.

TIMING, $\mu$s

Look-Ahead Status Complete ($K+\phi+8$)/8

$\phi = \begin{cases} 1 \text{ for odd K} \\ 0 \text{ for even K} \end{cases}$

| SL — Shift Left | | | O,R$^a$ | K,R$^r$ |
|---|---|---|---|---|
| R$^r$ | 22 | R$^a$ | 1 0 1 | Count |
| 0 1 2 3 4 5 6 7 8 9 10 11 12 13 14 15 16 17 18 19 20 21 22 23 | | | | |

USAGE

Shift Left is used to left shift single-word length arithmetic or logical operands located in a general purpose register. Zero's are inserted into the vacated bit positions.

OPERATION

The contents of the specified general purpose register (R$^a$) are shifted 1 bit position to the left — the number of times specified by the effective count. At each step, a zero is inserted into bit position 23 following the left shift, and bit 0 is lost.

INDICATORS

The final contents of R$^a$ are used to set the condition code register. If a change also occurs in the sign bit of R$^a$, during the execution of the shift, then the arithmetic anomaly indicator of the Interrupt Indicator register ($w^2$) is set.

EFFECTIVE COUNT

The effective count is a 6-bit quantity, copied from the instruction count field but which may be optionally modified through indexing.

TIMING, μs

Look-Ahead Status
Complete
$(K+4)/4$

| SLC — Shift Left, Cyclic | O,R$^a$ | K,R$^r$ |
|---|---|---|

| R$^r$ | 22 | R$^a$ | 1 | 0 | 1 | Count |
|---|---|---|---|---|---|---|
| 0 1 2 3 4 5 6 7 | 8 9 10 11 | 12 13 14 15 | 16 | 17 | 18 | 19 20 21 22 23 |

USAGE

Shift Left, Cyclic is used to rotate a single-length word operand located in a general purpose register. Rotation takes place to the left, and bit 0 is copied into bit 23 at each cycle.

OPERATION

The contents of the specified general purpose register (R$^a$) are shifted 1 bit position to the left — the number of times specified by the effective count. At each step, bit 0 is saved and inserted into the vacated bit 23 position.

INDICATORS

The final contents of R$^a$ are used to set the condition code register.

EFFECTIVE COUNT

The effective count is a 6-bit quantity copied from the instruction count field but which may optionally be modified through indexing.

TIMING, μs

Look-Ahead Status
Complete
$(K+4)/4$

| SRDA — Shift Right Double, Arithmetic | O,R$^a$ | K,R$^r$ |
|---|---|---|

| R$^r$ | 22 | R$^a$ | 0 | 1 | 0 | Count |
|---|---|---|---|---|---|---|
| 0 1 2 3 4 5 6 7 | 8 9 10 11 | 12 13 14 15 | 16 | 17 | 18 | 19 20 21 22 23 |

USAGE

Shift Right Double, Arithmetic is used to right shift double-length arithmetic operands located in consecutively addressed general purpose registers. The sign bit (bit 0 of the most significant register contents) is copied and inserted into the vacated bit positions.

OPERATION

The contents of the specified general purpose register (R$^a$) and those of the register whose address is next higher in the register bank (R$^{(a+1) \bmod 8}$) are jointly right shifted 1 bit position. This cycle is repeated as specified by the effective count (bit 23 of R$^a$ is always shifted into bit 0 of R$^{(a+1) \bmod 8}$). At each step, the previous sign bit is copied into R$^a$'s vacated bit 0 position, and bit 23 of R$^{(a+1) \bmod 8}$ is lost.

INDICATORS

The final contents of R$^a$ are used to set the condition code register.

EFFECTIVE COUNT

The effective count is a 6-bit quantity copied from the instruction count field but which may optionally be modified by indexing.

TIMING, μs

Look-Ahead Status
Complete
$(K+\phi+16)/8$ $$\phi = \begin{cases} 1 \text{ for odd } K \\ 0 \text{ for even } K \end{cases}$$

| SRDL — Shift Right Double, Logical | O,R$^a$ | K,R$^r$ |
|---|---|---|

| R$^r$ | 22 | R$^a$ | 0 | 1 | 1 | Count |
|---|---|---|---|---|---|---|
| 0 1 2 3 4 5 6 7 | 8 9 10 11 | 12 13 14 15 | 16 | 17 | 18 | 19 20 21 22 23 |

USAGE

Shift Right Double, Logical is used to right shift double-length logical operands located in consecutively addressed general purpose registers. Leading zeros are inserted into vacated bit positions.

OPERATION

The contents of the specified general purpose register (R$^a$) and those of the register whose address is next higher in the register bank (R$^{(a+1) \bmod 8}$) are jointly right shifted 1 bit position. This cycle is repeated as specified by the effective count (bit 23 of R$^a$ is always shifted into bit 0 of R$^{(a+1) \bmod 8}$). At each step, a zero is inserted into bit 0 of R$^a$ following the right shift, and bit 23 of R$^{(a+1) \bmod 8}$ is lost.

INDICATORS

The final contents of R$^a$ are used to set the condition code register.

EFFECTIVE COUNT

The effective count is a 6-bit quantity copies from the instruction count field but which may be optionally modified by indexing.

TIMING, μs

Look-Ahead Status
Complete
$(K+\phi+16)/8$ $$\phi = \begin{cases} 1 \text{ for odd } K \\ 0 \text{ for even } K \end{cases}$$

| SLD — Shift Left Double | O,R$^a$ | K,R$^r$ |
|---|---|---|

| R$^r$ | 22 | R$^a$ | 1 | 1 | 1 | Count |
|---|---|---|---|---|---|---|
| 0 1 2 3 4 5 6 7 | 8 9 10 11 | 12 13 14 15 | 16 | 17 | 18 | 19 20 21 22 23 |

USAGE

Shift Left Double is used to left shift double-length arithmetic or logical operands located in consecutively addressed general purpose registers. Zeros are inserted into the vacated bit positions.

OPERATION

The contents of the specified general purpose register ($R^a$) and those of the register whose address is next higher in the register bank ($R^{(a+1) \bmod 8}$) are jointly left shifted 1 bit position. This cycle is repeated as specified by the effective count (Bit 0 of $R^{(a+1) \bmod 8}$ is always shifted into bit 23 of $R^a$. At each step, a zero is inserted into bit position 23 of $R^{(a+1) \bmod 8}$ following the left shift, and bit 0 of $R^a$ is lost.

INDICATORS

The final contents of $R^a$ are used to set the condition code register. If a change also occurs in the sign bit of $R^a$ during the execution of the shift, then the arithmetic anomaly indicator of the interrupt indicator register ($w^2$) is set.

EFFECTIVE COUNT

The effective count is a 6-bit quantity copied from the instruction count field but which can optionally be modified by indexing.

TIMING, μs

| | Look-Ahead Status |
| --- | --- |
| | Complete |
| | (K+8)/4 |

| SLDC — Shift Left Double, Cyclic | O,$R^a$ | | | | | K,$R^x$ |
| --- | --- | --- | --- | --- | --- | --- |
| $R^x$ | 22 | $R^a$ | 1 | 1 | 0 | Count |
| 0 1 2 3 4 5 6 7 8 9 10 11 12 13 14 15 16 17 18 19 20 21 22 23 | | | | | | |

USAGE

Shift Left Double, Cyclic is used to rotate a double-length operand located in consecutively addressed general purpose registers. Rotation occurs to the left.

OPERATION

The contents of the specified general purpose register ($R^a$) and those of the register whose address is next higher in the register bank ($R^{(a+1) \bmod 8}$) are jointly left-shifted 1 bit position. This cycle is repeated as specified by the effective count. Bit 0 of $R^{(a+1) \bmod 8}$ is copied into bit 23 of $R^a$, while bit 0 of $R^a$ is copied into bit 23 of $R^{(a+1) \bmod 8}$.

INDICATORS

The final contents of $R^a$ are used to set the condition code register.

EFFECTIVE COUNT

The effective count is a 6-bit quantity copied from the instruction count field, but which can be optionally modified by indexing.

TIMING, μs

| | Look-Ahead Status |
| --- | --- |
| | Complete |
| | (K+8)/4 |

| SLCT — Shift Left and Count | O,$R^a$ | $R^c$ |
| --- | --- | --- |
| $R^c$ | 23 | $R^a$ |

| -continued | |
| --- | --- |
| | Look-Ahead Status |
| | Complete |
| | (K+8)/4 |
| | 0 1 2 3 4 5 6 7 8 9 10 11 |

USAGE

Shift Left and Count is useful for normalizing (or left justifying and counting) a single word operand located in a general purpose register. One bit left shift cycles are executed until bits 0 and 1 are not identical or until 23 shifts have occurred. Zero's are inserted into the vacated bit positions.

OPERATION

Bits 0 and 1 of the specified general purpose register ($R^a$) are tested for equality. If they are identical, a sequence of 1 bit left shifts are performed until either the inequality condition is met or 23 shift cycles have occurred. Zero's are inserted into bit position 23 in each shift cycle. The number of cycles (possibly 0) are then loaded, right justified with leading zero's, into general purpose register $R^c$. $R^c$ may also equal $R^a$, in which case the count is retained but the shift register is lost. (Caution: SLCT should not be used as the next instruction in logical sequence after executing a BAL instruction, as the count register $R^c$ may not be properly initialized.)

The contents of $R^a$ following the last shift cycle are used to set the condition code register.

TIMING, μs

| Look-Ahead Status | |
| --- | --- |
| Complete | None |
| (K+6)/4 | (K+10)/4 |

BRANCH INSTRUCTIONS

This instruction set contains nine branch instructions used to alter the program sequence either unconditionally or conditionally. These instructions permit unconditional branch capabilities, and a decrement and conditional branch instruction to facilitate loop control.

The set of branch instructions, can be used to alter the program sequence either unconditionally or conditionally. If a program branch is unconditional, the next instruction to be executed is located by the branch instruction's computed effective address. If the branch is conditional and the conditions for the branch are currently satisfied, then the next instruction executed is again located by the branch instruction's effective address; otherwise the next instruction to be executed is that instruction immediately following the branch instruction in the current program sequence.

The two unconditional branch instructions B and BAL, and BCT each have unique operation code assignments; the remaining six conditional branch instructions share a single operation code and use the following format.

| OPCODE Extender | 31 | ADDRESS (32,768 Half-Words) |
| --- | --- | --- |

-continued 0 1 2 3 4 5 6 7 8 9 10 11 12 13 14 15 16 17 18 19 20 21 22 23

Bit positions 0 through 2 contain an opcode extender field. This field, in effect, indicates by set bits one or more of the three mutually exclusive condition code register states to be tested for by the branch instruction. If the condition code register is in a state corresponding to a set bit in the extended opcode field when the conditional branch instruction is executed, the program branch is taken; otherwise the branch is not taken and the next sequential instruction executed. The correspondence between condition code states and opcode extender bits is given below:

| Condition Code Register State | | Indication | Corresponding Extended Opcode Field Bit |
|---|---|---|---|
| $K_1$ | $K_2$ | | |
| 0 | 1 | < or negative | 0 |
| 1 | 0 | = or zero | 1 |
| 1 | 1 | > or positive | 2 |
| 0 | 0 | Never occurs | None |

Thus, the bit pattern in the instruction opcode extender field specifies the conditions to be met by a conditional branch.

| Opcode Extender Field Bits | | | Mnemonic | Branch Instruction Name |
|---|---|---|---|---|
| 0 | 1 | 2 | | |
| 1 | 0 | 0 | BL | Branch if less than |
| 1 | 1 | 0 | BLE | Branch if less than or equal |
| 1 | 0 | 1 | BNE | Branch if not equal |
| 0 | 1 | 0 | BE | Branch if equal |
| 0 | 1 | 1 | BGE | Branch if greater or equal |
| 0 | 0 | 1 | BG | Branch if greater than |
| (1 | 1 | 1) | — | (Branch unconditionally) |
| (0 | 0 | 0) | — | (No operation) |

| BL — Branch if Less Than | | 0 | A |
|---|---|---|---|
| 1 0 0 | 31 | Address (32,768 half-words) | |
| 0 1 2 3 4 5 6 7 8 9 10 11 12 13 14 15 16 17 18 19 20 21 22 23 | | | |

USAGE

Branch if Less Than is used to cause a program branch if the condition code register is currently set to its negative state.

OPERATION

The condition code register state is compared with the set bits of the instruction opcode extender field (i.e., bit 0). If the register is in a corresponding state (less than), then the instruction effective address is loaded into the program counter ($w^o$). Otherwise, the program counter is incremented.

INDICATORS

None.

EFFECTIVE ADDRESS

The effective address is the instruction immediate address.

TIMING, $\mu s$

| Look-Ahead Status | | |
|---|---|---|
| Complete | None | |
| (not taken) | (not taken) | (taken) |
| 0.50 | 2.00 | 2.50 |

| BLE — Branch if Less Than or Equal | | 0 | A |
|---|---|---|---|
| 1 1 0 | 31 | Address (32,768 half-words) | |
| 0 1 2 3 4 5 6 7 8 9 10 11 12 13 14 15 16 17 18 19 20 21 22 23 | | | |

USAGE

Branch if Less Than or Equal is used to cause a program branch if the condition code register is currently set to either its negative or zero state.

OPERATION

The condition code register state is compared with the set bits of the instruction opcode extender field (i.e., bits 0 and 1). If the register is in a corresponding state (less than or equal to), then the instruction effective address is loaded into the program counter ($w^o$). Otherwise, the program counter is incremented.

INDICATORS

None

EFFECTIVE ADDRESS

The effective address is the instruction immediate address.

TIMING, $\mu s$

| Look-Ahead Status | | |
|---|---|---|
| Complete | None | |
| (not taken) | (not taken) | (taken) |
| 0.50 | 2.00 | 2.50 |

| BNE — Branch if Not Equal | | 0 | A |
|---|---|---|---|
| 1 0 1 | 31 | Address (32,768 half-words) | |
| 0 1 2 3 4 5 6 7 8 9 10 11 12 13 14 15 16 17 18 19 20 21 22 23 | | | |

USAGE

Branch if Not Equal is used to cause a program branch if the condition code register is currently set to either its negative or positive state.

OPERATION

The condition code register state is compared with the set bits of the instruction opcode extender field (i.e., bits 0 and 2). If the register is in a corresponding state (less than or greater than), then the instruction effective address is loaded into the program counter ($w^o$). Otherwise, the program counter is incremented.

INDICATORS

None

EFFECTIVE ADDRESS

The effective address is the instruction immediat address.

TIMING, μs

| | Look-Ahead Status | |
|---|---|---|
| Complete | None | |
| (not taken) 0.50 | (not taken) 2.00 | (taken) 2.50 |

| BE — Branch if Equal To | | O | A |
|---|---|---|---|

| 0 1 0 | 31 | Address (32,768 half-words) |
|---|---|---|
| 0 1 2 3 4 5 6 7 8 9 10 11 12 13 14 15 16 17 18 19 20 21 22 23 | | |

USAGE

Branch if Equal To is used to cause a program branch if the condition code register is currently set to its zero state.

OPERATION

The condition code register state is compared with the set bits of the instruction opcode extender field (i.e., bit 1). If the register is in a corresponding state (equal), then the instruction effective address is loaded into the program counter ($w^o$). Otherwise, the program counter is incremented.

INDICATORS

None

EFFECTIVE ADDRESS

The effective address is the instruction immediate address.

TIMING, μs

| | Look-Ahead Status | |
|---|---|---|
| Complete | None | |
| (not taken) 0.50 | (not taken) 2.00 | (taken) 2.50 |

| BG — Branch if Greater Than | | O | A |
|---|---|---|---|

| 0 0 1 | 31 | Address (32,768 half-words) |
|---|---|---|
| 0 1 2 3 4 5 6 7 8 9 10 11 12 13 14 15 16 17 18 19 20 21 22 23 | | |

USAGE

Branch if Greater Than is used to cause a program branch if the condition code register is currently set to its positive state.

OPERATION

The condition code register state is compared with the set bits of the instruction opcode extender field (i.e., bit 2). If the register is in a corresponding state (greater than), then the instruction effective address is loaded into the program counter ($w^o$). Otherwise, the program counter is incremented.

INDICATORS

None

EFFECTIVE ADDRESS

The effective address is the instruction immediate address.

TIMING, μs

| | Look-Ahead Status | |
|---|---|---|
| Complete | None | |
| (not taken) 0.50 | (not taken) 2.00 | (taken) 2.50 |

| BGE — Branch if Greater or Equal | | O | A |
|---|---|---|---|

| 0 1 1 | 31 | Address (32,768 half-words) |
|---|---|---|
| 0 1 2 3 4 5 6 7 8 9 10 11 12 13 14 15 16 17 18 19 20 21 22 23 | | |

USAGE

Branch if Greater or Equal is used to cause a program branch if the condition code register is currently set to either its positive or zero state.

OPERATION

The condition code register state is compared with the set bits of the instruction opcode extender field (i.e., bits 1 and 2). If the register is in a corresponding state (greater than or equal to), then the instruction effective address is loaded into the program counter ($w^o$). Otherwise, the program counter is incremented.

INDICATORS

None

EFFECTIVE ADDRESS

The effective address is the instruction immediate address.

TIMING, μs

| | Look-Ahead Status | |
|---|---|---|
| Complete | None | |
| (not taken) 0.50 | (not taken) 2.00 | (taken) 2.50 |

| BCT — Branch and Count | | O | *A,$R^x$ |
|---|---|---|---|

| * | $R^x$ | 32 | Address (32,768 half-words) |
|---|---|---|---|
| 0 1 2 3 4 5 6 7 8 9 10 11 12 13 14 15 16 17 18 19 20 21 22 23 | | | |

USAGE

Branch and Count is used to cause a program branch if a specific condition is met. A designated count is first decremented, and as long as the new value remains non-negative, the branch is taken. This instruction is used primarily to control programmed loops.

OPERATION

The contents of general purpose register $R^x$ are decremented by 2. If the new count value is positive or zero, the value is stored in register $R^x$ and the effective address loaded into the program counter ($w^o$). If the new count value is negative, the value is discarded (i.e. $R^x$ is not changed), the program counter is incremented, and the next sequential program instruction executed. Any one of register $R^0$ through $R^3$ may be used as the count register $R^x$.

INDICATORS

None

EFFECTIVE ADDRESS

Indirect addressing may be specified to modify the 15-bit immediate address field.

TIMING, μs

| Indirect Address, μs/level | Look-Ahead Status | | |
|---|---|---|---|
| | Complete | None | |
| 2.00 | (not taken) 0.50 | (not taken) 2.00 | (taken) 2.50 |

| B — Branch Unconditionally | | O | *A,R^r |
|---|---|---|---|
| * | R^r | 30 | Address (32,768 half-words) |
| | 0 1 2 3 4 5 6 7 8 9 10 11 12 13 14 15 16 17 18 19 20 21 22 23 | | |

USAGE

Branch Unconditionally is used to alter a sequential program instruction stream and cause a program jump. This jump is usually to another memory location, but in general may be any HCM 231 system addressable location. The contents of the specified location will be treated as an instruction.

OPERATION

The effective instruction address is computed and loaded into the program counter; working register zero ($w^0$). Instruction execution proceeds with the instruction located at the effective address.

INDICATORS

None

EFFECTIVE ADDRESS

Indirect addressing and indexing may be specified to modify the 15-bit immediate address field. The effective address can reference either a half- or full-word instruction beginning in either the left or right half of the specified location.

TIMING, μs

| Indirect Address, μs/level | Execution Time |
|---|---|
| 2.00 | 2.00 |

| BAL — Branch and Link | | O | *A,R^r |
|---|---|---|---|
| * | R^r | 33 | Address (32,768 half-words) |
| | 0 1 2 3 4 5 6 7 8 9 10 11 12 13 14 15 16 17 18 19 20 21 22 23 | | |

USAGE

Branch and Link is used to alter sequential program execution and to allow a subsequent return to that sequence. This instruction is used primarily to enter subroutines. Returning to the calling program can be accomplished with an indirectly addressed or indexed B instruction; its computed effective address points to that location saving the program counter contents at the time of the subroutine call.

OPERATION

The updated contents of the program counter ($w^0$) are loaded into the general purpose register specified by the instruction X field. (Any one of registers $R^0$ through $R^3$ may be selected, though $R^0$ cannot be used if the subsequent return is made via indexing alone. The 18-bit program count is right justified in the general purpose register; leading bit positions are cleared to zeros.) The effective instruction address is then computed and loaded into the program counter. Instruction execution proceeds with the instruction located at the effective address.

INDICATORS

None

EFFECTIVE ADDRESS

Indirect addressing may be specified to modify the 15-bit immediate address field. The effective address can reference either a half- or full-word instruction which may begin in either the left or right half of the specified location.

TIMING, μs

| Indirect Address, μs/level | Execution Time |
|---|---|
| 2.00 | 2.00 |

| EXAMPLES: | | | |
|---|---|---|---|
| (1) | BAL | *JOE,1 | Subroutine call |
| | BU | 000000,1 | Subroutine return |

PROCESSOR CONTROL INSTRUCTIONS

This instruction set includes eight control instructions that can be used to enable or disable the interrupt system, lock or unlock low order memory cells, and set or reset BIT flags, as well as perform certain AGE functions.

The processor control instructions are used to exert control over the interrupt logic, system address interpretation, built-in-test flip-flop states, and to perform certain ground (test or preflight) computer operations. All control instructions except BIT are half-word instructions and may be executed as required without altering any processor data storage location contents. Groups of control instructions are employed to accomplish these tasks.

Interrupt System Control

Three instructions (ENT, DST, and DSIM) provide control over interrupt system operation. ENT and DST set and reset, respectively, the Tactical Interrupt enable flip-flop. DSIM disarms all interrupts during the following two instruction executions.

System Address Control

SCM and SCP are used, respectively, to set a control flip-flop to its memory or processor position. In the processor position, system addresses below the local store address boundary are interpreted as referring to the appropriate cell or register contained within the processor, while in the memory position all system addresses are interpreted as referencing locations in main core memory.

Built-In-Test Mode Control

BIT mode control is determined by the states of 12 distributed flip-flops that are selectively set or reset via the BIT instructions.

Aerospace Ground Equipment Operation

The AGE and H instructions are used during ground or preflight operations in conjunction with external auxiliary checkout equipment; they are not employed in tactical computer modes. The processor control instructions are summarized in the following table.

| Instruction Name | Mnemonic |
|---|---|
| Enable Tacticals | ENT |
| Disable Tacticals | DST |
| Disable Interrupts Momentarily | DSIM |
| Set Control to Processor | SCP |
| Set Control to Memory | SCM |
| Built-in-Test | BIT |
| AGE Control | AGE |
| Halt | H |

Processor Control Instructions

The eight processor control instructions coordinate the interrupt system, system addressing, built-in-test, and the ground support equipment.

| ENT — Enable Tacticals | | | O |
|---|---|---|---|
| | 7 | 25 | 1 |
| 0 1 2 3 4 5 6 7 8 9 10 11 | | | |

USAGE

Enable Tacticals is used to set the tactical interrupt control bit to the interrupt enable position. In this position, tactical interrupts are recognized by the processor unless they are either masked or the interrupt system is temporarily disarmed. Catastrophic interrupt recognition is not affected by this instruction, once an interrupt disarm interval ending after the second succeeding instruction has elapsed.

OPERATION

The tactical interrupt control flip-flop is set to one, and the interrupt disarm flip-flop is set to one. Barring subsequent interrupt systems status changes, the disarm flipflop will be reset to zero at the end of the second sequential instruction to be executed.

INDICATORS

None.

TIMING, μs

| Look-Ahead Status | |
|---|---|
| Complete | None |
| 0.5 | 1.5 |

| DST — Disable Tacticals | | | O |
|---|---|---|---|
| | 7 | 25 | 0 |

-continued

| Look-Ahead Status | |
|---|---|
| Complete | None |
| 0 1 2 3 4 5 6 7 8 9 10 11 | |

USAGE

Disable Tacticals is used to reset the tactical interrupt control bit to the interrupt disable position. In this position, tactical interrupts will not be recognized by the processor even if they are unmasked and would be allowed otherwise. Catastrophic interrupt recognition is not affected by this instruction once an interrupt disarm interval ending after the second succeeding instruction has elapsed.

OPERATION

The tactical interrupt control flip-flop is reset to zero, and the interrupt disarm flip-flop is set to one. Barring subsequent interrupt system status changes, the disarm flip-flop will be reset to zero at the end of the second sequential instruction to be executed.

INDICATORS

None.

TIMING, μs

| Look-Ahead Status | |
|---|---|
| Complete | None |
| 0.5 | 1.5 |

| DSIM — Disable Interrupts Momentarily | | | O |
|---|---|---|---|
| | 7 | 25 | 2 |
| 0 1 2 3 4 5 6 7 8 9 10 11 | | | |

USAGE

Disable Interrupts Momentarily is used to temporarily disarm all interrupts, including the catastrophic interrupts from being permitted by the processor for the duration of the next two instructions to be executed. Then the interrupt system status reverts to its state before the DSIM instruction, unless the status has been altered during the two-instruction disarm period. This instruction is particularly useful as a means of allowing a subroutine return free from the possibility of interrupt occurrence.

OPERATION

The interrupt disarm flip-flop is set to one. Barring subsequent interrupt system status changes, the disarm flip-flop will be reset to zero at the end of the second sequential instruction to be executed.

INDICATORS

None

TIMING, μs

| Look-Ahead Status | |
|---|---|
| Complete | None |
| 0.5 | 1.5 |

| SCP — Set Control to Processor | | 0 |
|---|---|---|

-continued

| Look-Ahead Status | |
|---|---|
| Complete | None |
| 7 | 25 | 4 |

0 1 2 3 4 5 6 7 8 9 10 11

USAGE

Set Control to Processor is used to set the processor main memory control bit to the processor address position. In this position, system addresses in the range of 0 to 127 fullwords refer to processor locations in the general purpose register bank (0 to 7), the working register bank (8 to 15), or local store cells (16 to 127), respectively, instead of the corresponding main memory locations. System addresses greater than 127 full words are not affected.

OPERATION

The processor main memory flip-flop is reset to 0.

INDICATORS

None.

TIMING, μs

| Look-Ahead Status | |
|---|---|
| Complete | None |
| 0.5 | 1.5 |

SCM — Set Control to Memory       O

| 7 | 25 | 5 |

0 1 2 3 4 5 6 7 8 9 10 11

USAGE

Set Control to Memory is used to set the processor main memory control bit to the memory address position. In this position, system addresses in the range of 0 to 127 fullwords refer to main memory locations instead of processor locations in the general purpose register or working register banks, or in the local store. System addresses greater than 127 full workds are not affected.

OPERATION

The processor main memory flip-flop is set to 1.

INDICATORS

None.

TIMING, μs

| Look-Ahead Status | |
|---|---|
| Complete | None |
| 0.5 | 1.5 |

BIT — Built-in-Test       Y

| 36 | Immediate Operand - Y |

0 1 2 3 4 5 6 7 8 9 10 11 12 13 14 15 16 17 18 19 20 21 22 23

USAGE

The Built-in-Test (BIT) instruction is used to set or reset one or more BIT flip-flops located throughout the computer and its associated I/O modules. Each flip-flop is assigned a BIT position in the instruction 12-bit immediate operand field, and its effect on the system is described below. The immediate operand field for operational tactical modes will be 3777.

In addition to the described test functions, the bit-12 flip-flop of the BIT instruction is forced to the one state at the power-on interrupt. This state will cause a no-go indication if the BIT instruction is not executed within 600 milliseconds with bit-12 reset.

OPERATION

Each of the BIT flip-flops is set or reset, depending on whether its corresponding Y-field bit is 1 or 0, respectively. The following BIT assignments have been made.

| BIT | Flip-Flop Function and State |
|---|---|
| 12 | State 0 — RDP and radar operational. State 1 — Set RDP fault indicator and no-go lights on the BIT control panel and avionics status panel indicators latch on after 600 to 1800 milliseconds. |
| 13 | State 0 — Set I/O channel controller to test mode. State 1 — Set I/O channel controller to tactical (normal) mode. |
| 14 | State 0 — Set BIT mode 041. State 1 — Set tactical mode 041. Set with bit 15. |
| 15 | State 0 — Raise data valid to 041 unit for test data to enter RDP. State 1 — Normal tactical operation of 041. Set with bit 14. |
| 16 | Not used. |
| 17 | State 0 — Completes link between P-MUX register and C-MUX register for testing. State 1 — Normal tactical operation of P-MUX channel. |
| 18 | Not used. |
| 19 | Not used. |
| 20 | Not used. |
| 21 | Not used. |
| 22 | Not used. |
| 23 | State 0 — Set C-MUX to test mode. State 1 — Set C-MUX to tactical mode. |

INDICATORS

None.

TIMING, μs

| Look-Ahead Status | |
|---|---|
| Complete | None |
| 0.5 | 1.5 |

H — Halt       O

| 6 | 25 |

0 1 2 3 4 5 6 7 8 9 10 11

USAGE

Halt is used to halt the processor, if it is in the test mode, and await a start command. If the processor is not in the test mode, H performs a no-operation function.

OPERATION (Operation details not finalized.)

INDICATORS

None.

TIMING, µs

| Look-Ahead Status | |
|---|---|
| Complete | None |
| 0.5 | 1.51 |

INPUT-OUTPUT CONTROL INSTRUCTIONS

This instruction set contains two I/O control instructions that are used in conjunction with the I/O system control units. I/O operations are performed in two modes:
1. Direct mode I/O, in which I/O operands are referenced directly by regular instructions via their system addresses, i.e., L, A, ST, etc.
2. Buffered mode I/O, in which I/O operands are transferred between the I/O system and memory (or processor) storage cells by autonomously operating I/O control units.

When buffered mode I/O is performed, the program controlled I/O control units are initiated, and possibly sampled or terminated, by the processor under program control. Two special I/O control instructions are used for these purposes.

Buffered I/O Transaction Initiation

A buffered mode transation is initiated by transmitting a control word from the processor to the selected I/O control unit. A PCW instruction is executed and, in general, one PCW instruction is required for each transaction instance.

Buffered I/O Transaction Status Sampling

The status of some I/O control units can be sampled as desired by the processor, with the option of terminating any currently executing transaction, using the LSC instruction.

| PCW: | Place Control Word | | O,B | *A,R* |
|---|---|---|---|---|

| * R* | 17 | B | Address (2048 full-words) |
|---|---|---|---|
| 0 1 2 3 4 5 6 7 8 9 10 11 12 13 | 14 15 16 17 18 19 20 21 22 | | |

USAGE

The Place Control Word instruction is used to initiate the action of a program controlled I/O control unit on a block of sequential I/O data items. Once initiated, the control unit performs the I/O transaction independently. They can accommodate data blocks of varying lengths, where data items themselves are either full- or half-word lengths.

OPERATION

The contents of the computed effective address are transmited to the I/O control unit, specified by bits 9, 10 and 11 in the instruction. These contents are in the format corresponding to the type of control unit to be used.

INDICATORS

None.

EFFECTIVE ADDRESS

Indirect addressing and indexing may be specified, is desired, to form the effective address of the control word to be transmitted. The control word occupies a full memory word (24 bits). The least significant bit of the effective address formation is ignored in the address computation.

TIMING, µs

| Indirect Address, µs/level | Look-Ahead Status | |
|---|---|---|
| | Complete | None |
| 1.5 | 3.00 | 3.75 |

EXAMPLE 1:    PCW, 1   ABC

Before Execution                After Execution
(ABC)            '0441 2500'       '0441 2500'
(I/O Controller No. 1    XXXXXXXX      '0441 2500'
   control reg.)                              O,R$^a$   r
LCW:    Load Control Word
      20      R$^a$       S.A.       C T I R X     B
0 1 2 3 4 5 6 7 8 9 10 11 12 13 14 15 16 17 18 19 20 21 22 23

USAGE

The Load Control Word instruction is used to determine the status of a selected I/O control unit. A 24-bit word containing status information is transmitted to a general purpose register.

OPERATION

The contents of the instruction's 12-bit y field (bits 12-23) are used to form the effective address, which is transmitted to the I/O control unit via the main bus. The control unit transmits its status information to the processor. The 24-bit status word sent by the control unit is loaded into general purpose register R$^a$. The meaning of the control bits C, T and R, fields S.A. and B, and spare bit X are as follows:

| | | | | Word Address | H (i) |
|---|---|---|---|---|---|
| S.A. | C T I | P Channel | Subchannel X | Word | H (ii) |
| | | R X Cont. | All Zero's | | (iii) |
| 0 1 2 3 4 5 6 7 8 9 10 11 12 13 | | | 14 15 16 17 18 19 20 21 22 23 | | |

(i) Main Memory Address
    0 0 0 0 0 0 0 - - - - - - - - - - - - - - - - -
(ii) Channel Controller Address
    0 0 0 0 0 0 1 1 - - - - - - - - - - - - - - - -
(ii) Direct Dependent Unit Address (Special I/O Module)
    0 0 0 0 0 0 1 0 - - - - - - - - - - - - - - - -
(iii) Input-Output Controller Address
    0 0 0 0 1 0 1 1 0 - - - 0 0 0 0 0 0 0 0 0 0 0 (a)
    0 0 0 0 1 1 1 1 0 - - - 0 0 0 0 0 0 0 0 0 0 0 (b)
    0 0 0 0 1 1 1 0 0 - - - 0 0 0 0 0 0 0 0 0 0 0 (c)

(a) Status Request
(b) Status and Terminate Request
(c) Assignment Command

| Control Bit | Name | Bit Position Control Word | Bit Position Address Word | Meaning | |
|---|---|---|---|---|---|
| C | Control Word Address Flag Bit | - | 4 | C = 1 | An independent I/O unit |
| I | I/O - Memory Partition Bit | - | 6 | I = 1 | An I/O Address |
| | | | | I = 0 | A main memory address |
| P | Channel Controller | - | 7 | P = 1 | A channel controller |

-continued

| Control Bit | Name | Bit Position Control Word | Bit Position Address Word | | Meaning |
|---|---|---|---|---|---|
| | Partition Bit | | | P = 0 | An address external to any channel controller address |
| R | Block Transfer Controller Status Request Bit | - | 7 | R = 1 | A status request |
| | | | | R = 0 | An I/O transmission assignment with no status request |
| H | Half-Word Address Bit | 23 | 23 | H = 1 | A least significant (right) word half |
| | | | | H = 0 | A most significant (left) word half |
| X | Spare Control Bit | - | 8 or 16 | X = 0 | (Hardwired) |

INDICATORS
None.

EFFECTIVE ADDRESS

The effective address transmitted to the selected I/O control unit is formed by shifting the instruction y field contents (bits 12–23) to bit positions 0 through 11, respectively, and setting address bits 12 through 23 to zero. The control bits contained by the effective address are defined in the next section.

TIMING, μs

|  | Look-Ahead | Status Complete |
|---|---|---|
| | 20 | 1.75 |

EXAMPLE 1:  LCW,7  '0261'

| | Before Execution | | After Execution | |
|---|---|---|---|---|
| (R⁷) | XXXX | XXXX | 0441 | 0500 |
| (I/O Controller No. 11 control reg.) | 0441 | 0500 | 0441 | 0500 |

APPENDIX B

PART I

| | | | | | |
|---|---|---|---|---|---|
| 00630 | ATV02 | DATA | 0 | THETA(E) INITIAL PSD EL BY XT BO | AT012 |
| 00631 | ATV03 | DATA | 0 | THETA(D) INITIAL PSD AZ BY XT BO | AT013 |
| 00632 | ATV04 | DATA | 0 | L(E) EL B-2 | AT014 |
| 00633 | ATV05 | DATA | 0 | L(D) AZ B-2 | AT015 |
| | ******** | | | TRACKING FILTER VARIABLES | FT002 |
| | * | | | | FT003 |
| | | BOUND | 8 | | FT004 |
| 00716 | FTV0000 | DATA,W | 0 | FT ROUT RETURN ADDRESS SAVE | FT005 |
| | * | | | | FT007 |
| 00720 | FTV0001 | DATA,W | 0 | R(TPA) FT B20 | FT008 |
| 00722 | FTV0002 | DATA,W | 0 | V(TPA) FPS B13 | FT009 |
| | * | | | | FT010 |
| 00724 | FTV0010 | DATA,H | 0 | T SECS B-3 (FILTER PER) | FT011 |
| 00725 | FTV0011 | DATA,H | 0 | T(NEW) SECS B-3 | FT012 |
| 00726 | FTV0012 | DATA,W | 0 | T(INS) SECS B1 | FT012 10 |
| | * | | | | FT012 20 |
| 00730 | FTV0020 | DATA | 0 | C(INS) INS F.C. COUNTER B11 | FT012 30 |
| | * | | | | FT012 40 |
| 00731 | FTV0030 | DATA | 0 | SNR(D) B6 | FT012 50 |
| | * | | | | FT013 |

APPENDIX B-continued

```
00733  FTV0101  DATA,W  0    R(GC) FT B20 (RNG GATE CMD)        FT014
00734
00736  FTV0102  DATA,W  0    V(GC) FPS B13 (VEL GATE CMD)       FT015
00740  FTV01021 DATA,W  0    V(GC)(OLD)                         FT015 10
       *******       INDEPENDENT RNG AND VEL TRACKERS' GAINS    FT121
                                                                FT122
       *
00744  FTV1501  DATA,H  0    K1(R) RANGE(R) GAIN ND B1          FT123
00745  FTV1502  DATA,H  0    K2(R) VEL(R) GAIN FPS/FT B4        FT124
00746  FTV1503  DATA,H  0    K3(R) ACCEL(R) GAIN FPS**2/FT B5   FT125
00747           DATA,H  0    SPARE                              FT126
       *                                                        FT127
00750  FTV1512  DATA,H  0    K2(V) VEL(V) GAIN ND B2            FT128
00751  FTV1513  DATA,H  0    K3(V) ACCEL(V) GAIN FPS**2/FPS B5  FT129
       *                                                        FT130
       *******       KALMAN ANGLE TRACKER STATE VARIABLES       FT201
       *                                                        FT202
00754  FTV2011  DATA,W  0    EPS(P)(E) RADS B-2                 FT203
00756  FTV2012  DATA,W  0    OMEGA(LSP)(E) RADS/SEC B1          FT204
00760  FTV2013  DATA,W  0    A(TP)(D) FPS**2 B11                FT205
00762  FTV2014  DATA,W  0    S(P)(E) RADS B-2                   FT206
       *                                                        FT207
00764  FTV2021  DATA,W  0    EPS(P)(D) RADS B-2                 FT208
00766  FTV2022  DATA,W  0    OMEGA(LSP)(D) RADS/SEC B1          FT209
00770  FTV2023  DATA,W  0    A(TP)(-E) EPS**2 B11               FT210
00772  FTV2024  DATA,W  0    S(P)(D) RADS B-2                   FT211
       *                                                        FT212
       *******       KALMAN ANGLE TRACKER STATE TRANSITION
                     MATRIX                                     FT213
                                                                FT214
       *
00774  FTV2112  DATA,W  0    PHI(A)12 SEC B-2                   FT215
00776  FTV2113  DATA,W  0    PHI(A)13 SEC**2/FT B-17            FT216
01000  FTV2122  DATA,W  0    PHI(A)22 ND B1                     FT217
01002  FTV2123  DATA,W  0    PHI(A)23 SEC/FT B-12               FT218
01004  FTV2133  DATA,W  0    PHI(A)33 ND B1                     FT219
01006  FTV2144  DATA,W  0    PHI(A)44 ND B1                     FT220
       *                                                        FT221
```

APPENDIX B-continued

```
********           KALMAN ANGLE TRACKER CO-VARIANCE MATRIX   FT222
   *                                                         FT223
01010  FTV2211  DATA,W  0   M(A)11 (RADS)**2 B-9             FT224
01012  FTV2212  DATA,W  0   M(A)12 (RADS)*(RADS/SEC) B-8     FT225
01014  FTV2213  DATA,W  0   M(A)13 (RADS)*(FPS**2) B2        FT226
01016  FTV2214  DATA,W  0   M(A)14 (RADS)**2 B-9             FT227
01210  FTV2222  DATA,W  0   M(A)22 (RADS/SEC)**2 B-8         FT228
01022  FTV2223  DATA,W  0   M(A)23 (RADS/SEC)*(FPS**2) B3    FT229
01024  FTV2224  DATA,W  0   M(A)24 (RADS/SEC)*(RADS) B-8     FT230
01026  FTV2233  DATA,W  0   M(A)33 (FPS**2)**2 B13           FT231
01030  FTV2234  DATA,W  0   M(A)34 (FPS**2)*(RADS) B2        FT232
01032  FTV2244  DATA,W  0   M(A)44 (RADS)**2 B-9             FT233
   *                                                         FT234
   ********          KALMAN ANGLE TRACKER TEMPORARY STORAGE  FT235
   *                                                         FT235 10
01034  FTV2400  DATA,W  0   FT TEMP0                         FT236
01036  FTV2401  DATA,W  0   FT TEMP1                         FT237
01040  FTV2402  DATA,W  0   FT TEMP2                         FT238
01042  FTV2403  DATA,W  0   FT TEMP3                         FT239
01044  FTV2404  DATA,W  0   FT TEMP4                         FT240
   *                                                         FT241
   ********          KALMAN ANGLE TRACKER GAINS              FT242
   *                                                         FT243
01046  FTV2501  DATA,W  0   K(A)1 EPS GAIN ND B1             FT244
01050  FTV2502  DATA,W  0   K(A)2 OMEGA GAIN 1/SEC B4        FT245
01052  FTV2503  DATA,W  0   K(A)3 AT GAIN FPS**2 B15         FT246
01054  FTV2504  DATA,W  0   K(A)4 S GAIN ND B1               FT247
   *                                                         FT248
   ********          KALMAN ANGLE TRACKER MOTION
                          COMPENSATION                       FT249
   *                                                         FT250
01056  FTV2611  DATA,W  0   L(E)1 RADS B-2                   FT253
01060  FTV2612  DATA,W  0   L(E)2 RADS/SEC B1                FT254
   *                                                         FT255
01062  FTV2621  DATA,W  0   L(D)1 RADS B-2                   FT256
01064  FTV2622  DATA,W  0   L(D)2 RADS/SEC B1                FT257
   *                                                         FT257 10
```

APPENDIX B-continued

```
01066   FTV2631   DATA,H   0    ETA(T1)(AI01 AT T1)                FT257 20
01067   FTV2632   DATA,H   0    ETA(T2)(AI01 AT T2)                FT257 30
01070   FTV2633   DATA,W   0    ETA(DOT) RADS/SEC B3               FT257 40
        *                                                          FT258
        ********         KALMAN ANGLE TRACKER MISC VARIABLES       FT259
        *                                                          FT260
01072   FTV2700   DATA,W   0    SIGMA(S)**2 B-9                    FT261
01074   FTV2701   DATA,W   0    TAU(S) SECS B1                     FT262
01076   FTV2702   DATA,W   0    RADOME COMPENSATION (EL) RADS B-2  FT263
01100   FTV2703   DATA,W   0    RADOME COMPENSATION (AZ) RADS B-2  FT264
01102   FTV2704   DATA,H   0    KE (EL DISCR SLOPE) B1             FT265
01103   FTV2705   DATA,H   0    KD (AZ DISCR SLOPE) B1             FT266
01104   FTV2706   DATA,W   0    RESIDUAL (EL) RADS B-3             FT267
01106   FTV2707   DATA,W   0    RESIDUAL (AZ) RADS B-3             FT268
        *                                                          FT269
        *                                                          FT300
        ********         OWN SHIP VARIABLES                        FT301
        *                                                          FT302
01110   FTV3001   DATA,W   0    AI(R)(ANT COORDS) FPS**2B11        FT303
01112   FTV3002   DATA,W   0    AI(E) B11                          FT304
01114   FTV3003   DATA,W   0    AI(D) B11                          FT305
        *                                                          FT306
01116   FTV3111   DATA,W   0    V(N)1 FPS B12 INS VEL BUFFER       FT307
01120   FTV3112   DATA,W   0    V(E)1 FPS B12                      FT308
01122   FTV3113   DATA,W   0    V(V)1 FPS B11                      FT309
        *                                                          FT310
01124   FTV3201   DATA,W   0    SIN(ETA) INS TWO ANTENNA-          FT311
01126   FTV3202   DATA,W   0    COS(ETA) XFM BUFFER                FT312
01130   FTV3203   DATA,W   0    SIN(EPS)                           FT313
01132   FTV3204   DATA,W   0    COS(EPS)                           FT314
01134   FTV3205   DATA,W   0    SIN(PHI+PHIG)                      FT315
01136   FTV3206   DATA,W   0    COS(PHI+PHIG)                      FT316
01140   FTV3207   DATA,W   0    SIN(THETA)                         FT317
01142   FTV3208   DATA,W   0    COS(THETA)                         FT318
01144   FTV3209   DATA,W   0    SIN(PSI)                           FT319
01146   FTV3210   DATA,W   0    COS(PSI)                           FT320
        *                                                          FT321
```

APPENDIX B-continued

```
       * SNR VARIABLES - SNV01 THRU SNV07 ARE SNR PARAMETERS   SN400
01203  SNV01   DATA   0    * SNR(EARLY RNG/LOW VEL) B6         SN401
01204  SNV03   DATA   0    3 * SNR (RNG) B6                    SN403
01205  SNV04   DATA   0    4 * SNR (AZ) B6                     SN404
01206  SNV05   DATA   0    5 * SNR (EL) B6                     SN405
01207  SNV06   DATA   0    6 * SNR (VEL) B6                    SN406
       * ANY CELL PREFIXED SNV08 ARE SNR SUMS                  SN408
01212  SNV082  DATA,W 0    SUM(2)                              SN409
01214  SNV086  DATA,W 0    SUM(6)                              SN410
01216  SNV084  DATA,W 0    SUM(4)                              SN411
01220  SNV087  DATA,W 0    SUM(7)                              SN412
01222  SNV083  DATA,W 0    SUM(3)                              SN413
01224  SNV085  DATA,W 0    SUM(5)                              SN414
01226  SNV081  DATA,W 0    SUM(1)                              SN415
01230  SNV089  DATA,W 0    SUM(9) = ALTERNATE SUM(1)           SN416
01232  SNV09   DATA,W 0    HPRF 11 NARROW FLTR HIT/MISS COUNT  SN417
01234  SNV10   DATA,W 0    RETURN ADDRESS FOR SN ROUTINE       SN418
02276  FTV1001 DATA,W 0    R(TPR) FT B20                       FT103
02300          DATA,W 0    R(TPR) LEAST SIGNIFICANT WORD       FT103 10
       *                                                       FT104
02302  FTV1002 DATA,W 0    V(TPR) FPS B13                      FT105
02304  FTV1003 DATA,W 0    A(TPR) FPS**2 B11                   FT106
       *                                                       FT107
02306  FTV1012 DATA,W 0    V(TPV) FPS B13                      FT108
02310  FTV1013 DATA,W 0    A(TPR) FPS**2 B11                   FT109
       *                                                       FT110
       *                                                       FT001
       *******             TRACKING FILTER CONSTANTS           FT002
       *                                                       FT003
       *                                                       FT100
       *******             INDEPENDENT RNG AND VEL TRACKERS'
                                   GAINS                       FT101
       *                                                       FT102
       *                                                       FT103
04630  FTK101  EQU    $    MPRF SNR1 < SNR(R) < SNR2 (SET 1)   FT104
04631          DATA        FX'0·130B1' K1(R) I/T               FT105
```

APPENDIX B-continued

```
04631           DATA      FX'0·150B4'   K2(R) I/T              FT106
04632           DATA      FX'0·000B5'   K3(R) I/T              FT107
04633           DATA      FX'-·150B2'   K2(V) I/T              FT108
04634           DATA      FX'-·500B5'   K3(V) I/T              FT109
04635  FTK103   EQU    $  MPRF·SNR3 < SNR(R) (SET3)            FT116
04635           DATA      FX'0·050B1'   K1(R) I/T              FT117
04636           DATA      FX'0·100B4'   K2(R) I/T              FT118
04637           DATA      FX'0·000B5'   K3(R) I/T              FT119
04640           DATA      FX'- 150B2'   K2(V) I/T              FT120
04641           DATA      FX'- 800B5'   K3(V) I/T              FT121
04642  FTK104   EQU    $  MPRF SNR1 < SNR(R) < SNR5 (SET 4)    FT122
04642           DATA      FX'0·150B1'   K1(R) F/T              FT123
04643           DATA      FX'0·100B4'   K2(R) F/T              FT124
04644           DATA      FX'0·030B5'   K3(R) F/T              FT125
04645           DATA      FX'0·700B2'   K2(V) F/T              FT126
04646           DATA      FX'2·000B5'   K3(V) F/T              FT127
04647  FTK106   EQU    $  MPRF·SNR6 < SNR(R) (SET 6)           FT134
04647           DATA      FX'0·060B1'   K1(R) F/T              FT135
04650           DATA      FX'0·080B4'   K2(R) F/T              FT136
04651           DATA      FX'0·030B5'   K3(R) F/T              FT137
04652           DATA      FX'0·400B2'   K2(V) F/T              FT138
04653           DATA      FX'1·800B5'   K3(V) F/T              FT139
04700  FTK200   GAD       ANV4 IAOW FOR FETCHING 6 GIMBAL
                          VAR'S                                FT203
04702  FTK201   GAD       FTV3201 POINTER TO INS-ANT XFM
                          BUFFER                               FT204
                                                               FT205
          *
          *                                                    FT247
          ********        ANGLE TRACKER INITIAL TRACK GAINS    FT248
          *                                                    FT249
04704  FTK250   DATA      FX'0·8B1'  R(TPA)<R1 GAINS           FT250
04705           DATA      FX'4·B4'                             FT251
04706           DATA      FX'=2000·B15'                        FT252
04707           DATA      FX'0·15B1'                           FT253
          *                                                    FT254
04710           DATA      FX'0·20B1'  B1 < R(TPA) ·SNR(D) >
                          C4 GAINS                             FT255
```

APPENDIX B-continued

| | | | |
|---|---|---|---|
| 04711 | DATA | FX'0·67B4' | FT256 |
| 04712 | DATA | FX'=1000·B15' | FT257 |
| 04713 | DATA | FX'0·92B1' | FT258 |
| * | | | FT259 |
| 04714 | DATA | FX'0·12B1' R1 < R(TPA)·SNR(D) <C4 GAINS | FT260 |
| 04715 | DATA | FX'0·17B4' | FT261 |
| 04716 | DATA | FX'=100·B15' | FT262 |

```
                    P A R T  I I
           *                                                   AT101
           ********    AT A/A TRACK ANTENNA CONTROL  ********AT102
           ********                                            AT103
           *                                                   AT104
42521 AT         EQU     $                                     AT105
42521            LG,0    3 SAVE RETURN ADDRESS IN R0           AT105 10
42526            LI,2    6'0124' AI10 INDEX                    AT106
42530            L,4     *UNK3 BUFFERED AZ PSD OUTPUT THETA (D) BO AT107
           *             50USEC DELAY                          AT108
42532            STH,4   AI10 TO BUFFER                        AT109
42534            AI,2    2 AI11 INDEX                          AT110
42536            L,4     *UNK3 BUFFERED EL PSD OUTPUT THETA(E) BO AT111
           *             50 USEC DELAY                         AT112
42540            STH,4   AI11 TO BUFFER                        AT113
           *             START EL DRIVE CALCULATIONS           AT144
42554 ATL060     LI,1    0 INDEX FOR AT VAR IN EL              AT145
42556            LI,2    0'0010' 0A004 INDEX                   AT146
42560            LI,3    0 INDEX FOR FT VAR IN EL              AT147
42562            LH,4    AI11 THETA(E) BO                      AT148
           *             COMMON EL/AZ DRIVE CALCULATIONS       AT149
42564 ATL070     LH,5    ATV02,1 PREVIOUS THETA(E)/(D) BO      AT150
42566            STH,4   ATV02,1 UPDATE THETA(E)/(D) BO        AT151
42570            SHG,4   5 DELTA THETA(E)/(D) BO               AT152
           *             PSD SCALING 10/(1·75*57·296) = ·100 RADS  AT152 1
42571            MHI,4   FX'-0·1B0' CONVERT TO RADS, CORRECT
                         AI POLARITY                           AT153
42573            SL,4    2 B-2                                 AT154
42575            A,4     FTV2011,3 +EPS(P)(E)/(D)B-2           AT155
```

APPENDIX B-continued

| | | | |
|---|---|---|---|
| 42577 | ST,4 | FTV2011,3 NEW EPS(P)(E)/(D) RADS B-2 | AT156 |
| 42601 | AH,4 | ATV04,1 + L(E)1 OR L(D)1 RADS B-2 | AT157 |
| 42603 | MHI,4 | FX'15·B6' *K(2) B4 | AT158 |
| 42605 | L,5 | FTV2012,3 OMEGA(LSP)(E)/(D) B1 | AT159 |
| 42607 | SRA,5 | 3 B4 | AT160 |
| 42611 | AG,4 | 5 B4 | AT161 |
| 42612 | LHI,6 | FX'0·69813B0' | AT162 |
| 42614 | SRA,6 | 4 40 DEG/SEC B4 | AT163 |
| 42616 | DT,4 | R6 B0 | AT164 |
| 42620 | SLC,7 | 24 DELAY FOR AO | AT164 10 |
| 42622 | STH,4 | *UNK3 OUTPUT EL/AZ DRIVE | AT165 |
| 42624 | CI,1 | 1 BOTH EL/AZ CALCULATIONS COMPLETED? | AT166 |
| 42626 | BE | ATL080 YES | AT167 |
| 42630 | STH,4 | A004 TO BUFFER | AT168 |
| * | | START AZ DRIVE CALCULATIONS DURING EL DRIVE AO | |
| | | TIME | AT169 |
| 42632 | LI,1 | 1 INDEX FOR AT VAR IN AZ | AT170 |
| 42634 | LI,2 | 0'0006' A003 INDEX | AT171 |
| 42636 | LI,3 | 8 INDEX FOR FT VAR IN AZ | AT172 |
| 42640 | LH,4 | THETA(D) B0 | AT173 |
| 42642 | | 8 ATL070 | AT174 |
| | * | | AT175 |
| 42644 ATL080 | STH,4 | A003 TO BUFFER | AT176 |
| 42646 | LI,1 | 0'0066' | AT177 |
| 42650 | BCT | $·1 66 USEC DELAY TO COMPLETE AZ AO | AT178 |
| 42652 | I,1 | 0'1000' | AT179 |
| 42654 | CSW,1 | 2 CLEAR ADA COMPLETE | AT180 |
| 42655 | BU | *0 RETURN | AT181 |
| | * | | FT001 |
| | ******** | TRACKING FILTER PROGRAM | FT002 |
| | * | | FT003 |
| 46713 FT | ST,0 | FTV0000 SAVE RET ADDRESS TO XT | FT004 |
| 46715 | LH,4 | XTF001 'INITIAL TRK' FLAG | FT005 |
| 46717 | BEZ | FTL1010 BR IF F/T | FT006 |
| 46721 | STHI,0 | FTV0020 I/T. SET C(INS)=0 | FT007 |
| 46723 | BU | FTL1050 | FT008 |
| | * | | FT009 |

APPENDIX B-continued

| | | | | |
|---|---|---|---|---|
| 46725 | FTL1010 | LR,1 | FTV0020 F/T·C(INS) TO R1(R) | FT010 |
| 46727 | | BNEZ | FTL1020 BR IF NOT 1ST TIME F/T | FT011 |
| 46731 | | L,4 | INDA 1ST TIME F/T. SAVE 1ST VEL SET | FT012 |
| 46733 | | L,5 | IND5 | FT013 |
| 46735 | | L,6 | IND6 | FT014 |
| 46737 | | STD,4 | FTV3111 V(N),V(E) TO V(N)1,V(E)1FPSB12 | FT015 |
| 46741 | | ST,6 | FTV3113 V(V) TO V(V)1 FPS B11 | FT016 |
| 46743 | | STI,0 | FTV0012 T(INS)=0 | FT017 |
| 46745 | | STHI,1 | FTV0020 C(INS)=1 | FT018 |
| 46747 | | LI,1 | 18 | FT018 10 |
| 46751 | FTL1015 | STI,0 | FTV2211,1 CLEAR ALL M(A)'S | FT018 15 |
| 46753 | | BCT | FTL1015,1 | FT018 20 |
| 46755 | | LHI,1 | FX'0·0001B-9' INITIALIZE DIAGONAL TERMS | FT018 25 |
| 46757 | | ST,1 | FTV2211 M(A)11 | FT018 30 |
| 46761 | | LHI,2 | FX'0·0004B-8' | FT018 35 |
| 46763 | | ST,2 | FTV2222 M(A)22 | FT018 40 |
| 46765 | | LHI,3 | FX'4000·B13' | FT018 45 |
| 46767 | | ST,3 | FTV2233 M(A)33 | FT018 50 |
| 46771 | | L,4 | FTV2700 | FT018 55 |
| 46773 | | SRA,4 | 1  1/2*SIGMA(S)**2 B-9 | FT018 60 |
| 46775 | | ST,4 | FTV2244 M(A)44 | FT018 65 |
| 46777 | | LH,4 | FTV2632 | FT018 70 |
| 47001 | | STH,4 | FTV2631 SET ETA(1)=ETA(2) | FT018 75 |
| 47003 | | BU | FTL1040 | FT019 |
| | * | | | FT020 |
| 47005 | FTL1020 | LH,4 | FTV0010  F/T,NOT 1ST TIME · T TO R4 B-3 | FT021 |
| 47007 | | SRA,4 | 4 T(PREVIOUS FILTER PER) TO B1 | FT022 |
| 47011 | | ATM,4 | FTV0012 T(INS)=T(INS)+T SECS B1 | FT023 |
| 47013 | | AI,1 | 1  C(INS)=C(INS)+T | FT024 |
| 47015 | | STR,1 | FTV0020  SAVE | FT025 |
| 47017 | | CI,1 | 3 | FT026 |
| 47021 | | BNE | FTL1030 BR IF C(INS) N·E·3 | FT027 |
| 47023 | | L,4 | IND3 C(INS)=3·SAVE INS-ANT XFM TERMS. | FT028 |
| 47025 | | BAL | SC,3 | FT029 |
| 47027 | | ST,4 | FTV3209 SIN(PSI) | FT030 |

APPENDIX B-continued

| | | | |
|---|---|---|---|
| 47031 | ST,6 | FTV3210 COS(PSI) | FT031 |
| 47033 | LM,0,0 | *FTK200 PICK UP ANV* THRU ANV11 | FT032 |
| 47035 | LD,4 | ANV12 S,C(PHI+PHIG) TO R4,R5 | FT033 |
| 47037 | STM,0,0 | *FTK201 SAVE IN XFM BUFFER | FT034 |
| 47041 | BU | FTL1040 | FT035 |
| * | | | FT036 |
| 47043 FTL1030 | CI,1 | 5 C(INS)N·E·3·COMPARE TO 5 | FT037 |
| 47045 | BL | FTL1040 BR IF C(INS) L·T·5 | FT038 |
| 47047 | STHI,1 | FTV0020 C(INS)=5·SET C(INS)=1 | FT039 |
| 47051 | BAL | FTS8,0 COMPUTE O·S·ACCEL IN ANY COORDS | FT040 |
| * | | | FT041 |
| 47053 FTL1040 | LH,4 | FTV0010 | FT042 |
| 47055 | LH,6 | FTV2632 ETA(2) | FT042 10 |
| 47057 | LHG,5 | 6 SAVE IN R5 | FT042 20 |
| 47060 | SH,6 | FTV2631 ETA(2)=ETA(1) | FT042 30 |
| 47062 | MHI,6 | FX'1·13446B1' TO RADS AT B1 | FT042 40 |
| 47064 | SL,6 | 1 TO B0 | FT042 50 |
| 47066 | DT,6 | R4 DELTA(ETA)/T(OLD) RADS/SEC B3 | FT042 60 |
| 47070 | ST,6 | FTV2633 ETA(DOT) RADS/SEC B3 | FT042 70 |
| 47072 | STH,5 | FTV2631 SET ETA(1)=ETA(2) | FT042 80 |
| 47074 | AH,4 | FTV0011 | FT043 |
| 47076 | SRL,4 | 1 | FT044 |
| 47100 | STH,4 | FTV0010 T=1/2*(T(OLD)+T(NEW)) SECSB-3 | FT045 |
| * | | | FT046 |
| * | | | FT049 |
| **** | | R(TPA),V(TPA),SNR(D) SELECTION | FT050 |
| * | | | FT051 |
| 47112 | L,1 | FTV1001 R(TPR) TO R1 | FT055 |
| 47114 | L,2 | FTV1012 V(TPV) TO R2 | FT056 |
| 47116 | LH,3 | SNV03 SNR(RNG) TO R3 | FT057 |
| 47130 | LH,4 | XTF001 MPRF, 'INITIAL TRK'FLAG | FT061 |
| 47132 | BEZ | FTL1120 BR IF F/T | FT062 |
| 47134 FTL1070 | L,2 | FTV1002 MPRF I/T, V(TPR) TO R2 | FT063 |
| 47136 | BU | FTL1120 | FT064 |
| * | | | FT082 |
| 47202 FTL1120 | CHI,1 | 8 RTPA GE 4096 FT AT B20 ? | FT083 |
| 47204 | BGE | FTL1125 DONT LIMIT RTPA IF GE | FT083 10 |

APPENDIX B-continued

| | | | | |
|---|---|---|---|---|
| 47206 | | LHI,1 | 8 LIMIT RTPA TO 4096 FT AT B20 | FT083 20 |
| 47210 | FTL1125 | STD,1 | FTV0001 SAVE RTPA AND VTPA | FT083 30 |
| 47212 | | STH,3 | FTV0030 R3 TO SNR(D) | FT084 |
| | | | | FT085 |
| | *** | | CONTROLLER PARAMETERS | FT086 |
| | * | | | FT087 |
| 47216 | FTL1130 | LH,4 | XTF001 'INITIAL TRK' FLAG | FT088 |
| 47220 | | BNEZ | FTL1140 BR IF I/T | FT089 |
| 47222 | | LHI,1 | FX'0·3B2' F/T·B2 TO R1 | FT090 |
| 47224 | | LHI,2 | FX'-·3B2' C2 TO R2 | FT091 |
| 47226 | | BU | FTL1150 | FT092 |
| 47230 | FTL1140 | LHI,1 | FX'0·3B2' I/T · B1 TO R1 | FT093 |
| 47232 | | LHI,2 | FX'-·3B2' C1 TO R2 | FT094 |
| 47234 | FTL1150 | LH,4 | ATV04 L(E) RADS B-2 | FT095 |
| 47236 | | MHG,4 | 1 B*L(E) BO | FT096 |
| 47237 | | LH,6 | FTV2011 EPS(E) RADS B-2 | FT097 |
| 47241 | | MHG,6 | 2 C*EPS(E) BO | FT098 |
| 47242 | | AG,4 | 6 B*L(E)+C*EPS(E) BO | FT099 |
| 47243 | | SL,4 | 2 TO B-2 | FT100 |
| 47245 | | STH,4 | ATV04 NEW L(E) RADS B-2 | FT101 |
| 47247 | | LH,4 | ATV05 L(D) RADS B-2 | FT102 |
| 47251 | | MHG,4 | 1 B*L(D) BO | FT103 |
| 47252 | | LH,6 | FTV2021 EPS(D) RADS B-2 | FT104 |
| 47254 | | MHG,6 | 2 C*EPS(D) BO | FT105 |
| 47255 | | AG,4 | 6 B*L(D)+C*EPS(D) BO | FT106 |
| 47256 | | SL,4 | 2 TO B-2 | FT107 |
| 47260 | | STH,4 | ATV05 NEW L(D) RADS B-2 | FT108 |
| | * | | | FT109 |
| | *** | | SCINTILLATION PARAMETERS | FT110 |
| | * | | | FT111 |
| 47262 | | BAL | FTS1,0 COMPUTE SIGMA(S)**2 AND TAU(S) | FT117 |
| | * | | | FT121 |
| 47264 | FTL1190 | BAL | FTS2,0 COMPUTE STATE TRANS MATRIX PHI(A) | FT122 |
| | * | | | FT123 |
| 47266 | FTL1200 | BAL | FTS3,0 COMPUTE MOTION COMPENSATION | FT124 |
| | * | | | FT125 |

APPENDIX B-continued

```
47270  FTL1210  LH,4     XTF008 'DATA VALID' FLAG              FT126
47272           BEZ      FTL1230 BR IF DISCR DATA NOT VALID    FT127
47274           LH,4     FTV0030 SNR(D)                        FT128
47276           CH,4     FTV0031 SNR(D): EXTRAP THRES          FT129
47300           BL       FTL1230 BR IF SNR(D) L·T· THRSH       FT130
47302           STHI,0   FTF201 RESET 'ANGLE XTRAP'            FT131
47304           LH,4     XTF001 'INITIAL TRK'FLAG              FT132
47306           BNEZ     FTL1220 BR IF I/T· SKIP RADOME COMP   FT133
47310           BAL      FTS4,0 CALL RADOME COMP               FT134
47312  FTL1220  BAL      FTS5,0 COMPUTE DISCR SLOPES AND
                                 RESIDUALS                    FT135
47314           BU       FTL1240                              FT136
       *                                                      FT137
47316  FTL1230  STHI,-1  FTF201 SET 'ANGLE XTRAP'             FT138
47320           STI,0    FTV2704 SET KE=0,KD=0                FT139
47322           STI,0    FTV2706 SET RESIDUAL(EL)=0           FT140
47324           STI,0    FTV2707 SET RESIDUAL(AZ)=0           FT141
       *                                                      FT142
       ***               GAINS,CO-VARIANCE UPDATE ETC.        FT143
       *                                                      FT144
47326  FTL1240  LH,4     XTF001 'INITIAL TRK' FLAG            FT145
47330           BNEZ     FTL1290 BR IF I/T TO I/T GAIN SELECT FT146
47332           LH,4     FTF202 'M(A) LARGE' FLAG             FT147
47334           BEZ      FTL1250 BR IF M(A) NOT LARGE         FT148
47336           LH,4     FTF201 'ANGLE XTRAP' FLAG            FT149
47340           BNEZ     FTL1340 BR IF ANGLE XTRAP (FREEZE M(A) FT150
47342           STHI,0   FTF202 RESET 'M(A) LARGE' FLAG       FT151
47344  FTL1250  BAL      FTS6,0 KALMAN GAIN AND CO-VARIANCE
                                 UPDATE                       FT152
47346           L,6      FTV2222 NEW M(A)22                   FT152 10
47350           L,4      FTV2211 NEW M(A)11                   FT153
47352           CHI,4    FX'0·0015B-9'                        FT154
47354           BG       FTL1260 BR IF M(A)11 > C11            FT155
47356           CHI,6    FX'0·003B-8'                         FT157
47360           BLE      FTL1340 BR IF M(A)22 < C22           FT158
       *                                                      FT160
```

APPENDIX B-continued

```
47362  FTL1260   STHI,-1   FTF202 M(A)11 OR M(A)22 TOO LARGE ·        FT161
                           SET FLAG
47364            LHI,1     FX'0·980' C13 TO R1                        FT162
47366            MG,4      1                                          FT163
47367            ST,4      FTV2211 M(A)11=C13(M(A)11                  FT164
47371            MG,6      1                                          FT165
47372            ST,6      FTV2222 M(A)22=C13(M(A)22                  FT166
47374            M,1       FTV2212                                    FT167
47376            ST,1      FTV2212 M(A)12=C13(M(A)12                  FT168
47400            BU        FTL1340                                    FT169
         *                                                            FT170
47402  FTL1290   L,4       FTV0001 R(TPA) TO R4                       FT175
47404            CHI,4     FX'20000·B20'                              FT176
47406            BGE       FTL1300 BR IF R(TPA) G·E· RNG1              FT177
47410            LI,1      3 R(TPA) < RNG1· SET INDEX IN R1           FT178
47412            BU        FTL1320                                    FT179
47414  FTL1300   LH,4      FTV0030 SNR(D) B6                          FT180
47416            CHI,4     FX'4·B6'                                   FT180 10
47420            BL        FTL1310 BR IF SNR(D) < C4                  FT181
47422            LI,1      7 R(TPA) > R1,SNR(D) > C4                  FT182
47424            BU        FTL1320                                    FT183
47426  FTL1310   LI,1      11 R(TPA) > R1,SNR(D) < C4                 FT184
         *                                                            FT184 10
47430  FTL1320   LI,2      6  4 ITERATIONS                            FT185
47432  FTL1330   LH,4      FTK250,1 PICK UP SELECTED GAIN SET         FT186
47434            ST,4      FTV2501,2 TO ANGLE GAIN VARIABLES          FT187
47436            AI,1      -1                                         FT188
47440            BCT       FTL1330,2                                  FT189
47442  FTL1340   BAL       FTS7,0 UPDATE ANGLE STATE VECTORS          FT191
         *                                                            FT401
       *******   RANGE AND RANGE RATE TRACKING FILTER PROGRAM         FT402
         *                                                            FT403
47450  FTL2000   LH,1      XTF008 'DATA VALID'                        FT411
47452            BE        FTL2540 BRANCH IF DATA NOT VALID           FT412
47454            LH,4      SNV03  SNR(R) B6                           FT413
         ***               MPRF                                       FT415 10
47462            CHI,4     FX'1 0B6'·SNR(R) : EXTRAP THRES            FT416
```

APPENDIX B-continued

| | | | | |
|---|---|---|---|---|
| 47464 | | BL | FTL2500 BRANCH IF SNR(R) < SNR1 | FT417 |
| 47466 | FTL2210 | LH,0 | XTF001 'INITIAL TRACK' FLAG | FT418 |
| 47470 | | BEZ | FTL2250 BRANCH IF GINAL TRACK | FT419 |
| 47472 | FTL2220 | CHI,4 | FX'5·0B6' SNR2=5·0 AT B6 | FT420 |
| 47474 | | BL | FTL2240 BRANCH IF SNR(R) < SNR2 | FT421 |
| 47476 | | LI,1 | FTK103 LOAD R1 TO PICK UP SET 3 CONSTANTS | FT424 |
| 47500 | | LHI,2 | FX'1·0B1' K(RDOT)(F) | FT424 10 |
| 47502 | | BU | FTL2600 | FT425 |
| 47504 | FTL2240 | LI,1 | FTK101 LOAD R1 TO PICK UP SET 1 CONSTANTS | FT428 |
| 47506 | | LHI,2 | FX'1·0B1' K(RDOT)(F) | FT428 10 |
| 47510 | | BU | FTL2600 | FT429 |
| | * | | MPRF F/T | FT429 10 |
| 47512 | FTL2250 | CHI,4 | FX'5·0B6' SNR5 = 5·0 AT B6 | FT430 |
| 47514 | | BL | FTL2270 BRANCH IF SNR(R) < SNR5 | FT431 |
| 47516 | | LI,1 | FTK106 LOAD R1 TO PICK UP SET 6 CONSTANTS | FT434 |
| 47520 | | LHI,2 | FX'0·85B1' K(RDOT)(F) | FT434 10 |
| 47522 | | BU | FTL2600 | FT435 |
| 47524 | FTL2270 | LI,1 | FTK104 LOAD R1 TO PICK UP SET 4 CONSTANTS | FT438 |
| 47526 | | LHI,2 | FX'0·35B1' K(RDOT)(F) | FT438 10 |
| 47530 | | BU | FTL2600 | FT439 |
| | | | | FT490 10 |
| | *** | | TOO LOW SNR(R) = MPRF | FT490 20 |
| | * | | | FT490 30 |
| 47646 | FTL2500 | LH,0 | XTF001 'INITIAL TRACK' FLAG | FT491 |
| 47650 | | BNEZ | FTL2540 BRANCH IF INITIAL TRACK | FT492 |
| 47652 | FTL2520 | LD,1 | FTV1012 V(TPV) FPS B13 / A(TPV) FPS**2 B11 | FT493 |
| 47654 | | STD,1 | FTV1002 V(TPR) FPS B13 / A(TPR FPS**2 B11 | FT494 |
| | | | | FT494 10 |
| | *** | | DATA NOT VALID OR TOO LOW SNR | FT494 20 |
| | * | | | FT494 30 |
| 47656 | FTL2540 | LHI,7 | FX'0 1B0' 1/TA = .1SEC AT B0 | FT495 |

APPENDIX B-continued

```
47660  FTL2560   SG,5    5    DELTA R(M) = 0                          FT496
47661            SG,6    6    DELTA V(M) = 0                          FT497
47662            BU           FTL2690                                  FT498
         *                                                             FT498 10
         ***                  PICK UP SELECTED GAIN SET AND SAVE       FT498 20
         *                                                             FT498 30
47664  FTL2600   SHG,1   1    CLEAR THE LEFT HALF OF R1                FT499
47665            LR,5    1,1  K2(R) B4 TO RIGHT HALF OF R5             FT500
47667            AH,5    0,1  K1(R) B1 TO LEFT HALF OF R5              FT501
47671            ST,5         FTV1501 STORE K1(R) B1 AND K2(R) B5      FT502
47673            LH,6    2,1  K3(R) B5 TO LEFT HALF OF R6              FT503
47675            STH,6        FTV1503 STORE K3(R) B5                   FT504
47677            LR,7    4,1  K3(V) B5 TO RIGHT HALF OF R7             FT505
47701            AH,7    3,1  K2(V) B2 TO LEFT HALF OF R7              FT506
47703            ST,7         FTV1512 STORE K2(V) B2 AND K3(V) B5      FT507
47705  FTL2610   LHI,7        FX'0·33333B0' 1/TA=.33333 SEC AT B0     FT508
47713            LH,4         DSV03 DELTA R AT B0                      FT524
47715            K,4          CHANGE SIGN OF DELTA R                   FT524 10
47716            MT,4         XTV044 *RBIN(BUFFERED) IN FT AT B11'     FT525
47720            LG,5    4    R5 = DELTA R(M) FT B11                   FT526
47721            L,6          XTV045 FW=PRF/16(BUFFERED) HZ B10        FT527
47727  FTL2680   MH,6         DSV02 *DELTA V(DSCR) AT B0               FT530
47731            MT,6         RFV003 *(LAMBDA/2) AT B-4                FT531
47733            L,4          FTV1012                                  FT531 10
47735            S,4          FTV01021 V(TPV)-V(GC)(OLD) B13           FT531 20
47737            MG,2    4    K(RDOT)(F)*(V(TPV)-V(GC)(OLD)) B14       FT531 30
47740            SLD,2   8    TO B6                                    FT531 40
47742            SG,6    2                                             FT531 50
         *                    R6 IS DELT V(M) FPS B6                   FT532
47743  FTL2690   STD,5        FTV2401 TEMP1 IS DELTA R(M) AT B11       FT533
                              FTV2402 TEMP2 IS DELTA V(M) AT B6        FT534
         *                                                             FT535
         *                                                             FT536
         *              SET UP R2 R3 R4 AND R5
47745  FTL2700   LH,5         FTV0010 *R4 = T SEC B-3                  FT537
47747            LG,2    5    R2 = T  SEC B-3                          FT538
47750            MG,2    5    R2 = (1/2)(T**2)  SEC**2 B-7             FT540
47751            LHI,3        FX'0·0B-4' R3 = W(F)**2 (RAD/SEC)**2
```

APPENDIX B-continued

B-4

| | | | | |
|---|---|---|---|---|
| | | | | FT541 |
| 47753 | | MHG,3 | 5 *R3 = (W(F)**2)*T 1/SEC B-7 | FT542 |
| 47754 | | MHG,7 | 5 R7 = T(1/TA) B-3 | FT543 |
| 47755 | | SRA,7 | 3 B0 | FT543 10 |
| 47757 | | LG,4 | 7 | FT544 |
| 47760 | | MT,4 | R7 (T/TA)**2 B0 | FT544 10 |
| 47762 | | SRA,4 | 1 | FT544 20 |
| 47764 | | SG,4 | 7 | FT544 30 |
| 47765 | | A,4 | UNK1 R4 = 1-(T/TA)+1/2(T/TA)**2 B0 | FT545 |
| 47767 | FTL2710 | LH,0 | XTF005 'RANGE AVAILABLE' FLAG | FT545 10 |
| 47771 | | BEZ | FTL2750 BRANCH IF RANGE IS NOT AVAILABLE | FT545 20 |
| 47777 | FTL2720 | LH,6 | FTV1501 R6 = K1(R) ND B1 | FT548 |
| 50001 | | M,6 | FTV2401 R67= K1(R)*DELTA R(M) FT B12 | FT549 |
| 50003 | | L,0 | FTV1003 R0 = A(TPR) FPS**2 B11 | FT550 |
| 50005 | | S,0 | FTV3001 R0 = A(TPR)-AI(R) FPS**2 B11 | FT551 |
| 50007 | | MG,0 | 2 R)=R2*(A(TPR)=AI(R)) FT B4 | FT552 |
| 50010 | | SRDA,0 | 8 R0=R2*(A(TPR)-AI(R)) FT B12 | FT553 |
| 50012 | | AD,6 | 0 R67=R6+R0 = SUM FT B12 | FT554 |
| 50014 | | L,0 | FTV1002 R0=V(TPR) FPS B13 | FT555 |
| 50016 | | MG,0 | 5 R0=T*V(TPR) FT B10 | FT556 |
| 50017 | | SRDA,0 | 2 R0=T*V(TPR) FT B12 | FT557 |
| 50021 | | AD,6 | 0 R67= R6 + R0 = SUM FT B12 | FT558 |
| 50023 | | SRDA,6 | 8 R67= SUM FT B20 | FT559 |
| 50025 | | AD,6 | FTV1001 R67=R(TPR) + SUM FT B20 | FT560 |
| 50027 | | STD,6 | FTV1001 R(TPR) FT B20 | FT561 |
| | | | | FT562 |
| 50031 | | LH,6 | FTV1502 R6=K2(R) FPS/FT B4 | FT563 |
| 50033 | | M,6 | FTV2401 R67=K2(R) *DELTA R(M) FPS B15 | FT564 |
| 50035 | | SLD,6 | 2 R67=K2(R)*DELTA R(M) FPS B13 | FT565 |
| 50037 | | L,0 | FTV1003 R0 = A(TPR) FPS**2 B11 | FT567 |
| 50041 | | S,0 | FTV3001 R0 = A(TPR)-AI(R) FPS**2 B11 | FT568 |
| 50043 | | MG,0 | 5 R01=T*(A(TPR)-AI(R)) FPS B8 | FT569 |
| 50044 | | SR8,0 | 5 R0 = T*(A(TPR)-AI(R)) FPS B13 | FT570 |
| 50046 | | AG,6 | 0 R6 = R0 + R6 = SUM FPS B13 | FT571 |
| 50047 | | L,0 | FTV1001 R0 = R(TPR) FT B20 | FT572 |

APPENDIX B-continued

| | | | |
|---|---|---|---|
| 50051 | MG,0 | 3 R01 = R(TPR)*(W(F)**2)*T FPS B13 | FT573 |
| 50052 | AG,6 | 0 R6 = R0+R6 = SUM FPS B13 | FT574 |
| 50053 | ATM,6 | FTV1002 V(TPR) = V(TPR)OLD + SUM FPS B13 | FT575 |
| | | | FT577 |
| | * | | |
| 50055 | LH,6 | FTV1503 R6 = K3(R) FPS**2/FT B5 | FT578 |
| 50057 | M,6 | FTV2401 R67= K3(R)*DELTA R(M) FPS**2 B16 | FT579 |
| 50061 | SLD,6 | 5 R67= K3(R)*DELTA R(M) FPS**2 B11 | FT580 |
| 50063 | L,0 | FTV1003 R0 = A(TPR) FPS**2 B11 | FT581 |
| 50065 | MG,0 | 4 R0 = (1-T(1/TA))*A(TPR) FPS**2 B11 | FT582 |
| 50066 | AG,6 | 0 R6 = A(TPR)(NEW) FTS**2 B11 | FT583 |
| 50067 | ST,6 | FTV1003 A(TPR) FPS**2 B11 | FT584 |
| | | | FT585 |
| | * | | |
| 50071 | S,6 | FTV3001 R6 = A(TPR)-AI(R) FPS**2 B11 | FT586 |
| 50073 | LH,0 | FTV0011 R0 = T(NEW) SEC B-3 | FT587 |
| 50075 | MG,6 | 0 (1/2)T(NEW)*(A(TPR)-AI(R)) FPS B7 | FT588 |
| 50076 | SRA,6 | 6 FPS B13 | FT589 |
| 50100 | A,6 | FTV1002 R6 = R6 + V(TPR) FPS B13 | FT590 |
| 50102 | MG,6 | 0 *T(NEW) FT B10 | FT591 |
| 50103 | SRA,6 | 10 R6 = SUM T B20 | FT592 |
| 50105 | A,6 | FTV1001 R6 = R(TPR) + SUM FT B20 | FT593 |
| 50107 | ST,6 | FTV0101 R(GC)(TI+1) FT B20 | FT594 |
| | | | FT595 |
| | * | | |
| 50115 FTL2760 | LH,0 | XTF006 'VELOCITY AVAILABLE' FLAG | FT597 10 |
| 50117 | BEZ | FTL2900 RANCH IF VELOCITY IS NOT AVAILABLE | FT597 20 |
| 50121 FTL2770 | LH,6 | FTV1512 R6 = K2(V) ND B2 | FT598 |
| 50123 | M,6 | FTV2402 R67= K2(V)*DELTA V(M) FPS B8 | FT599 |
| 50125 | SRA,6 | 5 R6 = K2(V)*DELTA V(M) FPS B13 | FT600 |
| 50127 | L,0 | FTV1001 R0 = R(TPR) FT B20 | FT601 |
| 50131 | MG,0 | 3 R0 = R(TPR)*(W(F)**2)*T FPS B13 | FT602 |
| 50132 | AG,6 | 0 R6 = SUM FPS B13 | FT603 |
| 50133 | L,0 | FTV1013 R0 = A(TPV) FPS**2 B11 | FT604 |
| 50135 | S,0 | FTV3001 R0 = A(TPV) -AI(R) FPS**2 B11 | FT605 |
| 50137 | MG,0 | 5 R0 = T*(A(TPV)-AI(R)) FPS B8 | FT608 |
| 50140 | SRA,0 | 5 R0 = T*(A(TPV)-AI(R)) FPS B13 | FT609 |

APPENDIX B-continued

| | | | |
|---|---|---|---|
| 50142 | AG,6 | 0  R6 = SUM FPS B13 | FT610 |
| 50143 | ATM,6 | FTV1012  V(TPV)=V(TPV)+SUM FPS B13 | FT611 |
| | * | | FT613 |
| 50145 | LH,0 | FTV1513  R) = K3(V) FPS**2/FPS B5 | FT614 |
| 50147 | MT,0 | FTV2402  RO = K3(V)*DELTA V(M) FPS**2 | |
| | | B11 | FT615 |
| 50151 | MT,4 | FTV1013  R4 = (1-T/TA)*A(TPV) FPS**2 | |
| | | B11 | FT616 |
| 50153 | AG,0 | 4  RO = RO + R4 FPS**2 B11 | FT617 |
| 50154 | ST,0 | FTV1013  A(TPV) FPS**2 B11 | FT618 |
| | * | | FT619 |
| 50156 | L,2 | FTV0102  SAVE V(GC) IN | FT619 10 |
| 50160 | ST,2 | FTV01021 V(GC)(OLD) | FT619 20 |
| 50162 | MT,3 | FTV1001  R3 = R(TPR)*T(W(F)**2) FPS | |
| | | B13 | FT620 |
| 50164 | S,0 | FTV3001  RO = A(TPV)-AI(R) FPS**2 B11 | FT621 |
| 50166 | LH,2 | FTV0011  R2 = T(NEW) SEC B-3 | FT621 10 |
| 50170 | MG,0 | 2  RO = T(NEW)*(A(TPV)-AI(R)) FPS B8 | FT622 |
| 50171 | SRA,0 | 5  RO = T(NEW)*(A(TPV)-AI(R)) FPS B13 | FT623 |
| 50173 | AG,0 | 3  RO = RO +R3 = SUM FPS B13 | FT624 |
| 50174 | A,0 | FTV1012  RO=V(TPV) + SUM FPS B13 | FT625 |
| 50176 | ST,0 | FTV0102  V(GC) FPS B13 | FT626 |
| 50200 | BU | FTL2900 | FT627 |
| | * | | FT659 |
| 50277 | FTL2900  LH,4 | FTV0011 | FT660 |
| 50301 | STH,4 | FTV0010  SET T=T(NEW) | FT661 |
| 50303 | LI,4 | 0'3777'  R4 = 256 FT B20 | FT662 |
| 50305 | C,4 | FTV1001  COMPARE WITH R(TPR) | FT663 |
| 50307 | BL | FTL2910  BRANCH IF R(TPR) > 256 FT | FT664 |
| 50311 | ST,4 | FTV1001  R(TPR) = R4 | FT665 |
| 50313 | FTL2910  BU | *FTV0000  RETURN | FT666 |
| | * | | FTS01 |
| | ******** | TRACKING FILTER SUB-ROUTINES | FTS02 |
| | * | | FTS03 |
| | * | | FTS101 |
| | ******** | FTSR01-COMPUTE SIGMA(S)**2 AND TAU(S) | FTS102 |
| | ******** | RETURN ADDRESS IN RO | FTS103 |

APPENDIX B-continued

```
                                                                    FTS104
50315  FTS1      L,6       FTV0001 R(TPA) TO R6·B20                 FTS105
50317            MG,6      6 R**2 B40                               FTS106
50320            LI,4      FX'130·B9' ALPHA2 TO R4· F·W·SCALE=
                           12 + 9 = 21                              FTS107
50322            SG,5      5 CLEAR R5                               FTS108
50323            SRDA,4    10 ALPHA2 TO B31                         FTS109
50325            DG,4      6 ALPHA 2/R**2 AT B(31-40)=B-9           FTS110
50326            ST,4      FTV2700 SIGMA(S)**2 B-9                  FTS111
       *                   ENTER HERE FOR TAU(S) ONLY.              FTS112
50330  FTS1L10   L,4       FTV0002 V(TPA) TO R4· B13                FTS113
50332            SRA,4     1 TO B14                                 FTS114
50334            ABS,4                                              FTS115
50335            BAL       S0,3 SQ RT (|V|) TO R6·B7                FTS116
50337            SRA,6     5 TO B12                                 FTS117
50341            LHI,4     FX'0·00246B=7' ALPHA 3 TO R4             FTS118
50343            M,4       FTV0001 ALPHA3*R(TPA) B13                FTS119
50345            DG,4      6 ALPHA3*R/(RT(|V|)) B1                  FTS120
50346            LHI,6     FX'0·8B1' ALPHA1 TO R6                   FTS121
50350            CG,4      6 R4:ALPHA1                              FTS122
50351            BL        FTS1L20 BR IF R4 L.T. ALPHA1             FTS123
50353            ST,6      FTV2701 TAU(S)=ALPHA1 B1                 FTS124
50355            BU        *0 EXIT                                  FTS125
50357  FTS1L20   ST,4      FTV2701 TAU(S)=ALPHA3*R/(RT(|V|)) B1     FTS126
50361            BU        *0 EXIT                                  FTS127
                                                                    FTS201
       *******   FTSR02-COMPUTE PHI(A) MATRIX                       FTS202
       *******   RETURN ADDRESS IN R0                               FTS203
                                                                    FTS204
50363  FTS2      LHI,1     FX'1·0B1' 1 AT B1 TO R1                  FTS205
50365            LHI,2     FX'0·3333B0' ALPHA(T) TO R2 B0           FTS206
50367            LH,3      FTV0010 T (FILTER PER) TO R3.SECS B-3    FTS207
                                                                    FTS208
50371            LG,6      3                                       FTS209
50372            MHG,6     2 X=ALPHA(T)*T IN R6· B-3                FTS210
50373            SRA,6     4 TO B1                                  FTS211
50375            LG,4      6                                       FTS212
```

APPENDIX B-continued

| | | | |
|---|---|---|---|
| 50376 | MG,4 | 6 $X^{}2$ AT B2=($X^{}2$)/2 AT B1 | FTS213 |
| 50377 | SG,4 | 6 | FTS214 |
| 50400 | AG,4 | 1 | FTS215 |
| 50401 | ST,4 | FTV2133 PHI(A)33-10X+($X^{**}2$)/2 B1 | FTS216 |
| * | | | FTS217 |
| 50403 | LG,6 | 3 T TO R6 B-3 | FTS218 |
| 50404 | SRA,6 | 5 TO B2 | FTS219 |
| 50406 | DT,6 | FTV2701 Y=T/TAU(S) IN R6. B1 | FTS220 |
| 50410 | LG,4 | 6 | FTS221 |
| 50411 | MG,4 | 6 $Y^{}2$ AT B2=($Y^{}2$)/2 AT B1 | FTS222 |
| 50412 | SG,4 | 6 | FTS223 |
| 50413 | AG,4 | 1 | FTS224 |
| 50414 | ST,4 | FTV2144 PHI(A)44=1-Y+($Y^{**}2$)/2 B1 | FTS225 |
| * | | | FTS226 |
| 50416 | LG,6 | 3 T TO R6 B-3 | FTS227 |
| 50417 | M,6 | FTV0002 T*V(TPA) B10 | FTS228 |
| 50421 | SRDA,6 | 8 TO B18 | FTS229 |
| 50423 | D,6 | FTV0001 Z=T*V(TPA)/R(TPA) IN R6. B-2 | FTS230 |
| 50425 | SRA,6 | 3 TO B1 | FTS23010 |
| 50427 | SG,1 | 6 1-Z IN R1. B1 | FTS231 |
| 50430 | LG,4 | 3 T TO R4 | FTS232 |
| 50431 | MG,4 | 1 | FTS233 |
| 50432 | ST,4 | FTV2112 PHI(A)12=T*(1-Z) B-2 | FTS234 |
| * | | | FTS235 |
| 50434 | MG,6 | 1 Z*(1-Z) IN R6. B2 | FTS236 |
| 50435 | SL,6 | 2 2Z*(1-Z) AT B1 | FTS237 |
| 50437 | T,6 | | FTS238 |
| 50440 | AHI,6 | FX'1·0B1' | FTS239 |
| 50442 | ST,6 | FTV2122 PHI(A)22=1-2Z*(1-Z) B1 | FTS240 |
| * | | | FTS241 |
| 50444 | LG,6 | 3 T TO R6 B-3 | FTS242 |
| 50445 | T,6 | | FTS243 |
| 50446 | MG,6 | 3 $-T^{**}2$ B-6 | FTS244 |
| 50447 | SRDA,6 | 10 $(-T^{**}2)/2$ AT B3 | FTS245 |
| 50451 | D,6 | FTV0001 /R(TPA) AT B20 | FTS246 |
| * | | | FTS248 |
| 50455 | SRDA,4 | 10 PHI(A)12 TO B8 | FTS249 |

APPENDIX B-continued

| | | | |
|---|---|---|---|
| 50457 | D,4 | FTV0001 PHI(A)12/R(TPA) B-12 | FTS250 |
| 50461 | T,4 | | FTS251 |
| 50462 | SRA,2 | 5 ALPHA(T) TO B5 | FTS252 |
| 50464 | MG,6 | 2 ALPHA(T)*PHI(A)13 B-12 | FTS253 |
| 50465 | SG,4 | 6 | FTS254 |
| 50466 | ST,4 | FTV2123 PHI(A)23=-PHI12/R-ALPHA(T) | |
| | | *PHI13 | FTS255 |
| 50470 | BU | *0 EXIT | FTS256 |
| | * | | FTS301 |
| | ******* | FTSR03-COMPUTE MOTION COMPENSATION L(E) | |
| | | AND L(D) | FTS302 |
| | ******* | RETURN ADDRESS IN R0 | FTS303 |
| | * | | FTS304 |
| 50472 | FTS3    LH,1 | AI05 EL RATE AI TO R1 | FTS305 |
| 50474 | MHI,1 | FX'0·69813B0' WA(E) RADS/SEC B0 | FTS306 |
| 50476 | LH,2 | AI04 AZ RATE AI TO R2 | FTS307 |
| 50500 | MHI,2 | FX'0·69813B0' WA(D) RADS/SEC B0 | FTS308 |
| 50502 | LH,3 | FTV0010 T(FILTER PER) TO $3. SECS B-3 | FTS309 |
| 50504 | LG,4 | 3 | FTS310 |
| 50505 | T,4 | | FTS311 |
| 50506 | SRA,4 | 1 -T SECS B-2 | FTS312 |
| 50510 | LG,6 | 4 | FTS313 |
| 50511 | MG,4 | 1 | FTS314 |
| 50512 | ST,4 | FTV2611 L(E)1=-T*WA(E) RADS B-2 | FTS315 |
| 50514 | MG,6 | 2 | FTS316 |
| 50515 | ST,6 | FTV2621 L(D)1=-T*WA(D) RADS B-2 | FTS317 |
| 50517 | LH,4 | XTF001 'INITIAL TRK' FLAG | FTS318 |
| 50521 | BEZ | FTS3L10 BR IF FINAL TRK | FTS319 |
| 50523 | BU | *0  INITIAL TRK. EXIT | FTS320 |
| | * | FINAL TRK. COMPUTE WA(R) AND REST OF L TERMS | FTS321 |
| 50525 | FTS3L10   ST,0 | FTV2400 SAVE RET ADDRESS | FTS322 |
| 50527 | LH,0 | AI12 ROLL RATE AI TO R0 | FTS323 |
| 50531 | MHI,0 | FX'8·31109B4' WOG RADS/SEC B4 | FTS324 |
| 50533 | SRA,1 | 2 WA(E) TO B2 | FTS325 |
| 50535 | SRA,2 | 3 WA(D) TO B3 | FTS326 |
| | * | | FTS327 |
| 50537 | L,4 | FTV2633 ETA(DOT) RADS/SEC B3 | FTS328 |

APPENDIX B-continued

| | | | |
|---|---|---|---|
| 50541 | SG,4 | 2 ETA(D)T-WA(D) B3 | FTS336 |
| 50542 | M,4 | ANV6 (ETA(D)T)-WA(D))*SIN(EPS) B4 | FTS337 |
| 50544 | AG,4 | 0 + WOG | FTS338 |
| 50545 | L,6 | ANV7 COS(EPS) TO R6 | FTS339 |
| 50547 | M,1 | ANV4 | FTS340 |
| 50551 | MG,1 | 6 WA(E)*SIN(ETA)*COS(EPS) B4 | FTS341 |
| 50552 | AG,4 | 1 N IN R4 RADS/SEC R4 | FTS342 |
| 50553 | M,6 | ANV5 D=COS(EPS)*COS(ETA) IN R6 B2 | FTS343 |
| 50555 | SL,6 | 1 TO B1 | FTS344 |
| 50557 | DT,4 | R6 WA(R) RADS/SEC B3 | FTS345 |
| 50561 | LG,0 | 4 WA(R) TO R0 | FTS347 |
| 50562 | MG,4 | 3 T*WA(R) RADS B0 | FTS348 |
| 50563 | LG,6 | 4 | FTS349 |
| 50564 | ST,4 | DPUV37 *** THETA(R) TO DPU RADS B0 | FTS34920 |
| 50566 | M,4 | FTV2021 (T*WA(R))*EPS(D) RADS B-2 | FTS350 |
| 50570 | ATM,4 | FTV2611 L(E)1+R4 TO L(E)1 | FTS351 |
| 50572 | M,6 | FTV2011 | FTS352 |
| 50574 | T,6 | -(T*WA(R))*EPS(E) RADS B-2 | FTS353 |
| 50575 | ATM,6 | FTV2621 L(D)1+R6 TO L(D)1 | FTS354 |
| | | | FTS355 |
| 50577 | MG,3 | 3 | FTS356 |
| 50600 | SRA,3 | 1 (T**@)/2 B-6 | FTS357 |
| 50602 | L,4 | FTV3003 AI(D) FPS**2 B11 | FTS358 |
| 50604 | SG,5 | 5 | FTS359 |
| 50605 | SRDA,4 | 13 TO B24 | FTS360 |
| 50607 | D,4 | FTV0001 AI(D)/R(TPA) B4 | FTS361 |
| 50611 | LG,6 | 0 | FTS362 |
| 50612 | M,6 | FTV2022 WA(R)*WLS(D) B4 | FTS363 |
| 50614 | AG,4 | 6 | FTS364 |
| 50615 | LG,6 | 4 AI(D)/R+WA(R)*WLS(D) IN R4 AND R6 | FTS365 |
| 50616 | MG,4 | 3 ((T**2)/2)*R4 B(-6+4)=B-2 | FTS366 |
| 50617 | ATM,4 | FTV2611 L(E)1 COMPLETE RADS B-2 | FTS367 |
| 50621 | M,6 | FTV2112 PHI(A)12*R6 B(-2+4)=B2 | FTS368 |
| 50623 | SL,6 | 1 TO B1 | FTS369 |
| 50625 | ST,6 | FTV2612 L(E)2 RADS/SEC B1 | FTS370 |
| | | | FTS371 |
| 50627 | L,4 | FTV3002 AI(E) FPS**2 B11 | FTS372 |

APPENDIX B-continued

| | | | |
|---|---|---|---|
| 50631 | SG,5 | 5 | FTS373 |
| 50632 | SRDA,4 | 13 TO B24 | FTS374 |
| 50634 | D,4 | FTV0001 AI(E)/R(TPA) B4 | FTS375 |
| 50636 | LG,6 | 0 | FTS376 |
| 50637 | M,6 | FTV2012 WA(R)*WLS(E) B4 | FTS377 |
| 50641 | AG,4 | 6 | FTS378 |
| 50642 | LG,6 | 4 AI(E)/R+WA(R)*WLS(E) IN R4 AND R6 | FTS379 |
| 50643 | MG,4 | 3 | FTS380 |
| 50644 | T,4 | -((T**2)/2)*R4 B(-6+4)=B-2 | FTS381 |
| 50645 | ATM,4 | FTV2621 L(D)1 COMPLETE RADS B-2 | FTS382 |
| 50647 | M,6 | FTV2112 | FTS383 |
| 50651 | T,6 | -PHI(A)12*R6 B(-2+4)-B2 | FTS384 |
| 50652 | SL,6 | 1 TO B1 | FTS385 |
| 50654 | ST,6 | FTV2622 L(D)2 RADS/SEC B1 | FTS386 |
| 50656 | BU | *FTV2400 EXIT | FTS387 |
| | * | | FTS401 |
| | ******* | FTSR04-COMPUTE RADOME COMPENSATION | FTS402 |
| | ******* | RETURN ADDRESS IN R0 | FTS403 |
| | * | | FTS404 |
| 50660 FTS4 | ST,0 | FTV2400 SAVE RET ADDRESS TEMP 0 | FTS405 |
| 50662 | LM,2,6 | *FTK200 LOAD GIMBAL VAR'S ALL B+1 | FTS406 |
| 50664 | MG,7 | 4 COS(PHIG)*SIN(EPS) TO R7 B+2 | FTS407 |
| 50665 | SL,7 | 2 TO B0 | FTS408 |
| 50667 | MG,7 | 3 *COS(ETA), PROD B+1 | FTS409 |
| 50670 | MG,3 | 5 COS(EPS)*COS(ETA) TO R3 B+2 | FTS410 |
| 50671 | SL,3 | 1 TO B1 | FTS411 |
| 50673 | MT,2 | R6 SIN(PHIG)*SIN(ETA) B+2 | FTS412 |
| 50675 | SL,2 | 1 TO B1 | FTS413 |
| 50677 | SG,2 | 7 -COS(PHIG)*SIN(EPS)*COS(ETA) B1 | FTS414 |
| 50700 | MHI,2 | FX'0·10192B-3' *SIN(SIG') B-3' | |
| | | PROD B-2 | FTS416 |
| 50702 | SRA,2 | 3 TO B+1 | FTS417 |
| 50704 | MHI,3 | FX'0·994798+0' COS(SIG')*COS(EPS) | |
| | | *COS(ETA) B+1 | FTS418 |
| 50706 | AG,2 | 3 COS(DELTA) B+1 | FTS419 |
| 50707 | LG,4 | 2 | FTS420 |
| 50710 | MG,4 | 2 COS(DELTA)**2 B+2 | FTS421 |

APPENDIX B-continued

| | | | |
|---|---|---|---|
| 50711 | T,4 | =COS**2 | FTS422 |
| 50712 | AHI,4 | FX'1·0B+2' 1-COS(DELTA**2 B-2 | FTS423 |
| 50714 | BAL | SQ,3 G) CALC SIN(DELTA) IN R6 B+1 | FTS424 |
| 50716 | ST,6 | FTV2401 SIN(DELTA) TO TEMP 1 B+1 | FTS425 |
| * | | | FTS426 |
| 50720 | LM,7,6 | (FTK200 LOAD GIMBAL SINES,COSINES B1 | FTS427 |
| 50722 | LHI,5 | FX'0·10192B-3' SIN(SIG') B-3 | FTS428 |
| 50724 | LHI,6 | FX'0·9947980' COS(SIG') B0 | FTS429 |
| 50726 | SRA,5 | 3 SIN(SIG') B0 | FTS430 |
| 50730 | MT,0 | R3 | FTS431 |
| 50732 | MT,0 | R5 S(SIG')*S(PHIG)*C(ETA) B2 | FTS432 |
| 50734 | MT,7 | R2 | FTS433 |
| 50736 | MT,7 | R6 C(SIG')*C(EPS)*S(ETA) B2 | FTS434 |
| 50740 | SG,0 | 7 | FTS435 |
| 50741 | DT,0 | FTV2401 SIN(LAMBDA) IN R0 B1 | FTS436 |
| 50743 | MG,2 | 4 | FTS437 |
| 50744 | MG,2 | 5 S(SIG')*C(PHIG)*C(EPS) B2 | FTS438 |
| 50745 | MG,6 | 1 C(SIG')*S(EPS) B1 | FTS439 |
| 50746 | SRA,6 | 1 B2 | FTS440 |
| 50750 | AG,2 | 6 | FTS441 |
| 50751 | DT,2 | FTV2401 COS(LAMBDA) IN R2 B1 | FTS442 |
| * | | | FTS443 |
| 50753 | L,4 | FTV2401 SIN(DELTA) B1 | FTS444 |
| 50755 | LG,6 | 4 | FTS445 |
| 50756 | CHI,4 | FX'0·174B1' SIN(DELTA) : 0·174 | FTS446 |
| 50760 | BLE | FTS4L10 BR IF L·E· | FTS447 |
| 50762 | CHI,4 | FX'0·422B1' SIN(DELTA) : 0·422 | FTS448 |
| 50753 | BLE | FTS4L20 BR IF L·E· | FTS449 |
| 50766 | MHI,4 | FX'0·00045B-5' REGION 3 | FTS450 |
| 50770 | AHI,4 | FX'0·00051B-4' DELTA(EL) RADS B-4 | FTS451 |
| 50772 | MHI,6 | FX'-·00202B-5' | FTS452 |
| 50774 | AHI,6 | FX'0·00266B-4' DELTA(AZ) RADS B-4 | FTS453 |
| 50776 | BU | FTS4L30 | FTS454 |
| 51000 FTS4L10 | MHI,4 | FX'0·00575B-5' DELTA(EL) RADS B-4 REGION 1 | FTS455 |
| 51002 | MHI,6 | FX'0·00977B-5' DELTA(AZ) RADS B-4 | FTS456 |
| 51004 | BU | FTS4L30 | FTS457 |

APPENDIX B-continued

| | | | | |
|---|---|---|---|---|
| 51006 | FTS4L20 | MHI,4 | FX'-·00121B-5' REGION 2 | FTS458 |
| 51010 | | AHI,4 | FX'0·00121B-4' DELTA(EL) RADS B-4 | FTS459 |
| 51012 | | MHI,6 | FX'0·00040B-5' | FTS460 |
| 51014 | | AHI,6 | FX'0·00163B-4' DELTA(AZ) RADS B-4 | FTS461 |
| | * | | | FTS462 |
| 51016 | FTS4L30 | MG,4 | 2 DELTA(EL)*COS(LAMBDA) B-3 | FTS463 |
| 51017 | | MG,4 | 4 SQUARE B-6 | FTS464 |
| 51020 | | MG,6 | 0 DELTA(AZ)*SIN(LAMBDA) B-3 | FTS465 |
| 51021 | | MG,6 | 6 SQUARE B-6 | FTS466 |
| 51022 | | AG,4 | 6 DELTA**2 B-6 R4 | FTS476 |
| 51023 | | BAL | SQ,3 TO CALC DELTA B-3 R4 | FTS477 |
| 50125 | | MG,0 | 6 DELTA(RD)=SIN(LAMBDA)*DELTA B-2 R0 | FTS478 |
| 51026 | | T,0 | CHG SIGN DELTA(RD) B-2 | FTS479 |
| 51027 | | ST,0 | FTV2703 DELTA(RD) B-2 | FTS480 |
| 51031 | | MG,6 | 2 COS(LAMBDA)*DELTA B-2 R6 | FTS481 |
| 51032 | | ST,6 | FTV2702 DELTA(RE) B-2 | FTS482 |
| 51034 | | B | *FTV2400 RETURN | FTS483 |
| | * | | | FTS501 |
| | ******* | FTSR05 - COMPUTE DISCR SLOPES AND RESIDUALS | | FTS502 |
| | ******* | RETURN ADDRESS IN R0 | | FTS503 |
| | * | | | FTS504 |
| 51036 | FTS5 | LH,2 | TXV15 DCAL FROM BIT MATRIX B1 | FTS505 |
| 51040 | | LHG,4 | 2 D(CAL) TO R4 | FTS506 |
| 51041 | | LH,6 | SNV05 SNR(EL) B6 | FTS507 |
| 51043 | | CHI,6 | FX'2·25B6' | FTS508 |
| 51045 | | BG | FTS5L10 BR IF SNR(EL) > THRSH | FTS509 |
| 51047 | | MHI,6 | FX'0·44B0' KE1*SNR(EL) B6 | FTS510 |
| 51051 | | MG,4 | 6 KE1*SNR(EL)*D(CAL)=KE B7 | FTS511 |
| 51052 | | SL,4 | 6 TO B1 | FTS512 |
| 51054 | FTS5L10 | STH,4 | FTV2704 KE B1 | FTS513 |
| | * | | | FTS514 |
| 51056 | | L,6 | FTV2011 EPS(P)(E) RADS B-2 | FTS515 |
| 51060 | | A,6 | FTV2014 +S(P)(E) | FTS516 |
| 51062 | | A,6 | FTV2702 +DELTA(R)(E) | FTS517 |
| 51064 | | MG,6 | 4 KE*(EPS(E)+S(E)+DELTA(E)) B-1 | FTS518 |
| 51065 | | LH,4 | DSV05 DELTA(EL) DSCR B1 | FTS519 |
| 51067 | | MHI,4 | FX'0·030B-2' *C10·PROD IN RADS AT B-1 | FTS520 |

APPENDIX B-continued

| | | | |
|---|---|---|---|
| 51071 | SG,4 | 6 RESIDUAL (EL) RADS B-1 | FTS521 |
| 51072 | SL,4 | 2 TO B-3 | FTS522 |
| 51074 | ST,4 | FTV2706 RESIDUAL (EL) RADS B-3 | FTS523 |
| * | | | FTS524 |
| 51076 | LH,6 | SNV04 SNR(AZ) B6 | FTS525 |
| 51100 | CHI,6 | FX'2·25B6' | FTS526 |
| 51102 | BG | FTS5L20 BR IF SNR(AZ) > THRSH | FTS527 |
| 51104 | MHI,6 | FX'0·44B0' KD1*SNR(AZ) B6 | FTS528 |
| 51106 | MG,2 | 6 KD1*SNR(AZ)*D(CAL)=KD B7 | FTS529 |
| 51107 | SL,2 | 6 TO B1 | FTS530 |
| 51111 FTS5L20 | STH,2 | FTV2705 KD B1 | FTS531 |
| * | | | FTS532 |
| 51113 | L,6 | FTV2021 EPS(P)(D) RADS B-2 | FTS533 |
| 51115 | A,6 | FTV2024 +S(P)(D) | FTS534 |
| 51117 | A,6 | FTV2703 +DELTA(R)(D) | FTS535 |
| 51121 | MG,6 | 2 KD*(EPS(D)+S(D)+DELTA(D)) B-1 | FTS536 |
| 51122 | LH,4 | DSV04 DELTA(AZ) DSCR B1 | FTS537 |
| 51124 | MHI,4 | FX'0·030B-2' *C10·PROD IN RADS AT B-1FTS538 |
| 51126 | SG,4 | 6 RESIDUAL (AZ) RADS B-1 | FTS539 |
| 51127 | SL,4 | 2 TO B-3 | FTS540 |
| 51131 | ST,4 | FTV2707 RESIDUAL (AZ) RADS B-3 | FTS541 |
| 51133 | BU | *0 RETURN | FTS542 |
| * | | | FTS601 |
| ******* | FTSR06-COMPUTE KALMAN GAINS K(A) AND | | FTS602 |
| ******* | UPDATE THE CO-VARIANCE MATRIX M(A) | | FTS603 |
| ******* | RETURN ADDRESS IN R0 | | FTS604 |
| * | | | FTS605 |
| 51135 FTS6 | ST,0 | FTV2400 SAVE RET ADDRESS | FTS606 |
| 51137 | LHI,6 | FX'1·0B1' NZ TO R6 | FTS60610 |
| 51141 | LH,0 | FTV2704 | FTS607 |
| 51153 | AH,0 | FTV2705 | FTS608 |
| 51145 | SRL,0 | 1 KA=1/2(KE+KD) B1 | FTS609 |
| 51147 | BEZ | FTS6L20 BR IF KA=0 | FTS610 |
| 51151 | LD,1 | FTV2211 M(A)11,M(A)12 TO R1,R2 | FTS611 |
| 51153 | LD,3 | FTV2213 M(A)13,M(A)14 TO R3,R4 | FTS612 |
| 51155 | L,5 | FTV2234 M(A)24 TO R5 | FTS613 |
| 51157 | LD,6 | FTV2234 M(A)34,M(A)44 TO R6,R7 | FTS614 |

APPENDIX B-continued

| | | | |
|---|---|---|---|
| 51161 | SRA,1 | 1 RE-SCALE M(A)'S | FTS615 |
| 51163 | SRA,2 | 1 | FTS616 |
| 51165 | SRA,3 | 1 | FTS617 |
| 51167 | SRA,4 | 1 | FTS618 |
| 51171 | SRA,5 | 1 | FTS619 |
| 51173 | SRA,6 | 1 | FTS620 |
| 51175 | SRA,7 | 1 | FTS621 |
| 51177 | AG,1 | 4 ZM1=M(A)11+M(A)14 B-8 | FTS622 |
| 51200 | AG,2 | 5 ZM2=M(A)12+M(A)24 B-7 | FTS623 |
| 51201 | AG,3 | 6 ZM3=M(A)13+M(A)34 B3 | FTS624 |
| 51202 | AG,4 | 7 ZM4=M(A)14+M(A)44 B-8 | FTS625 |
| * | | | FTS626 |
| 51203 | SRA,1 | 1 ZM1 TO B-7 | FTS627 |
| 51205 | LG,6 | 2 | FTS628 |
| 51206 | MT,6 | FTV2112 PHI(A)12*ZM2 B-9 | FTS629 |
| 51210 | SRA,6 | 2 TO B-7 | FTS630 |
| 51212 | LG,7 | 3 | FTS631 |
| 51213 | MT,7 | FTV2113 PHI(A)13*ZM3 B-14 | FTS632 |
| 51215 | SRA,7 | 7 TO B-7 | FTS633 |
| 51217 | AG,6 | 7 | FTS634 |
| 51220 | AG,6 | 1 ZM1+PHI(A)12*ZM2+PHI(A)13*ZM3= | FTS635 |
| 51221 | ST,6 | FTV2401 Z(A)11 B=7 | FTS636 |
| 51223 | MT,2 | FTV2122 PHI(A)22*ZM2 B-6 | FTS637 |
| 51225 | LG,6 | 3 | FTS638 |
| 51226 | MT,6 | FTV2123 PHI(A)23*ZM3 B-9 | FTS639 |
| 51230 | SRA,6 | 3 TO B-6 | FTS640 |
| 51232 | AG,6 | 2 PHI(A)22*ZM2+PHI(A)23*ZM3= | FTS641 |
| 51233 | ST,6 | FTV2402 Z(A)21 B-6 | FTS642 |
| 51235 | MT,3 | FTV2133 PHI(A)33*ZM3 B4 | FTS643 |
| 51237 | SL,3 | 1 TO B3 | FTS644 |
| 51241 | ST,3 | FTV2403 Z(A)31=PHI(A)33*ZM3 B3 | FTS645 |
| 51243 | LG,6 | 4 | FTS646 |
| 51244 | MT,6 | FTV2144 PHI(A)44*ZM4 B-7 | FTS647 |
| 51246 | SL,6 | 1 TO B-8 | FTS648 |
| 51250 | ST,6 | FTV2404 Z(A)41=PHI(A)44*ZM4 B-8 | FTS649 |
| * | | | FTS650 |
| 51252 | SRA,4 | 1 ZM4 TO B-7 | FTS651 |

APPENDIX B-continued

| | | | |
|---|---|---|---|
| 51254 | AG,1 | 4 ZM1+ZM4 B-7 | FTS652 |
| 51255 | LG,6 | 0 | FTS653 |
| 51256 | MG,6 | 0 KA**2 B2 | FTS654 |
| 51257 | MG,6 | 1 (KA**2)*(ZM1+ZM4) B-5 | FTS655 |
| 51260 | LI,4 | FX'0·00011B-12' RAO TO R4. F.W. | |
| | | SCALE = B0 | FTS656 |
| 51262 | LH,1 | XTV029 KFC=PS/FC B11 | FTS65610 |
| 51264 | SL,1 | 6 TO B5 | FTS65620 |
| 51266 | DT,4 | R1 RAO/KFC B-5 | FTS65630 |
| 51270 | LH,1 | SNV04 | FTS657 |
| 51272 | AH,1 | SNV05 | FTS658 |
| 51274 | SRL,1 | 1 SNR(ANGLE)=1/2(SNR(AZ)+SNR(EL)) B6 | FTS659 |
| 51276 | CHI,1 | FX'1·0B6' SNR(ANGLE):1 | FTS660 |
| 51300 | BL | FTS6L10 BR IF SNR(ANGLE) L.T. THRSH | FTS661 |
| 51302 | MG,1 | 1 SNR(ANGLE)**2 B12 | FTS662 |
| 51303 | SG,5 | 5 0 TO R5 | FTS66210 |
| 51304 | SRDA,4 | 12 RAO/KFC TO B7 | FTS663 |
| 51306 | DG,4 | 1 (RAO/KFC)/SNR(ANGLE)**2 B-5 | FTS664 |
| 51307 | AI,4 | 134 +B=RA B-5. (B=.5E-6 B-5) | FTS665 |
| 51311 FTS6L10 | AG,6 | 4 DENOM=RA+(KA**2)*(ZM1+ZM4). B-5 | FTS666 |
| * | | | FTS667 |
| 51312 FTS6L20 | LI,1 | 3 | FTS668 |
| 51314 | LI,2 | 6 3 ITERATIONS | FTS669 |
| 51316 FTS6L30 | LG,4 | 0 KA TO R4 B1 | FTS670 |
| 51317 | M,4 | FTV2401,2 KA*(Z(A)41,Z(A)31,Z(A)21, | |
| | | Z(A)11) | FTS671 |
| 51321 | ST,4 | FTV2401,2 B-7,B4,B-5,B-6 | FTS672 |
| 51323 | SRDA,4 | 0,1 B-4,B10,B-1,B-4 | FTS673 |
| 51325 | DG,4 | 6 KA*Z(A)/DENOM B1,B15,B4,B1 | FTS674 |
| 51326 | ST,4 | FTV2501,2 K(A)4,K(A)3,K(A)2,K(A)1 | FTS675 |
| 51330 | LG,1 | 2 | FTS676 |
| 51331 | BCT | FTS6L30,2 | FTS677 |
| * | | | FTS678 |
| ******* | | UPDATE THE CO-VARIANCE MATRIX,M(A) | FTS679 |
| * | | | FTS680 |
| 51333 FTS6L40 | LD,0 | FTV2212 M(A)12,M(A)13 TO R0,R1 B-8,B2 | FTS681 |
| 51335 | L,2 | FTV2223 M(A)23 TO R2 B3 | FTS682 |

APPENDIX B-continued

| | | | |
|---|---|---|---|
| 51337 | L,3 | FTV2233 M(A)33 TO R3 B13 | FTS683 |
| 51341 | SRA,1 | 1 M(A)13 TO B3 | FTS684 |
| 51343 | L,4 | FTV2112 PHI(A)12 TO R4 B-2 | FTS685 |
| 51345 | LG,6 | 4 TO R6 | FTS686 |
| 51346 | M,4 | FTV2222 PHI(A)12*M(A)22 B-10 | FTS687 |
| 51350 | SRA,4 | 2 TO B-8 | FTS688 |
| 51352 | AG,0 | 4 M(A)12+PHI(A)12*M(A)22 B-8 | FTS689 |
| 51353 | MG,6 | 2 PHI(A)12*M(A)23 B1 | FTS690 |
| 51354 | SRA,6 | 2 TO B3 | FTS691 |
| 51356 | AG,1 | 6 M(A)13+PHI(A)12*M(A)23 B3 | FTS692 |
| 51361 | LG,6 | 4 TO R6 | FTS694 |
| 51362 | MG,4 | 2 PHI(A)13*M(A)23 B-14 | FTS695 |
| 51363 | SRA,4 | 6 TO B-8 | FTS696 |
| 51365 | AG,0 | 4 D12=M12+PHI12*M22+PHI13*M23 B-8 | FTS697 |
| 51366 | MG,6 | 3 PHI(A)13*M(A)33 B-4 | FTS698 |
| 51367 | SRA,6 | 7 TO B3 | FTS699 |
| 51371 | AG,1 | 6 D13-M13+PHI12*M23+PHI13*M33 B3 | FTS6A0 |
| 51372 | MT,2 | FTV2122 PHI(A)22*M(A)23 B4 | FTS6A1 |
| 51374 | MT,3 | FTV2123 PHI(A)23*M(A)33 B1 | FTS6A2 |
| 51376 | SRA,3 | 3 TO B4 | FTS6A3 |
| 51400 | AG,3 | 2 D23=PHI22*M23+PHI23*M33 B4 | FTS6A4 |
| ** | | | FTS6A5 |
| 51401 | LI,4 | 0'0002' QS=.466E-9 B-9 | FTS6A6 |
| 51403 | A,4 | FTV2211 M(A)11+QS B-9 | FTS6A7 |
| 51405 | L,6 | FTV2501 | FTS6A8 |
| 51407 | M,6 | FTV2401 K1*(KA*Z11) B(1-6)=B-5 | FTS6A9 |
| 51411 | SLD,6 | 4 TO B-9 | FTS6B0 |
| 51413 | SG,4 | 6 | FTS6B1 |
| 51414 | L,6 | FTV2213 M(A)13 B2 | FTS6B2 |
| 51416 | SRA,6 | 2 TO B4 | FTS6B3 |
| 51420 | LG,7 | 1 D13 B3 | FTS6B4 |
| 51421 | SRA,7 | 1 TO B4 | FTS6B5 |
| 51423 | AG,6 | 7 M13+D13 B4 | FTS6B6 |
| 51424 | M,6 | FTV2113 PHI13*(M13+D13) B-13 | FTS6B7 |
| 51426 | SRA,6 | 4 TO B-9 | FTS6B8 |
| 51430 | AG,4 | 6 | FTS6B9 |
| 51431 | L,6 | FTV2212 M(A)12 B-8 | FTS6C0 |

APPENDIX B-continued

| | | | |
|---|---|---|---|
| 51433 | SRA,6 | 1 TO B-7 | FTS6C1 |
| 51435 | LG,7 | 0 D12 B-8 | FTS6C2 |
| 51436 | SRA,7 | 1 TO B-7 | FTS6C3 |
| 51440 | AG,6 | 7 M12+D12 B-7 | FTS6C4 |
| 51441 | M,6 | FTV2112 PHI12*(M12+D12) B-9 | FTS6C5 |
| 51443 | AG,4 | 6 | FTS6C6 |
| 51444 | ST,4 | FTV2211 M(A)11 UPDATED B-9 | FTS6C7 |
| * | | | FTS6C8 |
| 51446 | L,4 | FTV2122 PHI(A)22 B1 | FTS6C9 |
| 51450 | MG,4 | 4 | FTS6D0 |
| 51451 | M,4 | FTV2222 ((PHI22)**2)*M22 B(2-8)=B-6 | FTS6D1 |
| 51453 | L,6 | FTV2502 | FTS6D2 |
| 51455 | M,6 | FTV2402 K2*(KA*Z21) B(4-5)=B-1 | FTS6D3 |
| 51457 | SLD,6 | 5 TO B-6 | FTS6D4 |
| 51461 | SD,4 | R6 | FTS6D5 |
| 51463 | LG,6 | 3 D23 B4 | FTS6D6 |
| 51464 | SRA,6 | 2 TO B6 | FTS6D7 |
| 51466 | SRA,2 | 2 R2 TO B6 | FTS6D8 |
| 51470 | AG,6 | 2 | FTS6D9 |
| 51471 | M,6 | FTV2123 PHI23*(PHI22*M23+D23) B-6 | FTS6E0 |
| 51473 | AD,4 | R6 NEW M(A)22 IN R4,R5 B-6 | FTS6E1 |
| 51475 | SLD,4 | 2 | FTS6E2 |
| 51477 | ST,4 | FTV2222 M(A)22 UPDATED B-8 | FTS6E3 |
| * | | | FTS6E4 |
| 51501 | L,4 | FTV2133 PHI(A)33 B1 | FTS6E5 |
| 51503 | MG,4 | 4 | FTS6E6 |
| 51504 | M,4 | FTV2233 ((PHI33)**2)*M33 B15 | FTS6E7 |
| 51506 | L,6 | FTV2503 | FTS6E8 |
| 51510 | M,6 | FTV2403 K3*(KA*731) B(15+4)=B19 | FTS6E9 |
| 51512 | SLD,6 | 5 TO B15 | FTS6F0 |
| 51514 | SD,4 | R6 | FTS6F1 |
| 51516 | SLD,4 | 2 R4,R5 TO B13 | FTS6F2 |
| 51520 | LH,6 | FTV0010 T B-3 | FTS6F3 |
| 51522 | MHI,6 | FX'2670·B13' ALPHA4*T=Q33 B10 | FTS6F4 |
| 51524 | SRA,6 | 3 TO B13 | FTS6F5 |
| 51526 | AG,4 | 6 | FTS6F6 |
| 51527 | ST,4 | FTV2233 M(A)33 UPDATED B13 | FTS6F7 |

APPENDIX B-continued

|       |       |                                  |        |
|-------|-------|----------------------------------|--------|
|       |       |                                  | FTS6F8 |
| 51531 | L,4   | FTV2144 PHI(A)44 B1              | FTS6F9 |
| 51533 | MG,4  | 4                                | FTS6G0 |
| 51534 | M,4   | FTV2244 ((PHI44)**2)*M44 B-7     | FTS6G1 |
| 51536 | L,6   | FTV2504                          | FTS6G2 |
| 51540 | M,6   | FTV2404 K4*(KA*Z41) B(1-7)=B-6   | FTS6G3 |
| 51542 | SLD,6 | 1 TO B-7                         | FTS6G4 |
| 51544 | SD,4  | R6                               | FTS6G5 |
| 51546 | SLD,4 | 2 R4,R5 TO B-9                   | FTS6G6 |
| 51550 | LH,6  | FTV0010 T B-3                    | FTS6G7 |
| 51552 | SRA,6 | 5 TO B1                          | FTS6G8 |
| 51554 | M,6   | FTV2700                          | FTS6G9 |
| 51556 | D,6   | FTV2701 Q44=T*SIGMA(S)**2/TAU(S) B-9 | FTS6H0 |
| 51560 | AG,4  | 6                                | FTS6H1 |
| 51561 | ST,4  | FTV2244 M(A)44 UPDATED B-9       | FTS6H2 |
|   *   |       |                                  | FTS6H3 |
| 51563 | MT,0  | FTV2122 PHI22*D12 B-7            | FTS6H4 |
| 51565 | L,4   | FTV2123                          | FTS6H5 |
| 51567 | MG,4  | 1 PHI23*D13 B-9                  | FTS6H6 |
| 51570 | SRA,4 | 2 TO B-7                         | FTS6H7 |
| 51572 | AG,4  | 0                                | FTS6H8 |
| 51573 | L,6   | FTV2501                          | FTS6H9 |
| 51575 | M,6   | FTV2402 K1*(KA*Z21) B(1-5)=B-4   | FTS6I0 |
| 51577 | SLD,6 | 3 TO B-7                         | FTS6I1 |
| 51601 | SG,4  | 6                                | FTS6I2 |
| 51602 | SL,4  | 1                                | FTS6I3 |
| 51604 | ST,4  | FTV2212 M(A)12 UPDATED B-8       | FTS6I4 |
|   *   |       |                                  | FTS6I5 |
| 51606 | M,1   | FTV2133 PHI33*D13 B4             | FTS6I6 |
| 51610 | L,6   | FTV2501                          | FTS6I7 |
| 51612 | M,6   | FTV2403 K1*(KA*Z31) B(1+4)=B5    | FTS6I8 |
| 51614 | SLD,6 | 1 TO B4                          | FTS6I9 |
| 51616 | SD,1  | R6 NEW M(A)13 IN R1,R2 B4        | FTS6J0 |
| 51620 | SLD,1 | 2                                | FTS6J1 |
| 51622 | ST,1  | FTV2213 M(A)13 UPDATED B2        | FTS6J2 |
|  **   |       |                                  | FTS6J3 |
| 51624 | L,4   | FTV2144 PHI(A)44 B1              | FTS6J4 |

APPENDIX B-continued

| | | | |
|---|---|---|---|
| 51626 | L,0 | FTV2234 M(A)34 B2 | FTS6J5 |
| 51630 | MG,0 | 4 D43=PHI44*M34 B3 | FTS6J6 |
| 51631 | SL,0 | 1 TO B2 | FTS6J7 |
| 51633 | L,1 | FTV2224 M(A)24 B-8 | FTS6J8 |
| 51635 | MG,1 | 4 D42=PHI44*M24 B-7 | FTS6J9 |
| 51636 | SL,1 | 1 TO B-8 | FTS6K0 |
| ** | | | FTS6K1 |
| 51640 | M,4 | FTV2214 PHI44*M14 B-8 | FTS6K2 |
| 51642 | L,6 | FTV2112 | FTS6K3 |
| 51644 | MG,6 | 1 PHI12*D42 B-10 | FTS6K4 |
| 51645 | SRA,6 | 2 TO B-8 | FTS6K5 |
| 51647 | AG,4 | 6 | FTS6K6 |
| 51650 | L,6 | FTV2113 | FTS6K7 |
| 51652 | MG,6 | 0 PHI13*D43 B-15 | FTS6K8 |
| 51653 | SRA,6 | 7 TO B-8 | FTS6K9 |
| 51655 | AG,4 | 6 | FTS6L0 |
| 51656 | L,6 | FTV2501 | FTS6L1 |
| 51660 | M,6 | FTV2404 Y1*(KA*Z41) B(1-7)=B-6 | FTS6L2 |
| 51662 | SLD,6 | 2 TO B-8 | FTS6L3 |
| 51665 | SG,4 | 6 | FTS6L4 |
| 51665 | SL,4 | 1 | FTS6L5 |
| 51667 | ST,4 | FTV2214 M(A)14 UPDATED B-9 | FTS6L6 |
| * | | | FTS6L7 |
| 51671 | M,3 | FTV2133 PHI33*D23 B5 | FTS6L8 |
| 51673 | L,6 | FTV2502 | FTS6L9 |
| 51674 | M,6 | FTV2403 K2*(KA*Z31) B(4+4)=B8 | FTS6M0 |
| 51677 | SLD,6 | 3 TO B5 | FTS6M1 |
| 51701 | SD,3 | R6 NEW M(A)23 IN R3,R4 B5 | FTS6M2 |
| 51703 | SLD,3 | 2 | FTS6M3 |
| 51705 | ST,3 | FTV2223 M(A)23 UPDATED B3 | FTS6M4 |
| * | | | FTS6M5 |
| 51707 | M,1 | FTV2122 PHI22*D42 B-7 | FTS6M6 |
| 51711 | L,6 | FTV2123 | FTS6M7 |
| 51713 | MG,6 | 0 PHI23*D43 B-10 | FTS6M8 |
| 51714 | SRA,6 | 3 TO B-7 | FTS6M9 |
| 51716 | AG,1 | 6 | FTS6N0 |
| 51717 | L,6 | FTV2502 | FTS6N1 |

APPENDIX B-continued

| | | | |
|---|---|---|---|
| 51721 | M,6 | FTV2404 K2*(KA*Z41) B(4-7)=B-3 | FTS6N2 |
| 51723 | SLD,6 | 4 TO B-7 | FTS6N3 |
| 51725 | SG,1 | 6 | FTS6N4 |
| 51726 | SL,1 | 1 | FTS6N5 |
| 51730 | ST,1 | FTV2224 M(A)24 UPDATED B-8 | FTS6N6 |
| * | | | FTS6N7 |
| 51732 | M,0 | FTV2133 PHI33*D43 B3 | FTS6N8 |
| 51734 | L,6 | FTV2503 | FTS6N9 |
| 51736 | M,6 | FTV2404 K3*(KA*Z41) B(15-7)=B8 | FTS6P1 |
| 51740 | SLD,6 | 5 TO B3 | FTS6P2 |
| 51742 | SG,0 | 6 | FTS6P3 |
| 51743 | SL,0 | 1 | FTS6P4 |
| 51745 | ST,0 | FTV2234 M(A)34 UPDATED B2 | FTS6P5 |
| 51747 | BU | *FTV2400 EXIT | FTS6P6 |
| * | | | FTS701 |
| ******* | FTSR07-COMPUTE NEW PREDICTED ANGLE STATE | | |
| | VECTORS | | FTS702 |
| ******* | | RETURN ADDRESS IN R0 | FTS703 |
| * | | | FTS704 |
| 51751 FTS7 | ST,0 | FTV2400 SAVE RET ADDRESS | FTS705 |
| 51753 | LI,1 | 2 SET INDICES FOR AZ | FTS706 |
| 51755 | LI,2 | 4 | FTS707 |
| 51757 | LI,3 | 8 | FTS708 |
| 51761 FTS7L10 | L,0 | FTV2706,1 RESIDUAL TO R0 RADS B-3 | FTS709 |
| 51763 | L,4 | FTV2012,3 | FTS710 |
| 51765 | M,4 | FTV2112 PHI(A)12*OMEGA(LSP) B-1 | FTS711 |
| 51767 | SLD,4 | 1 TO B-2 | FTS712 |
| 51771 | L,6 | FTV2013,3 | FTS713 |
| 51773 | M,6 | FTV2113 PHI(A)13*A(TP) B-6 | FTS714 |
| 51775 | SRA,6 | 4 TO B-2 | FTS715 |
| 51777 | AG,4 | 6 | FTS716 |
| 52000 | A,4 | FTV2011,3 +EPS(P) | FTS717 |
| 52002 | A,4 | FTV2611,2 +L1 | FTS718 |
| 52004 | LG,6 | 0 | FTS719 |
| 52005 | M,6 | FTV2501 K(A)1*RESIDUAL B-2 | FTS720 |
| 52007 | AG,4 | 6 | FTS721 |
| 52010 | ST,4 | FTV2011,3 NEW EPS(P) RADS B-2 | FTS722 |

APPENDIX B-continued

| | | | |
|---|---|---|---|
| | | | FTS723 |
| | * | | FTS724 |
| 52012 | L,4 | FTV2012,3 | FTS725 |
| 52014 | M,4 | FTV2122 PHI(A)22*OMEGA(LSP) B2 | FTS726 |
| 52016 | SG,6 | 6 | FTS727 |
| 52017 | LHI,7 | 0'2000' | FTS728 |
| 52021 | AD,4 | R6 ROUND R4,R5 | FTS729 |
| 52023 | SLD,4 | 1 TO B1 | FTS730 |
| 52025 | L,6 | FTV2013,3 | FTS731 |
| 52027 | M,6 | FTV2123 PHI(A)23*A(TP) B-1 | FTS732 |
| 52031 | SRA,6 | 2 TO B1 | FTS733 |
| 52033 | AG,4 | 6 | FTS734 |
| 52034 | A,4 | FTV2612,2 +L2 | FTS735 |
| 52036 | LG,6 | 0 | FTS736 |
| 52037 | M,6 | FTV2502 K(A)2*RESIDUAL B1 | FTS737 |
| 52041 | AG,4 | 6 | FTS738 |
| 52042 | ST,4 | FTV2012,3 NEW OMEGA(LSP) RADS/SEC B1 | FTS739 |
| | * | | FTS740 |
| 52044 | L,4 | FTV2013,3 | FTS741 |
| 52046 | M,4 | FTV2133 PHI(A)33*A(TP) B12 | FTS742 |
| 52050 | LG,6 | 0 | FTS743 |
| 52051 | M,6 | FTV2503 K(A)3*RESIDUAL B12 | FTS744 |
| 52053 | AD,4 | R6 | FTS745 |
| 52055 | SLD,4 | 1 TO B11 | FTS746 |
| 52057 | ST,4 | FTV2013,3 NEW A(TP) FPS**2 B11 | FTS74610 |
| | * | | FTS747 |
| 52061 | L,4 | FTV2014,3 | FTS748 |
| 52063 | M,4 | FTV2144 PHI(A)44*S(P) B-1 | FTS749 |
| 52065 | SLD,4 | 1 TO B-2 | FTS750 |
| 52067 | LG,6 | 0 | FTS751 |
| 52070 | M,6 | FTV2504 K(A)4*RESIDUAL B-2 | FTS752 |
| 52072 | AG,4 | 6 | FTS753 |
| 52073 | ST,4 | FTV2014,3 NEW S(P) RADS B-2 | FTS754 |
| | * | | FTS755 |
| 52075 | SG,2 | 2 R2=0 SET INDICES FOR EL | FTS756 |
| 52076 | SG,3 | 3 R3=0 | FTS757 |
| 52077 | BCT | FTS7L10,1 R1=0 | FTS758 |
| 52101 | BU | *FTV2400 EXIT | |

APPENDIX B-continued

```
                                                                    FTS801
         ********  FTSR08-COMPUTE OWNSHIP ACCELERATION IN
                   ANTENNA COORDS                                   FTS802
         ********            RETURN ADDRESS IN R0                   FTS803
         *                                                          FTS804
52103  FTS8    ST,0    FTV2400 SAVE RET ADDRESS                     FTS805
52105          L,4     IND4 V(N)2 TO R4                             FTS806
52107          L,5     IND5 V(E)2 TO R5                             FTS807
52111          L,6     IND6 V(V)2 TO R6                             FTS808
52113          LD,1    FTV3111 V(N)1,V(E)1 TO R1,R2                 FTS809
52115          L,3     FTV3113 V(V)1 TO R3                          FTS810
52117          STD,4   FTV3111 V(N)2,V(E)2 TO V(N)1,V(E)1           FTS811
52121          ST,6    FTV3113 V(V)2 TO V(V)1                       FTS812
         *                                                          FTS813
52123          SG,4    1 V(N)2-V(N)1 FPS B12                        FTS814
52124          SG,5    2 V(E)2-V(E)1 FPS B12                        FTS815
52125          SG,6    3 V(V)2-V(V)1 FPS B11                        FTS816
52126          T,6                                                  FTS817
52127          SRA,6   1 V(D)2-V(D)1 FPS B12                        FTS818
52131          DT,4    FTV0012 AI(N) FPS**2 B11 OS ACCEL
                       IN NED                                       FTS819
52133          DT,5    FTV0012 AI(E) FPS**2 B11                     FTS820
52135          DT,6    FTV0012 AI(D) FPS**2 B11                     FTS821
52137          LG,1    4 AI(N) TO R1                                FTS822
52140          LG,2    5 AI(E) TO R2                                FTS82210
52141          ST,6    FTV3003                                      FTS823
52143          STI,0   FTV0012 CLEAR T(INS)                         FTS824
         *                                                          FTS825
52145          L,4     FTV3209 SIN(PSI) TO R4                       FTS826
52147          L,6     FTV3210 COS(PSI) TO R6                       FTS827
52151          BAL     SR,3 PSI XFRM                                FTS829
52153          ST,4    FTV3002 A(JS) TO MEMORY                      FTS830
52155          LG,2    4 A(IS) TO R2                                FTS831
52156          L,1     FTV3003 AI(D) TO R1                          FTS832
         *                                                          FTS833
52160          L,4     FTV3207 SIN(THETA) TO R4                     FTS834
52162          L,6     FTV3208 COS(THETA) TO R6                     FTS835
```

APPENDIX B-continued

| | | | |
|---|---|---|---|
| 52164 | BAL | SR,3 THETA XFRM | FTS836 |
| 52166 | ST,6 | FTV3001 A(I) TO MEMORY | FTS837 |
| 52170 | LG,2 | 4 A(K') TO R2 | FTS838 |
| 52171 | L,1 | FTV3002 A(JS) TO R1 | FTS839 |
| | * | | FTS840 |
| 52173 | L,4 | FTV3205 SIN(PHI+PHIG) TO R4 | FTS841 |
| 52175 | L,6 | FTV3206 COS(PHI+PHIG) TO R6 | FTS842 |
| 52177 | BAL | SR,3 PHI+PHIG XFRM | FTS843 |
| 52201 | ST,4 | FTV3002 A(E') TO MEMORY | FTS844 |
| 52203 | LG,1 | 5 A(D') TO R1 | FTS845 |
| 52204 | L,2 | FTV3001 A(I) TO R2 | FTS846 |
| | * | | FTS847 |
| 52206 | L,4 | FTV3203 SIN(EPS) TO R4 | FTS848 |
| 52210 | L,6 | FTV3204 COS(EPS) TO R6 | FTS849 |
| 52212 | BAL | SR,3 EPS XFRM | FTS850 |
| 52214 | ST,4 | FTV3003 AI(D) FPS**2 B11 | FTS851 |
| 52216 | LG,1 | 5 A(R') TO R1 | FTS852 |
| 52217 | L,2 | FTV3002 A(E') TO R2 | FTS853 |
| | * | | FTS854 |
| 52221 | L,4 | FTV3201 SIN(ETA) TO R4 | FTS855 |
| 52223 | L,6 | FTV3202 COS(ETA) TO R6 | FTS856 |
| 52225 | BAL | SR,3 ETA XFRM | FTS857 |
| 52227 | STD,4 | FTV3001 AI(R),AI(E) FPS**2 B11 | FTS858 |
| 52231 | BU | *FTV2400 EXIT | FTS859 |
| | * | | FTI001 |
| | ******** | TRACKING FILTER INITIALIZATION | FTI002 |
| | ******** | RETURN ADDRESS IN R0 | FTI003 |
| | * | | FTU004 |
| 52237 FTI | LH,1 | AQV09 RT=RNG HIT BIN NO. FR AQII B11 | FTI007 |
| 52241 | LH,2 | AQV18 FT=VEL HIT FIL NO. FR AQII B11 | FTI008 |
| 52243 | LH,3 | FTV0010 T SECS B-3 | FTI009 |
| 52245 | L,6 | VGV3 VT FPS B12 | FTI010 |
| 52247 | SRA,6 | 1 | FTI011 |
| 52251 | T,6 | -VG FPS B13 | FTI012 |
| | * | | FTI201 |
| | ******** | MPRF TRACKING FILTER INITIALIZATION | FTI202 |
| | * | | FTI203 |

APPENDIX B-continued

| | | | | |
|---|---|---|---|---|
| 52306 | FTIL20 | MT,1 | XTV044 R1 = RBIN*RT FT B22 | FTI204 |
| 52310 | | SL,1 | 2 R1 = RBIN*RT FT B20 | FTI205 |
| 52312 | | LH,4 | DNV10 R4 = DELTA(RT) FT B11 | FTI206 |
| 52314 | | MHI,4 | FX'-.43B0' R4=-.43 DELTA (RT) B11 | FTI20610 |
| 52316 | | SRA,4 | 9 B20 | FTI20620 |
| 52320 | | AG,1 | 4 R1=RBIN*RT-.43 DELTA(RT) B20 | FTI20630 |
| 52321 | | ST,1 | FTV1001 R(TPR)-INITIAL RNG FT B20 | FTI207 |
| 52323 | | ST,6 | FTV1002 V(TPR)=-VG FPS E13 | FTI208 |
| 52325 | | MG,6 | 3 T*V(TPR) FT B10 | FTI209 |
| 52326 | | SRA,6 | 10 TO B20 | FTI210 |
| 52330 | | AG,1 | 6 | FTI211 |
| 52331 | | ST,1 | FTV0101 RGC=R(TPR)+T*V(TPR) FT B20 | FTI212 |
| | * | | | FTI213 |
| 52333 | | MT,2 | XTV045 *PRF/16 AT B10· PROD AT B21 | FTI214 |
| 52335 | | MT,2 | RFV003 *(LAMBDA/2) AT B-4.PROD AT B17 | FTI215 |
| 52337 | | SL,2 | 4 TO B13 | FTI216 |
| 52341 | FTIL25 | ST,2 | FTV1012 V(TPV) FPS B13 | FTI217 |
| 52343 | | ST,2 | FTV0102 VGC=V(TPV) B13 | FTI218 |
| 52345 | | BU | FTIL40 TO COMMON I.C. | FTI219 |
| | * | | | FTI401 |

| | | | | |
|---|---|---|---|---|
| | ******* | | COMMON TRACKING FILTER INITIALIZATION.(ALL PRF'S) | FTI402 |
| | * | | | FTI404 |
| 52414 | FTIL40 | LHI,4 | FX'1·B6' SET A-PRIORI SNR'S FOR 1ST LONG FC | FTI405 |
| 52416 | | STH,4 | SNV03 SNR(RNG) | FTI406 |
| 52420 | | STH,4 | SNV04 SNR(AZ) | FTI407 |
| 52422 | | STH,4 | SNV05 SNR(EL) | FTI408 |
| 52424 | | STH,4 | SNV06 SNR(VEL) | FTI409 |
| | * | | | FTI410 |
| 52426 | | STH,5 | FTF102 'HI BR 1ST'=(R5)='VS'(NOT USED=M,L) | FTI411 |
| 52430 | | STHI,1 | FTV1601 I.C. MED BR COUNT (N=1) | FTI413 |
| 52432 | | BU | *0 RETURN TO XT | FTI414 |

APPENDIX C

Range Tracker

| | | | | |
|---|---|---|---|---|
| $C_1 = C_3$ | 0 | | 0 | |
| | (R > 50,000 ft) | | (R ≤ 50,000 ft) | |
| $C_2$ | −0.333 (−0.1 for extrapolation) | | | |

| | | | | max |
|---|---|---|---|---|
| Initial Track | $k_1^a$ | 0.15 | 0.08 | 2 |
| | $k_2^a$ | 0.3 | 0.18 | 2 |
| | $k_3^a$ | 0.0 | 0.0 | 8 |

$R_o$ SNR < 7 db     $R_o$ SNR ≥ 7 db

| | | | | max |
|---|---|---|---|---|
| Final Track | $k_1^b$ | 0.15 | 0.12 | 2 |
| | $k_2^b$ | 0.16 | 0.2 | 8 |
| | $k_3^b$ | 0.05 | 0.13 | 32 |

$R_o$ SNR < 7 db     $R_o$ SNR ≥ 7 db

| | | | |
|---|---|---|---|
| SNR1 | 1.0 | | 1 |

Velocity Tracker

| | | | | max |
|---|---|---|---|---|
| Initial Track | $K_2^d$ | −0.15 | −0.23 | 4 |
| | $K_3^d$ | −0.8 | −2 | 32 |
| | $k_{Rf}^{\cdot}$ | 1 | 1 | 2 |

$R_o$ SNR < 7 db     $R_o$ SNR ≥ 7 db

| | | | | max |
|---|---|---|---|---|
| Final Track | $K_2^e$ | 0.7 | 1.0 | 8 |
| | $K_3^e$ | 3.0 | 5.0 | 32 |
| | $k_{Rf}^{\cdot}$ | 0.35 | 0.85 | 2 |

$R_o$ SNR<7db     $R_o$ SNR≥7db

Angle Track

| | | | | max |
|---|---|---|---|---|
| $K_{a1}$ | 0.8 | 0.2 | 0.12 | 2 |
| $K_{a2}$ | 4 | 0.67 | 0.17 | 15 |
| $K_{a3}$ | $-2 \times 10^3$ | $-10^3$ | $-100$ | $2^{15}$ |
| $K_{a4}$ | 0.15 | 0.02 | 0 | 2 |
| | $R(0)<R_1$ | $R_1<R(0)$ and $SNR(D) \geq C_4$ $SNR(D)=SNR_R$ | $R_1<R(0)$ and $SNR(D)<C_4$ | |

| | | max |
|---|---|---|
| $R_1$ | $2 \times 10^4$ | $5 \times 10^4$ |
| $C_4$ | 4 | 20 |
| $C_{10}$ | 0.03 | 0.1 |

Antenna Controller Parameters

| | | max |
|---|---|---|
| $K_2$ | 15 | 60 |
| $a_1, a_2$ | 1.0 | 1.0 |
| $b_1, b_2$ | 0.3 | 4 |
| $c_1, c_2$ | $-0.3$ | 4 |

Angular Scintillation

| | | max |
|---|---|---|
| $\alpha_1$ | 0.8 | 2 |
| $\alpha_2$ | 130 | 500 |
| $\alpha_3$ | 0.0025 | 1 |

$Q_a$ Matrix

| | | max |
|---|---|---|
| $Q_s$ | $0.4 \times 10^{-9}$ | $10^{-7}$ |
| $\alpha_4$ | 2670 | $8 \times 10^3$ |

A, H, K Matrices

| | | max |
|---|---|---|
| $a_T$ | 0.33 | 1 |
| $k_{e0}$ | 0 | 0 |
| $k_{e1}$ | 0.44 | 1 |
| $k_{e2}$ | 0 | 0 |
| $k_{d0}$ | 0 | 0 |
| $k_{d1}$ | 0.44 | 1 |
| $k_{d2}$ | 0 | 0 |
| $R_{a0}$ | $1.1 \times 10^{-4}$ | $2^{-12}$ |
| $S_2$ (Initial SNR) | 1 | 10 |
| b | $0.5 \times 10^{-6}$ | $10^7$ |

$L_e$ and $L_d$ Vectors

| | | max |
|---|---|---|
| $K_g$ | $-0.1$ | 1 |
| $C_{15}$ | 0.7 | 0.1 |
| $C_{14}$ | 0.834 | 2 |

Radome Errors (Typical)

| | |
|---|---|
| A | 0.0010 rad |
| B | 0.0007 |
| C | 0.0009 |
| D | 0.0017 |
| E | 0.0018 |
| F | 0.0009 |

Initialization of Full Track

| | | max |
|---|---|---|
| $m_1$ | $10^{-4}$ | $5 \times 10^{-4}$ |
| $m_3$ | $4 \times 10^3$ | $5 \times 10^3$ |
| $m_2$ | $4 \times 10^{-4}$ | $3.9 \times 10^3$ |

Reinitialization

| | | max |
|---|---|---|
| $c_{11}$ | $1.5 \times 10^{-3}$ | $1.9 \times 10^{-3}$ |
| $c_{12}$ | $3 \times 10^{-3}$ | $3.9 \times 10^{-3}$ |
| $c_{13}$ | 0.9 | 1 |

What is claimed is:

1. In a monopulse radar tracking system having a direction sensitive antenna for cyclically sensing reflected electromagnetic energy from a moving target and producing signals $\Delta R_m$, $\Delta V_m$, $\Delta \epsilon_m$ and $\Delta \eta_m$ representing discriminants of elevation, azimuth, range and radial velocity, respectively, of said target relative to said tracking system, filters for tracking target range, velocity, elevation and azimuth, each filter responding to respective discriminants $\Delta R_m$, $\Delta V_m$, $\Delta \epsilon_m$ and $\Delta \eta_m$ to generate predictions of the next measurements from current estimates of filter states, where the states are vectors $[X_R(i), X_V(i), X_e(i)$ and $X_d(i),]$ $X_R(i)$, $X_V(i)$, $X_e(i)$ and $X_d(i)$, using for each state an equation of the general form $$\hat{X}_{i+1} = \overline{\Phi}_i \, \hat{X}_i + L_i + K_i(Y_i - \overline{H}_i \, \hat{X}_i)$$

where $\hat{X}$ is a state vector, $\overline{\Phi}$ is a transition matrix, $L$ is a vector of dynamical aiding terms to compensate for rotational rates and inertial acceleration of the antenna, $k$ is a gain factor, $Y$ is the output of a measurement structure for the dynamical system, H is a system scaling factor which accounts for the gain in the measurement structure, a ^ over X indicates the estimate of X, a bar over a symbol indicates a matrix quantity or value used in the filter for the parameter represented by the symbol, and the subscript $i$ indicates a value at time $i$ while the subscript $i+1$ indicates a value at the next iteration time.

2. In an airborne system having direction sensitive means for cyclically sensing electromagnetic energy from a target and producing pulse signals proportional thereto for tracking moving targets, the combination comprising means connected to said sensing means and responsive to said energy received from said target for cyclically developing signals representing discriminants of at least elevation, $\Delta \epsilon_m$, and azimuth, $\Delta \eta_m$;

means responsive to said signals representing discriminants for cyclically generating predictions of the next measurements of elevation, $\hat{X}_e$, and azimuth, $\hat{X}_d$, from current estimates of tracking system vectors, using for each vector an equation of the general form $$\hat{X}_{i+1} = \overline{\Phi}_i \, \hat{X}_i + L_i + K_i(Y_i - \overline{H}_i \, \hat{X}_i)$$

where $\hat{X}$ is a multistate vector, $\overline{\Phi}$ is a transition matrix, $L$ is a vector of dynamical aiding terms to compensate for motion of said sensing means, $K$ is a system gain factor, $Y$ is the output of a measurement structure for said system, and $\overline{H}$ is the scaling factor which accounts for a system measurement parameter, where a bar over a symbol indicates a matrix quantity used in said tracking system as the system's version of the parameter represented by the symbol, the subscript $i$ indicates a value during the ith cycle of iterative computations, and where $\hat{X}$ for respective elevation, $e$, and azimuth, $d$, tracking is $$\hat{X}_e = \begin{bmatrix} \epsilon_{P_e} \\ \omega_{LSP_e} \\ a_{T_d} \\ S_e \end{bmatrix} \qquad \hat{X}_d = \begin{bmatrix} \epsilon_{P_d} \\ \omega_{LSP_d} \\ a_{T_e} \\ S_d \end{bmatrix}$$

thus generating estimates of pointing errors $\epsilon_e$ and $\epsilon_d$, target line-of-sight rates, $\omega_{LSP_e}$ and $\omega_{LSP_d}$, target accelerations normal to the line-of-sight, $a_{T_d}$ and $a_{T_e}$, and target angular scintillations, $S_e$ and $S_d$, all referenced directly to antenna coordinates, the subscript P designating a prediction, means responsive to states of said tracking vectors for producing tracking commands, and means responsive to said commands for driving said system, thereby tracking said target.

3. In a monopulse radar tracking system having a direction sensitive antenna for cyclically sensing reflected electromagnetic energy from a moving target and producing signals $\Delta R_m$, $\Delta V_m$, $\Delta \epsilon_m$ and $\Delta \eta_m$ representing discriminants of elevation, azimuth, range and radial velocity, respectively, of said target relative to said tracking system, filters for tracking target range, velocity, elevation and azimuth, each filter responding to respective discriminants $\Delta R_m$, $\Delta V_m$, $\Delta\epsilon_m$ and $\Delta\eta_m$ to generate predictions of the next measurements from current estimates of filter states, where the states are vectors [$X_R(i)$, $X_V(i)$, $X_e(i)$ and $X_d(i)$,] $X_R(i)$, $X_V(i)$, $X_e(i)$ and $X_d(i)$, using for each state an equation of the general form $$\hat{X}_{i+1} = \overline{\Phi}_i \hat{X}_i + K_i (Y_i - \overline{H}_i \hat{X}_i)$$

where $\hat{X}$ is a state vector, $\overline{\Phi}$ is a transition matrix, $K$ is a gain factor, $Y$ is the output of a measurement structure for the dynamical system, $H$ is a system scaling factor which accounts for the gain in the measurement structure, a ˆ over $X$ indicates the estimate of $X$, a bar over a symbol indicates a matrix quantity or value used in the filter for the parameter represented by the symbol, and the subscript $i$ indicates a value at time $i$ while the subscript $i+1$ indicates a value at the next iteration time.

4. In a radar tracking system having a direction sensitive antenna for cyclically sensing reflected electromagnetic energy from a moving target and producing a signal representing a discriminant of a selected parameter of said target relative to said tracking system, a filter for tracking said selected parameter, said filter responding to said discriminant to generate predictions of the next measurement from a current estimate of the filter state where the state is a vector $X(i)$, using for said state an equation of the general form $$\hat{X}_{i+1} = \overline{\Phi}_i \hat{X}_i + K_i (y_i - \overline{H}_i \hat{X}_i)$$

where $\hat{X}$ is a state vector, $\overline{\Phi}$ is a transition matrix, $K$ is a gain factor, $Y$ is the output of a measurement structure for the dynamical system responsive to said discriminant, $H$ is a system scaling factor which accounts for the gain in the measurement structure, a ˆ over $X$ indicates the estimate of $X$, a bar over a symbol indicates that a matrix quantity or value is used in said filter, and the subscript $i$ indicates a value at time $i$ while the subscript $i+1$ indicates a value at the next iteration time.

5. In a radar tracking system having a direction sensitive antenna for cyclically sensing reflected electromagnetic energy from a moving target and producing a signal representative of a discriminant of a selected parameter of said target relative to said tracking system, a filter for tracking said selected parameter, said filter responding to said discriminant to generate predictions of the next measurements from a current estimate of the filter state, where the state is a vector $X(i)$, using for said state an equation of the general form $$\hat{X}_{i+1} = \overline{\Phi}_i \hat{X}_i + L_i + K_i (Y_i - \overline{H}_i \hat{X}_i)$$

where $\hat{X}$ is a state vector, $\overline{\Phi}$ is a transition matrix, $L$ is a vector of dynamically aiding terms to compensate for rotational rates and inertial acceleration of the antenna, $K$ is a gain factor, $Y$, is the output of a measurement structure for the dynamical system responsive to said discriminant, $H$ is a system scaling factor which accounts for the gain in the measurement structure, a ˆ over $X$ indicates the estimate of $X$, a bar over a symbol indicates that a matrix quantity or value is used in said filter, and the subscript $i$ indicates a value at time $i$ while the subscript $i+1$ indicates a value at the next iteration time.

* * * * *

UNITED STATES PATENT AND TRADEMARK OFFICE
CERTIFICATE OF CORRECTION

PATENT NO. : 3,952,304
DATED : April 20, 1976
INVENTOR(S) : Laurence E. Broniwitz, John B. Pearson, III, Mark I. Landau It is certified that error appears in the above-identified patent and that said Letters Patent are hereby corrected as shown below:

Column 199, Claim 1, line 43, --vectors $X_R(i)$, $X_V(i)$,-- in lieu of vectors [$X_R(i)$, $X_V(i)$, $X_e(i)$ and $X_d(i)$,] $X_R(i)$, $X_V(i)$, Column 200, Claim 2, lines 51-53

$$\hat{X}_e = \begin{matrix} \varepsilon_{P_e} \\ \omega_{LSP_e} \\ a_{T_d} \\ S_e \end{matrix} \quad \text{in lieu of} \quad \hat{X}_e = \begin{matrix} \varepsilon_{P_e} \\ \omega_{LSP} \\ a_{T_d} \\ S_e \end{matrix}$$

Column 201, Claim 3, line 5; --vectors $X_R(i)$, $X_V(i)$,-- in lieu of vectors [$X_R(i)$, $X_V(i)$, $X_e(i)$ and $X_d(i)$,] $X_R(i)$, $X_V(i)$, Signed and Sealed this Thirteenth Day of December 1977

[SEAL]

Attest:

RUTH C. MASON
Attesting Officer

LUTRELLE F. PARKER
Acting Commissioner of Patents and Trademarks